(12) United States Patent
Pokora et al.

(10) Patent No.: US 12,046,254 B2
(45) Date of Patent: *Jul. 23, 2024

(54) MULTI-SENSOR DEVICES AND SYSTEMS FOR EVALUATING VEHICLE CONDITIONS

(71) Applicant: ACV Auctions Inc., Buffalo, NY (US)

(72) Inventors: Michael Pokora, Tonawanda, NY (US); Philip Schneider, Amherst, NY (US); Livio Forte, III, Lloyd Harbor, NY (US); Margaret Donnelly, Buffalo, NY (US); Justas Birgiolas, Lockport, NY (US); Shawn Galante, Depew, NY (US); Marc LaBelle, Buffalo, NY (US); Dennis Christopher Fedorishin, Amherst, NY (US)

(73) Assignee: ACV Auctions Inc., Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,676

(22) Filed: Jul. 17, 2023

(65) Prior Publication Data
US 2023/0360667 A1 Nov. 9, 2023

Related U.S. Application Data

(63) Continuation of application No. 18/087,385, filed on Dec. 22, 2022, now Pat. No. 11,783,851.
(Continued)

(51) Int. Cl.
*G01M 13/028* (2019.01)
*G01M 15/02* (2006.01)
(Continued)

(52) U.S. Cl.
CPC ........... *G10L 25/78* (2013.01); *G01M 13/028* (2013.01); *G01M 15/02* (2013.01); *G01M 15/12* (2013.01); *G10L 25/30* (2013.01)

(58) Field of Classification Search
CPC ..... G01M 13/028; G01M 15/02; G01M 15/12
(Continued)

(56) References Cited

U.S. PATENT DOCUMENTS

| 4,215,412 A | 7/1980 | Bernier et al. |
|---|---|---|
| 4,375,672 A | 3/1983 | Kato et al. |

(Continued)

FOREIGN PATENT DOCUMENTS

WO  WO 2008/022289 A2  2/2008

OTHER PUBLICATIONS

International Search Report and Written Opinion for International Application No. PCT/US2020/014645 mailed May 22, 2020.
(Continued)

*Primary Examiner* — Erick R Solis
(74) *Attorney, Agent, or Firm* — Wolf, Greenfield & Sacks, P.C.

(57) ABSTRACT

A mobile vehicle diagnostic device (MVDD) for acquiring data about a vehicle, the device comprising: a housing configured to be mechanically coupled to the vehicle so that, when the housing is mechanically coupled to the vehicle, vibration generated by the vehicle during its operation causes the housing to vibrate; acoustic sensors disposed within the housing and configured to acquire sound generated by the vehicle during its operation, the acoustic sensors comprising first and second acoustic sensors respectively oriented in first and second directions, wherein the first and second directions are at least 30 degrees apart; at least one dampening device disposed in the housing and positioned to dampen vibration of the acoustic sensors caused by operation of the vehicle; and at least one vibration sensor disposed within the housing and configured to sense vibration in the housing caused by the operation of the vehicle.

20 Claims, 46 Drawing Sheets

Related U.S. Application Data

(60) Provisional application No. 63/293,534, filed on Dec. 23, 2021, provisional application No. 63/293,558, filed on Dec. 23, 2021.

(51) Int. Cl.
*G01M 15/12* (2006.01)
*G10L 25/30* (2013.01)
*G10L 25/78* (2013.01)

(58) Field of Classification Search
USPC .................. 73/114.07; 701/31.5, 33.2, 33.3
See application file for complete search history.

(56) References Cited

U.S. PATENT DOCUMENTS

| | | | |
|---|---|---|---|
| 5,854,993 A * | 12/1998 | Grichnik | G01M 13/028 |
| | | | 706/912 |
| 6,175,787 B1 | 1/2001 | Breed | |
| 6,275,765 B1 | 8/2001 | Divljakovic et al. | |
| 7,054,596 B2 | 5/2006 | Arntz | |
| 8,311,973 B1 | 11/2012 | Zadeh | |
| 8,437,904 B2 | 5/2013 | Mansouri et al. | |
| 10,127,591 B1 | 11/2018 | Wollmer et al. | |
| 10,554,802 B2 | 2/2020 | Moore et al. | |
| 10,740,404 B1 | 8/2020 | Hjermstad et al. | |
| 11,157,835 B1 | 10/2021 | Hjermstad et al. | |
| 11,327,726 B2 | 5/2022 | Wang et al. | |
| 11,631,289 B2 | 4/2023 | Campanella et al. | |
| 11,783,851 B2 | 10/2023 | Schneider et al. | |
| 2004/0176879 A1 | 9/2004 | Menon et al. | |
| 2005/0096873 A1 | 5/2005 | Klein | |
| 2005/0149234 A1 * | 7/2005 | Vian | G05B 23/024 |
| | | | 706/23 |
| 2005/0169484 A1 | 8/2005 | Cascone et al. | |
| 2005/0171833 A1 | 8/2005 | Jost et al. | |
| 2005/0192722 A1 | 9/2005 | Noguchi | |
| 2008/0192954 A1 | 8/2008 | Honji et al. | |
| 2012/0323531 A1 * | 12/2012 | Pascu | F01D 17/02 |
| | | | 702/184 |
| 2013/0277529 A1 | 10/2013 | Bolliger | |
| 2014/0096608 A1 | 4/2014 | Themm et al. | |
| 2014/0162219 A1 | 6/2014 | Stankoulov | |
| 2014/0201126 A1 | 7/2014 | Zadeh et al. | |
| 2015/0019533 A1 | 1/2015 | Moody et al. | |
| 2015/0100448 A1 | 4/2015 | Binion et al. | |
| 2015/0333789 A1 | 11/2015 | An | |
| 2016/0025027 A1 | 1/2016 | Mentele | |
| 2016/0034590 A1 | 2/2016 | Endras et al. | |
| 2016/0036899 A1 | 2/2016 | Moody et al. | |
| 2016/0055737 A1 | 2/2016 | Boken | |
| 2016/0112216 A1 | 4/2016 | Sargent et al. | |
| 2016/0161299 A1 | 6/2016 | Campbell et al. | |
| 2016/0342945 A1 | 11/2016 | Doranth et al. | |
| 2016/0377500 A1 | 12/2016 | Bizub | |
| 2017/0169399 A1 | 6/2017 | Areshidze et al. | |
| 2017/0201779 A1 | 7/2017 | Publicover et al. | |
| 2017/0213541 A1 | 7/2017 | MacNeille et al. | |
| 2017/0356936 A1 | 12/2017 | Ismail et al. | |
| 2017/0364776 A1 | 12/2017 | Micks et al. | |
| 2018/0005463 A1 | 1/2018 | Siegel et al. | |
| 2018/0025392 A1 | 1/2018 | Helstab | |
| 2018/0150805 A1 | 5/2018 | Shaver et al. | |
| 2018/0350167 A1 | 12/2018 | Ekkizogloy et al. | |
| 2019/0017487 A1 | 1/2019 | Rudnitzki et al. | |
| 2019/0080528 A1 | 3/2019 | Bednar et al. | |
| 2019/0228596 A1 | 7/2019 | Mondello et al. | |
| 2019/0287079 A1 | 9/2019 | Shiraishi et al. | |
| 2019/0294878 A1 | 9/2019 | Endras et al. | |
| 2020/0057487 A1 | 2/2020 | Sicconi et al. | |
| 2020/0064227 A1 | 2/2020 | Im et al. | |
| 2020/0118367 A1 | 4/2020 | Dudar | |
| 2020/0234517 A1 | 7/2020 | Campanella et al. | |
| 2021/0123832 A1 | 4/2021 | Johnson et al. | |
| 2023/0091331 A1 | 3/2023 | Gibson et al. | |
| 2023/0186690 A1 * | 6/2023 | Usami | G07C 5/006 |
| | | | 701/29.1 |
| 2023/0204461 A1 | 6/2023 | Schneider et al. | |
| 2023/0206942 A1 | 6/2023 | Schneider et al. | |
| 2023/0267780 A1 | 8/2023 | Campanella et al. | |

OTHER PUBLICATIONS

International Preliminary Report on Patentability for International Application No. PCT/US2020/014645 mailed Aug. 5, 2021.
Extended European Search Report for European Application No. 20745586.6 dated Dec. 12, 2022.
Invitation to Pay Additional Fees for International Application No. PCT/US2022/053850 mailed Apr. 3, 2023.
International Search Report and Written Opinion for International Application No. PCT/US2022/053850 mailed Jun. 2, 2023.
Bilen et al., A framework for the robust evaluation of sound event detection. 2020 IEEE International Conference on Acoustics, Speech and Signal Processing (ICASSP). May 4, 2020:61-5.
Fedorishin et al., Large-Scale Acoustic Automobile Fault Detection: Diagnosing Engines Through Sound. Proceedings of the 28th ACM SIGKDD Conference on Knowledge Discovery and Data Mining Aug. 14, 2022. 11 pages.
Fedorishin et al., Waveforms and Spectrograms: Enhancing Acoustic Scene Classification Using Multimodal Feature Fusion. DCASE 2021:216-20.
U.S. Appl. No. 18/087,323, filed Dec. 22, 2022, Schneider et al.
U.S. Appl. No. 18/087,385, filed Dec. 22, 2022, Schneider et al.
U.S. Appl. No. 18/183,562, filed Mar. 14, 2023, Campanella et al.
PCT/US2020/014645, May 22, 2020, International Search Report and Written Opinion.
PCT/US2020/014645, Aug. 5, 2021, International Preliminary Report on Patentability.
EP 20745586.6, Dec. 12, 2022, Extended European Search Report.
PCT/US2022/053850, Apr. 3, 2023, Invitation to Pay Additional Fees.
PCT/US2022/053850, Jun. 2, 2023, International Search Report and Written Opinion.

* cited by examiner

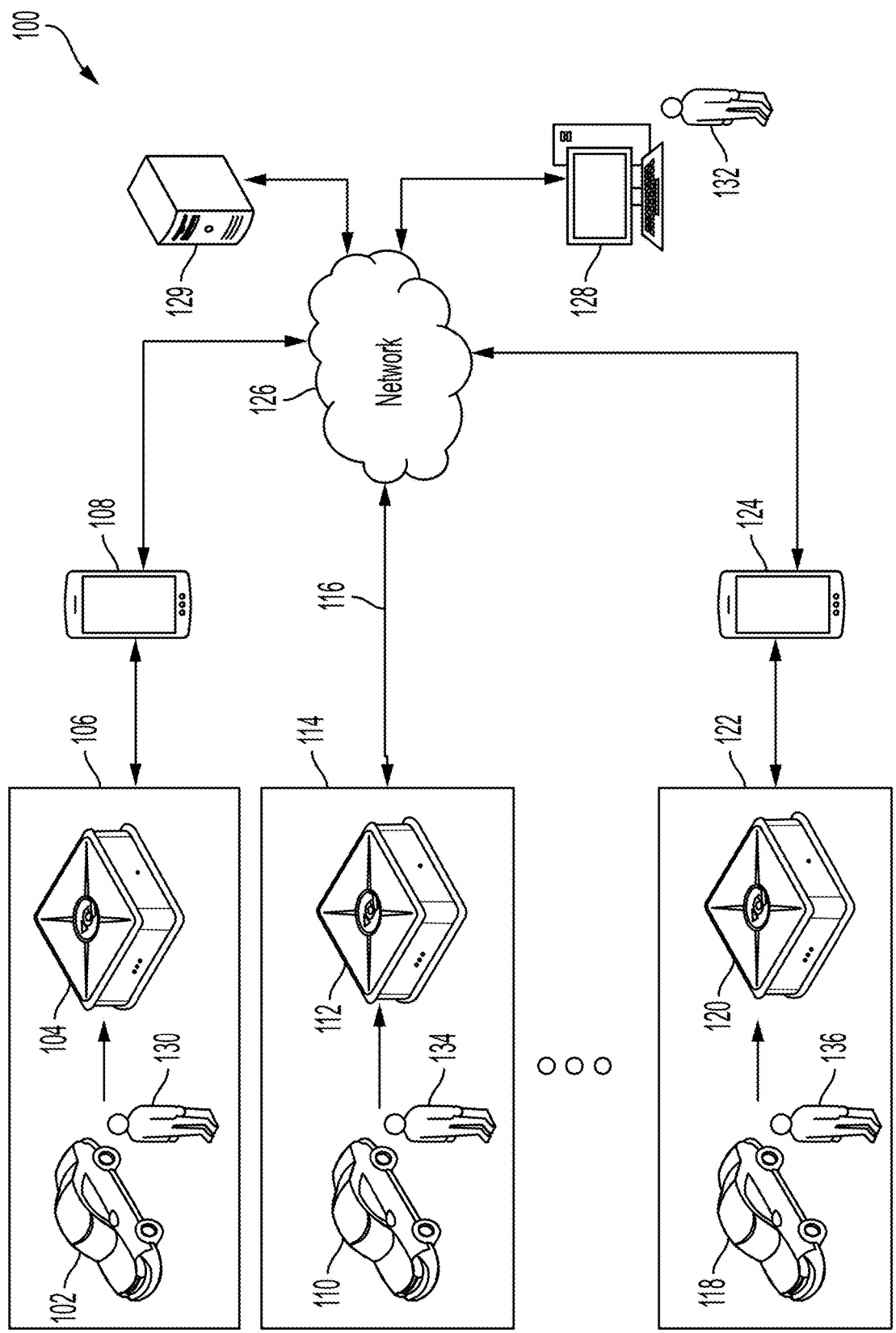

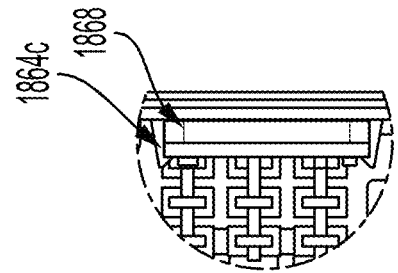
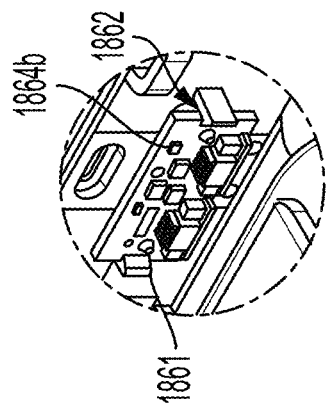
FIG. 18I
FIG. 18K
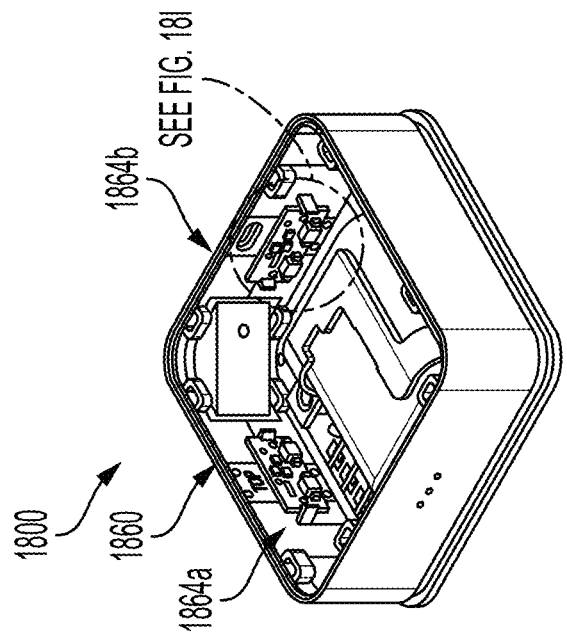
FIG. 18H
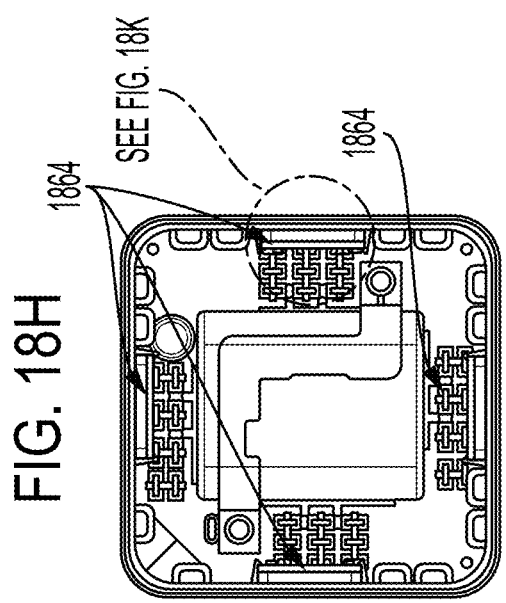
FIG. 18J

MULTI-SENSOR DEVICES AND SYSTEMS FOR EVALUATING VEHICLE CONDITIONS

CROSS REFERENCE TO RELATED APPLICATIONS

This application is a continuation of and claims priority under 35 U.S.C. § 120 to U.S. patent application Ser. No. 18/087,385, filed Dec. 22, 2022, titled "MULTI-SENSOR DEVICES AND SYSTEMS FOR EVALUATING VEHICLE CONDITIONS", which claims the benefit of priority under 35 U.S.C. § 119(e) to U.S. Provisional Patent Application Serial No. "63/293,558", filed on Dec. 23, 2021, and entitled "INTEGRATED PORTABLE MULTI-SENSOR DEVICE FOR DETECTION OF VEHICLE OPERATING CONDITION," and U.S. Provisional Patent Application Serial No. "63/293,534", filed on Dec. 23, 2021, and entitled "INTEGRATION OF ENGINE VIBRATION AND SOUND WITH OBDII READING," each of which is incorporated by reference herein in its entirety.

BACKGROUND

In many situations it is important to determine the condition of a vehicle (e.g., a car, a truck, a boat, a plane, a bus, etc.). For example, a buyer, seller, or owner of a vehicle may wish to understand the condition of the vehicle and, in particular, whether the vehicle has any defects. For example, a buyer may wish to understand whether the engine, the transmission, or any other system of a vehicle has any defects. If so, the buyer may wish to pay a different amount for the vehicle and/or consider repairing the vehicle.

Conventional methods of identifying defects in vehicles include having a vehicle inspected by a professional mechanic. The mechanic may use on-board diagnostics provided by a vehicle (e.g., OBDII codes for cars) to help identify any issues with the vehicle. However, using a mechanic is time-consuming and costly. In circumstances where the condition of many vehicles needs to be established (e.g., by a car dealer, a car auction marketplace, etc.), having a mechanic evaluate each vehicle is impractical.

SUMMARY

Some embodiments provide for a method for using a trained machine learning (ML) model to detect presence of vehicle defects from audio acquired at least in part during operation of an engine of a vehicle, the method comprising using at least one computer hardware processor to perform: obtaining, via at least one communication network, a first audio recording that was acquired, using at least one acoustic sensor, at least in part during operation of the engine; processing the first audio recording using the trained ML model to detect, from the first audio recording, presence of at least one vehicle defect, the processing comprising: generating an audio waveform from the first audio recording, generating a two-dimensional (2D) representation of the audio waveform, and processing the audio waveform and the 2D representation of the audio waveform using the trained ML model to obtain output indicative of presence or absence of the at least one vehicle defect.

Some embodiments provide for a system, comprising: at least one computer hardware processor; and at least one non-transitory computer-readable storage medium storing processor executable instructions that when executed by the at least one computer hardware processor perform a method for using a trained machine learning (ML) model to detect presence of vehicle defects from audio acquired at least in part during operation of an engine of a vehicle, the method comprising: obtaining, via at least one communication network, a first audio recording that was acquired, using at least one acoustic sensor, at least in part during operation of the engine; processing the first audio recording using the trained ML model to detect, from the first audio recording, presence of at least one vehicle defect, the processing comprising: generating an audio waveform from the first audio recording, generating a two-dimensional (2D) representation of the audio waveform, and processing the audio waveform and the 2D representation of the audio waveform using the trained ML model to obtain output indicative of presence or absence of the at least one vehicle defect.

Some embodiments provide for at least one non-transitory computer-readable storage medium storing processor executable instructions that, when executed by at least one computer hardware processor, cause the at least one computer hardware processor to perform a method for using a trained machine learning (ML) model to detect presence of vehicle defects from audio acquired at least in part during operation of an engine of a vehicle, the method comprising: obtaining, via at least one communication network, a first audio recording that was acquired, using at least one acoustic sensor, at least in part during operation of the engine; processing the first audio recording using the trained ML model to detect, from the first audio recording, presence of at least one vehicle defect, the processing comprising: generating an audio waveform from the first audio recording, generating a two-dimensional (2D) representation of the audio waveform, and processing the audio waveform and the 2D representation of the audio waveform using the trained ML model to obtain output indicative of presence or absence of the at least one vehicle defect.

Some embodiments provide for a system for detecting presence of vehicle defects from audio acquired at least in part during operation of an engine of the vehicle, the system comprising: at least one mobile vehicle diagnostic device (MVDD), the MVDD being configured to be coupled to the vehicle, the MVDD comprising at least one acoustic sensor and configured to acquire, using the at least one acoustic sensor, a first audio recording at least in part during operation of the engine, and the MVDD being configured to transmit the first audio recording; at least one mobile device configured to receive the first audio recording from the MVDD and transmit the first audio recording, via the at least one communication network, to at least one computing device; and the at least one computing device, the at least one computing device configured to perform: obtaining, via the at least one communication network, the first audio recording; processing the first audio recording using a trained ML model to detect, from the first audio recording, presence of at least one vehicle defect, the processing comprising: generating an audio waveform from the first audio recording, generating a two-dimensional (2D) representation of the audio waveform, and processing the audio waveform and the 2D representation of the audio waveform using the trained ML model to obtain output indicative of presence or absence of the at least one vehicle defect.

In some embodiments, generating the audio waveform from the first audio recording comprises resampling, normalizing, and/or clipping the first audio recording to obtain the audio waveform.

In some embodiments, the audio recording comprises at least a first waveform for at least a first audio channel, and wherein generating the audio waveform from the first audio recording comprises: resampling the first waveform to a target frequency to obtain a resampled waveform; normalizing the resampled waveform by subtracting its mean and dividing by its standard deviation to obtain a normalized waveform; and clipping the normalized waveform to a target maximum to obtain the audio waveform.

In some embodiments, the audio waveform is between 5 and 45 seconds long and wherein the frequency of the audio waveform is between 8 and 45 KHz.

In some embodiments, generating the two-dimensional (2D) representation of the audio waveform comprises generating a time-frequency representation of the audio waveform.

In some embodiments, generating the time-frequency representation of the audio waveform comprises using a short-time Fourier transform, a wavelet transform, a Gabor transform, or a chirplet transform to generate the time-frequency representation.

In some embodiments, generating the time-frequency representation of the audio waveform comprises generating a Mel-scale log spectrogram from the audio waveform.

In some embodiments, the method further comprises: obtaining, via the at least one communication network, metadata indicating one or more properties of the vehicle, wherein using the trained ML model to detect the presence of the at least one vehicle defect further comprises generating metadata features from the metadata, and wherein processing the audio waveform and the 2D representation of the audio waveform comprises processing the audio waveform, the 2D representation of the audio waveform, and the metadata features using the trained ML model to obtain the output indicative of the presence or absence of the at least one vehicle defect.

In some embodiments, the properties of the vehicle are selected from the group consisting of: a reading of the vehicle's odometer, a model of the vehicle, a make of the vehicle, an age of the vehicle, a type of drivetrain in the vehicle, a type of transmission in the vehicle, a measure of displacement of the engine, a fuel type for the vehicle, an indication of whether on-board diagnostics (OBD) codes could be obtained from the vehicle, a number of incomplete readiness monitors reported by the OBD scanner, one or more BlackBook-reported engine properties, a list of one or more OBD codes, location of the vehicle, information about weather at the location of the vehicle, and information about a seller of the vehicle.

In some embodiments, the metadata comprises text indicating at least one of the one or more properties, and generating the metadata features from the metadata comprises generating a numeric representation of the text.

In some embodiments, the output is indicative of the presence or absence of abnormal internal engine noise, timing chain noise, engine accessory noise, and/or exhaust noise. In some embodiments, the trained ML model is a deep neural network model.

In some embodiments, the trained ML model comprises: a first neural network portion comprising a plurality of one-dimensional (1D) convolutional layers configured to process the audio waveform; a second neural network portion comprising a plurality of 2D convolutional layers configured to process the 2D representation of the audio waveform; and a fusion neural network portion comprising one or more fully connected layers configured to combine outputs produced by the first neural network portion and the second neural network portion to obtain the output indicative of the presence or absence of the at least one vehicle defect.

In some embodiments, the method further comprises: obtaining, via the at least one communication network, metadata indicating one or more properties of the vehicle, wherein using the trained ML model to detect the presence of the at least one vehicle defect further comprises generating metadata features from the metadata, wherein processing the audio waveform and the two-dimensional representation of the audio waveform comprises processing the audio waveform, the two-dimensional representation of the audio waveform, and the metadata features, using the trained ML model to obtain output indicative of presence of the at least one vehicle defect, wherein the trained ML model further comprises a third neural network portion comprising one or more fully connected layers configured to process the metadata features, and wherein the one or more fully connected layers of the fusion neural network are configured to combine outputs produced by the first neural network portion, the second neural network portion, and the third neural network portion to obtain the output indicative of the presence or absence of the at least one vehicle defect.

In some embodiments, the trained ML model has at least one million parameters, and processing the first audio recording using the trained ML model to detect the presence of the at least one vehicle defect comprises computing the output using values of the at least one million parameters, the audio waveform, and the 2D representation of the audio waveform.

In some embodiments, the method further comprises acquiring, using the at least one acoustic sensor, the first audio recording at least in part during operation of the engine.

In some embodiments, the method further comprises: determining, based on the output, that the at least one vehicle defect was detected using the first audio recording, and generating an electronic vehicle condition report indicating that the at least one vehicle defect was detected using the first audio recording and a measure of confidence in that detection.

In some embodiments, the method further comprises: transmitting the electronic vehicle condition report, via the at least one communication network, to a remote device of an inspector of the vehicle.

In some embodiments, the method further comprises receiving a second audio recording, via the at least one communication network, from the remote device of the inspector of the vehicle, the second audio recording being acquired after transmission of the electronic vehicle condition report and using the at least one acoustic sensor at least in part during operation of the engine; and processing the second audio recording using the trained ML model to detect, from the second audio recording, presence of the at least one vehicle defect, the processing comprising: generating a second audio waveform from the second audio recording, generating a second two-dimensional (2D) representation of the second audio waveform, and processing the second audio waveform and the second 2D representation of the audio waveform using the trained ML model to obtain second output indicative of presence or absence of the at least one vehicle defect.

In some embodiments, the method further comprises: transmitting the electronic vehicle condition report, via the at least one communication network, to one or more reviewers.

In some embodiments, the method further comprises upon review and approval of the electronic vehicle condition report, initiating an online vehicle auction to auction the vehicle.

In some embodiments, obtaining the first audio recording comprises receiving the first audio recording from a mobile device, via the at least one communication network, by at least one computing device at a location remote from a location of the mobile device, and the processing is performed by the at least one computing device.

In some embodiments, the mobile device comprises a smart phone or a mobile vehicle diagnostic device.

In some embodiments, obtaining the first audio recording comprises receiving the first audio recording from a mobile vehicle diagnostic device, via the at least one communication network, by a mobile device, and the processing is performed by the mobile device.

Some embodiments provide for a method for using a trained machine learning (ML) model to detect presence of vehicle defects from audio and vibration acquired at least in part during operation of an engine of a vehicle, the method comprising using at least one computer hardware processor to perform: obtaining, via at least one communication network, a first audio recording that was acquired, using at least one acoustic sensor, at least in part during operation of the engine, and a first vibration signal that was acquired, using at least one vibration sensor, at least in part during operation of the engine; and processing the first audio recording and the first vibration signal using the trained ML model to detect presence of at least one vehicle defect, the processing comprising: generating audio features from the first audio recording, generating vibration features from the first vibration signal, and processing the audio features and the vibration features using the trained ML model to obtain output indicative of presence or absence of the at least one vehicle defect.

Some embodiments provide for a system, comprising: at least one computer hardware processor; and at least one non-transitory computer-readable storage medium storing processor executable instructions that when executed by the at least one computer hardware processor perform a method for using a trained machine learning (ML) model to detect presence of vehicle defects from audio and vibration acquired at least in part during operation of an engine of a vehicle, the method comprising: obtaining, via at least one communication network, a first audio recording that was acquired, using at least one acoustic sensor, at least in part during operation of the engine, and a first vibration signal that was acquired, using at least one vibration sensor, at least in part during operation of the engine; and processing the first audio recording and the first vibration signal using the trained ML model to detect presence of at least one vehicle defect, the processing comprising: generating audio features from the first audio recording, generating vibration features from the first vibration signal, and processing the audio features and the vibration features using the trained ML model to obtain output indicative of presence or absence of the at least one vehicle defect.

Some embodiments provide for at least one non-transitory computer-readable storage medium storing processor executable instructions that, when executed by at least one computer hardware processor, cause the at least one computer hardware processor to perform a method for using a trained machine learning (ML) model to detect presence of vehicle defects from audio and vibration acquired at least in part during operation of an engine of a vehicle, the method comprising: obtaining, via at least one communication network, a first audio recording that was acquired, using at least one acoustic sensor, at least in part during operation of the engine, and a first vibration signal that was acquired, using at least one vibration sensor, at least in part during operation of the engine; and processing the first audio recording and the first vibration signal using the trained ML model to detect presence of at least one vehicle defect, the processing comprising: generating audio features from the first audio recording, generating vibration features from the first vibration signal, and processing the audio features and the vibration features using the trained ML model to obtain output indicative of presence or absence of the at least one vehicle defect.

Some embodiments provide for a system for detecting presence of vehicle defects from audio and vibration acquired at least in part during operation of an engine of the vehicle, the system comprising: at least one mobile vehicle diagnostic device (MVDD), the MVDD being configured to be coupled to the vehicle, the MVDD comprising at least one acoustic sensor and at least one vibration sensor and configured to: acquire, using the at least one acoustic sensor, a first audio recording at least in part during operation of the engine, and acquire, using the at least one vibration sensor, a first vibration signal at least in part during operation of the engine, the MVDD being configured to transmit the first audio recording and the first vibration signal; at least one mobile device configured to receive the first audio recording and the first vibration signal from the MVDD and transmit the first audio recording and the first vibrations signal, via the at least one communication network, to at least one computing device; and the at least one computing device, the at least one computing device configured to perform: obtaining, via the at least one communication network, the first audio recording and the first vibration signal; and processing the first audio recording and the first vibration signal using the trained ML model to detect presence of at least one vehicle defect, the processing comprising: generating audio features from the first audio recording, generating vibration features from the first vibration signal, and processing the audio features and the vibration features using the trained ML model to obtain output indicative of presence or absence of the at least one vehicle defect.

In some embodiments, generating the audio features from the first audio signal comprises: generating an audio waveform from the first audio recording; and generating a two-dimensional (2D) representation of the audio waveform.

In some embodiments, generating the audio waveform comprises resampling, normalizing, and/or clipping the first audio recording to obtain the audio waveform.

In some embodiments, the audio recording comprises at least a first waveform for at least a first audio channel, and wherein generating the audio waveform from the first audio recording comprises: resampling the first waveform to a target frequency to obtain a resampled waveform; normalizing the resampled waveform by subtracting its mean and dividing by its standard deviation to obtain a normalized waveform; and clipping the normalized waveform to a target maximum to obtain the audio waveform.

In some embodiments, the audio waveform is between 5 and 45 seconds long and wherein the frequency of the audio waveform is between 8 and 45 KHz.

In some embodiments, generating the two-dimensional (2D) representation of the audio waveform comprises generating a time-frequency representation of the audio waveform.

In some embodiments, generating the time-frequency representation of the audio waveform comprises generating a Mel-scale log spectrogram from the audio waveform.

In some embodiments, generating the vibration features from the first vibration signal comprises: generating a vibration waveform from the first vibration signal; and generating a two-dimensional (2D) representation of the vibration waveform.

In some embodiments, generating the vibration waveform comprises resampling, normalizing, and/or clipping the first vibration signal to obtain the vibration waveform, and generating 2D representation of the vibration waveform comprises generating a spectrogram of the vibration waveform.

In some embodiments, generating the audio features from the first audio signal comprises: generating an audio waveform from the first audio recording, and generating a two-dimensional (2D) representation of the audio waveform; and generating the vibration features from the first vibration signal comprises: generating a vibration waveform from the first vibration signal, and generating a two-dimensional (2D) representation of the vibration waveform.

In some embodiments, generating the 2D representation of the audio waveform comprises generating a Mel-scale log spectrogram of the audio waveform, and wherein generating the 2D representation of the vibration waveform comprises generating a log-linear scale spectrogram of the vibration waveform.

In some embodiments, the audio waveform has a sampling rate between 8 and 45 kHz; and the vibration waveform has a sampling rate between 10 and 200 Hz.

In some embodiments, the method further comprises: obtaining, via the at least one communication network, metadata indicating one or more properties of the vehicle, wherein using the trained ML model to detect the presence of the at least one vehicle defect further comprises generating metadata features from the metadata, and wherein processing the audio features and the vibration features further comprises processing the audio features, the vibration features and the metadata features using the trained ML model to obtain the output indicative of the presence or absence of the at least one vehicle defect.

In some embodiments, the properties of the vehicle are selected from the group consisting of: a reading of the vehicle's odometer, a model of the vehicle, a make of the vehicle, an age of the vehicle, a type of drivetrain in the vehicle, a type of transmission in the vehicle, a measure of displacement of the engine, a fuel type for the vehicle, an indication of whether on-board diagnostics (OBD) codes could be obtained from the vehicle, a number of incomplete readiness monitors reported by the OBD scanner, one or more BlackBook-reported engine properties, a list of one or more OBD codes, location of the vehicle, information about weather at the location of the vehicle, and information about a seller of the vehicle.

In some embodiments, the metadata comprises text indicating at least one of the one or more properties, and generating the metadata features from the metadata comprises generating a numeric representation of the text.

In some embodiments, the output is indicative of the presence or absence of internal engine noise, timing chain noise, engine accessory noise, and/or exhaust noise. In some embodiments, the trained ML model is a deep neural network model.

In some embodiments, the trained ML model comprises: a first neural network portion comprising a first plurality of convolutional layers configured to process the audio features; a second neural network portion comprising a second plurality of layers configured to process the vibration features; and a fusion neural network portion comprising one or more fully connected layers configured to combine outputs produced by the first neural network portion and the second neural network portion to obtain the output indicative of the presence or absence of the at least one vehicle defect.

In some embodiments, the audio features comprise a 1D audio waveform and a 2D representation of the audio waveform, and the first plurality of convolutional layers comprises 1D convolutional layers configured to process the 1D audio waveform and 2D convolutional layers configured to process the 2D representation of the audio waveform, and the vibration features comprise a 1D vibration waveform and a 2D representation of the vibration waveform, and the second plurality of convolutional layers comprises 1D convolutional layers configured to process the 1D vibration waveform and 2D convolutional layers configured to process the 2D representation of the vibration waveform.

In some embodiments, the trained ML model further comprises a third neural network portion comprising one or more fully connected layers configured to process metadata features generated from metadata indicating one or more properties of the vehicle, and the one or more fully connected layers of the fusion neural network are configured to combine outputs produced by the first neural network portion, the second neural network portion, and the third neural network portion to obtain the output indicative of the presence or absence of the at least one vehicle defect.

In some embodiments, the trained ML model has at least one million parameters, and processing the first audio recording and the first vibration signal using the trained ML model to detect the presence of the at least one vehicle defect comprises computing the output using values of the at least one million parameters, the audio features and the vibration features.

In some embodiments, acquiring, using the at least one acoustic sensor, the first audio recording at least in part during operation of the engine; and acquiring, using the at least one vibration sensor, the first vibration signal at least in part during operation of the engine.

In some embodiments, the method further comprises determining, based on the output, that the at least one vehicle defect was detected using the first audio recording and the first vibration signal, and generating an electronic vehicle condition report indicating that the at least one vehicle defect was detected using the first audio recording and the first vibration signal and a measure of confidence in that detection.

In some embodiments, the method further comprises transmitting the electronic vehicle condition report, via the at least one communication network, to a remote device of an inspector of the vehicle.

In some embodiments, the method further comprises: receiving a second audio recording and a second vibration signal, via the at least one communication network, from the remote device of the inspector of the vehicle, the second audio recording and the second vibration signal being acquired after transmission of the electronic vehicle condition report; and processing the second audio recording and the second vibration signal using the trained ML model to detect presence of the at least one vehicle defect, the processing comprising: generating second audio features from the second audio recording, generating second vibration features from the second vibration signal, and processing the second audio features and the second vibration features using the trained ML model to obtain second output indicative of presence or absence of the at least one vehicle defect.

In some embodiments, the method further comprises transmitting the electronic vehicle condition report, via the at least one communication network, to one or more reviewers.

In some embodiments, the method further comprises: upon review and approval of the electronic vehicle condition report, initiating an online vehicle auction to auction the vehicle.

In some embodiments, wherein obtaining the first audio recording and the first vibration signal comprises receiving the first audio recording and the first vibration signal from a mobile device, via the at least one communication network, by at least one computing device at a location remote from a location of the mobile device, and wherein the processing is performed by the at least one computing device.

In some embodiments, the mobile device comprises a smart phone or a mobile vehicle diagnostic device.

In some embodiments, obtaining the first audio recording and the first vibration signal comprises receiving the first audio recording and the first vibration signal from a mobile vehicle diagnostic device, via the at least one communication network, by a mobile device, and the processing is performed by the mobile device.

In some embodiments, the at least one vibration sensor comprises an accelerometer.

Some embodiments provide for a method for using a trained machine learning (ML) model to detect presence of vehicle engine rattle from audio acquired at least in part during operation of an engine of a vehicle during start-up, the method comprising using at least one computer hardware processor to perform: obtaining a first audio recording that was acquired, using at least one acoustic sensor, at least in part during operation of the engine; and processing the first audio recording, using the trained ML model, to detect the presence of engine rattle in the first audio recording and identify one or more timepoints in the first audio recording at which engine rattle was detected, the processing comprising: generating an audio waveform from the first audio recording, and processing the audio waveform using the trained ML model to obtain output indicating, for each particular timepoint of multiple timepoints, whether engine rattle was present at the particular timepoint in the first audio recording.

Some embodiments provide for a system comprising: at least one computer hardware processor; and at least one non-transitory computer-readable storage medium storing processor executable instructions that when executed by the at least one computer hardware processor perform a method for using a trained machine learning (ML) model to detect presence of vehicle engine rattle from audio acquired at least in part during operation of an engine of a vehicle during start-up, the method comprising: obtaining a first audio recording that was acquired, using at least one acoustic sensor, at least in part during operation of the engine; and processing the first audio recording, using the trained ML model, to detect the presence of engine rattle in the first audio recording and identify one or more timepoints in the first audio recording at which engine rattle was detected, the processing comprising: generating an audio waveform from the first audio recording, and processing the audio waveform using the trained ML model to obtain output indicating, for each particular timepoint of multiple timepoints, whether engine rattle was present at the particular timepoint in the first audio recording.

Some embodiments provide for at least one non-transitory computer-readable storage medium storing processor executable instructions that, when executed by at least one computer hardware processor, cause the at least one processor to perform a method for using a trained machine learning (ML) model to detect presence of vehicle engine rattle from audio acquired at least in part during operation of an engine of a vehicle during start-up, the method comprising: obtaining a first audio recording that was acquired, using at least one acoustic sensor, at least in part during operation of the engine; and processing the first audio recording, using the trained ML model, to detect the presence of engine rattle in the first audio recording and identify one or more timepoints in the first audio recording at which engine rattle was detected, the processing comprising: generating an audio waveform from the first audio recording, and processing the audio waveform using the trained ML model to obtain output indicating, for each particular timepoint of multiple timepoints, whether engine rattle was present at the particular timepoint in the first audio recording.

Some embodiments provide for a system for detecting presence of engine rattle from audio acquired at least in part during operation of an engine of the vehicle, the system comprising: at least one mobile vehicle diagnostic device (MVDD), the MVDD being configured to be coupled to the vehicle, the MVDD comprising at least one acoustic sensor and configured to acquire, using the at least one acoustic sensor, a first audio recording at least in part during operation of the engine, and the MVDD being configured to transmit the first audio recording; at least one mobile device configured to receive the first audio recording from the MVDD and transmit the first audio recording, via the at least one communication network, to at least one computing device; and the at least one computing device, the at least one computing device configured to perform: obtaining, via the at least one communication network, the first audio recording; processing the first audio recording, using the trained ML model, to detect the presence of engine rattle in the first audio recording and identify one or more timepoints in the first audio recording at which engine rattle was detected, the processing comprising: generating an audio waveform from the first audio recording, and processing the audio waveform using the trained ML model to obtain output indicating, for each particular timepoint of multiple timepoints, whether engine rattle was present at the particular timepoint in the first audio recording.

In some embodiments, generating the audio waveform from the first audio recording comprises resampling, normalizing, and/or clipping the first audio recording to obtain the audio waveform.

In some embodiments, the audio recording comprises at least a first waveform for at least a first audio channel, and wherein generating the audio waveform from the first audio recording comprises: resampling the first waveform to a target frequency to obtain a resampled waveform; normalizing the resampled waveform by subtracting its mean and dividing by its standard deviation to obtain a normalized waveform; and clipping the normalized waveform to a target maximum to obtain the audio waveform.

In some embodiments, the audio waveform is between 5 and 45 seconds long and wherein the frequency of the audio waveform is between 8 and 45 KHz.

In some embodiments, the trained ML model is a deep neural network model. In some embodiments, the trained ML model comprises a recurrent neural network. In some embodiments, the recurrent neural network comprises a bi-directional gated recurrent unit. In some embodiments, the trained ML model comprises a plurality of 1D convolutional layers.

In some embodiments, the trained ML model comprises: a plurality of convolutional blocks each comprising a 1D convolutional layer, a batch normalization layer, a non-linear layer, and a pooling layer; a recurrent neural network comprising a bi-directional gated recurrent unit, wherein output from a last one of the plurality of convolutional blocks is provided as input to the recurrent neural network; and a linear layer, wherein output from the recurrent neural network is provided as input to the linear layer.

In some embodiments, the output indicates, for each particular timepoint of the multiple timepoints, a likelihood indicating whether the engine rattle was present at the particular timepoint in the first audio recording.

In some embodiments, the output further includes a prediction indicating whether the first audio recording as a whole indicates presence of engine rattle.

In some embodiments, the trained ML model has at least one million parameters, and processing the first audio recording using the trained ML model to detect the presence of the engine rattle comprises computing the output using values of the at least one million parameters and the audio waveform.

In some embodiments, the method further comprises acquiring, using the at least one acoustic sensor, the first audio recording at least in part during operation of the engine.

In some embodiments, the method further comprises: determining, based on the output, that engine rattle was detected using the first audio recording, and generating an electronic vehicle condition report including the output and indicating that the engine rattle was detected using the first audio recording.

In some embodiments, the method further comprise transmitting the electronic vehicle condition report, via the at least one communication network, to a remote device of an inspector of the vehicle.

In some embodiments, the method further comprises: receiving a second audio recording, via the at least one communication network, from the remote device of the inspector of the vehicle, the second audio recording being acquired after transmission of the electronic vehicle condition report and using the at least one acoustic sensor at least in part during operation of the engine; and processing the second audio recording, using the trained ML model, to detect the presence of engine rattle in the second audio recording and identify one or more timepoints in the second audio recording at which engine rattle was detected, the processing comprising: generating a second audio waveform from the second audio recording, and processing the second audio waveform using the trained ML model to obtain output indicating, for each particular timepoint of multiple timepoints, whether engine rattle was present at the particular timepoint in the second audio recording.

In some embodiments, the method further comprises: transmitting the electronic vehicle condition report, via the at least one communication network, to one or more reviewers.

In some embodiments, the method further comprises: upon review and approval of the electronic vehicle condition report, initiating an online vehicle auction to auction the vehicle.

In some embodiments, obtaining the first audio recording comprises receiving the first audio recording from a mobile device, via the at least one communication network, by at least one computing device at a location remote from a location of the mobile device, and the processing is performed by the at least one computing device.

In some embodiments, the mobile device comprises a smart phone or a mobile vehicle diagnostic device.

In some embodiments, obtaining the first audio recording comprises receiving the first audio recording from a mobile vehicle diagnostic device, via the at least one communication network, by a mobile device, and the processing is performed by the mobile device.

Some embodiments provide for a method for using a trained machine learning (ML) model to detect presence of abnormal transmission noise from audio acquired at least in part during operation of an engine of a vehicle, the method comprising using at least one computer hardware processor to perform: obtaining, via at least one communication network, a first audio recording that was acquired, using at least one acoustic sensor, at least in part during operation of the engine, and metadata indicating one or more properties of the vehicle; processing the first audio recording using the trained ML model to detect, from the first audio recording, presence of the abnormal transmission noise, the processing comprising: generating an audio waveform from the first audio recording, generating a two-dimensional (2D) representation of the audio waveform, generating metadata features from the metadata, and processing the audio waveform, the 2D representation of the audio waveform, and the metadata features, using the trained ML model to obtain output indicative of presence or absence of the abnormal transmission noise.

Some embodiments provide for a system, comprising: at least one computer hardware processor; and at least one non-transitory computer-readable storage medium storing processor executable instructions that when executed by the at least one computer hardware processor perform a method for using a trained machine learning (ML) model to detect presence of abnormal transmission noise from audio acquired at least in part during operation of an engine of a vehicle, the method comprising: obtaining, via at least one communication network, a first audio recording that was acquired, using at least one acoustic sensor, at least in part during operation of the engine, and metadata indicating one or more properties of the vehicle; processing the first audio recording using the trained ML model to detect, from the first audio recording, presence of the abnormal transmission noise, the processing comprising: generating an audio waveform from the first audio recording, generating a two-dimensional (2D) representation of the audio waveform, generating metadata features from the metadata, and processing the audio waveform, the 2D representation of the audio waveform, and the metadata features, using the trained ML model to obtain output indicative of presence or absence of the abnormal transmission noise.

Some embodiments provide for at least one non-transitory computer-readable storage medium storing processor executable instructions that, when executed by at least one computer hardware processor, cause the at least one computer hardware processor to perform a method for using a trained machine learning (ML) model to detect presence of abnormal transmission noise from audio acquired at least in part during operation of an engine of a vehicle, the method comprising: obtaining, via at least one communication network, a first audio recording that was acquired, using at least one acoustic sensor, at least in part during operation of the engine, and metadata indicating one or more properties of the vehicle; processing the first audio recording using the trained ML model to detect, from the first audio recording, presence of the abnormal transmission noise, the processing comprising: generating an audio waveform from the first audio recording, generating a two-dimensional (2D) representation of the audio waveform, generating metadata features from the metadata, and processing the audio waveform, the 2D representation of the audio waveform, and the metadata features, using the trained ML model to obtain output indicative of presence or absence of the abnormal transmission noise.

Some embodiments provide for a system for detecting presence of abnormal transmission noise from audio acquired at least in part during operation of an engine of the vehicle, the system comprising: at least one mobile vehicle diagnostic device (MVDD), the MVDD being configured to be coupled to the vehicle, the MVDD comprising at least one acoustic sensor and configured to acquire, using the at least one acoustic sensor, a first audio recording at least in part during operation of the engine, and the MVDD being configured to transmit the first audio recording; at least one mobile device configured to receive the first audio recording from the MVDD and transmit the first audio recording, via the at least one communication network, to at least one computing device; and the at least one computing device, the at least one computing device configured to perform: processing the first audio recording using a trained ML model to detect, from the first audio recording, presence of the abnormal transmission noise, the processing comprising: generating an audio waveform from the first audio recording, generating a two-dimensional (2D) representation of the audio waveform, generating metadata features from metadata indicating one or more properties of the vehicle, and processing the audio waveform, the 2D representation of the audio waveform, and the metadata features, using the trained ML model to obtain output indicative of presence or absence of the abnormal transmission noise.

In some embodiments, generating the audio waveform from the first audio recording comprises resampling, normalizing, and/or clipping the first audio recording to obtain the audio waveform.

In some embodiments, the audio recording comprises at least a first waveform for at least a first audio channel, and wherein generating the audio waveform from the first audio recording comprises: resampling the first waveform to a target frequency to obtain a resampled waveform; normalizing the resampled waveform by subtracting its mean and dividing by its standard deviation to obtain a normalized waveform; and clipping the normalized waveform to a target maximum to obtain the audio waveform.

In some embodiments, the audio waveform is between 5 and 45 seconds long and wherein the frequency of the audio waveform is between 8 and 45 KHz.

In some embodiments, generating the two-dimensional (2D) representation of the audio waveform comprises generating a time-frequency representation of the audio waveform.

In some embodiments, generating the time-frequency representation of the audio waveform comprises using a short-time Fourier transform, a wavelet transform, a Gabor transform, or a chirplet transform to generate the time-frequency representation.

In some embodiments, generating the time-frequency representation of the audio waveform comprises generating a Mel-scale log spectrogram from the audio waveform.

In some embodiments, the properties of the vehicle are selected from the group consisting of: a reading of the vehicle's odometer, a model of the vehicle, a make of the vehicle, an age of the vehicle, a type of drivetrain in the vehicle, a type of transmission in the vehicle, a measure of displacement of the engine, a fuel type for the vehicle, an indication of whether on-board diagnostics (OBD) codes could be obtained from the vehicle, a number of incomplete readiness monitors reported by the OBD scanner, one or more BlackBook-reported engine properties, a list of one or more OBD codes, location of the vehicle, information about weather at the location of the vehicle, and information about a seller of the vehicle.

In some embodiments, the trained ML model is a deep neural network model.

In some embodiments, the trained ML model comprises: a first neural network sub-model comprising: a first neural network portion comprising a plurality of one-dimensional (1D) convolutional layers configured to process the audio waveform; a second neural network portion comprising a plurality of 2D convolutional layers configured to process the 2D representation of the audio waveform; and a fusion neural network portion comprising one or more fully connected layers configured to combine outputs produced by the first neural network portion and the second neural network portion to obtain an initial output indicative of the presence or absence of the abnormal transmission noise.

In some embodiments, the trained ML model further comprises: a second neural network sub-model comprising a plurality of fully connected layers configured to process: (1) the initial output indicative of the presence or absence of abnormal transmission noise that is produced by the first neural network sub-model; and (2) the metadata features, to obtain the output indicative of the presence or absence of the abnormal transmission noise.

In some embodiments, the trained ML model has at least one million parameters, and processing the first audio recording using the trained ML model to detect the presence of the abnormal transmission noise comprises computing the output using values of the at least one million parameters, the audio waveform, and the 2D representation of the audio waveform.

In some embodiments, the method further comprises: acquiring, using the at least one acoustic sensor, the first audio recording at least in part during operation of the engine.

In some embodiments, the method further comprises: determining, based on the output, that the abnormal transmission whine was detected using the first audio recording, and generating an electronic vehicle condition report indicating that the abnormal transmission noise was detected using the first audio recording and a measure of confidence in that detection.

In some embodiments, the method further comprises: transmitting the electronic vehicle condition report, via the at least one communication network, to a remote device of an inspector of the vehicle.

In some embodiments, the method further comprises: receiving a second audio recording, via the at least one communication network, from the remote device of the inspector of the vehicle, the second audio recording being acquired after transmission of the electronic vehicle condition report; and processing the second audio recording using the trained ML model to detect, from the second audio recording, presence or absence of abnormal transmission noise, the processing comprising: generating a second audio waveform from the second audio recording, generating a second two-dimensional (2D) representation of the audio waveform, and processing the second audio waveform, the second 2D representation of the audio waveform, and the metadata features, using the trained ML model to obtain output indicative of presence or absence of the abnormal transmission noise.

In some embodiments, the method further comprises: transmitting the electronic vehicle condition report, via the at least one communication network, to one or more reviewers.

In some embodiments, the method further comprises: upon review and approval of the electronic vehicle condition report, initiating an online vehicle auction to auction the vehicle.

In some embodiments, obtaining the first audio recording comprises receiving the first audio recording from a mobile device, via the at least one communication network, by at least one computing device at a location remote from a location of the mobile device, and the processing is performed by the at least one computing device.

In some embodiments, the mobile device comprises a smart phone or a mobile vehicle diagnostic device.

In some embodiments, obtaining the first audio recording comprises receiving the first audio recording from a mobile vehicle diagnostic device, via the at least one communication network, by a mobile device, and the processing is performed by the mobile device.

Some embodiments provide for a method for using a trained machine learning (ML) model to detect presence of environmental noise in audio acquired at least in part during operation of an engine of a vehicle, the method comprising using at least one computer hardware processor to perform: obtaining a first audio recording that was acquired, using at least one acoustic sensor, at least in part during operation of the engine; and processing the first audio recording, using the trained ML model, to detect the presence of environmental noise in the first audio recording, the processing comprising: generating an audio waveform from the first audio recording, and processing the audio waveform using the trained ML model to obtain output indicating whether environmental noise was present in the first audio recording.

Some embodiments provide for a system, comprising: at least one computer hardware processor; and at least one non-transitory computer-readable storage medium storing processor executable instructions that when executed by the at least one computer hardware processor perform a method for using a trained machine learning (ML) model to detect presence of environmental noise in audio acquired at least in part during operation of an engine of a vehicle, the method comprising: obtaining a first audio recording that was acquired, using at least one acoustic sensor, at least in part during operation of the engine; and processing the first audio recording, using the trained ML model, to detect the presence of environmental noise in the first audio recording, the processing comprising: generating an audio waveform from the first audio recording, and processing the audio waveform using the trained ML model to obtain output indicating whether environmental noise was present in the first audio recording.

Some embodiments provide for at least one non-transitory computer-readable storage medium storing processor executable instructions that, when executed by at least one computer hardware processor, cause the at least one computer hardware processor to perform a method for using a trained machine learning (ML) model to detect presence of environmental noise in audio acquired at least in part during operation of an engine of a vehicle, the method comprising: obtaining a first audio recording that was acquired, using at least one acoustic sensor, at least in part during operation of the engine; and processing the first audio recording, using the trained ML model, to detect the presence of environmental noise in the first audio recording, the processing comprising: generating an audio waveform from the first audio recording, and processing the audio waveform using the trained ML model to obtain output indicating whether environmental noise was present in the first audio recording.

Some embodiments provide for a system for detecting presence of environmental noise in audio acquired at least in part during operation of an engine of the vehicle, the system comprising: at least one mobile vehicle diagnostic device (MVDD), the MVDD being configured to be coupled to the vehicle, the MVDD comprising at least one acoustic sensor and configured to acquire, using the at least one acoustic sensor, a first audio recording at least in part during operation of the engine, and the MVDD being configured to transmit the first audio recording; at least one mobile device configured to receive the first audio recording from the MVDD and transmit the first audio recording, via the at least one communication network, to at least one computing device; and the at least one computing device, the at least one computing device configured to perform: obtaining, via the at least one communication network, the first audio recording; processing the first audio recording, using the trained ML model, to detect the presence of environmental noise in the first audio recording, the processing comprising: generating an audio waveform from the first audio recording, and processing the audio waveform using the trained ML model to obtain output indicating whether environmental noise is present in the first audio recording.

In some embodiments, the output indicates, for each particular timepoint of multiple timepoints, whether environmental noise is present in the first audio recording at the particular timepoint.

In some embodiments, the environmental noise comprises wind noise.

In some embodiments, the environmental noise includes one or more types of noise selected from the group consisting of: rain noise, water flow noise, wind noise, human speech, sound generated by a device not attached to vehicle, sound generated by one or more vehicles different from the vehicle.

In some embodiments, the audio recording comprises at least a first waveform for at least a first audio channel, and wherein generating the audio waveform from the first audio recording comprises: resampling the first waveform to a target frequency to obtain a resampled waveform; normalizing the resampled waveform by subtracting its mean and dividing by its standard deviation to obtain a normalized waveform; and clipping the normalized waveform to a target maximum to obtain the audio waveform.

In some embodiments, the audio waveform is between 5 and 45 seconds long and wherein the frequency of the audio waveform is between 8 and 45 KHz.

In some embodiments, the trained ML model is a deep neural network model. In some embodiments, the trained ML model comprises a recurrent neural network. In some embodiments, the recurrent neural network comprises a bi-directional gated recurrent unit. In some embodiments, the trained ML model comprises a plurality of 1D convolutional layers.

In some embodiments, the trained ML model comprises: a plurality of convolutional blocks each comprising a 1D convolutional layer, a batch normalization layer, a non-linear layer, and a pooling layer; a recurrent neural network comprising a bi-directional gated recurrent unit, wherein output from a last one of the plurality of convolutional blocks is provided as input to the recurrent neural network; and a linear layer, wherein output from the recurrent neural network is provided as input to the linear layer.

In some embodiments, the output indicates, for each particular timepoint of the multiple timepoints, a likelihood indicating whether the environmental noise was present at the particular timepoint in the first audio recording.

In some embodiments, the output further includes a prediction indicating whether the first audio recording as a whole indicates presence of environmental noise.

In some embodiments, the trained ML model has at least one million parameters, and processing the first audio recording using the trained ML model to detect the presence of the environmental noise comprises computing the output using values of the at least one million parameters and the audio waveform.

In some embodiments, the method further comprises: acquiring, using the at least one acoustic sensor, the first audio recording at least in part during operation of the engine.

In some embodiments, the method further comprises: determining, based on the output, that environmental noise was detected using the first audio recording, and transmitting, via the at least one communication network, a communication to a remote device of an inspector of the vehicle, the communication indicating that environmental noise was detected in the first audio recording and requesting collection of a new audio recording.

In some embodiments, the method further comprises: receiving a second audio recording, via the at least one communication network, from the remote device of the inspector of the vehicle, the second audio recording being acquired after transmission of the communication; and processing the second audio recording, using the trained ML model, to detect the presence of environmental noise in the first audio recording and identify one or more timepoints in the second audio recording at which environmental noise was detected, the processing comprising: generating a second audio waveform from the second audio recording, and processing the second audio waveform using the trained ML model to obtain output indicating, for each particular timepoint of multiple timepoints, whether environmental noise was present at the particular timepoint in the second audio recording.

In some embodiments, the method further comprises: determining, based on the output, that environmental noise was not detected using the first audio recording, and further analyzing the first audio recording using at least one trained machine learning model to detect presence of vehicle defects, engine rattle, or abnormal transmission noise.

In some embodiments, obtaining the first audio recording comprises receiving the first audio recording from a mobile device, via the at least one communication network, by at least one computing device at a location remote from a location of the mobile device, and the processing is performed by the at least one computing device.

In some embodiments, the mobile device comprises a smart phone or a mobile vehicle diagnostic device.

In some embodiments, obtaining the first audio recording comprises receiving the first audio recording from a mobile vehicle diagnostic device, via the at least one communication network, by a mobile device, and the processing is performed by the mobile device.

Some embodiments provide for a mobile vehicle diagnostic device (MVDD) for acquiring data about a vehicle at least in part during operation of the vehicle, the device comprising: a housing configured to be mechanically coupled to the vehicle so that, when the housing is mechanically coupled to the vehicle, vibration generated by the vehicle during its operation causes the housing to vibrate; a plurality of acoustic sensors disposed within the housing and configured to acquire sound generated by the vehicle during its operation, the plurality of acoustic sensors comprising first and second acoustic sensors respectively oriented in first and second directions, wherein the first and second directions are at least 30 degrees apart; at least one dampening device disposed in the housing and positioned to dampen vibration of the plurality of acoustic sensors caused by operation of the vehicle; and at least one vibration sensor disposed within the housing and configured to sense vibration in the housing caused by the operation of the vehicle.

Some embodiments provide for a mobile vehicle diagnostic device (MVDD) for acquiring data about a vehicle at least in part during operation of the vehicle, the device comprising: a housing configured to be mechanically coupled to the vehicle so that, when the housing is mechanically coupled to the vehicle, vibration generated by the vehicle during its operation causes the housing to vibrate; a plurality of acoustic sensors disposed within the housing and configured to acquire sound generated by the vehicle during its operation, the plurality of acoustic sensors comprising first and second acoustic sensors respectively oriented in first and second directions, wherein the first and second directions are at least 30 degrees apart; and at least one dampening device disposed in the housing and positioned to dampen vibration the plurality of acoustic sensors caused by operation of the vehicle.

Some embodiments provide for a mobile vehicle diagnostic device (MVDD) for acquiring data about a vehicle at least in part during operation of the vehicle, the device comprising: a housing configured to be mechanically coupled to the vehicle so that, when the housing is mechanically coupled to the vehicle, vibration generated by the vehicle during its operation causes the housing to vibrate; a plurality of acoustic sensors disposed within the housing and configured to acquire sound generated by the vehicle during its operation, the plurality of acoustic sensors oriented in different directions; and at least one vibration sensor disposed within the housing and configured to sense vibration in the housing caused by the operation of the vehicle.

In some embodiments, the first and second directions are at least 90 degrees apart.

In some embodiments, the plurality of acoustic sensors comprises four acoustic sensors respectively oriented in different directions.

In some embodiments, the housing comprises a plurality of walls and each of the plurality of acoustic sensors is attached to a respective wall in the plurality of walls.

In some embodiments, the at least one dampening device comprises a plurality of dampening devices disposed between the plurality of walls and the plurality of acoustic sensors to dampen vibrations from the housing to the acoustic sensors.

In some embodiments, the housing comprises a first wall, the first acoustic sensor is coupled to the first wall, and the at least one dampening device comprises a first dampening device disposed between the first wall and the first acoustic sensor to dampen vibrations from the housing to the first acoustic sensor.

In some embodiments, the first dampening device comprises at least one gasket. In some embodiments, the plurality of acoustic sensors are configured to be responsive to audio frequencies between 200 Hz to 60 kHz.

In some embodiments, the at least one vibration sensor is configured to be responsive to frequencies of 5-800 Hz. In some embodiments, the at least one vibration sensor comprises an accelerometer.

In some embodiments, the MVDD further comprises: at least two sensors selected from the group consisting of a gas sensor, a temperature sensor, a pressure sensor, a humidity sensor, a gyroscope, and a magnetometer.

In some embodiments, the MVDD further comprises a sensor module, the sensor module having disposed thereon both the at least one vibration sensor and the at least two sensors.

In some embodiments, the housing comprises: a rigid base, a plurality of walls coupled to the rigid base, and an overmolding disposed on the rigid base and configured to provide mechanical, chemical, and thermal protection to components disposed within the housing.

In some embodiments, each of the plurality of acoustic sensors is coupled to a respective one of the plurality of walls such that each of the plurality of acoustic sensors is oriented to receive audio from a different side of the MVDD.

In some embodiments, each of the plurality of acoustic sensors is each positioned at an approximate center position of each of the respective plurality of walls.

In some embodiments, the MVDD further comprises: an interface configured to receive signals from an on-board computer of the vehicle, the signals indicating one or more OBD codes.

In some embodiments, the MVDD further comprises: at least one communication interface configured to transmit, to one or more other computing devices, data collected using the plurality of acoustic sensors and/or the at least one vibration sensor.

In some embodiments, the at least one communication interface comprises a Wi-Fi interface, Wi-Max interface, and/or a Bluetooth interface.

In some embodiments, the MVDD comprises a Wi-Fi interface and a Bluetooth interface, and at least one computer hardware processor configured to: establish a connection between the MVDD with a mobile device using the Bluetooth interface; establish, using the connection, a Wi-Fi connection between the Wi-Fi interface of the MVDD and a Wi-Fi interface of the mobile device; and transmit data collected by the at least one acoustic sensor to the mobile device via the Wi-Fi connection. In some embodiments, the mobile device is further configured to use a cellular connection to transmit the data and/or processed data derived from the data to one or more remote servers.

In some embodiments, the MVDD further comprises: at least one computer hardware processor configured to process data collected by the plurality of acoustic sensors and/or the at least one vibration sensor, using at least one trained machine learning model, to obtain output indicative of presence or absence of at least one vehicle defect.

Some embodiments provide for a system for detecting presence of vehicle defects from audio acquired at least in part during operation of an engine of the vehicle, the system comprising: (A) a mobile vehicle diagnostic device (MVDD) for acquiring data about the vehicle at least in part during operation of the vehicle, the MVDD comprising: a housing configured to be mechanically coupled to the vehicle, a plurality of acoustic sensors disposed within the housing and configured to acquire sound generated by the vehicle during its operation; (B) a mobile computing device communicatively coupled to the MVDD and configured to: receive data from the MVDD, the data comprising an audio recording acquired by at least one of the plurality of acoustic sensors during operation of the engine of the vehicle, and transmit the data, via at least one communication network, to at least one computing device; and (C) the at least one computing device, being configured to perform: obtaining, via the at least one communication network, the first audio recording; processing the first audio recording using a trained ML model to detect, from the first audio recording, presence or absence of at least one vehicle defect, the processing comprising: generating audio features from the first audio recording, and processing the audio features using the trained ML model to obtain output indicative of presence or absence of the at least one vehicle defect.

In some embodiments, the MVDD further comprises: at least one dampening device disposed in the housing and positioned to dampen vibration the plurality of acoustic sensors caused by operation of the vehicle.

In some embodiments, the MVDD further comprises: at least one vibration sensor disposed within the housing and configured to sense vibration in the housing caused by the operation of the vehicle.

In some embodiments, the plurality of acoustic sensors comprising first and second acoustic sensors respectively oriented in first and second directions, wherein the first and second directions are at least 30 degrees apart.

In some embodiments, the housing comprises a plurality of walls and each of the plurality of acoustic sensors is attached to a respective wall in the plurality of walls, and the at least one dampening device comprises a plurality of dampening devices disposed between the plurality of walls and the plurality of acoustic sensors to dampen vibrations from the housing to the acoustic sensors.

In some embodiments, the plurality of acoustic sensors are configured to be responsive to audio frequencies between 200 Hz to 60 kHz, and the at least one vibration sensor is configured to be responsive to frequencies of 5-800 Hz.

In some embodiments, the MVDD further comprises at least two sensors selected from the group consisting of a gas sensor, a temperature sensor, a pressure sensor, a vibration sensor, a humidity sensor, a gyroscope, and a magnetometer.

In some embodiments, the housing comprises: a rigid base, a plurality of walls coupled to the rigid base, and an overmolding disposed on the rigid base and configured to provide mechanical, chemical, and thermal protection to components disposed within the housing.

In some embodiments, each of the plurality of acoustic sensors is coupled to a respective one of a plurality of walls of the housing such that each of the plurality of acoustic sensors is oriented to receive audio from a different side of the MVDD.

In some embodiments, the MVDD further comprises an interface configured to receive signals from an on-board computer of the vehicle, the signals indicating one or more OBD codes.

In some embodiments, generating the audio features from the first audio recording comprises: generating an audio waveform from the first audio recording, and generating a two-dimensional (2D) representation of the audio waveform, and wherein processing the audio features comprises: processing the audio waveform and the 2D representation of the audio waveform using the trained ML model to obtain output indicative of presence or absence of the at least one vehicle defect.

In some embodiments, generating the audio waveform from the first audio recording comprises resampling, normalizing, and/or clipping the first audio recording to obtain the audio waveform.

In some embodiments, the audio recording comprises at least a first waveform for at least a first audio channel, and wherein generating the audio waveform from the first audio recording comprises: resampling the first waveform to a target frequency to obtain a resampled waveform; normalizing the resampled waveform by subtracting its mean and dividing by its standard deviation to obtain a normalized waveform; and clipping the normalized waveform to a target maximum to obtain the audio waveform.

In some embodiments, the audio waveform is between 5 and 45 seconds long and wherein the frequency of the audio waveform is between 8 and 45 KHz.

In some embodiments, generating the two-dimensional (2D) representation of the audio waveform comprises generating a time-frequency representation of the audio waveform.

In some embodiments, generating the time-frequency representation of the audio waveform comprises using a short-time Fourier transform, a wavelet transform, a Gabor transform, or a chirplet transform to generate the time-frequency representation.

In some embodiments, generating the time-frequency representation of the audio waveform comprises generating a Mel-scale spectrogram from the audio waveform.

In some embodiments, the MVDD comprises at least one vibration sensor disposed within the housing and configured to sense vibration in the housing caused by the operation of the vehicle, the data received by mobile computing device further comprises a first vibration signal acquired by the at least one vibration sensor, and the at least one computing device is further configured to perform: obtaining, via the at least one communication network, the first vibration signal, and the processing further comprises: generating vibration features from the first vibration signal, and processing the audio features and the vibration features using the trained ML model to obtain output indicative of presence or absence of the vehicle defect(s).

In some embodiments, the MVDD comprises an interface configured to receive signals from an on-board computer of the vehicle, the signals indicating one or more properties of the vehicle, the data received by mobile computing device further comprises metadata indicating the one or more properties of the vehicle, and the at least one computing device is further configured to perform: obtaining, via the at least one communication network, the metadata, and the processing further comprises: generating metadata features from the first vibration signal, and processing the audio features and the metadata features using the trained ML model to obtain output indicative of presence or absence of the at least one vehicle defect.

BRIEF DESCRIPTION OF THE DRAWINGS

FIG. 1A illustrates an example vehicle diagnostic system, in accordance with some embodiments of the technology described herein.

FIG. 18H illustrates a perspective view of the mobile vehicle diagnostic device 1800 with the top removed, in accordance with some embodiments of the technology described herein.

FIG. 18I illustrates a perspective view of microphone 1862, in accordance with some embodiments of the technology described herein.

FIG. 18J illustrates a top view of the mobile vehicle diagnostic device 1800 with the top removed, in accordance with some embodiments of the technology described herein.

FIG. 18K illustrates a top view of microphone 1864c, in accordance with some embodiments of the technology described herein.

DETAILED DESCRIPTION

Figure 1B:
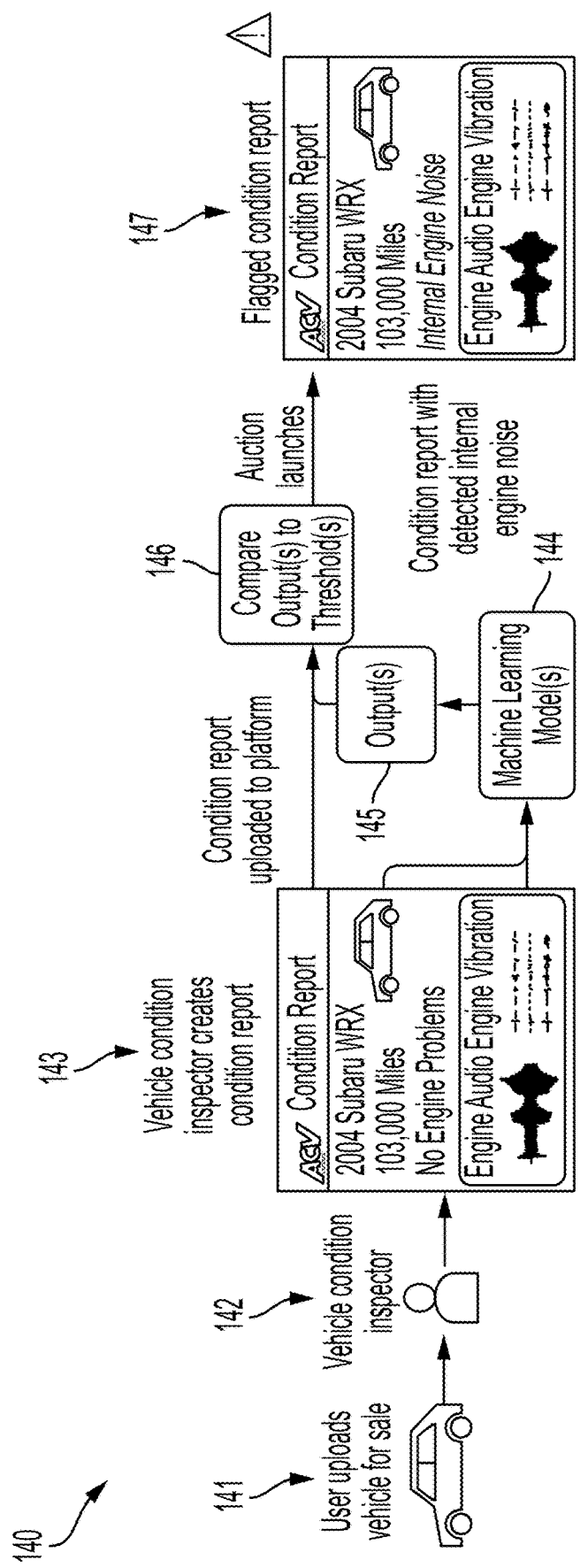
FIG. 1B illustrates an example schematic diagram of a vehicle examination 140 for use with a digital vehicle auction platform, in accordance with some embodiments of the technology described herein.

The inventors have developed technology to facilitate inspecting vehicles for the presence of defects. The technology includes multiple components including hardware and software components, which are described herein.

First, the inventors have developed new devices that may be used to gather data about a vehicle being inspected. Such devices, which may be referred to herein as mobile vehicle diagnostic devices or MVDDs, include various types of sensors and may be used to collect various types of data about vehicles. For example, an MVDD may be used to acquire audio, vibration, temperature, humidity measurements, and/or any other types of measurements supported by the sensors that it contains. As another example, an MVDD may be used to acquire various metadata about the properties of a vehicle including by connecting to vehicle's on-board diagnostics (OBD) computer and downloading various signals and/or or codes.

Second, the inventors have developed new machine learning techniques to analyze data about a vehicle being inspected, including the data about the vehicle collected by an MVDD. The machine learning techniques include multiple new machine learning models that are trained to analyze various sensor signals (e.g., audio signals, vibration signals, and/or metadata) to detect the presence or absence of potential vehicle defects. For example, the machine learning models developed by the inventors and described herein may be used to detect the presence or absence of abnormal internal engine noise (e.g., ticking, knocking, hesitation), rough running engine, abnormal timing chain noise (e.g., rattling of a stretched chain), abnormal engine accessory noise (e.g., power steering pump whines, serpentine belt squeals, bearing damage, turbocharger or supercharger noise, and noise emanating from any other anomalous components that are not internal to the engine block), and/or abnormal exhaust noise (e.g., noise generated due to a cracked or damaged exhaust system near the engine). Other examples of potential vehicle defects are described herein.

Finally, the inventors have developed an overall system for vehicle inspection that includes multiple MVDDs, mobile devices, and remote servers (e.g., as part of a cloud computing or other computing environment) that are configured by software to work together to facilitate inspections of multiple vehicles located in a myriad different locations. Operation of the system involves: (1) collecting data from multiple vehicles using MVDDs (which may be placed on or near the vehicles by inspectors examining the vehicles); (2) forwarding the collected data for subsequent analysis to one or more computing devices (e.g., one or more mobile devices operated by the inspectors and/or server(s) in a cloud computing or any other type of computing environment); (3) analyzing the collected data using one or more of the machine learning models developed by the inventors; and (4) performing an action based on results of the analysis, for example, flagging issues in a vehicle condition report, requesting further data be collected about a vehicle to confirm findings, requesting input on the identified potential defects from the vehicle inspector or other reviewer(s).

The various technologies developed by the inventors work in concert to enable efficient, distributed, and accurate inspection of vehicles. Indeed, the technologies described herein may be used to facilitate inspection of thousands, tens of thousands, hundreds of thousands, or even millions of vehicles, and with a sensitivity to potential defects that are difficult to discern even for experienced inspectors. Use of the system is streamlined, requiring minimal training. For example, inspectors using MVDDs to collect data about a vehicle may be guided in doing so by a software program on their mobile device, which may walk an inspector through a sequence of steps for how to operate an MVDD in order to obtain relevant data about a vehicle during its operation.

Numerous aspects of the technology are inventive and provide improvements relative to conventional techniques for inspecting vehicles, as described herein.

In one aspect, the inventors have developed a machine learning model that is configured to detect presence of absence of vehicle defects from audio acquired at least partially during operation of the vehicle's engine. Unlike conventional techniques that process time-domain audio signals directly, the machine learning model developed by the inventors is configured to process both a 1D and a 2D representation of the audio signals thereby taking advantage of two different signal representations and using complementary information contained in the two different representations to analyze the audio signals with greater accuracy and sensitivity. This provides an improvement relative to conventional approaches to analyzing audio data obtained from vehicles by processing only the time-domain audio signals.

Thus, in some embodiments, the machine learning model may be configured to process not only an audio waveform obtained from an audio recording made by an MVDD, but also a two-dimensional representation of that audio waveform which may be obtained, for example, by a time-frequency transformation such as a short-time Fourier transform and further normalized and scaled on the Mel-scale. In addition to the two different types of audio data, the machine learning model may be configured to process metadata about the vehicle as input. The metadata may contain signals and/or codes obtained from the vehicle's on-board diagnostics computer and/or any other suitable information about the vehicle, examples of which are provided herein. Accordingly, some embodiments provide for a computer-implemented method for using a trained ML model (e.g., a neural network model) to detect presence or absence of vehicle defects from audio acquired at least in part during operation of an engine of a vehicle (e.g. a car), the method comprising: (A) obtaining, via at least one communication network, a first audio recording that was acquired, using at least one acoustic sensor (e.g., part of an MVDD), at least in part during operation of the engine; (B) processing the first audio recording using the trained ML model to detect, from the first audio recording, presence of at least one vehicle defect, the processing comprising: (1) generating an audio waveform from the first audio recording, (2) generating a two-dimensional (2D) representation of the audio waveform (e.g., a Mel-scale log spectrogram), and (3) processing the audio waveform and the 2D representation of the audio waveform using the trained ML model to obtain output indicative of presence or absence of the at least one vehicle defect.

The inventors have recognized that it may be possible to detect more types of vehicle defects by using signals collected concurrently by multiple types of sensors (i.e., not just multiple acoustic sensors). For example, the inventors recognized that concurrently collecting acoustic and vibration data from a vehicle during its operation may enable more accurate vehicle defects and/or the detection of more types of defects than would be possible by using audio signals without concurrently measured vibration signals. For example, as described herein, the inventors have demonstrated that using both audio and vibration measurements allows for improved detection of internal engine noise and rough running engines.

Accordingly, some embodiments provide for a computer-implemented method for using a trained machine learning (ML) model (e.g., a neural network model) to detect presence of vehicle defects from audio and vibration acquired at least in part during operation of an engine of a vehicle (e.g., a car), the method comprising: (A) obtaining, via at least one communication network, a first audio recording that was acquired, using at least one acoustic sensor (e.g., part of an MVDD), at least in part during operation of the engine, and a first vibration signal that was acquired, using at least one vibration sensor (e.g., part of the MVDD), at least in part during operation of the engine; and (B) processing the first audio recording and the first vibration signal using the trained ML model to detect presence of at least one vehicle defect, the processing comprising: (1) generating audio features from the first audio recording (e.g., a 1D and/or a 2D representation of the audio recording), (2) generating vibration features from the first vibration signal (e.g., a 1D and/or a 2D representation of the vibration signal), and (3) processing the audio features and the vibration features using the trained ML model to obtain output indicative of presence or absence of the at least one vehicle defect. Processing data collected about a vehicle in this way provides an improvement in the ability to detect vehicle defects as compared to conventional approaches relying on only a single data modality (e.g., audio only).

The inventors have also developed a new machine learning model for detecting the presence or absence of start-up engine rattle. In some embodiments, the machine learning model is configured to process audio recordings of a vehicle (obtained, e.g., by an MVDD), and output an indication of the whether engine rattle was present in the audio recording. Additionally, in some embodiments, the machine learning model provides an indication of where the start-up rattle was detected within the audio recording. In some embodiments, this is achieved by incorporating a recurrent neural network (e.g., by including a bi-directional gated recurrent unit in its architecture), which allows the neural network to generate, for each particular one of multiple timepoints, an indication of whether start-up rattle was present at the particular timepoint. The inventors have recognized that detecting start-up rattle is especially challenging and that improvement in the ability to detect start-up rattle is obtained by a training an ML model dedicated to this task (as opposed to training an ML model to detect the presence of multiple different types of defects including start-up rattle) and having an architecture designed for this task.

Accordingly, some embodiments provide for a computer-implemented method for using a trained machine learning (ML) model (e.g., a neural network model) to detect presence of vehicle engine rattle from audio acquired at least in part during operation of an engine of a vehicle (e.g., a car) during start-up, the method comprising: (A) obtaining a first audio recording that was acquired, using at least one acoustic sensor (e.g., part of an MVDD), at least in part during operation of the engine; and (B) processing the first audio recording, using the trained ML model, to detect the presence of engine rattle in the first audio recording and identify one or more timepoints in the first audio recording at which engine rattle was detected, the processing comprising: (1) generating an (e.g., 1D) audio waveform from the first audio recording, and (2) processing the audio waveform using the trained ML model to obtain output indicating, for each particular timepoint of multiple timepoints, whether engine rattle was present at the particular timepoint in the first audio recording.

The inventors have also developed a new machine learning model for detecting the presence or absence of abnormal transmission noise. The machine learning model is configured to process audio recordings of a vehicle (obtained, e.g., by an MVDD) and metadata about the vehicle, and output an indication of the whether abnormal transmission noise was present in the audio recording. Additionally, in some embodiments, the machine learning model provides an indication of where the transmission noise was detected within the audio recording. In some embodiments, this is achieved by incorporating a recurrent neural network (e.g., by including a bi-directional gated recurrent unit in its architecture), which allows the neural network to generate, for each particular one of multiple timepoints, an indication of whether transmission noise was present at the particular timepoint. The inventors have recognized that detecting transmission noise (e.g., transmission whine) is especially challenging and that improvement in the ability to detect start-up rattle is obtained by a training an ML model dedicated to this task (as opposed to training an ML model to detect the presence of multiple different types of defects including transmission whine) and having an architecture designed for this task.

Accordingly, some embodiments provide for a computer-implemented method for using a trained machine learning (ML) model (e.g., a neural network model) to detect presence of abnormal transmission noise (e.g., transmission whine) from audio acquired at least in part during operation of an engine of a vehicle, the method comprising: (A) obtaining, via at least one communication network, a first audio recording that was acquired, using at least one acoustic sensor (e.g., part of an MVDD), at least in part during operation of the engine, and metadata (e.g., obtained by the MVDD) indicating one or more properties of the vehicle; (B) processing the first audio recording using the trained ML model to detect, from the first audio recording, presence of the abnormal transmission noise, the processing comprising: (1) generating an audio waveform from the first audio recording, (2) generating a two-dimensional (2D) representation of the audio waveform (e.g., a time-frequency representation such as a Mel-scale log spectrogram), (3) generating metadata features from the metadata, and (4) processing the audio waveform, the 2D representation of the audio waveform, and the metadata features, using the trained ML model to obtain output indicative of presence or absence of the abnormal transmission noise.

The inventors have recognized that performance of some of the machine learning models described herein may be deleteriously impacted by the presence of unwanted environmental noise in the signals that these machine learning models are configured to process. As described herein, the inventors have developed multiple machine learning models that process audio signals to identify various types of defects (e.g., abnormal engine noise, abnormal start-up rattle, abnormal transmission noise, etc.). However, if the audio recordings include unwanted environmental noise (e.g., noise from wind, rain, people talking, or other undesirable unrelated sound in the environment of the vehicle being inspected), that unwanted noise will negatively impact performance of the machine learning models that process such audio recordings.

Accordingly, the inventors have developed a machine learning model that is configured to process audio recordings (e.g., audio recordings made by MVDDs) to determine whether they are affected by environmental noise. If, based on the output of such an ML model, it is determined that an audio recording is not impacted by environmental noise, the audio recording may be processed by one or more other machine learning models to detect the presence or absence of vehicle defects. However, if based on the output of such an ML model, it is determined that the audio recording is impacted by environmental noise, one or more corrective actions may be taken. For example, in some embodiments, the affected audio recording may be discarded and the system may request that a new audio recording be obtained (e.g., by sending a message to the inspector of the vehicle whose MVDD provided an audio recording corrupted by environmental noise). As another example, in some embodiments, the affected audio recording may be processed by one or more denoising algorithms known in the art to reduce the amount of environmental noise present in the affected audio recording.

Accordingly, some embodiments provide for a computer-implemented method for using a trained machine learning (ML) model (e.g., a neural network model) to detect presence of environmental noise (e.g., wind noise) in audio acquired at least in part during operation of an engine of a vehicle, the method comprising: (A) obtaining a first audio recording that was acquired, using at least one acoustic sensor (e.g., part of an MVDD), at least in part during operation of the engine; and (B) processing the first audio recording, using the trained ML model, to detect the presence of environmental noise in the first audio recording, the processing comprising: (1) generating an audio waveform from the first audio recording, and (2) processing the audio waveform using the trained ML model to obtain output indicating whether environmental noise was present in the first audio recording.

The inventors have recognized that collecting data about vehicles during their operation presents challenges. To collect data about vehicle components of interest (e.g., an engine, transmission, etc.) it would be ideal to place various sensors as close to those components as possible. However, many components of interest are located in the engine bay of a vehicle and during operation of the engine the sensors would have to operate in an environment in which they are subject to significant mechanical, chemical, and heat stress due to shaking and rattling of various vehicle components, corrosive gasses and exhaust fumes, and high temperatures, respectively. Moreover, different types of sensors are susceptible to different sources of stress. Accordingly, it is challenging to build a robust multi-sensor device that may reliably and repeatedly obtain accurate data about the vehicle in a stressful environment.

Notwithstanding, the inventors have developed an MVDD that includes numerous features that allow it to properly operate in such a stressful environment. One particularly challenging problem was to develop an MVDD that can concurrently obtain acoustic and vibration measurements. While a vibration sensor (e.g., an accelerometer) may be able to detect vibration of the MVDD that is caused by the vibration of the vehicle during its operation, that same vibration will also cause the acoustic sensors to shake and introduce unwanted distortions into the audio signals captured by the acoustic sensors. Conversely, while preventing the MVDD from experiencing vibrations advantageously leads to reduced distortion picked up by the acoustic sensors, doing so results in poor signal detection by the vibration sensor(s).

Accordingly, the inventors have developed the MVDD by arranging the acoustic sensors, within the MVDD, with respective dampening devices such that, when the MVDD experiences vibration caused by vibration generated by the vehicle, both the vibration and the acoustic sensors can both measure high-quality signals. The same type of dampening is not applied to the vibration sensors. The resulting concurrently captured audio and vibration signals will each contain information about the vehicle and may be analyzed (e.g., using the trained ML model shown in FIG. 12A or 12B) to detect the presence or absence of any vehicle defects. Examples of various dampening devices are provided herein.

Accordingly, some embodiments provide for a mobile vehicle diagnostic device (MVDD) for acquiring data about a vehicle (e.g., car) at least in part during operation of the vehicle, the device comprising: (A) a housing configured to be mechanically coupled to the vehicle so that, when the housing is mechanically coupled to the vehicle, vibration generated by the vehicle during its operation causes the housing to vibrate; (B) a plurality of acoustic sensors disposed within the housing and configured to acquire sound generated by the vehicle during its operation, the plurality of acoustic sensors comprising first and second acoustic sensors respectively oriented in first and second directions, wherein the first and second directions are at least 30 degrees apart; (C) at least one dampening device (e.g., a passive dampening device such as a gasket) disposed in the housing and positioned to dampen vibration of the plurality of acoustic sensors caused by operation of the vehicle; and (D) at least one vibration sensor disposed within the housing and configured to sense vibration in the housing caused by the operation of the vehicle.

As described herein, the various technologies developed by the inventors including the new devices and machine learning models work together to enable efficient detection of vehicle defects in numerous vehicles located in a myriad different locations. As described herein, the inventors have developed a system that seamlessly integrates MVDDs, data they collected, and the techniques for analyzing the collected data into an effective vehicle diagnostic system.

Accordingly, some embodiments provide for a system for detecting presence of vehicle defects from audio acquired at least in part during operation of an engine of the vehicle, the system comprising: (A) a mobile vehicle diagnostic device (MVDD) for acquiring data about the vehicle at least in part during operation of the vehicle, the MVDD comprising: a housing configured to be mechanically coupled to the vehicle, a plurality of acoustic sensors disposed within the housing and configured to acquire sound generated by the vehicle during its operation, (B) a mobile computing device communicatively coupled to the MVDD and configured to: receive data from the MVDD, the data comprising an audio recording acquired by at least one of the plurality of acoustic sensors during operation of the engine of the vehicle, and transmit the data, via at least one communication network, to at least one computing device; and (C) the at least one computing device, being configured to perform: obtaining, via the at least one communication network, the first audio recording; processing the first audio recording using a trained ML model to detect, from the first audio recording, presence or absence of at least one vehicle defect, the processing comprising: generating audio features from the first audio recording, and processing the audio features using the trained ML model to obtain output indicative of presence or absence of the at least one vehicle defect.

The techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1A illustrates an example vehicle diagnostic system 100, in accordance with some embodiments of the technology described herein. Vehicle diagnostic system 100 may be used to collect information about one or more vehicles and analyze the collected information to determine whether any one of the vehicles has potential defects. In some embodiments, the vehicle diagnostic system 100 may collect information about the vehicle(s) using one or more mobile vehicle diagnostic devices (MVDDs), each containing one or more types of sensors, and may analyze the data collected by the MVDDs using one or more trained machine learning models. In some embodiments, an MVDD positioned near or inside of a vehicle may be used to collect data about a particular vehicle and the data collected by the MVDD may be transmitted to one or more computing devices (e.g., a mobile device, one or more servers in a cloud computing environment) for subsequent analysis using machine learning techniques, as described herein.

For example, the vehicle diagnostic system 100 may use an MVDD to collect, for a particular vehicle, audio signals, vibration signals, and/or metadata containing one or more properties of the particular vehicle and analyze some or all of these data (e.g., audio signals alone, vibration signals alone, metadata alone, any combination of two of these types of data, all three of these types of data) to detect presence or absence of one or more defects in the particular vehicle (e.g., by detecting the presence or absence of engine noise, transmission noise, start-up engine rattle, and/or any other type of defect the presence of which may be reflected in the gathered data). The MVDD may be used to collect one or more other types of data (examples of which are provided herein) in addition to or instead of the above described three example data types (e.g., audio, vibration, metadata), as aspects of the technology described herein are not limited in this respect. Data collected by MVDDs 104, 112, and 120 about vehicles 102, 110, and 118 may be transmitted, via network 126 for example, to server(s) 129 for subsequent analysis using one or more trained machine learning models stored at server(s) 129. The results of the analysis may be provided to one or more recipients, for example, users 130, 134, and 136 and/or user 132.

In the illustrated example of FIG. 1A, vehicle diagnostic system 100 may include any suitable number of MVDDs for collecting data about any suitable number of vehicles, as aspects of the technology described herein are not limited by the number of MVDDs part of vehicle diagnostic system 100 or the number of vehicles that such MVDDs may be used to examine. As shown in the example of FIG. 1A, vehicle diagnostic system 100 includes a first MVDD 104 for conducting a first vehicle examination 106 on vehicle 102 by a user 130 (e.g., an inspector, a buyer, a seller, or any other party), a second MVDD 114 for conducting a second vehicle examination 114 on vehicle 110 by user 134, and a $n^{th}$ MVDD 120 for conducting a $n^{th}$ vehicle examination 122 on a $n^{th}$ vehicle 118 by a $n^{th}$ user 136, where n is any suitable integer greater than or equal to three. Although the illustrated vehicle diagnostic system 100 has at least three MVDDs, in some cases, a vehicle diagnostic system may have one or two MVDDs, as aspects of the technology described herein are not limited in this respect.

In some embodiments, vehicle examinations may utilize separate MVDDs such that sensor data acquired for different vehicles is acquired by different MVDDs. For example, vehicle examinations 106, 114, and 122 may be performed utilizing MVDDs 104, 112, and 120, respectively.

Additionally or alternatively, a single MVDD may be used to conduct multiple vehicle examinations on different vehicles by moving a single MVDD from one vehicle to another vehicle. For example, MVDDs 104, 112, and 120 used vehicle examinations 106, 114, and 112 may each be the same MVDD, which has been moved among vehicles 102, 110, and 118 to collect data about these vehicles.

Additionally or alternatively, one or more MVDDs may be used to examine the same vehicle at multiple different times. For example, vehicle examinations 106, 114, and 122 may include vehicle examinations of the same car conducted at different times, such that vehicles 102, 110, and 118 represent the same vehicle at different times. In some embodiments, vehicle examinations may occur within the same hour. In some embodiments, vehicle examinations may occur within the same year. In some embodiments, vehicle examinations may occur years apart from one another. For example, a first vehicle examination 106 may be conducted on the same day as a second vehicle examination 114, which may be conducted on a different day than a third vehicle examination 122, which may be conducted at a later date.

In some embodiments, users 130, 134, and 136 may be the same user conducting different vehicle examinations. In some embodiments, users 130, 134, and 136 may be a trained user (e.g., a vehicle inspector) conducting a vehicle examination. In some embodiments, users 130, 134, and 136 may be users untrained in the use or operation of an MVDD. For example, users 130, 134, and 136 may be the owners, buyers, sellers, agents, and/or other people associated with vehicles 102, 110, and 118, respectively. The MVDDs may include features that facilitate their operation (e.g., light and/or sound based feedback mechanism(s) that provide various indications to the user).

During a vehicle examination, an MVDD may be positioned within (e.g., within the engine bay, vehicle hood, or passenger compartment) or adjacent to a vehicle (e.g., proximate an exhaust outlet) for collecting sensor measurements at least in part during the operation of the vehicle. In some embodiments, the vehicle examination includes assessing a condition of the engine, transmission, exhaust, and/or any other vehicle system or component. The MVDD may be used to collect various data from the vehicle as part of the examination. For example, while in operation, an internal combustion engine may produce sounds and vibrations at certain frequencies with certain magnitudes. These sounds and vibrations may include different frequencies and magnitudes during different engine operations (e.g., while the engine is being started, revved, idled, shut down). The sounds and vibrations generated by the vehicle (e.g., by engine, transmission, exhaust system, etc.) may change one or more vehicle components are affected by a defect. For example, the frequencies and magnitudes of sounds and vibrations generated by a vehicle may be impacted by the presence of one or more defects. By acquiring signals from multiple sensors (e.g., one or more acoustic sensors, one or more accelerometers, one or more VOC/gas sensors, one or more temperature sensors, one or more humidity sensors, etc.) and analyzing the resulting signals (e.g., by using one or more machine learning models, as described herein), the presence of one or more defects in the vehicle may be detected.

In some embodiments, a vehicle inspection may include acquiring one or more audio and/or one or more vibration signals generated by a vehicle (e.g., by the vehicle's engine and/or other vehicle component(s)). The acquired audio and vibration signals may be analyzed to infer one or more features indicative of vehicle operation, for example, throttle position, combustion, cylinder sequence, RPM-tachometer reading, engine misfire, stutter, air to fuel ratio, knock sensor condition, and/or any other conditions which may be indicative of vehicle performance loss associated with a vehicle defect. Recorded audio and vibration signals may also be unique to a vehicle's make and model. In some embodiments, the recorded audio and/or vibration signals may be analyzed to identify the make and model (e.g., make, model, and year) of a vehicle.

In some embodiments, an MVDD may be positioned with respect to a vehicle such that the MVDD is mechanically coupled to the vehicle and/or a component thereof. Mechanically coupling an MVDD to a vehicle (or a component thereof) involves positioning the MVDD with respect to the vehicle (or the component thereof) such that the MVDD is in physical contact, direct or indirect, with the vehicle (or the component thereof) in a way that allows vibrations generated by the vehicle (or the component thereof) to cause the MVDD to vibrate. For example, so that vibrations generated by an engine and/or any other vehicle component, cause the housing of the MVDD to vibrate and, in turn, to be detected by one or more vibration sensors in the MVDD.

In some embodiments, metadata about the vehicle and/or vehicle examination process may be collected during vehicle inspection. Non-limiting examples of metadata include a reading of the vehicle's odometer, a model of the vehicle, a make of the vehicle, an age of the vehicle, a type of drivetrain in the vehicle, a type of transmission in the vehicle, a measure of displacement of the engine, a fuel type for the vehicle, an indication of whether on-board diagnostics (OBD) codes could be obtained from the vehicle, a number of incomplete readiness monitors reported by the OBD scanner, one or more BlackBook-reported engine properties, a list of one or more OBD codes, location of the vehicle, information about weather at the location of the vehicle, and information about a seller of the vehicle.

The metadata about the vehicle and/or vehicle examination process may be collected in any of numerous ways. In some embodiments, metadata may be collected from an on-board diagnostic (OBD) computer that is part of the vehicle. For example, the metadata may include signals and/or codes received from a car's OBD computer (e.g., through an appropriate interface, for example, an OBDII interface). For instance, the vehicle identification number (VIN) and other vehicle data indicative of the vehicle's condition and/or operations may be included in the signals and/or codes received from the on-board diagnostic computer.

In some embodiments, the metadata may be collected from an OBD computer using an MVDD. In the example of FIG. 1A, MVDD 104, 112, or 120 may be used to receive signals from the on-board diagnostic computer of vehicles 102, 110, or 118, respectively. An MVDD may interface with the on-board diagnostic computer in any suitable way. For example, an MVDD may interface with the OBD computer through a wired ALDL, OBDI, OBD1.5, OBDII, EOBD, EOBD2, JOBD, ADR 79/01, or ADR 79/02 interfaces. In some embodiments, MVDD may interface with the on-board diagnostic computer through a wireless interface. Any other suitable interface may be used to obtain data from the on-board diagnostic computer, as aspects of the technology described herein are not limited in this respect.

Additionally or alternatively, the metadata may be collected from an OBD computer using a mobile device. For example, users 130 or 136 may use their mobile device 108 or 124 respectively to receive signals from the on-board diagnostic computer. A mobile device may interface with the on-board diagnostic computer in any suitable way, for example, through a wired or wireless interface.

In some embodiments, the metadata about the vehicle and/or vehicle examination process may include metadata collected from one or more sources other than an on-board diagnostic computer, in addition to or instead of being collected from the on-board diagnostic computer. For example, in some embodiments, a user may enter metadata including information about the vehicle and/or vehicle examination process via a software application. As one example, user 130 may enter metadata about vehicle 104 into mobile device 108 (e.g., via a software application executing on the user's smartphone). As another example, metadata about the vehicle may be downloaded from one or more external sources. For example, a software application (e.g., a software application executing on the user's smartphone) may be configured to download information about the vehicle by using information identifying the vehicle (e.g., VIN, license plate) to access information about the vehicle at a third party website or information repository (e.g., department of motor vehicles).

Irrespective of the manner in which metadata is obtained, that metadata may be used for subsequent analysis of the vehicle's condition (e.g., either on its own or together with one or more other sensor signals acquired by an MVDD, such as audio and/or vibration signals). To this end, the metadata may be transmitted to any computing device(s) performing such analysis (e.g., using any of the machine learning techniques described herein). For example, when the analysis of the condition of vehicle 102 is performed by a mobile device (e.g., mobile device 108), metadata may be transmitted to mobile device 108 (e.g., from the MVDD if the MVDD collected it). As another example, when the analysis of the condition of vehicle 102 is performed by a remote computing device or devices, such as server(s) 129, the metadata may be transmitted to the remote computing device (e.g., either from the MVDD 104 or the mobile device 108).

In addition to the above-described examples of metadata, in some embodiments, the metadata may include information about the environment of the vehicle such as temperature and humidity measurements. Environmental conditions surrounding the vehicle during its inspection may impact the performance of vehicle components and/or the relative frequencies at which certain defects manifest. For example, as temperature and/or humidity change, fittings within the vehicle may expand or contract resulting in changes to the frequencies at which certain components vibrate and/or changes to the frequency content of the sound they produce. As another example, the local environmental conditions around the MVDD positioned within the vehicle may be modified by a part which is about to fail, such as when a part is overheating or where vehicle emissions are out of an expected range due to a component defect. Accordingly, in some embodiments, the metadata collected may include information about the environment and such information may be used as input by the machine learning techniques described herein to identify potential vehicle defects.

As described herein, trained machine learning models may be used to determine the presence or absence of a potential vehicle defect (e.g., abnormal engine noise, start-up rattle, abnormal transmission noise, etc.) based on the signals (e.g., audio and/or vibration signals) acquired by one or more of the plurality of sensors part of the MVDD and/or the metadata acquired by the MVDD or another device. To this end, a trained machine learning model may be applied to data (e.g., features) derived from the signals and/or metadata obtained for a vehicle to generate one or more outputs indicative of the presence or absence of a vehicle defect. The application of a trained machine learning model to data involves performing computations on the data using parameter values of the trained machine learning model. Such computations may be performed by any suitable device(s).

Accordingly, in some embodiments, an MVDD may be configured to store and apply one or more trained machine learning models to signals and/or metadata obtained for a vehicle to generate one or more outputs indicative of the presence or absence of a defect in the vehicle. To this end, an MVDD may include memory and one or more processors (e.g., one or more CPUs, one or more GPUs). The memory may store a trained machine learning model (e.g., by storing parameters of the trained machine learning model) and software code for applying the trained machine learning model to signals and/or metadata obtained for a vehicle that the MVDD is being used to inspect. The software code may include processor-executable instructions for pre-processing the signals and/or metadata in any suitable way (including in any of the ways described herein) and for performing computations on data (e.g., data derived from the signals and/or metadata) using parameters of the trained machine learning model. The processor-executable instructions may be executed by the processor(s) of the MVDD.

In some embodiments, one or more other computing devices (physically separate from an MVDD) may be configured to store and apply one or more trained ML models to signals and/or metadata obtained for a vehicle to generate one or more outputs indicative of the presence or absence of a defect in the vehicle. For example, a mobile device (e.g., mobile devices 108 or 124) may be configured to store and apply one or more trained ML models to signals and/or metadata obtained for a vehicle to generate output(s) indicative of the presence or absence of a defect in the vehicle. The memory of the mobile device may store a trained ML model (e.g., by storing parameters of the trained ML model) and software code for applying the trained ML model to signals and/or metadata obtained from a vehicle. The software code may include processor-executable instructions for pre-processing the signals and/or metadata in any suitable way (including in any of the ways described herein) and for performing computations on data (e.g., data derived from the signals and/or metadata) using parameters of the trained ML model. The processor-executable instructions may be executed by the processor(s) of the mobile device.

For example, one or more trained ML models may be stored on a mobile device such as mobile device 124. In this example, mobile device 124 may receive acoustic sensor signals and vibration sensor signals from MVDD 120 through a wired or wireless interface. Mobile device 124 may additionally receive OBDII signals either from MVDD 120 or directly from vehicle 118. Mobile device 124 may process the received data using one or more trained ML models stored on the mobile device 124 (or, in some embodiments, retrieved from one or more remote devices such as server(s) 129). Following processing, mobile device 124 may generate a vehicle condition report and provide the vehicle condition report to user 136. Additionally or alternatively, mobile device 124 may transmit the vehicle condition report through network 126 to be stored on a remote computer 128 and/or on server(s) 129. In some embodiments, an interface (e.g. a graphical user interface, an application programming interface) may be provided for a user to view and interact with the vehicle condition report either through a mobile device or through a remote computing device.

As another example, one or more servers (e.g., server(s) 129) may be configured to store and apply one or more trained ML models to signals and/or metadata obtained for a vehicle to generate one or more outputs indicative of the presence or absence of a defect in the vehicle. The memory of or accessible by the server(s) may store a trained ML model (e.g., by storing parameters of the trained machine learning model) and software code for applying the trained ML model to signals and/or metadata obtained from a vehicle. The software code may include processor-executable instructions for pre-processing the signals and/or metadata in any suitable way (including in any of the ways described herein) and for performing computations on data (e.g., data derived from the signals and/or metadata) using parameters of the trained ML model. The processor-executable instructions may be executed by the processor(s) of the server(s).

In some embodiments, one or more types of devices may be used to store and apply trained machine learning models to data. It is not a requirement that trained ML models be stored only on servers or only on mobile devices or only on MVDDs. Accordingly, in some embodiments, one or more trained ML models may be stored on one or more MVDDs, one or more trained ML models may be stored on one or more mobile devices, and/or one or more trained ML models may be stored on one or more servers. Which trained ML models are stored on a particular device may depend on the hardware (e.g., processing capability, memory, etc.), software, firmware, or a combination of each which are present on the device, as well as the complexity of the trained ML model (e.g., as measured by the amount of memory and/or processing power required to apply the trained ML model to data).

In some embodiments, where trained ML models are stored on and applied by one or more computing devices different from an MVDD, signals and/or metadata collected by the MVDD may be provided (e.g., accessed or transmitted) through a communication interface of the MVDD to one or more other devices.

In some embodiments, the data being acquired by the MVDD may be provided through the communication interface of the MVDD to one or more other devices (e.g., only) after the process of acquiring the data has been completed. For example, audio and/or vibration signals may be provided through the communication interface after their recording (and, optionally, pre-processing onboard the MVDD) has completed. As another example, metadata may be provided through the communication interface after its download from the OBD computer of the vehicle (and, optionally pre-processing onboard the MVDD) has been completed. However, in some embodiments, data being acquired by the MVDD may be provided through the communication interface of the MVDD prior to completion of its acquisition. For example, the data may be transmitted via the communication interface as a live-stream in real time or in near-real time (e.g., within a threshold number of seconds or milliseconds of its receipt, for example, within 1 or 5 seconds or within 100 or 500 milliseconds of receipt). As one example, the MVDD may be configured to record an audio signal having a particular duration, but while that recording is ongoing and prior to its completion, the MVDD may be configured to transmit shorter segments of the part of the total recording already obtained (e.g., transmit the first ten seconds of audio record while continuing to record the next ten seconds of audio).

Returning to the communication interface of the MVDD, that interface may be of any suitable type and may be a wired or a wireless interface. For example, MVDD 104 may transmit, through a wired or wireless interface, sensor data to user mobile device 108.

In some embodiments, an MVDD may include one or more wireless communication interfaces of any suitable type. A wireless interface may be a short- or long-range communication interface. Examples of short-range communication interfaces include Bluetooth (BT), Bluetooth Low Energy (BLE), and Near-Field Communications (NFC) interfaces. Examples of long-range communication interfaces include Wi-Fi and Cellular interfaces. In support of any of these communication interfaces, an MVDD may include appropriate hardware, for example, one or more antennas, radios, transmit and/or receive circuitry to support the relevant protocol.

As shown in FIG. 1A, in some embodiments, an MVDD may provide data to one or more mobile devices. For example, an inspector (e.g., user 130) may be inspecting vehicle 102 by placing MVDD 104 on the engine block and causing the MVDD 104 to acquire various signals (e.g., audio signals, vibration signals) and/or metadata, while the inspector operates the vehicle (e.g., starting the vehicle, revving the engine one or more times, idling the vehicle, turning off the vehicle, etc.) in accordance with instructions provided to the inspector by a software application executing on the inspector's mobile device 108 (e.g., a software application installed on the mobile device, a web-based application accessible via an Internet browser installed on the mobile device). The signals and, optionally, metadata collected by the MVDD may be transmitted from the MVDD to the mobile device 108. In turn, the mobile device 108 may analyze the received data (e.g., using one or more trained ML models) and/or send the received data (or a processed version thereof), via network 126, to one or more remote devices for subsequent processing (e.g., by server(s) 129).

As also shown in FIG. 1A, in some embodiments, an MVDD may provide data to one or more remote computing devices. For example, an inspector (e.g., user 134) may be inspecting vehicle 110 by placing MVDD 112 on the hood of or on the engine within the vehicle and causing the MVDD 112 to acquire various signals (e.g., audio signals, vibration signals, temperature signals, humidity signals, VOC signals) and/or metadata, while the inspector operates the vehicle (e.g., starting the vehicle, revving the engine one or more times, idling the vehicle, turning off the vehicle, etc.) in accordance with instructions provided to the inspector by a software application executing on the inspector's mobile device (not shown). The signals and, optionally, metadata collected by the MVDD 112 may be transmitted from the MVDD 112, via communication link 116 and network 126, to one or more remote devices for subsequent processing (e.g., by server(s) 129).

Network 126 may be any suitable type of communication network such as a local area network or a wide-area network (e.g., the Internet). Network 126 may be implemented using any suitable wireless technologies, wired technologies, or any suitable combination thereof, as aspects of the technology described herein are not limited in this respect. Network 126 may be used to transmit data about a vehicle (e.g., signals and/or metadata acquired) to one or more remote server(s) 129. Network 126 may be used to transmit results of analyzing the data about the vehicle from one or more server(s) 129 (e.g., as part of a vehicle condition report or any other suitable communication) to one or more users (e.g., 130, 134, and 136) via their mobile devices (e.g., 108 and 124).

Server(s) 129 may include one or more computing devices of any suitable type. For example, server(s) 129 may include one or more rackmount devices, one or more desktop devices, and/or one or more other types of devices of any suitable type. In some embodiments, the computing device(s) may be part of a cloud computing environment. The cloud computing environment may be of any suitable type. For example, the environment may be a private cloud computing environment (e.g., cloud infrastructure operated for one organization), a public cloud computing environment (e.g., cloud infrastructure made available for use by others, for example, over the Internet or any other network, e.g., via subscription, to multiple organizations), a hybrid cloud computing environment (a combination of publicly-accessible and private infrastructure) and/or any other type of cloud computing environment. Non-limiting examples of cloud computing environments include GOOGLE Cloud Platform (GCP), ORACLE Cloud Infrastructure (OCI), AMAZON Web Services (AWS), and MICROSOFT Azure.

In some embodiments, a mobile device (e.g., mobile devices 108 and 124) may provide a user with access to a software application that may be configured to assist the user in operating an MVDD, receiving information from an MVDD, and/or transmitting information to the MVDD. The software application may be installed on the mobile device or may be a web-based application accessible via an Internet browser installed on the mobile device.

In some embodiments, the software application may provide a user with instructions for how to position and/or operate the MVDD. The software application may allow the user to view data collected by the MVDD (e.g., audio signals, vibration signals, metadata, other types of signals obtained by other types of sensors, etc.). In some embodiments, the application on the mobile device may transmit instructions to the MVDD to cause the MVDD to execute acquisitions using one or more of the plurality of sensors. In some embodiments, the software application may be configured to provide playback, display, preliminary results, and/or final analysis results based on acquired data to a user.

In some embodiments, where the mobile device stores one or more trained ML models, the software application may provide a user with results of analysis performed using the trained ML model(s). For example, the software application may: (1) generate a vehicle condition report that is based, in part, on results of analyzing collected data with trained ML model(s); and (2) provide at least some or all of these results to the user. As another example, the software application may determine (e.g., using a trained ML model or any other suitable way) that at least some of the data collected by the MVDD is not of sufficient quality for subsequent analysis (e.g., due to presence of environmental noise, such as wind noise, in the data) and may prompt the user (e.g., an inspector) to use the MVDD to collect additional data (e.g., so that an audio recording has less environmental noise than the first time around).

In some embodiments, where one or more servers store one or more trained ML models, the software application may be configured to transmit data collected about a vehicle (e.g., data collected using an MVDD) to the server(s) for analysis. Subsequent to that analysis being performed, the software application may receive results of the analysis (e.g., a vehicle condition report, an indication that some data is not of sufficient quality for subsequent analysis) and provide those results to a user. Providing the results to the user may involve showing the user a vehicle condition report, showing the user an indication of any defect identified using the remotely-performed analysis, and/or prompting the user to collect additional data when at least some of the data was determined to not be of sufficient quality for subsequent analysis.

In some embodiments, following the processing of data collected about a vehicle using one or more trained ML models, the user device(s) and/or the MVDDs may receive a vehicle condition report corresponding to the results of the analysis. The vehicle condition report may indicate the presence or absence of at least one vehicle defect. For example, following processing, the vehicle condition report may be sent from server(s) 129 through network 126 to user device 108 where the vehicle condition report is accessible to the user 130.

Remote computer 128 may be any suitable computing device. In some embodiments, remote computing device 128 may be a laptop, desktop, or mobile device and may be operated by any user 132 who is interested in the condition report of the vehicle. User 132 may be a buyer, seller, owner, dealer or any other person interested in the vehicle.

In some embodiments, server(s) 129 may store data collected by MVDDs and/or other sources as a library of training data. The training data may include audio, vibration, and/or any other types of signals acquired by MVDD sensors from vehicles. Examples of the other types of signals and sensors that may be used to collect them are described herein. Additionally or alternatively, the training data may include metadata acquired from vehicles. In some embodiments, the library of training data may be used to train one or more machine learning models. In some embodiments, the library of training data may include sub-libraries organized by defects and or make and model of the vehicle.

In some embodiments, only a portion of sensor data and metadata received at the server(s) 129 may be stored in a training library to be used for training. For example, data received from vehicle examinations 106 and 114 may be stored in the training library and used to train one or more machine learning models, but data received from vehicle examination 122 may not be stored in a training library. Rather, the data from vehicle examination 122 may be analyzed by the trained ML model to generate a vehicle condition report. In some embodiments, data received from vehicle examinations may be analyzed by the trained model and subsequently stored in a training library.

In some embodiments, the data received from vehicle examinations may be used as reference points for future vehicle examinations and/or comparisons. For example, subsequent vehicle examinations may be analyzed by the same trained machine learning model as the data from earlier vehicle examinations. The results of the analyses may be compared over time to determine if the vehicle condition changed in any way. In some embodiments, processed results and/or the raw data may be cataloged by the VIN information received. In this way, changes identified vehicle defects and/or changes in the confidences for those identifications may be included in the vehicle condition report.

The inventors have recognized and appreciated that a digital platform that facilitates the buying and selling of used vehicles would benefit from the confidence that the condition of the listed vehicle is thorough and reliable. Such a vehicle condition report would facilitate a potential buyer to assess a used vehicle's value, especially when doing so through a digital platform where the potential buyer does not have the opportunity to physically inspect the vehicle themselves. The inventors have further recognized and appreciated that a thorough and reliable is likely to give buyers greater confidence in buying the vehicle sign unseen from a digital vehicle auction platform.

FIG. 1B illustrates an example schematic diagram of a vehicle examination 140 for use with a digital vehicle auction platform, in accordance with some embodiments of the technology described herein. As shown in FIG. 1B, vehicle examination 140 may include a user uploading a vehicle listing for sale 141. In some embodiments, a vehicle sale profile may be uploaded to a server, on which the platform is hosted, for display as an available vehicle for sale. The user may perform said uploading via a software application installed on a user's device. That software application may be an application for connecting with a digital vehicle auction platform and/or an Internet browser providing web-based access to the digital vehicle auction platform.

Once uploaded, a vehicle condition inspector 142 may conduct an examination of the vehicle. That examination may involve the inspector to physically inspect the vehicle. The examination process may involve having the inspector use an MVDD to collect data about the vehicle, for example, my placing the MVDD on, in, or near the vehicle and causing the MVDD to collect various data including audio data, vibration data, metadata and/or any other suitable type of data. The inspector may have a mobile device (e.g., mobile device 108) and may use that device to interact with the MVDD. The mobile device may have a software application executing thereon that may instruct the inspector to take the vehicle through a series of stages (e.g., starting the engine, revving the engine, idling the engine, turning off the engine, a series of any of the preceding stages sequenced in any suitable way and repeating any one stage any suitable number of times) while the MVDD gathers sensor data (e.g., audio and/or vibration data) during at least some of those stages. As described herein, the collected data may be analyzed (e.g., using one or more trained ML models described herein) and the results of the analysis may be included in a vehicle condition report that serves aggregation of data regarding the vehicle's current condition. When the vehicle is presented to potential buyers on the digital platform, the vehicle condition report may be presented to parties potentially interested in bidding on the vehicle.

In some embodiments, the vehicle's condition report may include a review of the vehicle's characteristics, defects, damage, and/or faults. The vehicle condition report may include multiple (e.g., at least 10, 20, 30, etc.) photos of the exterior, interior, undercarriage, engine bay, and/or any other suitable component. Additionally or alternatively, the vehicle condition report may include the VIN number, odometer reading, engine fuel type, cosmetic issues observed by a user, mechanical issues observed by a user, and any of the other types of information about a vehicle described herein. In some embodiments, the vehicle condition report may include signals acquired of the vehicle during the vehicle examination, as described herein including with reference to FIG. 1C.

As described herein, in some embodiments, the vehicle examination includes acquiring sensor signals using an MVDD. Following the vehicle examination, the vehicle condition inspector generates a vehicle condition report associated with the vehicle for which a vehicle sale profile has been created. The vehicle condition report may include the signals and/or metadata acquired during the vehicle examination.

In some embodiments, the vehicle examination may occur prior to the uploading of a vehicle sale profile 141. Accordingly, in some embodiments, the vehicle condition report 143 may be generated along with the vehicle sale profile. In some embodiments, the vehicle condition report may be generated prior to the vehicle sale profile. However, once the vehicle sale profile is created it may be matched with the vehicle condition report based on the VIN or other available identification information.

However, in generating the vehicle condition report, user observations as to potential vehicle conditions may not be reliable. For example, engine defects may be very subtle issues which may only be discernible by automobile experts, if observable by physical observation at all. Accordingly, a vehicle defect may go unnoticed or even misclassified resulting in inaccurate vehicle condition report. In such an instance, an unknowing buyer may purchase the anomalous vehicle and upon finding such an undisclosed issue, may be eligible to file for an arbitration. More accurate vehicle condition reports may reduce the occurrence of undisclosed vehicle defects and by extension arbitrations.

Accordingly, to decrease the risk of undisclosed vehicle defects, the signals acquired during the vehicle examination by a plurality of sensors (e.g., an MVDD) may be processed by one or trained machine learning models to detect the presence or absence of potential vehicle defects. After the generated of the vehicle condition report, the acquired signals may be processed by trained machine learning model(s) 144 to produce one or more outputs 145, which may be indicative of one or more defects present in the vehicle (as determined based on the sensor data and/or metadata processed). In some embodiments, the output(s) 145 may be compared to threshold(s) 146 to determine if the output(s) 145 are indicative of the presence or absence of a one or more potential vehicle defects.

In some embodiments, comparing output(s) 145 to threshold(s) 146 may be implemented using class-wise thresholds such that if a predicted vehicle defect exceeds its class threshold the vehicle is subsequently flagged with the corresponding engine fault. In some embodiments, the thresholds may be tuned to favor very precise predictions at the expense of recall to decrease the likelihood of falsely labeling a vehicle as having a vehicle defect when it is in fact clean. For example, different classes of defects (e.g., internal engine noise, rough running engine, timing chain noise, etc.) may be associated with different threshold confidences such that different degrees of confidence may be required for different types of defects in order to flag them as potential defects in the report.

After determining whether the output(s) 145 are indicative of the presence or absence of a potential vehicle defect, the vehicle condition report may be flagged for the presence of the potential vehicle defect. In some embodiments, if the processing by the trained machine learning model(s) identifies potential defects which were not listed in the vehicle condition report 143, then the vehicle condition report may be flagged for additional review by the vehicle condition inspector 142, including conducting a second vehicle examination. Such a second vehicle examination may include collecting additional data about the vehicle using an MVDD, for example, by collecting additional sensor data and subsequently analyzing it using one or multiple trained ML models.

In some embodiments, where a potential defect was listed in the vehicle condition effect, but the analysis by the trained machine learning models identified that the listed vehicle condition was absent from the recording, the vehicle condition report may also be flagged for an additional review by the vehicle condition inspector 142, including conducting a second vehicle examination. In some embodiments, the output of the trained machine learning model(s) may be used to update the vehicle condition report to indicate either the presence and/or the absence of a vehicle defect without requiring an additional review by the vehicle condition inspector.

Figure 1C:
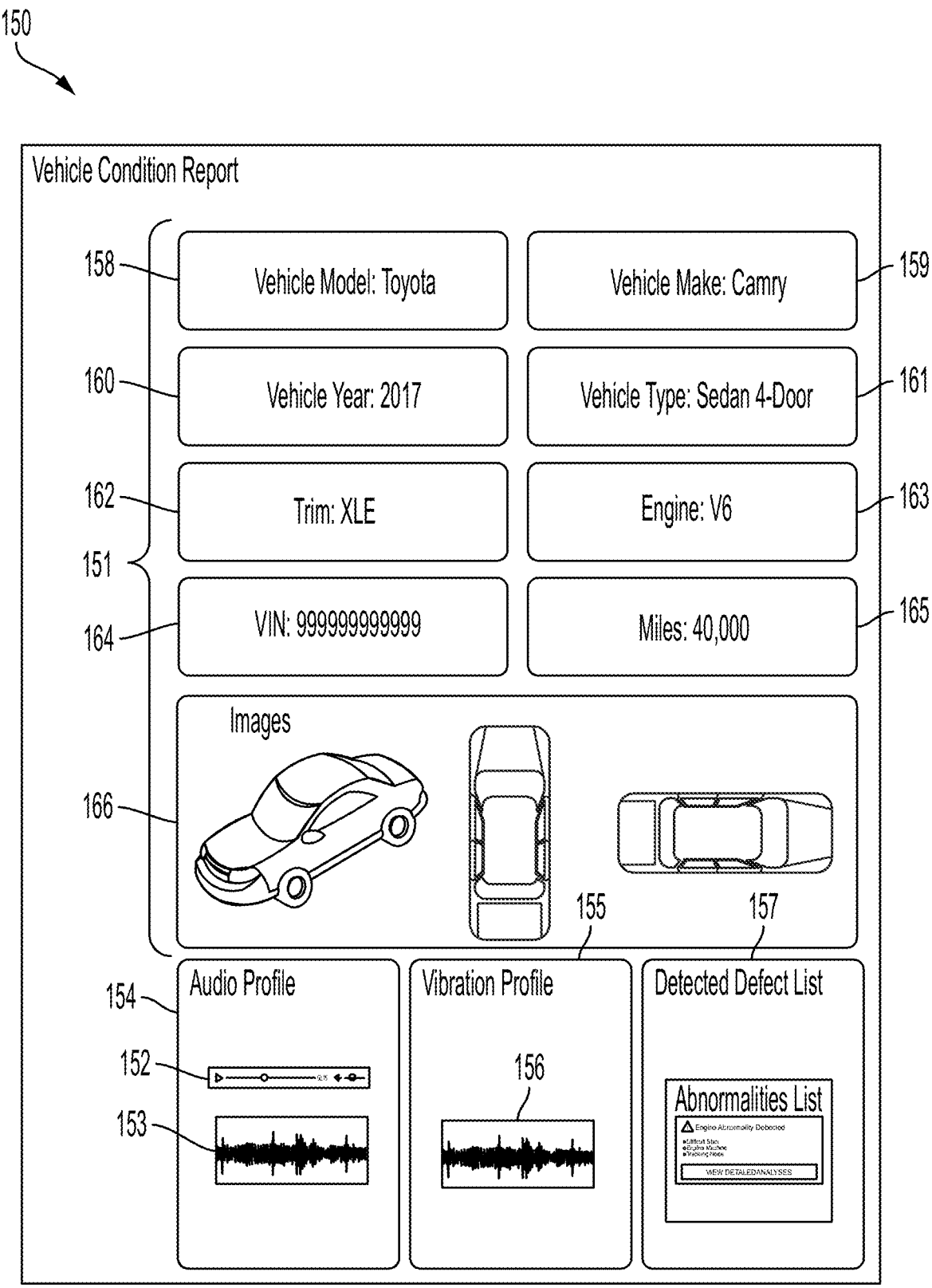
FIG. 1C illustrates an example vehicle condition report, in accordance with some embodiments of the technology described herein.

FIG. 1C illustrates an example vehicle condition report, in accordance with some embodiments of the technology described herein. In some embodiments, vehicle report 150 may include basic vehicle data 151, audio profile 154, vibration profile 155, and detected defect list 157. Audio profile 154 may include an audio playback bar 152 and/or waveform display 153. Vibration profile 155 may include waveform display 156.

As shown in the example of FIG. 1C, basic vehicle data 151 may include vehicle model 158, vehicle make 159, vehicle year 160, vehicle type 161, trim type 162, engine type 163, VIN 164, an odometer reading 165, and one or more images 166 of the vehicle and/or any of its components (e.g., undercarriage, panels, doors, hood, engine block, rear, etc.) may be included in vehicle condition report 150.

As shown in the example of FIG. 1C, information about one or more audio recordings captured (e.g., by an MVDD) may be part of a vehicle condition report. The report may allow a user to interact with it to listen to the audio recording (e.g., via audio playback bar 152), visually inspect the recording (e.g., via waveform display 153, which may display the time-domain waveform(s) recorded and/or any other types of views of the data such as in the frequency or time-frequency domains, for example, as spectrogram). Such access to the audio recordings allows a user to diagnose and/or confirm previously-identified issues with the vehicle from the data included in the vehicle condition report, when the vehicle is not readily available (e.g., the user is not. For example, if the frequency content of the audio acquired for a particular vehicle is sufficiently different (e.g., sounds different, looks different, different according to some objective measure), then this allows the user to better appreciate the presence of a potential defect with the vehicle. Similarly, vibration profile 155 and waveform display 156 may also allow a user to diagnose and/or confirm a previously-identified issue with the vehicle.

The vehicle report of FIG. 1C is illustrative and that, in other examples, one or more other types of information may be included in the vehicle report in addition to or instead of the information shown in FIG. 1C, as aspects of the technology described herein are not limited in this respect. For example, a vehicle condition report may include vehicle RPM data from the OBDII port and/or data from one or more other sensors (e.g., thermal, humidity, VOC, etc.). As another example, any list part of list 157 may be displayed with a corresponding numeric value (e.g., a probability, a confidence value, a likelihood) indicating a degree of confidence in the vehicle actually having that defect. Such numeric values may be generated by the trained ML models described herein, for example.

Figure 1D:
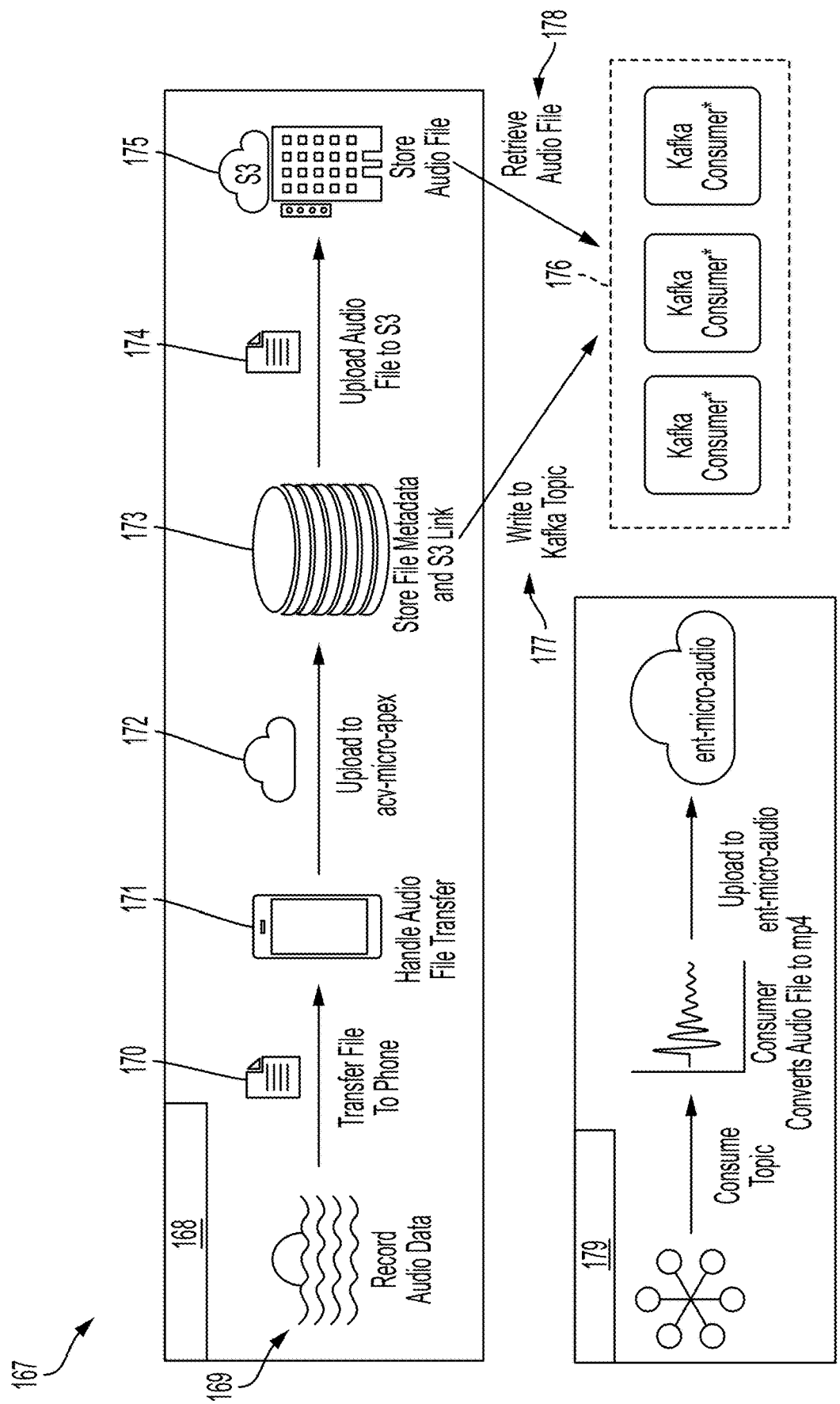
FIG. 1D illustrates an example process for processing recorded audio data, in accordance with some embodiments of the technology described herein.

FIG. 1D illustrates an example process 167 for processing recorded audio data, in accordance with some embodiments of the technology described herein. The illustrative process 167 includes the operations 169, 170, 171, 172, 173, 174, 176, 177, 178, and 179.

Operation 169 involves recording audio data. In some embodiments, this may be achieved by positioning an MVDD on or near a vehicle's engine and operating the engine in different modes (e.g., rev, idle, ignite, stop, etc.). At operation 170, the MVDD may transfer the audio data recorded to a mobile device located near the MVDD (e.g., the mobile device 108 may receive audio data from MVDD 104 as shown in FIG. 1). At operation 171, the mobile device may handle the audio transfer, which may involve preprocessing and/or otherwise formatting the audio data for subsequent transfer (though it may be simply a pass through). At operation 172, the mobile device may upload the audio data to a cloud computing environment using an upload service. At operation 173, metadata associated with the audio data (e.g., including a link to the file's location, for example, an S3 bucket) may be stored. At operation 174, the audio data may be uploaded to an audio file storage service and stored at operation 175.

At operation 177, the metadata and audio file link may be written to a data stream (e.g., a Kafka topic). That data stream may retrieve an audio file with the link at operation 178. At the operation 176 consumers of the data stream process the audio file. At the operation 179, each consumer processes a corresponding audio sample from the audio file by converting the file to an mp4 and provides the converted audio to service which may detect one or more features in the audio file which are mapped to a condition of the vehicle's engine.

Figure 1E:
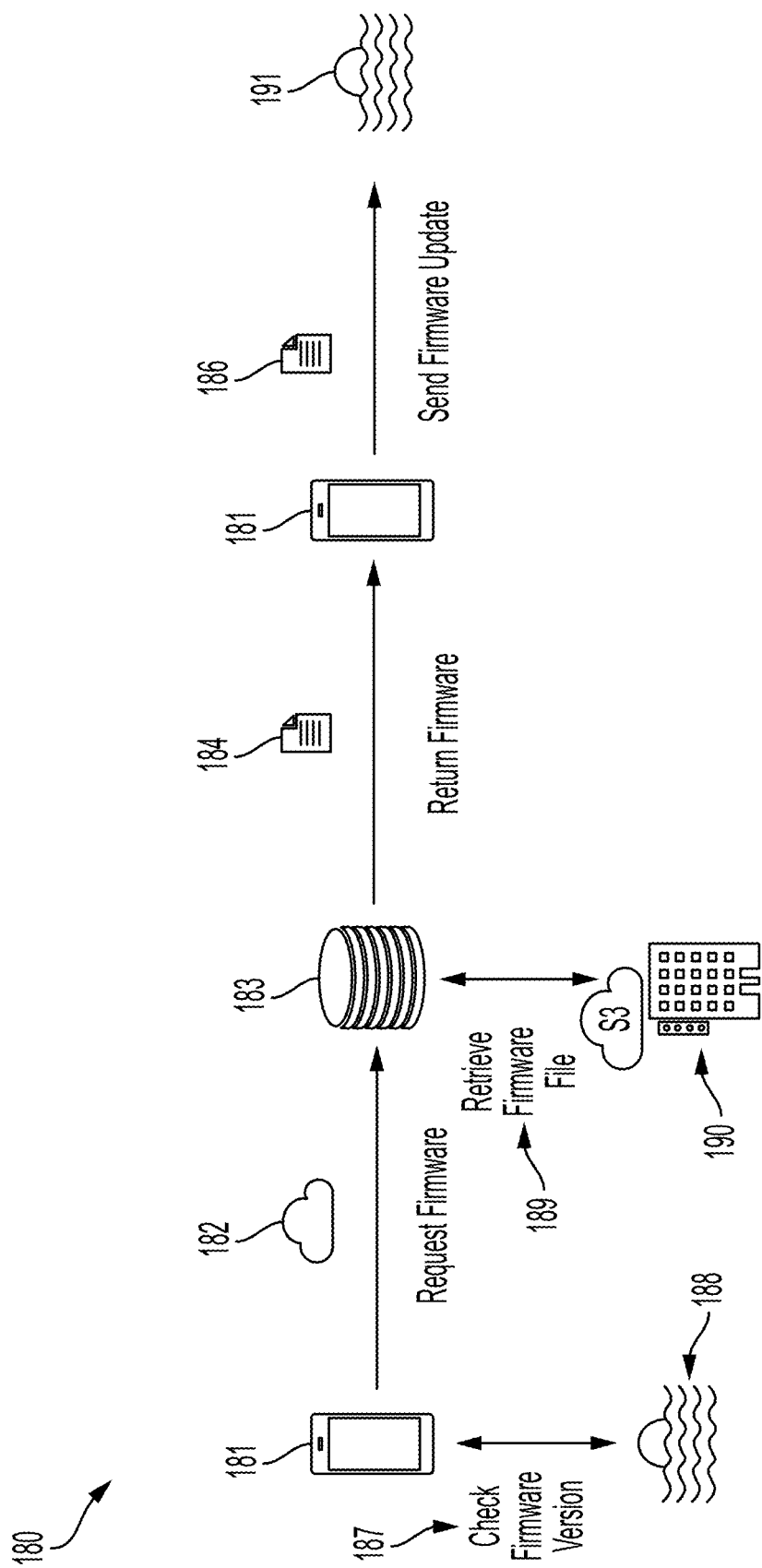
FIG. 1E illustrates an example process for processing a firmware update, in accordance with some embodiments of the technology described herein.

FIG. 1E illustrates an example process 180 for processing a firmware update, in accordance with some embodiments of the technology described herein. An MVDD may benefit from firmware updates in connection with improving operation and/or modifying the operation of some components. In some embodiments, an MVDD may receive firmware updates through the interface with a user's mobile device. For example, the illustrative process 180 includes the operations 181, 182, 183, 184, 185, 186, 187, 188, 189, 190, and 191.

Process 180 may be initiated by a mobile device 181 associated with the MVDD sending a request through a networking interface to determine if the current firmware version is up-to-date 187 by referencing a development database 188. If the current firmware version matches the newest version in the development database 188, then the current firmware version is up-to-date and mobile device 181 may end the firmware update process 180. However, if the current firmware version is older than the newest version in the development database 188, then the mobile device determines that the firmware is not up-to-date and proceeds with the firmware update to the newer version of the device firmware.

Upon determining that a new version of the device firmware is available, the mobile device 181 may send a request 182 for a firmware updated to a server associated with the mobile application 183.

Upon receiving a request for a firmware update, server 183 may retrieve the updated firmware files 189 from database 190. The server 183 may then return the mobile devices request for a firmware update 184 by transmitting the updated firmware to device 181.

Upon receiving the updated firmware at device 181, the updated firmware may then be sent over a networking interface 186 to an MVDD 191.

Figure 2:
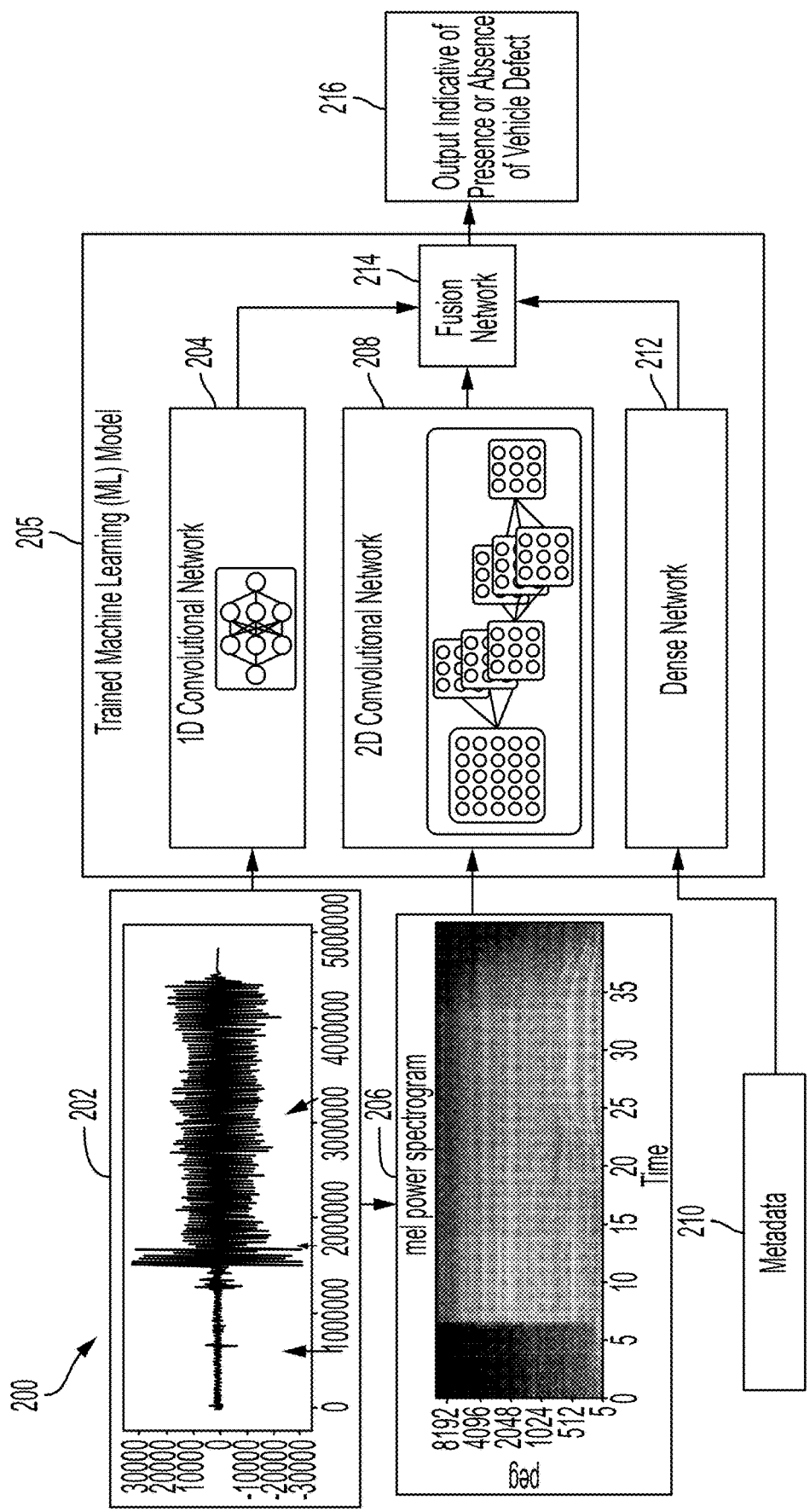
FIG. 2 illustrates a trained machine learning model used for analyzing an audio recording of a vehicle to detect presence or absence of vehicle defects, in accordance with some embodiments of the technology described herein.

FIG. 2 illustrates 200 a trained machine learning model 205 used for analyzing an audio recording of a vehicle to detect presence or absence of vehicle defects, in accordance with some embodiments of the technology described herein. As shown in FIG. 2, trained ML model 205 is configured to receive as input: (1) a waveform of the audio recording; (2) a two-dimensional representation (e.g., a Mel-scale log spectrogram) of the audio waveform; and (3) metadata indicating one or more properties of the vehicle. Upon processing these inputs, trained ML model 205 provides output 216 indicative of the presence or absence of any vehicle defect(s).

As shown in FIG. 2, the trained ML model 205 is a neural network model. The neural network model includes a first neural network 204 configured to process the audio waveform 202, a second neural network 208 configured to process the two-dimensional representation 206 of the audio waveform, and a third neural network 212 configured to process metadata 210. The outputs of each respective neural networks 204, 208, and 212 are processed by a fusion network 214 to generate output 216. In the illustrated example of FIG. 2, first neural network 204 is a one-dimensional convolutional neural network, second neural network 208 is a two-dimensional convolutional neural network, and third neural network 212 is a dense (e.g., fully connected) neural network.

In some embodiments, the trained ML model 205 may have at least 100K, at least 500K, at least 1 million, at least 2 million, at least three million at least 5 million, at least 10 million, between 1 and 5 million parameters, between 500K and 10 million parameters, between 500K and 100 million parameters.

In some embodiments, trained machine learning model 205 may provide an output 216 that is indicative of the presence or absence of a vehicle defect. For example, the output may provide an indication (e.g., a number such as a probability or a likelihood) that a vehicle defect is present or absent in the audio recording (e.g., a higher probability may be indicative of the vehicle defect being present, while a lower probability may be indicative of the vehicle defect being absent). For example, the output may provide an indication of the presence or absence of abnormal internal engine noise (e.g., ticking, knocking, hesitation), abnormal timing chain noise (e.g., rattling of a stretched chain), abnormal engine accessory noise (e.g., power steering pump whines, serpentine belt squeals, bearing damage, turbocharger or supercharger noise, and noise emanating from any other anomalous components that are not internal to the engine block), and/or abnormal exhaust noise (e.g., noise generated due to a cracked or damaged exhaust system near the engine). In some embodiments, trained ML model 205 may output 216 a vector of elements, where each element of the vector is a numeric value (e.g., a probability, a likelihood, a confidence) indicative of whether a respective potential vehicle defect is present or absent based on the audio recording.

In some embodiments, the audio waveform 202 may be generated from an audio recording acquired at least in part during operation of an engine of a vehicle. The audio recording may be obtained using an acoustic sensor (e.g., at least one microphone part of the MVDD) to acquire audio signals at least in part during operation of the engine of the vehicle. The audio waveform 202 may be generated from that audio recording in any suitable way. For example, the audio waveform 202 may be the same as the audio recording or may be obtained by any suitable pre-processing of the waveform including by using any of the pre-processing techniques described herein.

In some embodiments, audio waveform 202 may be a time-domain waveform. For example audio waveform 202 may be a one-dimensional (1D) vector where each element of the vector corresponds to a different time point and the value of each element corresponds to the amplitude of signals acquired by the acoustic sensor at that time point. However, the audio waveform 202 is not limited to being a time-domain waveform and, for example, may be a one-dimensional representation in any other suitable domain (e.g., frequency domain), as aspects of the technology described herein are not limited in this respect.

In some embodiments, the audio recording may include sounds produced during multiple engine operations. For example, the audio recording may include sounds produced during start-up (e.g., engine ignition), idle, load (e.g., while the engine is operating at elevated RPM). In some embodiments, the audio recording may include sounds produced during one or more, two or more, three or more, four or more, or five engine operations selected from the group consisting of: ambient sounds prior to start up, start-up sounds, idle sounds, load sounds, and engine shut off sounds.

In some embodiments, audio waveform 202 may include audio sequences of engine loads separated by periods of idle. For example, audio waveform 202 may include audio of a first load where the engine is accelerated to approximately 3000 RPM, then the engine idles before a second load where the engine is accelerated to approximately 3000 RPM a second time. In some embodiments, the first and second loads may be approximately the same (e.g., approximately 3000 RPM for each). In some embodiments, the first and second loads may be different (e.g., approximately 2000 RPM for the first and approximately 3000 RPM for the second. In other embodiments, the audio waveform may include more than two load cycles, as aspects of the technology described herein are not limited in this respect.

In some embodiments, the load sounds in the audio waveform may have been produced by an engine accelerated to between 2000 RPM and 4000 RPM, 3000 RPM and 6000 RPM, 4000 RPM and 8000 RPM, or 2000 RPM and 8000 RPM. In some embodiments, the load sounds in the audio waveform may have been produced by an engine accelerated to approximately 2000 RPM, approximately 3000 RPM, approximately 4000 RPM, approximately 5000 RPM, or greater than 5000 RPM.

The audio waveform 202 may have any suitable duration. In some embodiments, for example, the audio waveform 202 may have a duration between 5 and 45 seconds, 15 and 45 seconds, between 12 and 60 seconds, and/or between 10 seconds and 2 minutes. For example, the waveform may have a time duration of 30 seconds. In some embodiments, the waveform may have a duration greater than 2 minutes. In some embodiments, the waveform may be live streamed, in which case the duration would be determined, at least in part, on the duration of the live stream.

In some embodiments, the audio waveform 202 may be obtained from the audio recording by pre-processing that audio recording to obtain the audio waveform 202. In some embodiments, the pre-processing may include resampling, normalizing, and/or clipping the audio recording to obtain the audio waveform 202. The pre-processing may be performed in order to obtain a waveform having a target time duration, a target sampling rate, and/or a target dynamic range. For example, in some embodiments, the audio recording may be resampled to a target frequency to obtain a resampled waveform, the resampled waveform may then be normalized (e.g., by subtracting its mean and dividing by its standard deviation) to obtain a normalized waveform, and the normalized waveform may be clipped to a target maximum to obtain the audio waveform 202.

In some embodiments, resampling the audio recording to have a target frequency may include upsampling or downsampling the audio recording. In some embodiments, the audio recording may be resampled to have a target frequency of approximately 8 kHz, approximately 12 kHz, approximately 22 kHz approximately 48 kHz, approximately 88 kHz, approximately 96 kHz, approximately 192 kHz, or any other target frequency.

In some embodiments, a waveform may be scaled to have a target dynamic range. In some embodiments, scaling the waveform may involve statistically analyzing the waveform and clipping the waveform based on the statistics of the waveform's amplitude such that the waveform has the target dynamic range. For example, the waveform may be analyzed to determine its mean and standard deviation. Then Z-scores for the waveform may be calculated based on the standard deviation and the mean. Based on the Z-scores, the audio waveform may be clipped to have a dynamic range of ±2 standard deviations, ±3 standard deviations, ±4 standard deviations, ±6 standard deviations, ±8 standard deviations, or any other target dynamic range. Zero Z-score data may be used for padding the audio recording, as described herein, or for substituting portions of zero z-score data in for portions of data which have been flagged for replacement, as described herein.

Other types of pre-processing may be applied to the audio recording in addition to or instead of resampling, normalizing, and clipping. For example, in some embodiments, the duration of the audio recording may be altered to a target time duration. For example, the target time duration may be approximately 5 seconds, approximately 15 seconds, approximately 20 seconds, approximately 30 seconds, approximately 45 seconds, or approximately 60 seconds. In some embodiments, the target time duration may be any suitable duration in the range of 10 and 60 seconds. In some embodiments, the target duration may be greater than 60 seconds.

In some embodiments, processing the audio recording to achieve a target time duration may include removing portions of the audio recording and/or generating portions of padded audio to extend the length of the audio recording. For example, audio recorded earlier than a threshold amount of time (e.g., 1 second, 5, seconds, 10 seconds) prior to start of the vehicle's ignition may be removed. As yet another example, when an audio input for analysis is configured to receive an audio recording of a particular size and the audio recording is too short, the audio file may be padded with blank data (e.g., zeros, noise, zero z-score data as described herein, etc.) at the beginning and/or the end of the recorded audio such that the audio recording is the particular size for analysis.

In some embodiments, the audio recording may be a multi-channel recording (e.g., because each channel may correspond to a waveform recorded by a respective one of multiple microphones in the MVDD) and pre-processing the audio recording may involve selecting one of the channels to use for subsequent processing or otherwise combining the waveforms in each channel to obtain a single waveform using any suitable technique. In some embodiments, any suitable channel of a multi-channel recording may be selected for subsequent processing. In other embodiments, the channel having least environmental noise (or satisfying one or more quality criteria of any suitable type) may be selected.

After pre-processing of the audio recording to obtain the audio waveform 202, the resulting audio waveform 202 may have any suitable duration and sampling rate. As a result, the audio waveform 202 may be a vector having between 100,000 and 500,000 elements, 500,000 and 1,000,000 elements, 1 million and 10 million elements, or between 10 million and 100 million elements, or any other suitable range within these ranges.

As shown in FIG. 2, the audio waveform 202 is processed by first neural network 204, which may be a 1D convolutional neural network (CNN). The 1D CNN may include any suitable number of 1D convolutional blocks. A 1D convolutional block may include a 1D convolutional layer, a batch normalization layer, an activation layer (e.g., embodying a non-linearity such as a ReLU), and a 1D pooling layer (e.g., a maximum pooling layer, an average pooling layer). An example architecture of the first neural network 204 is described herein with reference to FIG. 4A.

In some embodiments, the two-dimensional representation 206 of the audio waveform 202 may be generated by applying a suitable transform to the audio waveform 202. For example, the two-dimensional representation 206 may be obtained by applying a short-time Fourier transform, a wavelet transform, a Gabor transform, or a chirplet transform to the audio waveform 202 in order to generate the two-dimensional representation.

In some embodiments, the two-dimensional representation may be a time-frequency representation. For example, the time-frequency representation may be a spectrogram. In some embodiments, the spectrogram may be transformed logarithmically and scaled to the Mel scale to produce a Mel-scale log spectrogram. As one example, a Mel-scale log spectrogram may be obtained via a short-time frequency transform performed using a window width of 2048 samples, a window shift of 256 samples, and 64 filter banks. As epsilon value of 1e-6 may be added to the resulting matrix and the natural log of the matrix computed. After computing the natural log of the matrix, the matrix may be normalized by subtracting its mean and dividing by its standard deviation. The resulting Mel spectrogram may be normalized and may have a dimensionality of 64 rows and 2584 columns.

Although in some embodiments, the two-dimensional representation 206 may be obtained from the audio waveform 202 directly as described above, in other embodiments the two-dimensional representation may be obtained directly from the audio recording (from which the audio waveform 202 itself was derived).

As shown in FIG. 2, the two-dimensional representation 206 is processed by second neural network 208, which may be a 2D convolutional neural network. The 2D CNN may include any suitable number of 2D convolutional blocks. A 2D convolutional block may include a 2D convolutional layer, a batch normalization layer, an activation layer (e.g., embodying a non-linearity such as a ReLU), and a 2D pooling layer (e.g., a maximum pooling layer, an average pooling layer). An example architecture of the first neural network 204 is described herein with reference to FIG. 4B.

In some embodiments, metadata 210 may include one or more properties of the vehicle and/or conditions associated with the acquisition of the audio data, in accordance with some embodiments. In some embodiments, metadata 210 may include one or more of the following properties and/or conditions: a reading of the vehicle's odometer, a model of the vehicle, a make of the vehicle, an age of the vehicle, a type of drivetrain in the vehicle, a type of transmission in the vehicle, a measure of displacement of the engine, a fuel type for the vehicle, an indication of whether on-board diagnostics (OBD) codes could be obtained from the vehicle, a number of incomplete readiness monitors reported by the OBD scanner, one or more BlackBook-reported engine properties, and a list of one or more OBD codes. In some embodiments, metadata 210 may include each of the properties and/or conditions described herein in addition to other suitable parameters and/or sensor measurements.

Not all of metadata 210 is numeric. Thus, in order for the metadata 210 to be processed by a trained machine learning model such as the neural network model, at least some (e.g., all) of the metadata 210 has to be converted to a numeric representation. This may be done in any suitable way known in the art. For example, in some embodiments, the one or more vehicle properties and/or conditions which include text values (e.g., fuel type, vehicle model, engine properties) may be numerically embedded, for example, by being word-vectorized. For example, vectorizing the text values may include generating sub-features of the property where each sub-feature represents the presence of certain words in the vehicle property. The certain words may be words from a dictionary generated during training of the ML model, as described herein. For example, the dictionary may consist of those words that occurred at least a threshold number (e.g., at least 100, 150, 200, 250, 300, 350, 400, 450, 500, 1000, etc.) times within each textual property in the training dataset. Vectors of numeric, Boolean, and word-vectorized properties may be normalized by their column means and standard deviations. Other techniques such as one-hot encoding, co-occurrence vectors, graph embeddings may be used additionally or alternatively.

In some embodiments, the vectorized metadata may include between 100 and 500 elements, between 250 and 750 elements, or between 500 and 1000 elements. In some embodiments, the vectorized metadata may include greater than 1000 elements.

In some embodiments, the one or more vehicle properties may be acquired from an on-board analysis computer integrated with the vehicle. For example, the at least a portion of metadata 210 may be acquired through OMB-II interface, as described herein. In some embodiments, at least a portion of the metadata 210 may be acquired through user input. For example, a user of an MVDD may enter information into their mobile device.

Additionally, or alternatively, metadata 210 may include data from one or more additional sensors, in accordance with some embodiments. For example, metadata 210 may include data from one or more of the sensors described below in connection with the MVDD described in FIGS. 16A-22.

Accordingly, in some embodiments, the metadata 210 is transformed to a numeric metadata representation and that numeric metadata representation is processed by dense neural network 212, which may be a fully connected neural network. The dense network 212 may include any suitable number of blocks. Each block may include a linear layer, an activation layer (e.g., embodying a non-linearity such as a ReLU), a batch normalization layer, and a dropout layer. An example architecture of the dense network 212 is described herein with reference to FIG. 4C.

As shown in FIG. 2, outputs of the neural networks 204, 208, and 212 may be jointly processed using fusion neural network 213 to generate output 216, in accordance with some embodiments. The fusion neural network 213 may be a fully connected neural network having any suitable number of blocks. Each block may include a linear layer, an activation layer (e.g., embodying a non-linearity such as a ReLU), a batch normalization layer, and a dropout layer. An example architecture of the fusion network 213 is described herein with reference to FIG. 4D.

In some embodiments, output 216 may be indicative of the presence or absence of vehicle defects. In some embodiments, a vehicle report may be generated based at least in part on output 216 of the fusion network, as described herein.

In some embodiments, output 216 may include labels for abnormal internal engine sounds. Labels for abnormal internal engine sounds may include symbolic and/or textual indications that a potential engine defect could be present. In some embodiments, the symbolic and/or textual indications may indicate the potential presence of an engine defect when the defect has a greater than 50% chance of being present, greater than 60% chance of being present, greater than 70% chance of being present, greater than 80% chance of being present, or greater than 90% chance of being present. In some embodiments, the symbolic and/or textual indications may indicate the potential presence of an engine defect when the defect has a probability between 60%-100%, 70%-100%, 80%-100%, 90%-100%, or 95%-100%. In some embodiments, the symbolic and/or textual indications may present a probability between 0-1 that a potential engine defect is present. For example, the presence of any of the following noises may be considered a positive class: internal engine noise, timing chain issue, engine hesitation. The absence of any of these noises was considered a negative class. After training, the model produced a score between 0 and 1, where higher values indicate a higher probability of abnormal internal engine noise.

In some embodiments, labels included in output 216 may be compared to a user generated label from the user's inspection report of the vehicle. In response to discrepancies between the user's labels and the labels included in output 216, a request for a follow up inspection may be associated with the audio recording and included in a vehicle condition report. This may cause an inspector to collect additional data (so that the data may be re-analyzed) and/or provide comments on the vehicle condition report indicating agreement or disagreement with the findings.

Although in the illustrative embodiment of FIG. 2, the trained ML model 205 includes portions for analyzing both audio and metadata input, in other embodiments, the trained ML model 205 may be used and/or trained to operate only on audio input (e.g., 1D audio input only, 2D audio input only, or 1D and 2D input as shown in FIG. 2) or only on metadata input. In yet other embodiments, the trained ML model 205 may be used to operate on 1D audio input and metadata or only on 2D audio input and metadata.

Figure 3:
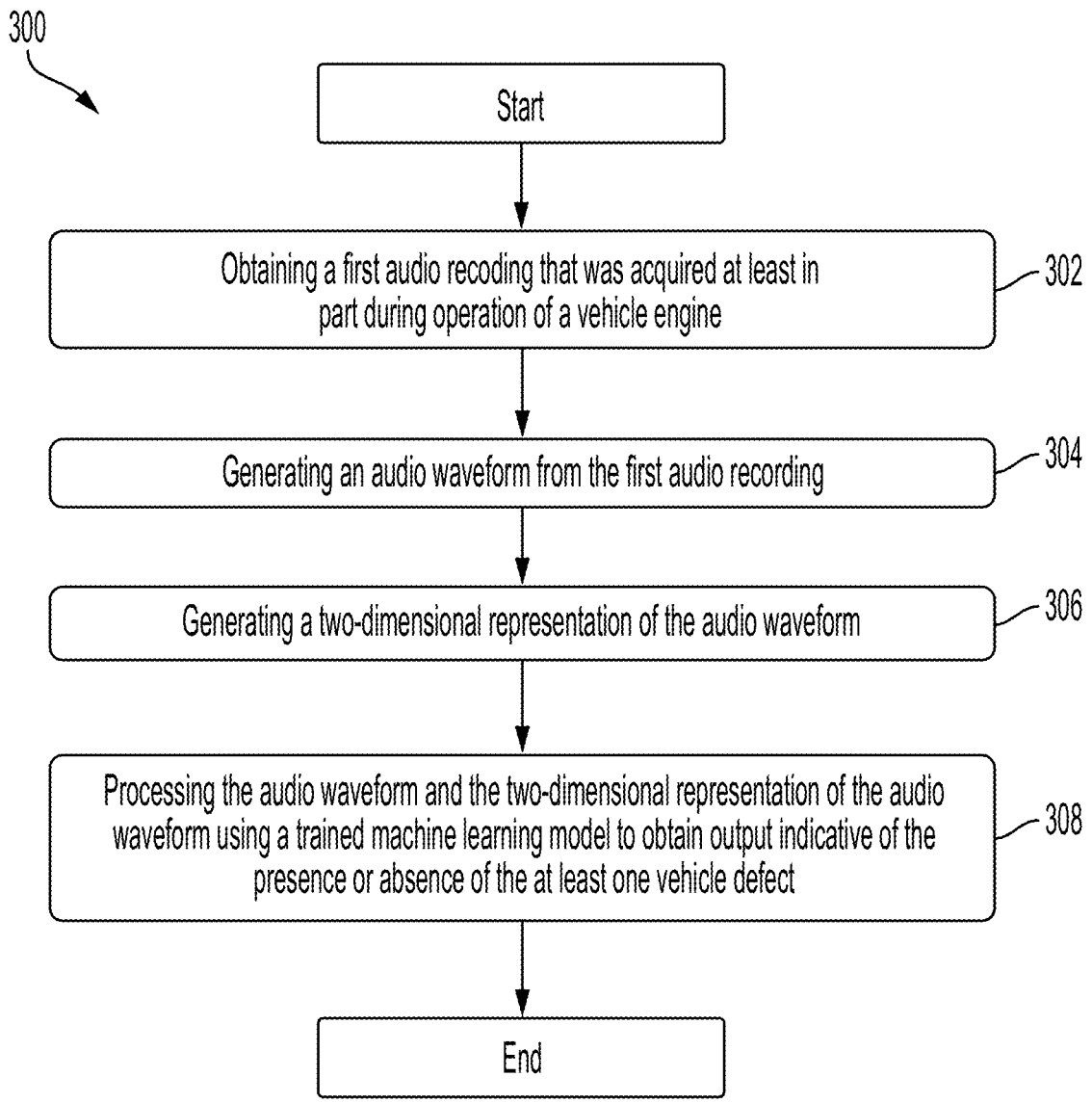
FIG. 3 illustrates a flowchart of an illustrative process 300 for using a trained machine learning model to detect the presence or absence of vehicle defects from audio acquired at least in part during the operation of the engine of a vehicle, in accordance with some embodiments of the technology described here.

FIG. 3 illustrates a flowchart of an illustrative process 300 for using a trained machine learning model to detect the presence or absence of one or more vehicle defects from audio acquired at least in part during the operation of the engine of a vehicle, in accordance with some embodiments of the technology described herein. Process 300 may be executed by any suitable computing device(s). For example, process 300 may be executed by an MVDD (e.g., MVDD 104), a mobile device (e.g., mobile device 108), a server or servers (e.g., server(s) 129), or any other suitable computing device(s) including any of the devices described herein including with reference to FIG. 1A.

Process 300 starts at act 302, by obtaining a first audio recording that was acquired at least in part during operation of a vehicle engine, in accordance with some embodiments of the technology described herein. The first audio recording may have been acquired by at least one acoustic sensor. The acoustic sensor(s) may be part of an MVDD used to inspect the vehicle.

In some embodiments, the at least one acoustic sensor acquires the first audio recording at least in part during the operation of a vehicle engine. The operation of a vehicle engine may include a number of engine operations, including ambient sounds prior to start up, start-up sounds, idle sounds, load sounds, engine shut off sounds, and ambient sounds after engine shutoff. Accordingly, in some embodiments, the first audio recording may begin prior to start-up and include at least an engine start-up operation. In some embodiments, the first audio recording may end at or soon after engine shut off. In some embodiments, the first audio recording may exclusively include vehicle engine noise including one or more engine operations.

Next, process 300 proceeds to act 304, where an audio waveform is generated from the first audio recording obtained at act 302. In some embodiments, the first audio recording comprises multiple channels and the audio waveform may be generated from a waveform selected from one of the multiple channels or from a waveform obtained by combining waveforms in different channels.

In some embodiments, generating the audio waveform may comprise pre-processing the audio recording (by resampling, normalizing, changing duration of, filtering, and/or clipping the first audio recording). For example, in some embodiments, generating the audio waveform comprises: (1) resampling the first waveform to a target frequency (e.g., 22.05 k Hz) to obtain a resampled waveform; (2) normalizing the resampled waveform by subtracting its mean and dividing by its standard deviation to obtain a normalized waveform (e.g., a time-series of Z-scores); and (3) clipping the normalized waveform to a target maximum (e.g., to +/−6 standard deviations) to obtain the audio waveform. Zero Z-scores may be used to impute for parts of the audio waveform that are missing.

Next, process 300 proceeds to act 306, where a 2D representation of the audio waveform obtained at act 304 is generated. In some embodiments, generating the 2D representation of the audio waveform comprises generating a time-frequency representation of the audio waveform. Generating the time-frequency representation of the audio waveform comprises using a short-time Fourier transform, a wavelet transform, a Gabor transform, or a chirplet transform to generate the time-frequency representation. In some embodiments, generating the time-frequency representation of the audio waveform comprises generating a Mel-scale log spectrogram from the audio waveform.

Next, process 300 proceed to act 308 where the audio waveform generated at act 304 and its 2D representation generated act 306 are processed by a trained ML model (e.g., the ML model shown in FIGS. 2 and/or 4A-4D) to obtain output indicative of the presence or absence of the at least one vehicle defect.

Following the conclusion of act 308, process 300 ends. Following the end of process 300, the output indicative of the presence or absence of the at least one vehicle defect may be output and, for example, used to generate a vehicle condition report, as described herein.

The process 300 is illustrative and that there are variations. For example, although in the illustrated embodiment of FIG. 3, only audio data is obtained processed by the trained ML model at act 308, in other embodiments, the process further includes obtaining metadata containing information about the vehicle (examples of metadata are provided herein), generating metadata features from the metadata (e.g., by generating a numeric representation of the metadata, as described herein) and processing features derived from the audio and the metadata with the trained ML to obtain the output indicative of the presence or absence of the at least one vehicle defect.

Figure 4A:
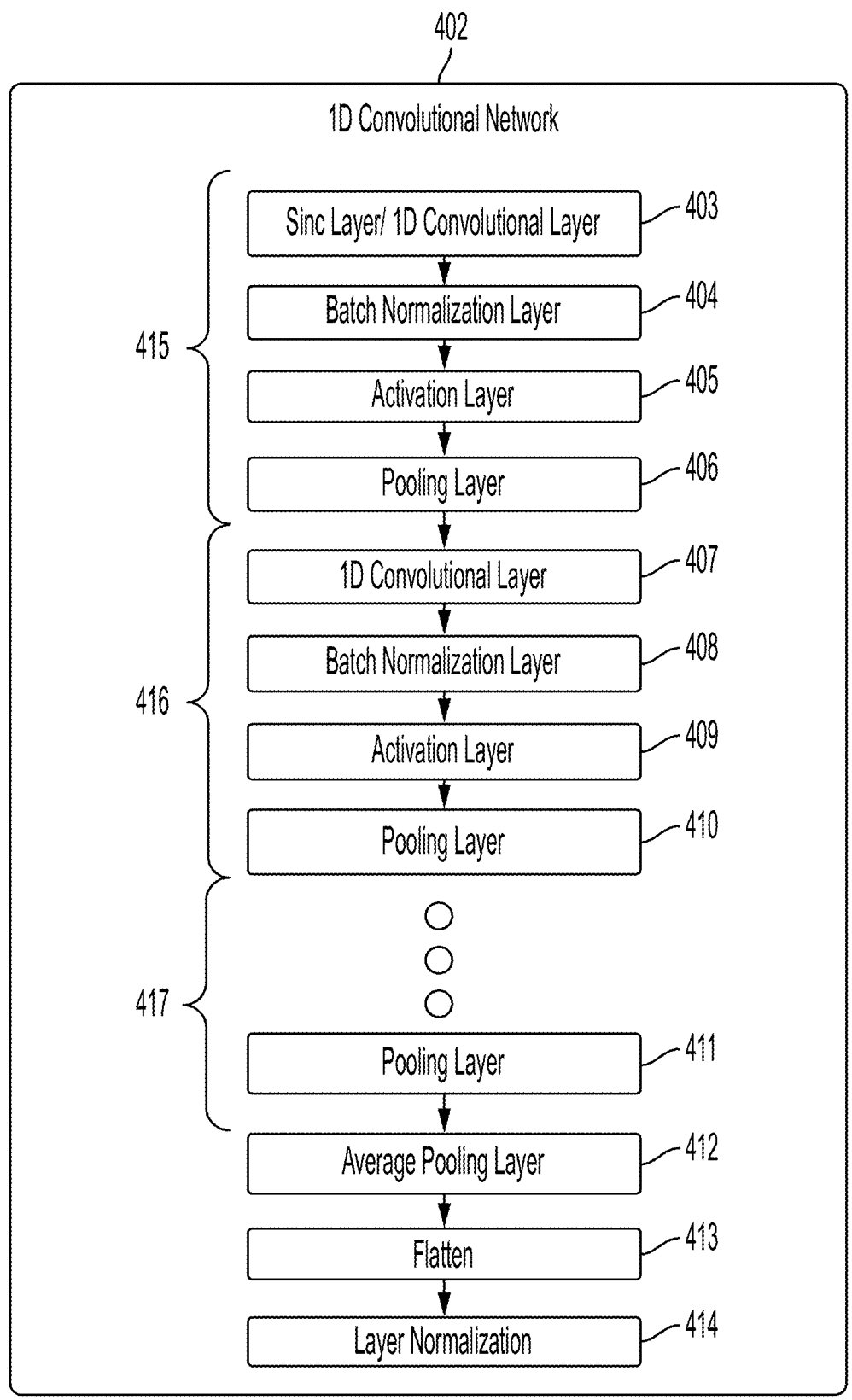
FIG. 4A illustrates an example architecture of an example one-dimensional (1D) convolutional neural network which may be used to process an audio waveform, in accordance with some embodiments of the technology described herein.

FIG. 4A illustrates an example architecture of an example one-dimensional (1D) convolutional neural network 402 which may be used to process an audio waveform, in accordance with some embodiments of the technology described herein. The example neural network of FIG. 4A may be used to implement the 1D convolutional network 204, part of trained ML model 205 shown in FIG. 2. As shown in FIG. 4A, 1D convolutional neural network 402 includes a plurality of layers with a corresponding plurality of parameters which are determined through training.

The 1D convolutional neural network 402 includes a sinc layer 403, batch normalization layer 404, activation layer 405, and pooling layer 406, in accordance with some embodiments of the technology described herein. The activation layer 405 may use any suitable non-linear activation function (e.g., sigmoid, hyperbolic tangent, ReLU, leaky ReLU, softmax, etc.). The pooling layer may be a maximum pooling layer or an average pooling layer. The Layers 403-406 may be considered a first convolutional block 415. In some embodiments, the 1D convolutional block may include one or more other layers (e.g., a dropout layer), as aspects of the technology described herein are not limited in this respect.

Following the first convolutional block, a second convolutional block 416 may include a 1D convolutional layer 407, batch normalization layer 408, activation layer 409, and pooling layer 410. In some embodiments, additional convolutional blocks 417 may be included. Additional convolutional blocks 417 may include the same layers as the second convolutional block or may have different types of layers. For example, 2 additional convolutional blocks, 4 additional convolutional blocks, 6 additional convolutional blocks, or more than 6 additional convolutional blocks may be included, in some embodiments.

After the final convolutional block, ending in pooling layer 411, the 1D convolutional network may further include an average pooling layer 412, flatten operation 413, and layer normalization operation 414.

Table 1, included below, illustrates an example configuration for the respective layers in an example implementation of 1D convolutional neural network 402.

TABLE 1

Example Configuration of 1D Convolutional Neural Network 402

```
 0 SincConv_fast( )
 1 BatchNorm1d(32, eps = 1e-05, momentum = 0.1, affine = True, track_running_stats = True)
 2 LeakyReLU(negative_slope = 0.01)
 3 MaxPool1d(kernel_size = 8, stride = 8, padding = 0, dilation = 1, ceil_mode = False)
 4 Conv1d(32, 64, kernel_size = (3,), stride = (1,), padding = (1,))
 5 BatchNorm1d(64, eps = 1e-05, momentum = 0.1, affine = True, track_running_stats = True)
 6 LeakyReLU(negative_slope = 0.01)
 7 MaxPool1d(kernel_size = 8, stride = 8, padding = 0, dilation = 1, ceil_mode = False)
 8 Conv1d(64, 128, kernel_size = (3,), stride = (1,), padding = (1,))
 9 BatchNorm1d(128, eps = 1e-05, momentum = 0.1, affine = True, track_running_stats = True)
10 LeakyReLU(negative_slope = 0.01)
11 MaxPool1d(kernel_size = 8, stride = 8, padding = 0, dilation = 1, ceil_mode = False)
12 Conv1d(128, 256, kernel_size = (3,), stride = (1,), padding = (1,))
13 BatchNorm1d(256, eps = 1e-05, momentum = 0.1, affine = True, track_running_stats = True)
14 LeakyReLU(negative_slope = 0.01)
15 MaxPool1d(kernel_size = 8, stride = 8, padding = 0, dilation = 1, ceil_mode = False)
16 Conv1d(256, 512, kernel_size = (3,), stride = (1,), padding = (1,))
17 BatchNorm1d(512, eps = 1e-05, momentum = 0.1, affine = True, track_running_stats = True)
18 LeakyReLU(negative_slope = 0.01)
19 MaxPool1d(kernel_size = 8, stride = 8, padding = 0, dilation = 1, ceil_mode = False)
20 AvgPool1d(kernel_size = (3,), stride = (3,), padding = (0,))
21 Flatten(start_dim = 1, end_dim = -1)
22 LayerNorm((1024,), eps = 1e-05, elementwise_affine = True)
```

Figure 4B:
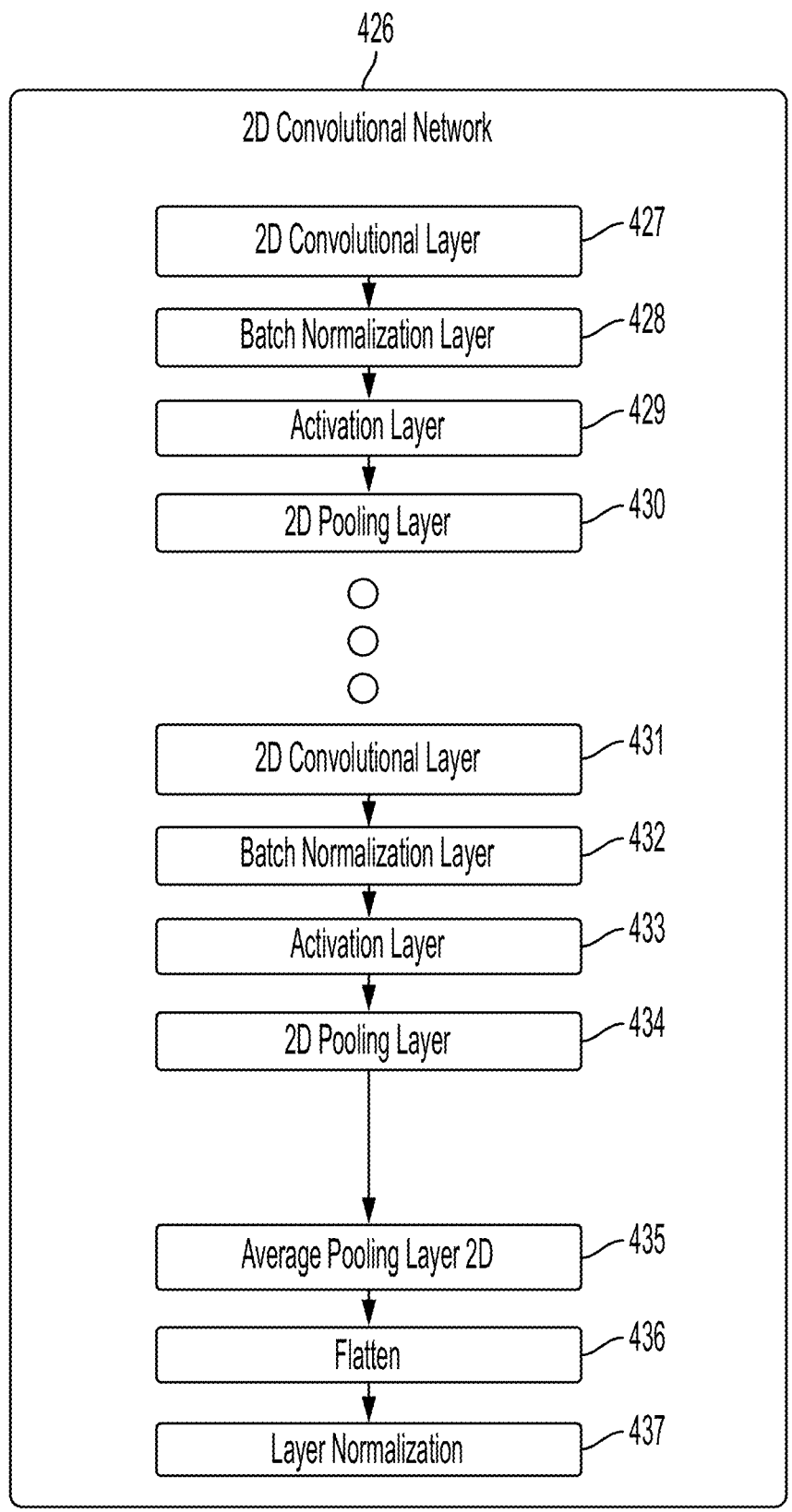
FIG. 4B illustrates an example architecture of an example two-dimensional (2D) convolutional neural network which may be used to process a two-dimensional representation of an audio waveform, in connection with detecting the presence of vehicle defects, in accordance with some embodiments of the technology described herein.

FIG. 4B illustrates an example architecture of an example two-dimensional (2D) convolutional neural network which may be used to process a two-dimensional representation of an audio waveform, in connection with detecting the presence of vehicle defects, in accordance with some embodiments of the technology described herein. The example neural network of FIG. 4B may be used to implement the 2D convolutional network 208, part of trained ML model 205 shown in FIG. 2. As shown in FIG. 4B, 2D convolutional neural network 426 includes a plurality of layers with a corresponding plurality of parameters which are determined through training.

The 2D convolutional neural network 426 includes a 2D convolutional layer 427, batch normalization layer 432, activation layer 429, and 2D pooling layer 430, in accordance with some embodiments. This sequence of layers may be repeated as a plurality of convolutional blocks. The final convolutional block may include 2D convolutional layer 431, batch normalization layer 432, activation layer 433, and 2D pooling layer 434. The activation layer may use any suitable activation non-linearity, examples of which are provided herein. The pooling layer may be a max pooling or an average pooling layer.

After pooling layer 434, the 2D convolutional network may further include a 2D average pooling layer 435, flatten operation 436, and layer normalization operation 437.

Table 2, included below, illustrates an example configuration for the respective layers in an example implementation of 2D convolutional neural network 426.

TABLE 2

Example Configuration of 2D Convolutional Neural Network 426

```
 0 Conv2d(1, 32, kernel_size = (3, 3), stride = (1, 1), padding = (1, 1))
 1 BatchNorm2d(32, eps = 1e-05, momentum = 0.1, affine = True, track_running_stats = True)
 2 LeakyReLU(negative_slope = 0.01)
 3 MaxPool2d(kernel_size = (2, 2), stride = (2, 2), padding = 0, dilation = 1, ceil_mode = False)
 4 Conv2d(32, 64, kernel_size = (3, 3), stride = (1, 1), padding = (1, 1))
 5 BatchNorm2d(64, eps = 1e-05, momentum = 0.1, affine = True, track_running_stats = True)
 6 LeakyReLU(negative_slope = 0.01)
 7 MaxPool2d(kernel_size = (2, 2), stride = (2, 2), padding = 0, dilation = 1, ceil_mode = False)
 8 Conv2d(64, 128, kernel_size = (3, 3), stride = (1, 1), padding = (1, 1))
 9 BatchNorm2d(128, eps = 1e-05, momentum = 0.1, affine = True, track_running_stats = True)
10 LeakyReLU(negative_slope = 0.01)
11 MaxPool2d(kernel_size = (2, 2), stride = (2, 2), padding = 0, dilation = 1, ceil_mode = False)
12 Conv2d(128, 256, kernel_size = (3, 3), stride = (1, 1), padding = (1, 1))
13 BatchNorm2d(256, eps = 1e-05, momentum = 0.1, affine = True, track_running_stats = True)
14 LeakyReLU(negative_slope = 0.01)
15 MaxPool2d(kernel_size = (2, 2), stride = (2, 2), padding = 0, dilation = 1, ceil_mode = False)
16 Conv2d(256, 512, kernel_size = (3, 3), stride = (1, 1), padding = (1, 1))
17 BatchNorm2d(512, eps = 1e-05, momentum = 0.1, affine = True, track_running_stats = True)
18 LeakyReLU(negative_slope = 0.01)
19 MaxPool2d(kernel_size = (2, 2), stride = (2, 2), padding = 0, dilation = 1, ceil_mode = False)
20 AvgPool2d(kernel_size = (2, 40), stride = (2, 40), padding = 0)
21 Flatten(start_dim = 1, end_dim = -1)
22 LayerNorm((1024,), eps = 1e-05, elementwise_affine = True)
```

Figure 4C:
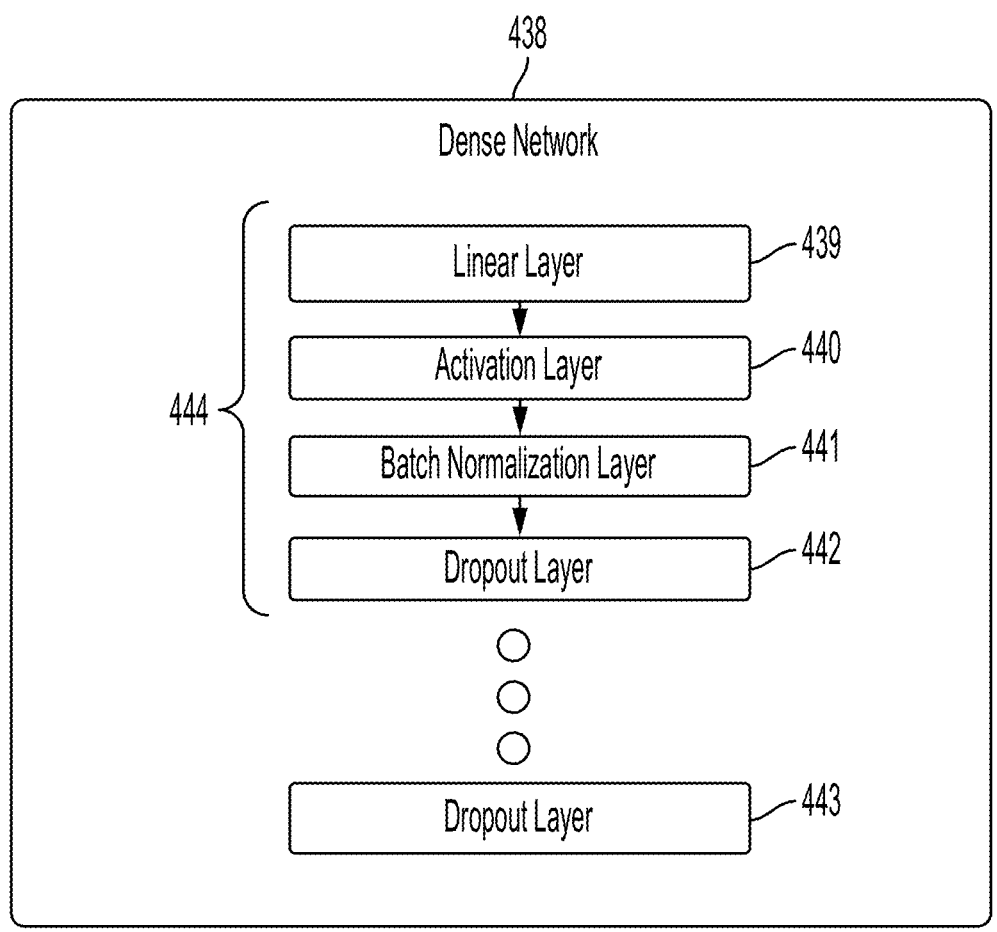
FIG. 4C illustrates an example architecture of an example dense neural network which may be used to process metadata in connection with detecting the presence of vehicle defects, in accordance with some embodiments of the technology described herein.

FIG. 4C illustrates an example architecture of an example dense neural network which may be used to process metadata in connection with detecting the presence of vehicle defects, in accordance with some embodiments of the technology described herein. The example neural network of FIG. 4C may be used to implement the dense network 212, part of trained ML model 205 shown in FIG. 2. As shown in FIG. 4C, dense network 438 includes a plurality of layers with a corresponding plurality of parameters which are determined through training.

The dense network 438 includes a linear layer 439, activation layer 440, normalization layer 441, and dropout layer 442. This sequence of layers may be considered a dense block 444. In some embodiments, a plurality of dense blocks may be included following the first dense block 444. For example, 2 additional dense blocks, 4 additional dense blocks, 6 additional dense blocks, or more than 6 additional dense blocks may be included. After the final dense block, a final dropout layer 443 may be included.

Table 3, included below, illustrates an example configuration for the respective layers in an example implementation of dense neural network 438.

TABLE 3

Example Configuration of Dense Neural Network 438

```
0  Linear(in_features=504, out_features=226, bias=True)
1  LeakyReLU(negative_slope=0.01)
2  BatchNorm1d(226, eps=1e-05, momentum=0.1, affine=True, track_running_stats=True)
3  Dropout(p=0.3, inplace=False)
4  Linear(in_features=226, out_features=36, bias=True)
5  LeakyReLU(negative_slope=0.01)
6  BatchNorm1d(36, eps=1e-05, momentum=0.1, affine=True, track_running_stats=True)
7  Dropout(p=0.3, inplace=False)
```

Figure 4D:
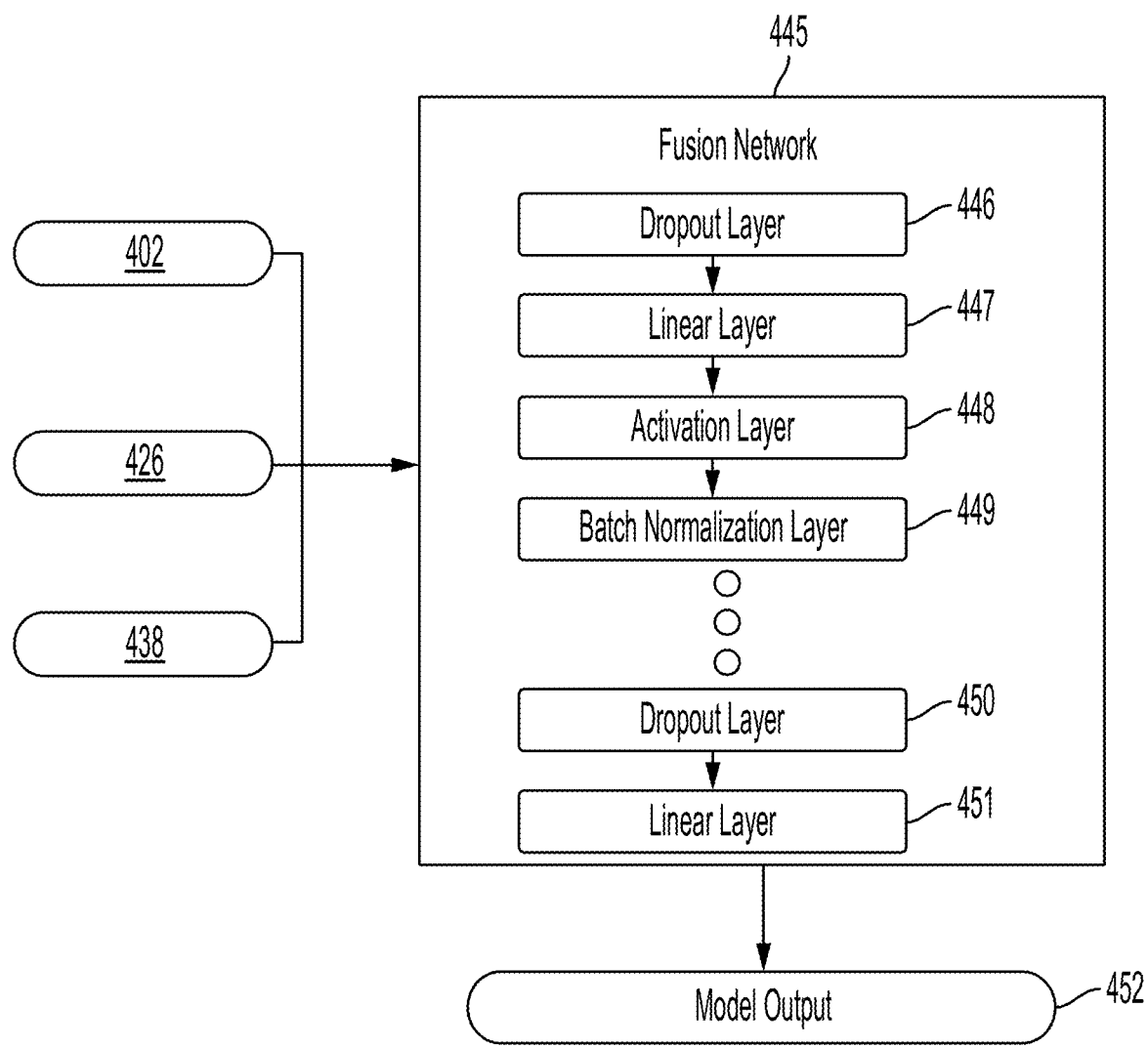
FIG. 4D illustrates an example architecture of an example fusion network which may be used to process the outputs of the 1D convolutional neural network of FIG. 4A, the 2D convolutional neural network of FIG. 4B, and the dense neural network of 4C, in connection with detecting the presence of vehicle defects, in accordance with some embodiments of the technology described herein.

FIG. 4D illustrates an example architecture of an example fusion network which may be used to process the outputs of the 1D convolutional neural network of FIG. 4A, the 2D convolutional neural network of FIG. 4B, and the dense neural network of 4C, in connection with detecting the presence of vehicle defects, in accordance with some embodiments of the technology described herein. The example neural network of FIG. 4D may be used to implement the fusion network 214, part of trained ML model 205 shown in FIG. 2. As shown in FIG. 4D, fusion network 445 includes a plurality of layers with a correspond plurality of parameters which are determined through training.

In the illustrated embodiment, the fusion network 445 receives the outputs from 1D convolutional neural network 402, 2D convolutional neural network 426, and dense network 438 for analysis, in accordance with some embodiments. Fusions network 445 includes dropout layer 446, linear layer 447, activation layer 448, and batch normalization layer 449. These layers may be repeated a plurality of times, in accordance with some embodiments. After the final batch normalization layer, the fusion network includes a dropout layer 450 and linear layer 451 to produce model output 452. Model output 452 may be indicative of the presence or absence of a vehicle defect as described herein.

Table 4, included below, illustrates an example configuration for the respective layers in an example implementation of fusion network 445.

made, the model was retrained with the corrected labels, and the best model was selected based on the validation score using the corrected labels.

In some embodiments, data augmentation may be used to increase size of the training data. For example, additional audio training data may be obtained, for each of one or more audio waveforms, by making changes to the vector representing the audio waveform. For example, the vector may randomly inverted (polarity inversion), shifted in time by a random amount (e.g., with wraparound rotation), and/or random continuous sections of the vector may be set to zero (time masking). As another example, additional audio training data may be obtained, for each of one or more audio waveforms, by making changes to the matrix representing the 2D representation of the waveform (e.g., the normalized matrix representing the log-transformed spectrogram). For example, the matrix may be shifted in time by a random amount (e.g., with wraparound rotation) and/or a random continuous set of rows may be set to zero (frequency masking).

In one example, the train, validation, and test datasets consisted of 730,000, 10,000, and 54,000 audio recordings, respectively. The input vectors were 661,500 elements long for the audio waveform, an input matrix with 64 rows and 2584 columns for the 2D representation of the waveform, and metadata features with 504 elements.

TABLE 4

Example Configuration of Fusion Network 445

| | |
|---|---|
| 0 | Dropout(p=0.3, inplace=False) |
| 1 | Linear(in_features=1060, out_features=512, bias=True) |
| 2 | LeakyReLU(negative_slope=0.01) |
| 3 | BatchNorm1d(512, eps=1e-05, momentum=0.1, affine=True, track_running_stats=True) |
| 4 | Dropout(p=0.3, inplace=False) |
| 5 | Linear(in_features=512, out_features=256, bias=True) |
| 6 | LeakyReLU(negative_slope=0.01) |
| 7 | BatchNorm1d(256, eps=1e-05, momentum=0.1, affine=True, track_running_stats=True) |
| 8 | Dropout(p=0.3, inplace=False) |
| 9 | Linear(in_features=256, out_features=1, bias=True) |

A neural network for detecting presence of abnormal transmission noise (e.g., the neural networks shown in FIGS. 2 and/or 4A-4D) may be trained by estimating values of neural network parameters using training data and suitable optimization software. The optimization software may be configured to perform neural network training by gradient descent, stochastic gradient descent, or in any other suitable way. In some embodiments, the Adam optimizer (Kingma, D. and Ba, J. (2015) Adam: A Method for Stochastic Optimization. Proceedings of the 3rd International Conference on Learning Representations (ICLR 2015)) may be used.

In one example, the training data was created, in part, by labeling audio recordings made during inspections based on input provided by the inspectors themselves. The labels were binary yes/no flags indicating the presence of abnormal noise in the audio recording. The presence of any of the following noises in an inspection report indicated a positive class (i.e., abnormal noise present): internal engine noise, timing chain issue, or engine hesitation. The absence of any of these noises indicated a negative class (i.e., abnormal noise absent). As part of validation, the labels that had the largest disagreement of an earlier model training iteration were reviewed by a professional vehicle mechanic for potential mislabeling. After the mechanic's corrections were In this example, the ML model was implemented using the PyTorch library and trained to minimize cross entropy loss when predicting the binary label of whether the vehicle inspector heard abnormal engine noise. The optimizer utilized stochastic gradient descent. The labels were weighted by the inverse of their occurrence frequency in the training dataset. The learning rate and momentum of the optimizer were controlled by the one-cycle scheduling algorithm. The one-cycle maximum learning rate was set by performing the learning rate range test five times and selecting the median value. The model was trained for 100 epochs using 64 sample mini-batches. The parameter combination that yielded the highest score on the validation dataset was retained for evaluation on the test set. The score consisted of the sum of three sub-metrics: ROCAUC, AP, and F1. ROCAUC was the area under the receiver operating characteristic curve, AP was the area under the precision-recall curve, and F1 was the harmonic mean of the precision and recall scores at threshold 0.5.

In this example, the hyperparameters of the training pipeline were optimized using the Ray Tune framework. Eight parallel processes for 200 generations of the OnePlusOne genetic algorithm from the Nevergrad library in combination with the median stopping rule were used to explore the hyperparameter space. The hyperparameters included:

fully connected layer widths, dropout probability, convolutional kernel sizes, max pooling widths, time/frequency masking ratios, time shift amounts, spectrogram parameters, normalization clipping range. The best hyperparameter combination was chosen based on the largest validation score.

In some embodiments, the trained ML model of FIGS. 4A-4D may have at least 100K, at least 500K, at least 1 million, at least 2 million, at least three million at least 5 million, at least 10 million, between 1 and 5 million parameters, between 500K and 10 million parameters, between 500K and 100 million parameters.

Figure 5:
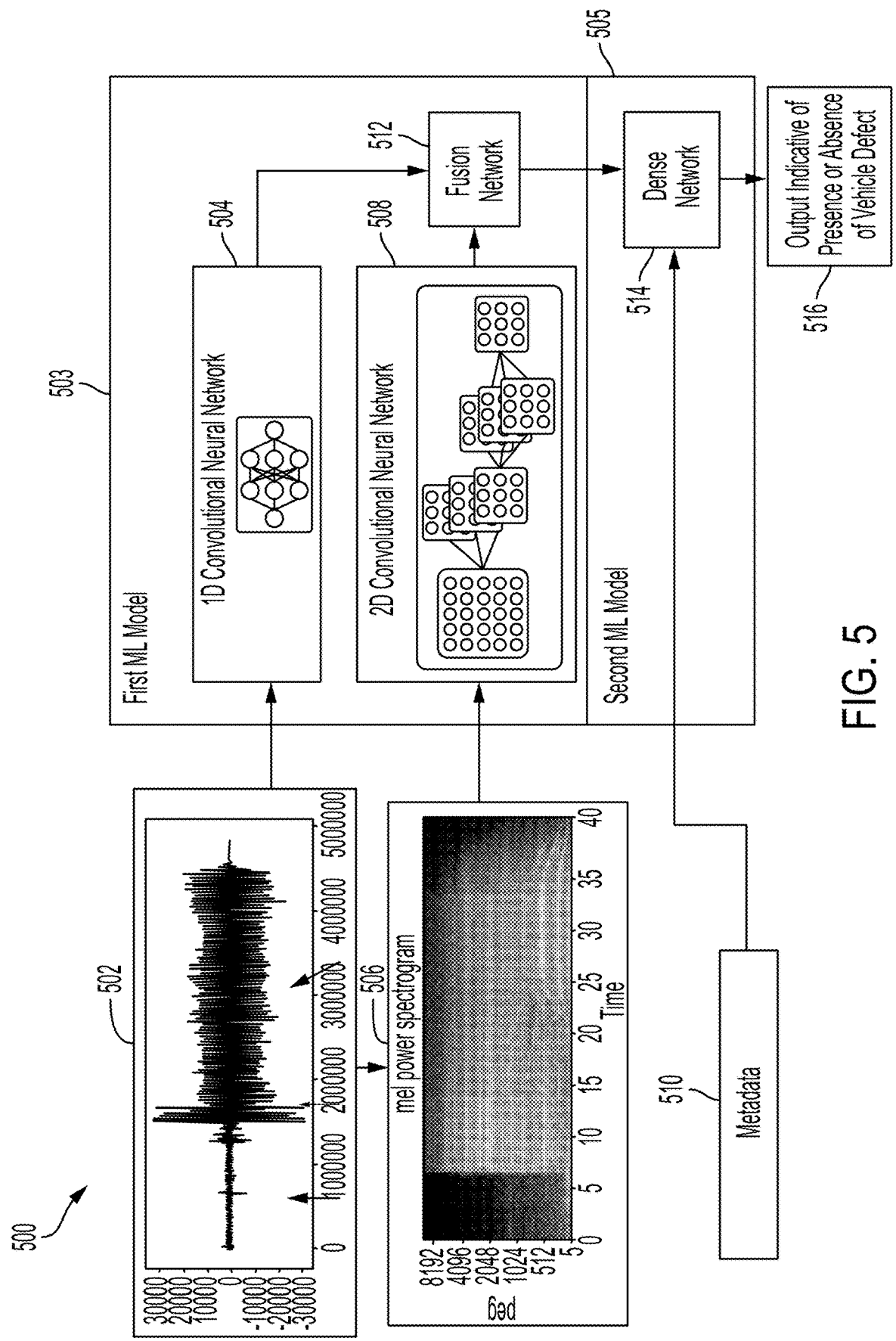
FIG. 5 illustrates a trained machine learning model for processing an audio recording and/or metadata obtained for a vehicle to determine the presence of a potential transmission defect, in accordance with some embodiments of the technology described herein.

FIG. 5 illustrates a trained machine learning model for processing an audio recording and/or metadata obtained for a vehicle to determine the presence or absence of a potential transmission defect (e.g., transmission whine), in accordance with some embodiments of the technology described herein. As shown in FIG. 5, trained ML model 500 is configured to receive as input: (1) an audio waveform obtained from the audio recording; (2) a two-dimensional representation (e.g., a Mel-scale log spectrogram) of the audio waveform; and (3) metadata indicating one or more properties of the vehicle. Upon processing these inputs, trained ML model 500 provides output 516 indicative of the presence or absence of the transmission defect.

In some embodiments, the trained ML model 500 may have at least 100K, at least 500K, at least 1 million, at least 2 million, at least three million at least 5 million, at least 10 million, between 1 and 5 million parameters, between 500K and 10 million parameters, between 500K and 100 million parameters.

As shown in FIG. 5, the trained ML model 500 may be configured as a first trained ML model 503 configured to receive the waveform of the audio and the two-dimensional representation of the audio waveform and a second trained ML model 505 configured to receive the metadata and the output of the first model. In the example of FIG. 5, the first trained ML model 503 is a neural network model. The neural network model 503 includes a first neural network 504 configured to process the audio waveform 502 and a second neural network 508 configured to process the two-dimensional representation 506 of the audio waveform. In this example, the first and second neural networks 504 and 508 are 1D convolutional and 2D convolutional neural networks, respectively. In turn, the outputs neural networks 504 and 508 are processed by a fusion neural network 512. The output of fusion network 512 and metadata 510 are provided as inputs to the second trained ML model 505. The second trained ML model 505 is a neural network model. The neural network model 505 includes a dense network 514 configured to process the output of the first model and metadata 510 and generated an output 516 that is indicative of the presence or absence of abnormal transmission noise, which may be an indication of the presence or absence of a transmission defect.

In some embodiments, the output 516 may provide an indication (e.g., a number such as a probability or a likelihood) that a transmission defect is present or absent in the audio recording (e.g., a higher probability may be indicative of the transmission defect being present, while a lower probability may be indicative of the transmission defect being absent). For example, the output may provide an indication of the presence or absence of abnormal transmission sounds (e.g., transmission grinding, whining, and/or clunking). In some embodiments, the output 516 may also provide an indication of a whine from one or more other components (e.g., HVAC hose, power steering, etc.).

In some embodiments, the audio waveform 502 may be generated from an audio recording acquired at least in part during operation of an engine of a vehicle. The audio recording may be obtained using an acoustic sensor, (e.g., at least one microphone part of the MVDD) to acquire audio signals at least in part during operation of the engine of the vehicle. The audio waveform 502 may be generated from that audio recording in any suitable way, as described above in FIG. 2 in connection with audio waveform 202.

In some embodiments, audio waveform 50 may be a time-domain waveform. For example, audio waveform 502 may be a one-dimensional (1D) vector where each element of the vector corresponds to a different time point and the value of each element corresponds to the amplitude of signals acquired by the acoustic sensor at that time point. However, the audio waveform 502 is not limited to being a time-domain waveform and, for example, may be a one-dimensional representation in any other suitable domain (e.g., frequency domain), as aspects of the technology described herein are not limited in this respect. The audio waveform 502 may have any suitable duration, for example, as described in connection with FIG. 2.

In some embodiments, the audio recording may include sounds produced during multiple engine operations. For example, the audio recording may include sounds produced during start-up (e.g., engine ignition), idle, load (e.g., while the engine is operating at elevated RPM), as described herein in connection with FIG. 2.

In some embodiments, audio waveform 502 may include audio sequences of engine loads separated by periods of idle. For example, audio waveform 502 may include audio of a first load where the engine is accelerated to approximately 3000 RPM, then the engine idles before a second load where the engine is accelerated to approximately 3000 RPM, then the engine idles before a second load where the engine is accelerated to approximately 3000 RPM a second time. In some embodiments, the first and second loads may be approximately the same (e.g., approximately 3000 RPM for each). In some embodiments, the first and second loads may be different (e.g., approximately 2000 RPM for the first and approximately 3000 RPM for the second. In other embodiments, the audio waveform may include more than two load cycles, as aspects of the technology described herein are not limited in this respect. In some embodiments, the load sounds in the audio waveform may have been produced by an engine accelerated to other RPMs, as described herein with respect to FIG. 2.

In some embodiments, audio waveform 502 may be generated from the audio recording and may be generated in any suitable way including in any of the ways described with reference to FIG. 2. For example, In some embodiments, processing of the audio recording to generate the audio waveform may further include: resampling the audio recording to have a target frequency, normalizing the waveform (e.g., by subtracting its mean and diving by its standard deviation), clipping the waveform, to have a target dynamic range, change the duration of the waveform, and/or selecting a channel from a multi-channel recording.

In some embodiments, the audio waveform 502 may be the same as audio waveform 202. In other embodiments, the audio waveform 502 may be generated from the same audio recording using one or more different and/or additional pre-processing steps than audio waveform 502. For example, audio waveform 502 may be resampled to a different sampling rate (e.g., 44.1 kHz) than audio waveform 202 (e.g., 22 kHz). As one non-limiting example, the audio waveform 202 may comprise 661,500 elements and audio waveform 502 may comprise 1,323,000 elements. In some embodiments, audio waveform 502 may be a different waveform than audio waveform 202 but may be based on different audio recordings of a same vehicle.

After pre-processing of the audio recording to obtain the audio waveform 502, the resulting audio waveform 502 may have any suitable duration and sampling rate. As a result, the audio waveform 502 may be a vector having between 100,000 and 500,000 elements, 500,000 and 1,000,000 elements, 1 million and 10 million elements, or between 10 million and 100 million elements, or any other suitable range within these ranges.

In some embodiments, the two-dimensional representation 506 of the audio waveform 502 may be generated by applying a time-frequency transform to the audio waveform 502. For example, the two-dimensional representation 506 may be obtained by applying a short-time Fourier transform, a wavelet transform, a Gabor transform, or a chirplet transform to the audio waveform 502 in order to generate the two-dimensional representation.

In some embodiments, the 2D representation may be a time-frequency representation. For example, the time-frequency representation may be a spectrogram. In some embodiments, the spectrogram may be scaled to the Mel scale to produce a Mel-scale log spectrogram, as described herein in connection with FIG. 2. For example, the Mel-scale log spectrogram may be obtained via a short-time frequency transform, transformed logarithmically, and then normalized (e.g., the log transformed matrix may be normalized by subtracting its mean and dividing by its standard deviation) to produce a Mel-scale log spectrogram that is normalized and may have a dimensionality of 64 rows and 2584 columns.

In some embodiments, 2D representation 506 may be the same representation as the 2D representation 206. In some embodiments, the 2D representation 506 may be a different representation than the 2D representation 206, but may be based on the same audio waveform. In some embodiments, the 2D representation 506 may be a different representation than the 2D representation 206 but may be based on different audio waveform of a same vehicle.

As shown in FIG. 5, trained ML model 500 includes a first ML model 503 and a second ML model 505. The audio waveform 502 is processed by a first neural network 504 of the first ML model 503. The first neural network 504 may be a 1D convolutional neural network. The 1D CNN may include any suitable number of 1D convolutional blocks. A 1D convolutional block may include a 1D convolutional layer, a batch normalization layer, an activation layer (e.g., embodying a non-linearity such as a ReLU), and a 1D pooling layer (e.g., a maximum pooling layer, an average pooling layer). An example architecture for the first neural network 504 is described herein with reference to FIG. 7A.

As shown in FIG. 5, the two-dimensional representation 506 is processed by second neural network 508 of the first ML model 503. The second neural network 508 may be a 2D convolutional neural network. The 2D CNN may include any suitable number of 2D convolutional blocks. A 2D convolutional block may include a 2D convolutional layer, a batch normalization layer, an activation layer (e.g., embodying a non-linearity such as a ReLU), and a 2D pooling layer (e.g., a maximum pooling layer, an average pooling layer). An example architecture of the second neural network 508 is described herein with reference to FIG. 7B.

As shown in FIG. 5, outputs of the neural networks 504 and 508 may be jointly processed using fusion neural network 512 prior to processing by the second ML model 505. The fusion neural network 512 may be a fully connected neural network having any suitable number of blocks. Each block may include a linear layer, an activation layer (e.g., embodying a non-linearity such as a ReLU), a batch normalization layer, and a dropout layer. An example architecture of the fusion network 512 is described herein with reference to FIG. 7C.

In some embodiments, metadata 510 may include one or more properties of the vehicle and/or conditions associated with the acquisition of the audio data. Examples of such properties are provided herein including with reference to FIG. 2.

In order for the metadata 510 to be processed by a trained machine learning model such as the neural network model, at least some (e.g., all) of the metadata 510 has to be converted to a numeric representation. This may be done in any suitable including in any of the ways described herein including with reference to FIG. 2. In some embodiments, metadata 510 may be the same metadata as metadata 210, though this need not be the case in all instances.

In some embodiments, the numeric representation of the metadata 510 may include between 100 and 500 elements, between 250 and 750 elements, between 500 and 1000 elements, between 100 and 10,000 elements or any number or range within these ranges.

As shown in FIG. 5, the numeric representation of metadata 510 and the output of fusion network 512 are proceed by dense network 514 to generate output 516. The dense network 514 may be a fully connected network and may include any suitable number of blocks. Each block may include a linear layer, an activation layer (e.g., embodying a non-linearity such as a ReLU), a batch normalization layer, and a dropout layer. An example architecture of the dense network 514 is described herein with reference to FIG. 7D.

In some embodiments, output 516 may be indicative of the presence or absence of transmission defects. In some embodiments, a vehicle report may be generated based at least in part on output 516 of the second ML model 505, as described herein.

In some embodiments, output 516 may include labels for abnormal transmission sounds. Labels for abnormal transmission sounds may include symbolic and/or textual indications that a potential transmission defect could be present. In some embodiments, the symbolic and/or textual indications may indicate the potential presence of a transmission defect when the defect has a greater than 50% chance of being present, greater than 60% chance of being present, greater than 70% chance of being present, greater than 80% chance of being present, or greater than 90% chance of being present. In some embodiments, the symbolic and/or textual indications may indicate the potential presence of a transmission defect when the defect has a probability between 60%-100%, 70%-100%, 80%-100%, 90%-100%, or 95%-100%. In some embodiments, the symbolic and/or textual indications may present a probability between 0-1 that a potential transmission defect is present. For example, the presence of any of the following noises may be considered a positive class: transmission grinding, transmission whining, and/or transmission clunking. The absence of any of abnormal transmission noises was considered a negative class. After training, the model produced a score between 0 and 1, where higher values indicate a higher probability of abnormal transmission noise.

In some embodiments, labels included in output 516 may be compared to a user generated label from the user's inspection report of the vehicle. In response to discrepancies between the user's labels and the labels included in output

516, a request for a follow up inspection may be associated with the audio recording and included in a vehicle condition report. This may cause an inspector to collect additional data (so that the data may be re-analyzed) and/or provide comments on the vehicle condition report indicating agreement or disagreement with the findings.

Figure 6:
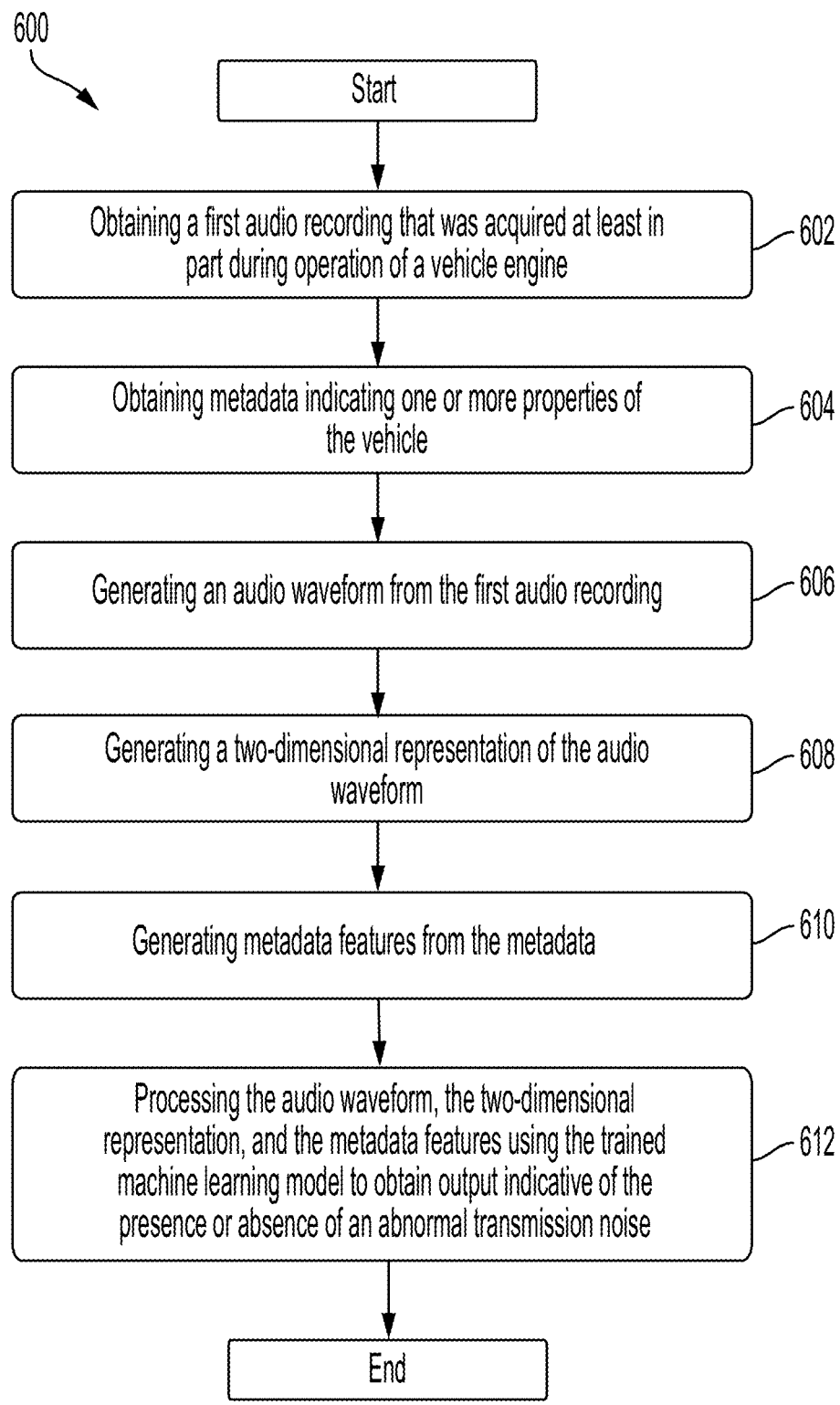
FIG. 6 illustrates a flowchart of an illustrative process 600 for using a trained machine learning model to detect the presence or absence of abnormal transmission noise from audio acquired at least in part during operation of an engine of a vehicle, in accordance with some embodiments of the technology described herein.

FIG. 6 illustrates a flowchart of an illustrative process 600 for using a trained machine learning model to detect the presence or absence of abnormal transmission noise from audio acquired at least in part during operation of an engine of a vehicle, in accordance with some embodiments of the technology described herein. Process 600 may be executed by any suitable computing device(s). For example, process 600 may be executed by an MVDD (e.g., MVDD 104), a mobile device (e.g., mobile device 108), a server or servers (e.g., server(s) 129), or any other suitable computing device (s) including any of the devices described herein including with reference to FIG. 1A.

Process 600 starts at act 602 by obtaining a first audio recording that was acquired at least in part during operation of a vehicle engine, in accordance with some embodiments of the technology described herein. The first audio recording may have been acquired by at least one acoustic sensor. The acoustic sensor(s) may be part of an MVDD used to inspect the vehicle.

In some embodiments, the at least one acoustic sensor acquires the first audio recording at least in part during the operation of a vehicle engine. The operation of a vehicle engine may include a number of engine operations, including ambient sounds prior to start up, start-up sounds, idle sounds, load sounds, engine shut off sounds, and ambient sounds after engine shutoff. Accordingly, in some embodiments, the first audio recording may begin prior to start-up and include at least an engine start-up operation. In some embodiments, the first audio recording may end at or soon after engine shut off. In some embodiments, the first audio recording may exclusively include vehicle engine noise including one or more engine operations.

Next, process 600 proceeds to act 606, where metadata indicating one or more properties of the vehicle is obtained. Examples of metadata are provided herein. Metadata may be obtained in any suitable way described herein.

Next, process 600 proceeds to act 606, where an audio waveform is generated from the first audio recording obtained at act 602. This may be done in any suitable way including in any of the ways described with reference to FIG. 3. For example, the first audio recording comprises multiple channels and the audio waveform may be generated from a waveform selected from one of the multiple channels or from a waveform obtained by combining waveforms in different channels. Also, generating the audio waveform may comprise pre-processing the audio recording (by resampling, normalizing, changing duration of, filtering, and/or clipping the first audio recording). For example, in some embodiments, generating the audio waveform comprises: (1) resampling the first waveform to a target frequency (e.g., 22.05 kHz) to obtain a resampled waveform; (2) normalizing the resampled waveform by subtracting its mean and dividing by its standard deviation to obtain a normalized waveform (e.g., a time series of Z-scores); and (3) clipping the normalized waveform to a target maximum (e.g., +/−6 standard deviations) to obtain the audio waveform. Zero Z-scores may be used to impute for parts of the audio waveform that are missing.

Next, process 600 proceeds to act 608, where a 2D representation of the audio waveform obtained at act 606 is generated. In some embodiments, generating the 2D representation of the audio waveform comprises generating a time-frequency representation of the audio waveform. Generating the time-frequency representation of the audio waveform comprises using a short-time Fourier transform, a wavelet transform, a Gabor transform, or a chirplet transform to generate the time-frequency representation. In some embodiments, generating the time-frequency representation of the audio waveform comprises generating a Mel-scale log spectrogram from the audio waveform.

Next, process 600 proceeds to act 610, where metadata features are generated from the metadata obtained at act 604. This may be done in any of the ways described herein. Generating the metadata features may comprise generating a numeric representation of the metadata. For example, the metadata may include text indicating at least one of the one or more vehicle properties, and generating the metadata features from the metadata comprises generating a numeric representation of the text indicating the properties. The numeric representation may be generated in any suitable way including in any of the ways described herein.

Next, process 600 proceeds to act 612, where the audio waveform generated at act 606, its 2D representation generated at act 608, and the metadata features generated at act 610 are processed by a trained ML model (e.g., the ML model shown in FIG. 5 and/or FIGS. 7A-7D) to obtain output indicative of the presence or absence of an abnormal transmission noise.

Following the conclusion of act 612, process 600 ends. Following the end of process 600, the output indicative of the presence or absence of abnormal transmission noise (which may be indicative of the presence or absence of a defect in the transmission) may be output and, for example, used to generate a vehicle condition report.

Figure 7A:
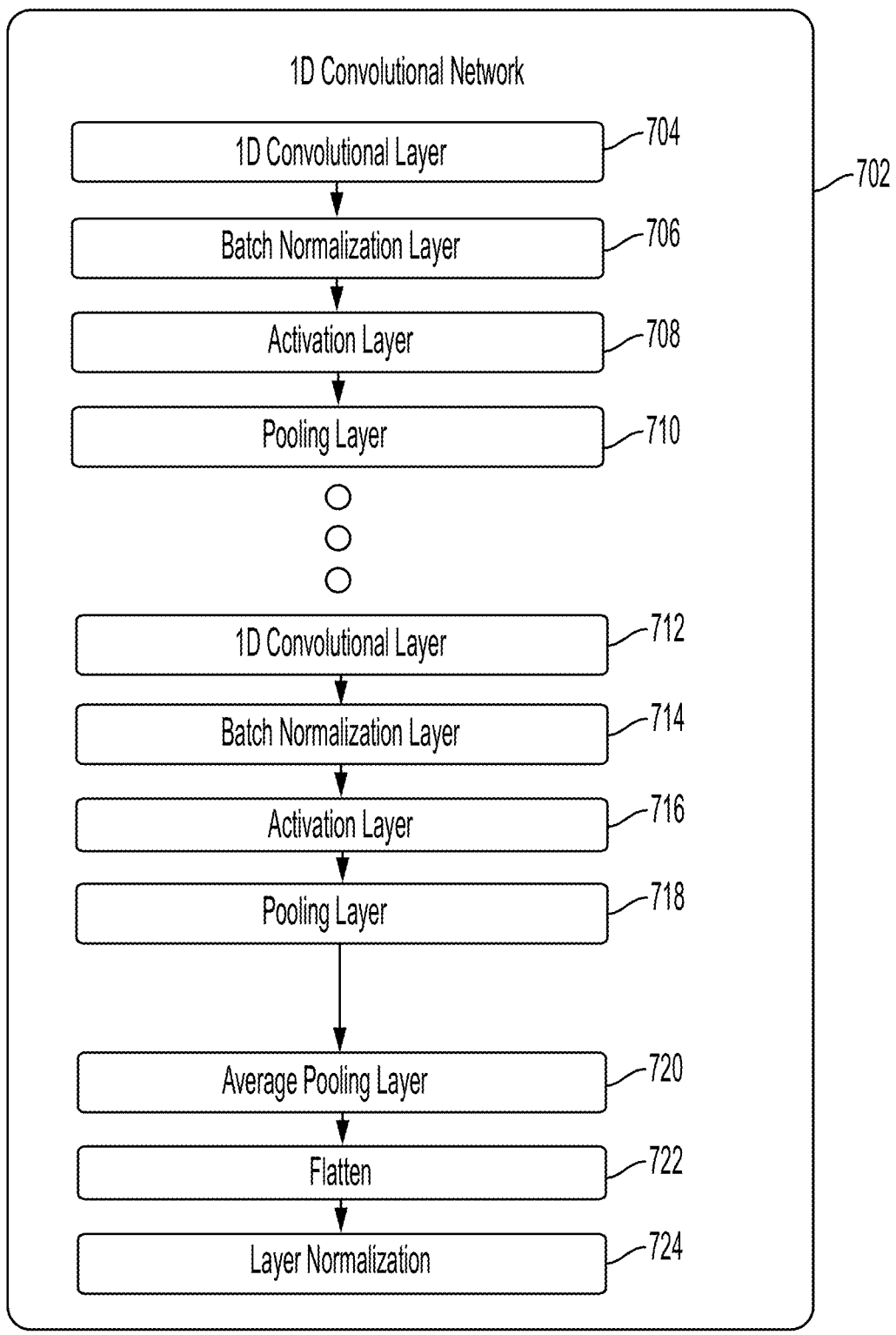
FIG. 7A illustrates an example architecture of an example 1D convolutional neural network which may be used to process an audio waveform in connection with detecting the presence of transmission defects, in accordance with some embodiments.

FIG. 7A illustrates an example architecture of an example 1D convolutional neural network which may be used to process an audio waveform in connection with detecting the presence of transmission defects, in accordance with some embodiments. The example neural network of FIG. 7A may be used to implement the 1D convolutional network 504 shown in FIG. 5. As shown in FIG. 7A, 1D convolutional neural network 702 includes a plurality of layers with a corresponding plurality of parameters which are determined through training.

The 1D convolutional neural network 702 may include any suitable number of 1D convolutional blocks (e.g., 2, 3, 4, 5, 6, 7, 8, 9, 10, etc.). A 1D convolutional block may include a 1D convolutional layer 704, a batch normalization layer 706, an activation layer 708, and a pooling layer 710. The activation layer 708 may use any suitable non-linear activation function (e.g., sigmoid, hyperbolic tangent, ReLU, leaky ReLU, softmax, etc.). The pooling layer 710 may be a maximum pooling layer or an average pooling layer. In some embodiments, the 1D convolutional block may include one or more other layers (e.g., a dropout layer), as aspects of the technology described herein are not limited in this respect.

In some embodiments, the last convolutional block—including 1D convolutional layer 712, batch normalization layer 714, activation layer 716, and pooling layer 718—is followed by an average pooling layer 720, a flattening operation 722, and layer normalization operation 724.

Table 5, included below, illustrates an example configuration for the respective layers of an example implementation of 1D convolutional neural network 702.

```
0   Conv1d(1, 32, kernel_size=(3,), stride=(1,), padding=(1,))
1   BatchNorm1d(32, eps=1e-05, momentum=0.1, affine=True, track_running_stats=True)
2   LeakyReLU(negative_slope=0.01)
3   MaxPool1d(kernel_size=8, stride=8, padding=0, dilation=1, ceil_mode=False)
0   Conv1d(32, 64, kernel_size=(3,), stride=(1,), padding=(1,))
1   BatchNorm1d(64, eps=1e-05, momentum=0.1, affine=True, track_running_stats=True)
2   LeakyReLU(negative_slope=0.01)
3   MaxPool1d(kernel_size=8, stride=8, padding=0, dilation=1, ceil_mode=False)
0   Conv1d(64, 128, kernel_size=(3,), stride=(1,), padding=(1,))
1   BatchNorm1d(128, eps=1e-05, momentum=0.1, affine=True, track_running_stats=True)
2   LeakyReLU(negative_slope=0.01)
3   MaxPool1d(kernel_size=8, stride=8, padding=0, dilation=1, ceil_mode=False)
0   Conv1d(128, 256, kernel_size=(3,), stride=(1,), padding=(1,))
1   BatchNorm1d(256, eps=1e-05, momentum=0.1, affine=True, track_running_stats=True)
2   LeakyReLU(negative_slope=0.01)
3   MaxPool1d(kernel_size=8, stride=8, padding=0, dilation=1, ceil_mode=False)
4   AdaptiveAvgPool1d(output_size=1)
5   Flatten(start_dim=1, end_dim=-1)
```

Figure 7B:
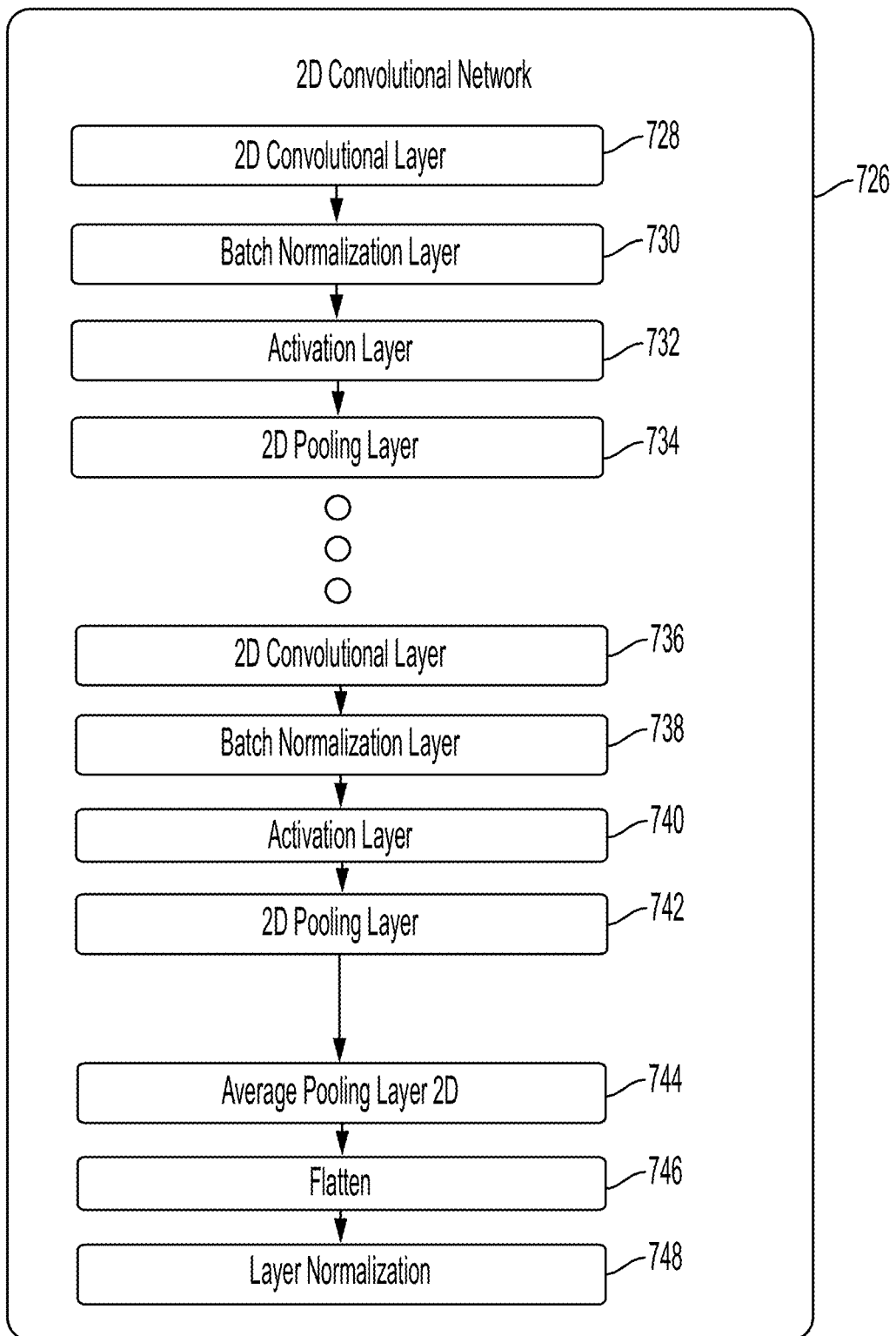
FIG. 7B illustrates an example architecture of an example 2D convolutional neural network which may be used to process a 2D representation of the audio waveform in connection with detecting the presence of transmission defects, in accordance with some embodiments of the technology described herein.

FIG. 7B illustrates an example architecture of an example 2D convolutional neural network which may be used to process a 2D representation of the audio waveform in connection with detecting the presence of transmission defects, in accordance with some embodiments of the technology described herein. The example neural network of FIG. 7B may be used to implement the 2D convolutional network 508 shown in FIG. 5. As shown in FIG. 7B, 2D convolutional neural network 726 includes a plurality of layers with a corresponding plurality of parameters which are determined through training.

The 2D convolutional neural network 726 may include any suitable number (e.g., one, two, three, four, five, six, seven, eight, nine, ten, etc.) of 2D convolutional blocks. A 2D convolutional block may include a 2D convolutional layer 728, a batch normalization layer 730, an activation layer 732, and a 2D pooling layer 734, in accordance with some embodiments. The activation layer may use any suitable activation non-linearity, examples of which are provided herein. The pooling layer may be a max pooling or an average pooling layer.

In some embodiments, the last convolutional block—including 2D convolutional layer 736, batch normalization layer 738, activation layer 740, and 2D pooling layer 742—is followed by a 2D average pooling layer 744, flatten operation 746, and layer normalization operation 748.

Table 6, included below, illustrates an example configuration for the respective layers in an example implementation of 2D convolutional neural network 726.

```
0   Conv2d(1, 32, kernel_size=(3, 3), stride=(1, 1), padding=(1, 1))
1   BatchNorm2d(32, eps=1e-05, momentum=0.1, affine=True, track_running_stats=True)
2   LeakyReLU(negative_slope=0.01)
3   MaxPool2d(kernel_size=2, stride=2, padding=0, dilation=1, ceil_mode=False)
0   Conv2d(32, 64, kernel_size=(3, 3), stride=(1, 1), padding=(1, 1))
1   BatchNorm2d(64, eps=1e-05, momentum=0.1, affine=True, track_running_stats=True)
2   LeakyReLU(negative_slope=0.01)
3   MaxPool2d(kernel_size=2, stride=2, padding=0, dilation=1, ceil_mode=False)
0   Conv2d(64, 128, kernel_size=(3, 3), stride=(1, 1), padding=(1, 1))
1   BatchNorm2d(128, eps=1e-05, momentum=0.1, affine=True, track_running_stats=True)
2   LeakyReLU(negative_slope=0.01)
3   MaxPool2d(kernel_size=2, stride=2, padding=0, dilation=1, ceil_mode=False)
0   Conv2d(128, 256, kernel_size=(3, 3), stride=(1, 1), padding=(1, 1))
1   BatchNorm2d(256, eps=1e-05, momentum=0.1, affine=True, track_running_stats=True)
2   LeakyReLU(negative_slope=0.01)
3   MaxPool2d(kernel_size=2, stride=2, padding=0, dilation=1, ceil_mode=False)
4   AdaptiveAvgPool2d(output_size=(1, 1))
5   Flatten(start_dim=1, end_dim=-1)
```

Figure 7C:
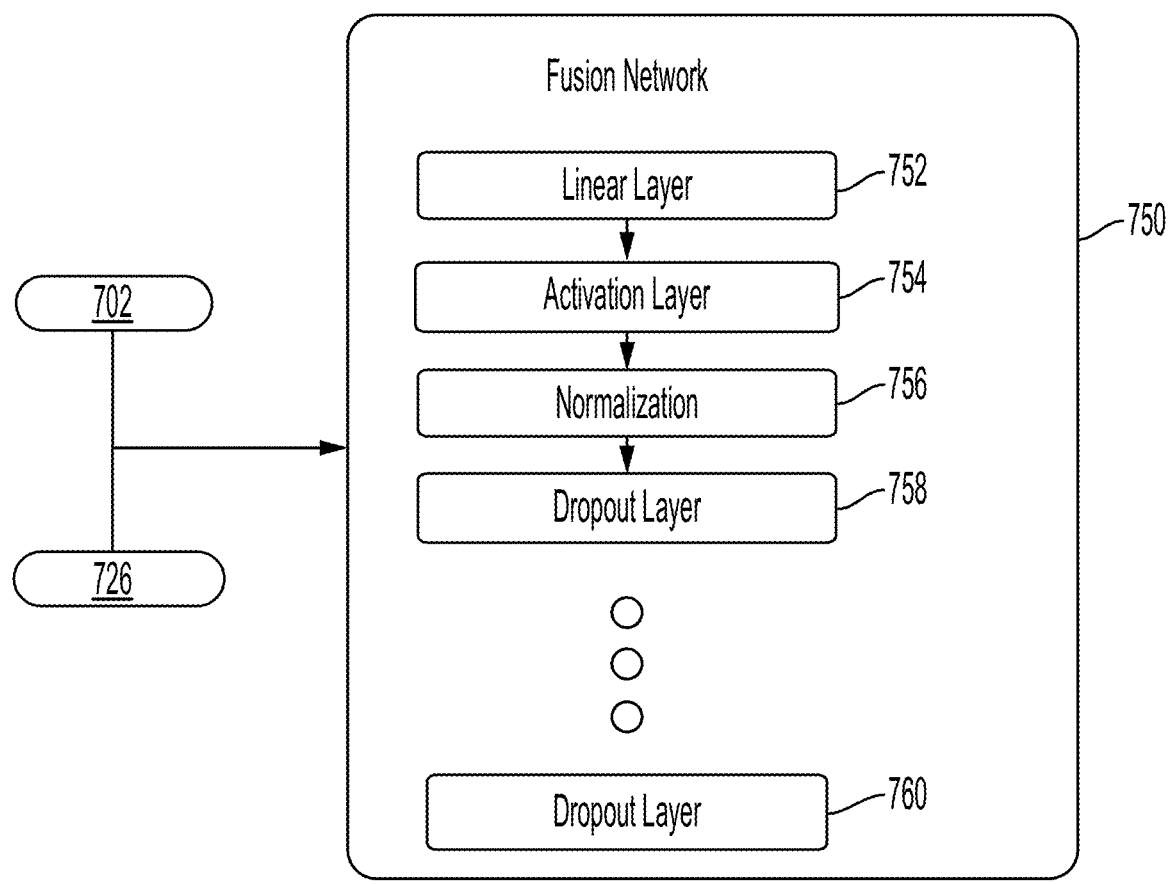
FIG. 7C illustrates an example architecture of an example fusion neural network which may be configured to process the output of the 1D convolutional network shown in FIG. 7A and the 2D convolutional neural network shown in FIG. 7B, in accordance with some embodiments of the technology described herein.

FIG. 7C illustrates an example architecture of an example fusion neural network which may be configured to process the output of the 1D convolutional network shown in FIG. 7A and the 2D convolutional neural network shown in FIG. 7B, in accordance with some embodiments of the technology described herein. The example neural network of FIG. 7C may be used to implement the fusion neural network 512 shown in FIG. 5. As shown in FIG. 7C, fusion network 750 includes a plurality of layers with a corresponding plurality of parameters which are determined through training.

The fusion network may include any suitable plurality of blocks (e.g., one, two, three, four, five, six, seven, eight, nine, ten, etc.). For example, fusion neural network 750 may include a first block which includes linear layer 752, acti vation layer 754, a normalization operation 756, and a dropout layer 758—in accordance with some embodiments.

In some embodiments, following the last fusion block, a dropout layer 760 may be included. Table 7, included below, illustrates an example configuration for the respective layers in an example implementation of fusion network 750.

TABLE 7

Example Configuration of Fusion Network 750

| | |
|---|---|
| 0 | Linear(in_features=256, out_features=512, bias=True) |
| 1 | LeakyReLU(negative_slope=0.01) |
| 2 | BatchNorm1d(512, eps=1e-05, momentum=0.1, affine=True, track_running_stats=True) |
| 3 | Dropout(p=0.3, inplace=False) |
| 0 | Linear(in_features=512, out_features=256, bias=True) |
| 1 | LeakyReLU(negative_slope=0.01) |
| 2 | BatchNorm1d(256, eps=1e-05, momentum=0.1, affine=True, track_running_stats=True) |
| 3 | Dropout(p=0.3, inplace=False) |
| 0 | Linear(in_features=256, out_features=1, bias=True) |
| 1 | LeakyReLU(negative_slope=0.01) |
| 2 | BatchNorm1d(1, eps=1e-05, momentum=0.1, affine=True, track_running_stats=True) |
| 3 | Dropout(p=0.3, inplace=False) |

Figure 7D:
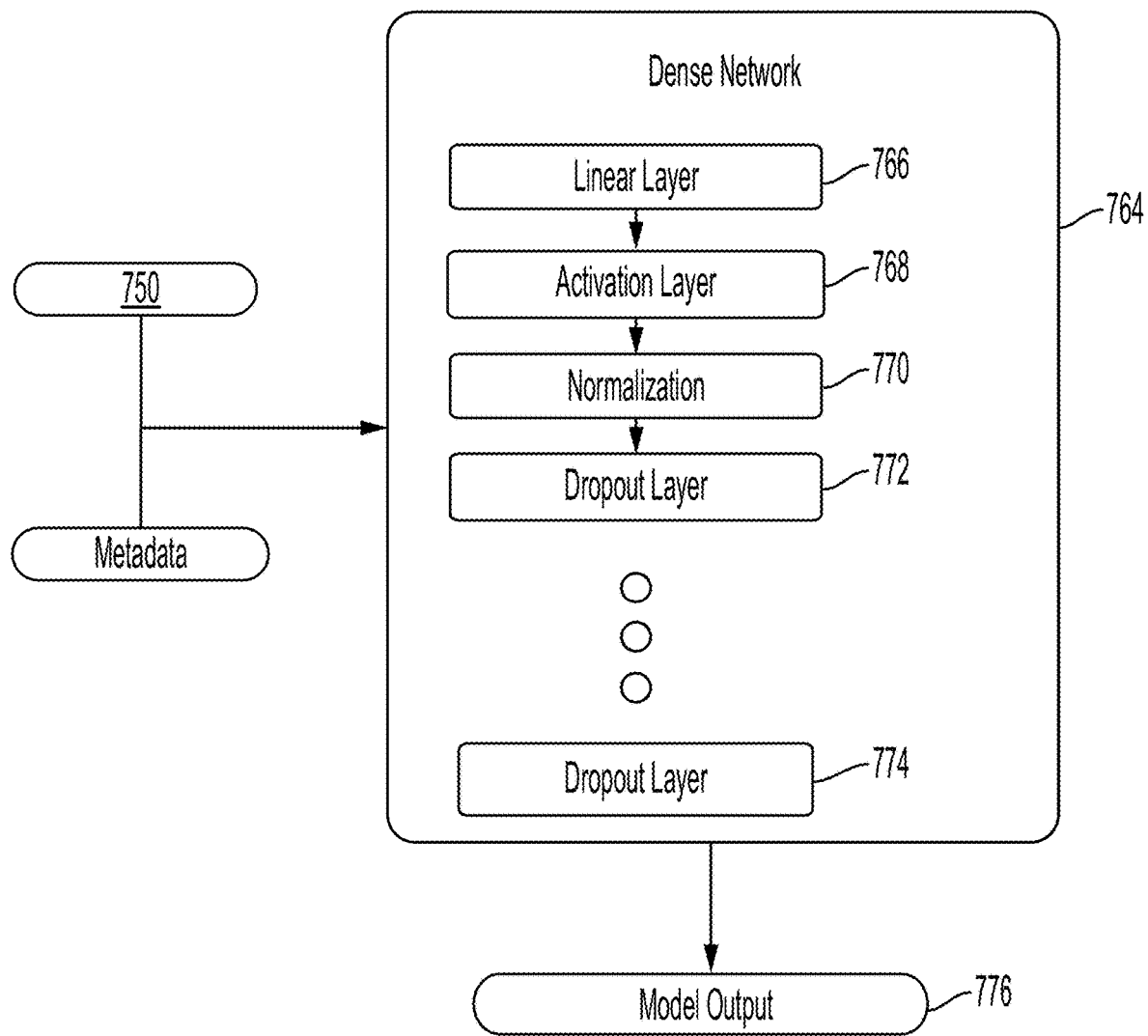
FIG. 7D illustrates an example architecture of an example dense neural network which may be used to process metadata and the fusion neural network shown in FIG. 7C, in connection with detecting the presence of transmission defects, in accordance with some embodiments of the technology described herein.

FIG. 7D illustrates an example architecture of an example dense neural network 764 which may be used to process metadata and the fusion neural network shown in FIG. 7C, in connection with detecting the presence of transmission defects, in accordance with some embodiments of the technology described herein.

As shown in FIG. 7D, dense network 764 includes a plurality of layers and a corresponding plurality of parameters which are determined through training. The dense network may include any suitable number (e.g., one two, three, four, five, six, seven, eight, nine, ten, etc.) of blocks. For example, dense network 764 may include a first dense block which includes linear layer 766, activation layer 768, a normalization operation 779, and a dropout layer 772.

Table 8, included below, illustrates an example configuration for the respective layers in an example implementation of fusion network 764.

TABLE 8

Example Configuration of Fusion Network 764

| | |
|---|---|
| 0 | Linear(in_features=136, out_features=128, bias=True) |
| 1 | LeakyReLU(negative_slope=0.01) |
| 2 | BatchNorm1d(128, eps=1e-05, momentum=0.1, affine=True, track_running_stats=True) |
| 3 | Dropout(p=0.3, inplace=False) |
| 0 | Linear(in_features=128, out_features=256, bias=True) |
| 1 | LeakyReLU(negative_slope=0.01) |
| 2 | BatchNorm1d(256, eps=1e-05, momentum=0.1, affine=True, track_running_stats=True) |
| 3 | Dropout(p=0.3, inplace=False) |
| 0 | Linear(in_features=256, out_features=512, bias=True) |
| 1 | LeakyReLU(negative_slope=0.01) |
| 2 | BatchNorm1d(512, eps=1e-05, momentum=0.1, affine=True, track_running_stats=True) |
| 3 | Dropout(p=0.3, inplace=False) |
| 0 | Linear(in_features=512, out_features=256, bias=True) |
| 1 | LeakyReLU(negative_slope=0.01) |
| 2 | BatchNorm1d(256, eps=1e-05, momentum=0.1, affine=True, track_running_stats=True) |
| 3 | Dropout(p=0.3, inplace=False) |
| 0 | Linear(in_features=256, out_features=1, bias=True) |
| 1 | LeakyReLU(negative_slope=0.01) |
| 2 | BatchNorm1d(1, eps=1e-05, momentum=0.1, affine=True, track_running_stats=True) |
| 3 | Dropout(p=0.3, inplace=False) |

A neural network for detecting presence of abnormal transmission noise (e.g., the neural networks shown in FIGS. 5 and/or 7A-7D) may be trained by estimating values of neural network parameters using training data and suitable optimization software. The optimization software may be configured to perform neural network training by gradient descent, stochastic gradient descent, or in any other suitable way. In some embodiments, the Adam optimizer (Kingma, D. and Ba, J. (2015) Adam: A Method for Stochastic Optimization. Proceedings of the 3rd International Conference on Learning Representations (ICLR 2015)) may be used.

In one example, the training data was created, in part, by obtaining examples of audio recordings having abnormal transmission noise in one of two ways. First, if a trained vehicle inspector identifies a transmission problem and mentions the keyword "whin" in the inspection report then any audio recording obtained as part of that inspection is considered as having abnormal transmission noise (e.g., transmission whine). In one example, about a thousand examples with abnormal transmission noise were obtained in this way. Second, an iterative active learning method was used in which human reviewers listened to audio recordings from cars that have OBDII codes related to the car's transmission. A reviewer may also have access to a prediction of the presence of transmission issues with a previous iteration's model was at least approximately 0.5. Labels generated by human reviewers, which had the largest disagreement from the predictions of an earlier model training iteration were reviewed by a professional vehicle mechanic for potential mislabeling. After the mechanic's corrections were made, the model was retrained with the corrected labels, and the best model was selected based on the validation score using the corrected labels. In one example, the training data contained a total of 21,601 audio recordings of which 2146 of them were positives meaning they contained an audible transmission whine, while the rest were negatives. Each recording was approximately 30 seconds and was pre-processed as described herein with reference to FIGS. 5, 6, and 7A-7D.

In some embodiments, data augmentation may be used to increase size of the training data. For example, additional audio training data may be obtained, for each of one or more audio waveforms, by making changes to the vector representing the audio waveform. For example, the vector may randomly inverted (polarity inversion), shifted in time by a random amount (e.g., with wraparound rotation), and/or random continuous sections of the vector may be set to zero (time masking). As another example, additional audio training data may be obtained, for each of one or more audio waveforms, by making changes to the matrix representing the 2D representation of the waveform (e.g., the normalized matrix representing the log-transformed spectrogram). For example, the matrix may be shifted in time by a random amount (e.g., with wraparound rotation) and/or a random continuous set of rows may be set to zero (frequency masking).

In one example, the model shown in FIGS. 7A-7D was implemented using the PyTorch library and trained to minimize binary cross entropy loss when predicting the binary label of whether the vehicle has a transmission noise. The optimizer used was a stochastic gradient descent optimizer. The labels were weighted by the inverse of their occurrence frequency in the training dataset. The learning rate and momentum of the optimizer were controlled by the one-cycle scheduling algorithm. The one-cycle maximum learning rate values 0.01 for stage 1 and 0.1 for stage 2 were set by performing the learning rate range test. The model was trained for 100 epochs using 64 sample mini-batches for the stage 1 model (e.g., first ML model 703) and 2048 for the stage 2 model (e.g., second ML model 705). The parameter combination that yielded the highest score on the validation dataset was retained as the final model. The score consisted of the sum of three sub-metrics: ROCAUC, AP, and F1. ROCAUC was the area under the receiver operating characteristic curve, AP was the area under the precision-recall curve, and F1 was the harmonic mean of the precision and recall scores at threshold 0.5.

In some embodiments, the trained ML model in FIGS. 7A-7D may have at least 100K, at least 500K, at least 1 million, at least 2 million, at least three million at least 5 million, at least 10 million, between 1 and 5 million parameters, between 500K and 10 million parameters, between 500K and 100 million parameters.

Figure 8:
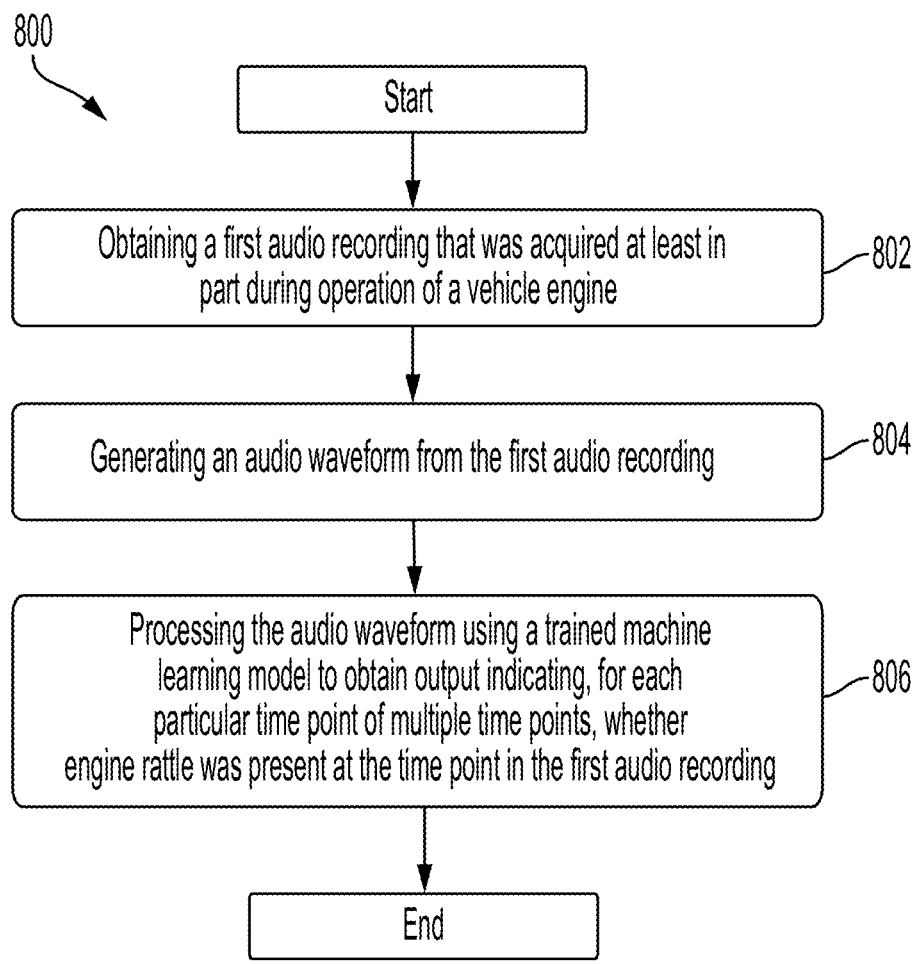
FIG. 8 illustrates a flowchart of an illustrative process 800 for using a trained machine learning model to detect the presence of engine rattle from audio acquired at least in part during operation of an engine of a vehicle, in accordance with some embodiments of the technology described herein.

FIG. 8 illustrates a flowchart of an illustrative process 800 for using a trained machine learning model to detect the presence of engine rattle from audio acquired at least in part during operation of an engine of a vehicle, in accordance with some embodiments of the technology described herein. Process 800 may be executed by any suitable computing device(s). For example, process 800 may be executed by an MVDD (e.g., MVDD 104), a mobile device (e.g., mobile device 108), a server or servers (e.g., server(s) 129), or any other suitable computing device(s) including any of the devices described herein including with reference to FIG. 1A.

Process 800 starts at act 802 by obtaining a first audio recording that was acquired at least in part during operation of a vehicle engine, in accordance with some embodiments of the technology described herein. The first audio recording may have been acquired by at least one acoustic sensor. The acoustic sensor(s) may be part of an MVDD used to inspect the vehicle.

Next, process 800 proceeds to act 804, where an audio waveform is generated from the first audio recording obtained at act 802. This may be done in any suitable way including in any of the ways described herein. For example, the first audio recording comprises multiple channels and the audio waveform may be generated from a waveform selected from one of the multiple channels or from a waveform obtained by combining waveforms in different channels. Also, generating the audio waveform may comprise pre-processing the audio recording (by resampling, normalizing, changing duration of, filtering, and/or clipping the first audio recording). For example, in some embodiments, generating the audio waveform comprises: (1) resampling the first waveform to a target frequency (e.g., 44.1 kHz) to obtain a resampled waveform; (2) normalizing the resampled waveform by subtracting its mean and dividing by its standard deviation to obtain a normalized waveform (e.g., a time series of Z-scores); and (3) clipping the normalized waveform to a target maximum (e.g., +/−6 standard deviations) to obtain the audio waveform. Zero Z-scores may be used to impute for parts of the audio waveform that are missing.

Next, process 800 proceeds to act 806, where the audio waveform obtained at act 804 is processed using a trained machine learning model (e.g., the ML model illustrated in FIG. 9) to obtain output indicating for each particular time point of multiple time points, whether engine rattle was present in the first audio recording at the time point.

In some embodiments, the output further provides an indication of where the engine rattle was detected within the audio recording. In such embodiments, the output of the trained ML model includes a time-series with each value in the time series indicating a time segment (e.g., a 100 ms segment, 150 ms segment, 200 ms segment, 250 ms segment, a segment of any length between 100 ms and 500 ms, etc.) in which the engine rattle was detected. In such embodiments, the inputs to and outputs from the train ML network are both time series, with the output time series having a lower temporal resolution than the input time series.

Following the conclusion of act 806, process 800 ends. Following the end of process 800, the output indicative of the presence or absence of the engine (e.g., start-up) rattle (which may be indicative of the presence or absence of an engine defect or other vehicle defect) may be output and, for example, used to generate a vehicle condition report.

Figure 9:
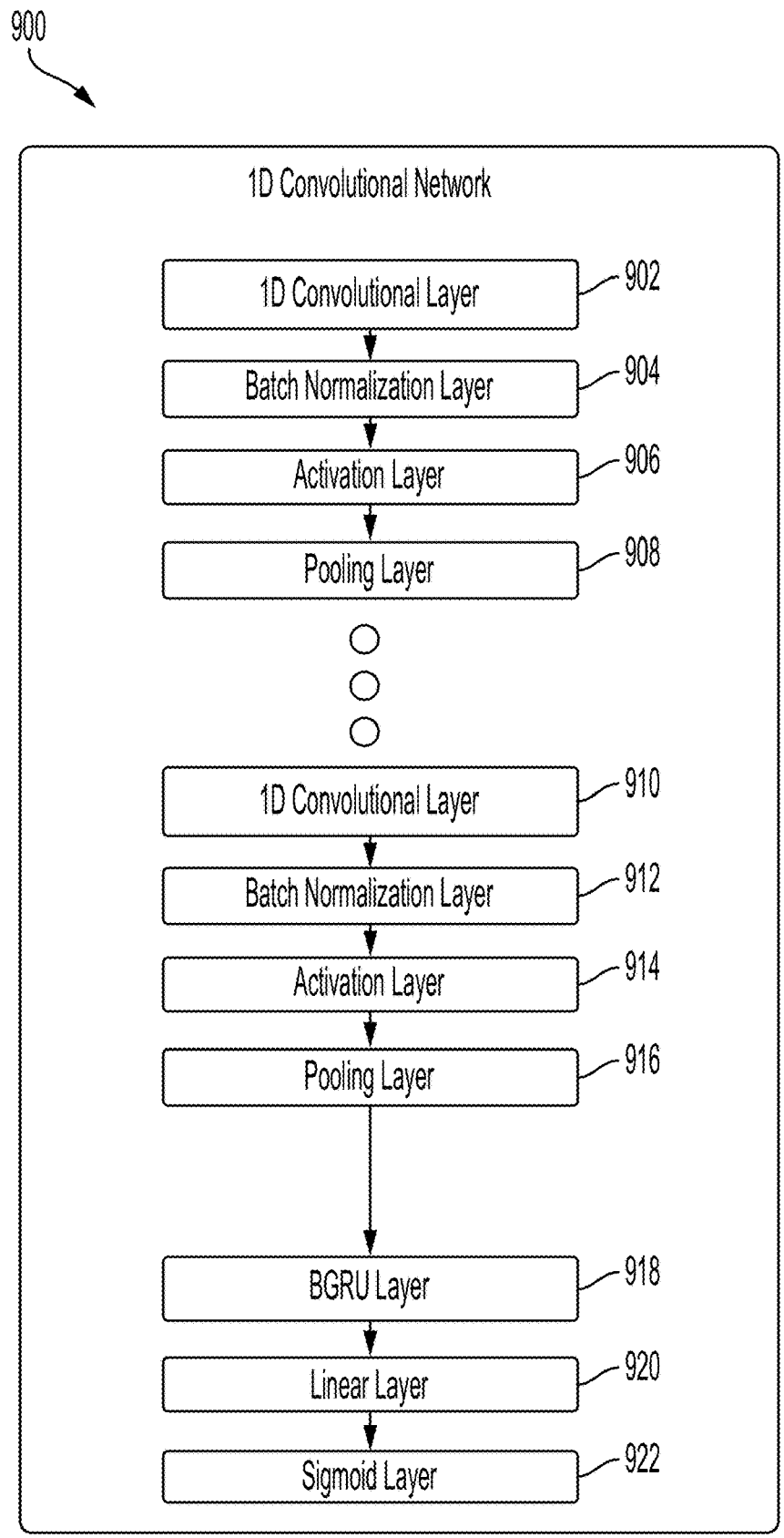
FIG. 9 illustrates an example architecture of a neural network which may be used to process an audio waveform in connection with detecting the presence of an engine rattle, in accordance with some embodiments of the technology described herein.

FIG. 9 illustrates an example architecture of an example neural network 900 which may be used to process an audio waveform in connection with detecting the presence of an engine rattle, in accordance with some embodiments of the technology described herein. The neural network 900 includes a plurality of layers with a corresponding plurality of parameters which are determined through training.

In some embodiments, the neural network 900 may have at least 100K, at least 500K, at least 1 million, at least 2 million, at least three million at least 5 million, at least 10 million, between 1 and 5 million parameters, between 500K and 10 million parameters, between 500K and 100 million parameters.

As shown in FIG. 9, the neural network 900 may include a series of multiple (e.g., 2, 3, 4, 5, 6, 7, 8, 9, 10, etc.). 1D convolutional blocks, after which latent features are extracted (these latent features may correspond to features of the input audio signal in time intervals of a particular length e.g., between 150 and 200 ms). These latent features may be passed through a recurrent portion of the neural network 900, for example, a bi-directional gate recurrent unit (BGRU). The BGRU may allow for temporal features to be shared between features representations between timesteps. Subsequently, a linear layer may classify each feature representation into a respective 1-class value indicating the presence of engine start-up rattle. These 1-class values, which are spread over time, may be aggregated together to form one vector denoting the presence of engine rattle at each subsequent time step.

As shown in FIG. 9, neural network 900 may include multiple 1D convolutional blocks. Each 1D convolutional block may include a 1D convolutional layer (e.g., 902), a batch normalization layer (e.g., 904), an activation layer (e.g., 906), and a pooling layer (e.g., 908). The activation layer may use any suitable non-linear activation function (e.g., sigmoid, hyperbolic tangent, ReLU, leaky ReLU, softmax, etc.). The pooling layer may be a maximum pooling layer or an average pooling layer. In some embodiments, a 1D convolutional block may include one or more other layers (e.g., a dropout layer), as aspects of the technology described herein are not limited in this respect.

In some embodiments, the last convolutional block—including 1D convolutional layer 910, batch normalization layer 912, activation layer 912, and pooling layer 916—is followed by a recurrent neural network portion comprising, for example, BGRU layer 918. The recurrent neural network portion is followed by linear layer 920 and sigmoid layer 922. In some embodiments, output of the neural network 900 include an array of values for corresponding time intervals. Higher values for a particular time interval may indicate a higher probability or likelihood of an engine rattle at that specific time step.

Table 8, included below, illustrates an example configuration for the respective layers of an example implementation of 1D convolutional neural network 900.

A neural network for detecting presence of vehicle engine rattle (e.g., the neural network 900) may be trained by estimating values of neural network parameters using training data and suitable optimization software. The optimization software may be configured to perform neural network training by gradient descent, stochastic gradient descent, or in any other suitable way. In some embodiments, the Adam optimizer (Kingma, D. and Ba, J. (2015) Adam: A Method for Stochastic Optimization. Proceedings of the 3rd International Conference on Learning Representations (ICLR 2015)) may be used.

In some embodiments, data augmentation may be used to increase size of the training data. For example, additional audio training data may be obtained, for each of one or more audio waveforms, by making changes to the vector representing the audio waveform. For example, the vector may randomly inverted (polarity inversion), shifted in time by a random amount (e.g., with wraparound rotation), and/or random continuous sections of the vector may be set to zero (time masking).

In one example, the training data was created using expert labelers. To this end, audio recordings were labeled by the labelers as having start-up rattle. For example, upon finding start-up rattle in an audio recording, an expert labeler would denote the presence of the rattle with two time steps denoting onset and offset times of each noise event. For example, the expert labeler, when finding start-up rattle in the audio recording, would denote the presence of the start-up rattle with two timestamps, for example 4.2 s and 4.8 s, denoting when the start-up rattle is audibly present in the recording. During training, these labeled "sound events" are transformed into an array of equal time steps at the same resolution of the output of the model. For instance, the labeled sound events may be transformed into ~170 millisecond time steps, with 0 denoting time steps without the presence of start-up rattle, and 1 denoting time steps with audible start-up rattle. In one example, the train and test datasets consisted of 2,337 and 636 audio recordings (approximately 30 seconds each) respectively. Each of the

TABLE 8

Example Configuration of Neural Network 900

| | |
|---|---|
| 0 | Conv1d(1, 16, kernel_size=(7,), stride=(1,), padding=(3,)) |
| 1 | BatchNorm1d(16, eps=1e-05, momentum=0.1, affine=True, track_running_stats=True) |
| 2 | LeakyReLU(negative_slope=0.01) |
| 3 | MaxPool1d(kernel_size=6, stride=6, padding=0, dilation=1, ceil_mode=False) |
| 4 | Conv1d(16, 32, kernel_size=(17,), stride=(1,), padding=(8,)) |
| 5 | BatchNorm1d(32, eps=1e-05, momentum=0.1, affine=True, track_running_stats=True) |
| 6 | LeakyReLU(negative_slope=0.01) |
| 7 | MaxPool1d(kernel_size=6, stride=6, padding=0, dilation=1, ceil_mode=False) |
| 8 | Conv1d(32, 64, kernel_size=(17,), stride=(1,), padding=(8,)) |
| 9 | BatchNorm1d(64, eps=1e-05, momentum=0.1, affine=True, track_running_stats=True) |
| 10 | LeakyReLU(negative_slope=0.01) |
| 11 | MaxPool1d(kernel_size=6, stride=6, padding=0, dilation=1, ceil_mode=False) |
| 12 | Conv1d(64, 128, kernel_size=(17,), stride=(1,), padding=(8,)) |
| 13 | BatchNorm1d(128, eps=1e-05, momentum=0.1, affine=True, track_running_stats=True) |
| 14 | LeakyReLU(negative_slope=0.01) |
| 15 | MaxPool1d(kernel_size=6, stride=6, padding=0, dilation=1, ceil_mode=False) |
| 16 | Conv1d(128, 256, kernel_size=(17,), stride=(1,), padding=(8,)) |
| 17 | BatchNorm1d(256, eps=1e-05, momentum=0.1, affine=True, track_running_stats=True) |
| 18 | LeakyReLU(negative_slope=0.01) |
| 19 | MaxPool1d(kernel_size=6, stride=6, padding=0, dilation=1, ceil_mode=False) |
| 20 | Conv1d(256, 512, kernel_size=(17,), stride=(1,), padding=(8,)) |
| 21 | BatchNorm1d(512, eps=1e-05, momentum=0.1, affine=True, track_running_stats=True) |
| 22 | LeakyReLU(negative_slope=0.01) |
| (rnn): | GRU(512, 512, batch_first=True, bidirectional=True) |
| (dense): | Linear(in_features=1024, out_features=1, bias=True) |
| (sigmoid): | Sigmoid( ) | audio recordings part of the train and test datasets was pre-processed as described herein with reference to FIG. 8.

In one example, the neural network model 900 was implemented using the PyTorch library and trained to minimize a binary cross entropy loss when predicting the binary label of whether start-up rattle is present at a certain time period. Specifically, the total loss for an individual sample is the summation of all binary cross entropy losses for each predicted time step. The Adam optimizer was used for training. The learning rate and momentum of the optimizer was controlled by the one-cycle scheduling algorithm. The one-cycle maximum learning rate was set by performing the learning rate range test five times and selecting the median value. The model was trained for 40 epochs using 48 sample mini-batches. The score used to evaluate the neural network is the Polyphonic Sound Detection Score (PSDS) at two predefined scenarios. Specifically, the PSDS score is calculated using pDTC and pGTC values at both 0.05 and 0.4, respectively. The parameter combination that yielded the highest score using the PSDS scenario at 0.4 pDTC and pGTC is used on the validation dataset was retained for evaluation on the test set. The PSDS, pDTC and pGTC values are described in Bilen, Çağdaş, et al. "A framework for the robust evaluation of sound event detection." IEEE International Conference on Acoustics, Speech and Signal Processing (ICASSP). IEEE, 2020, which is incorporated by reference herein in its entirety.

Figure 10:
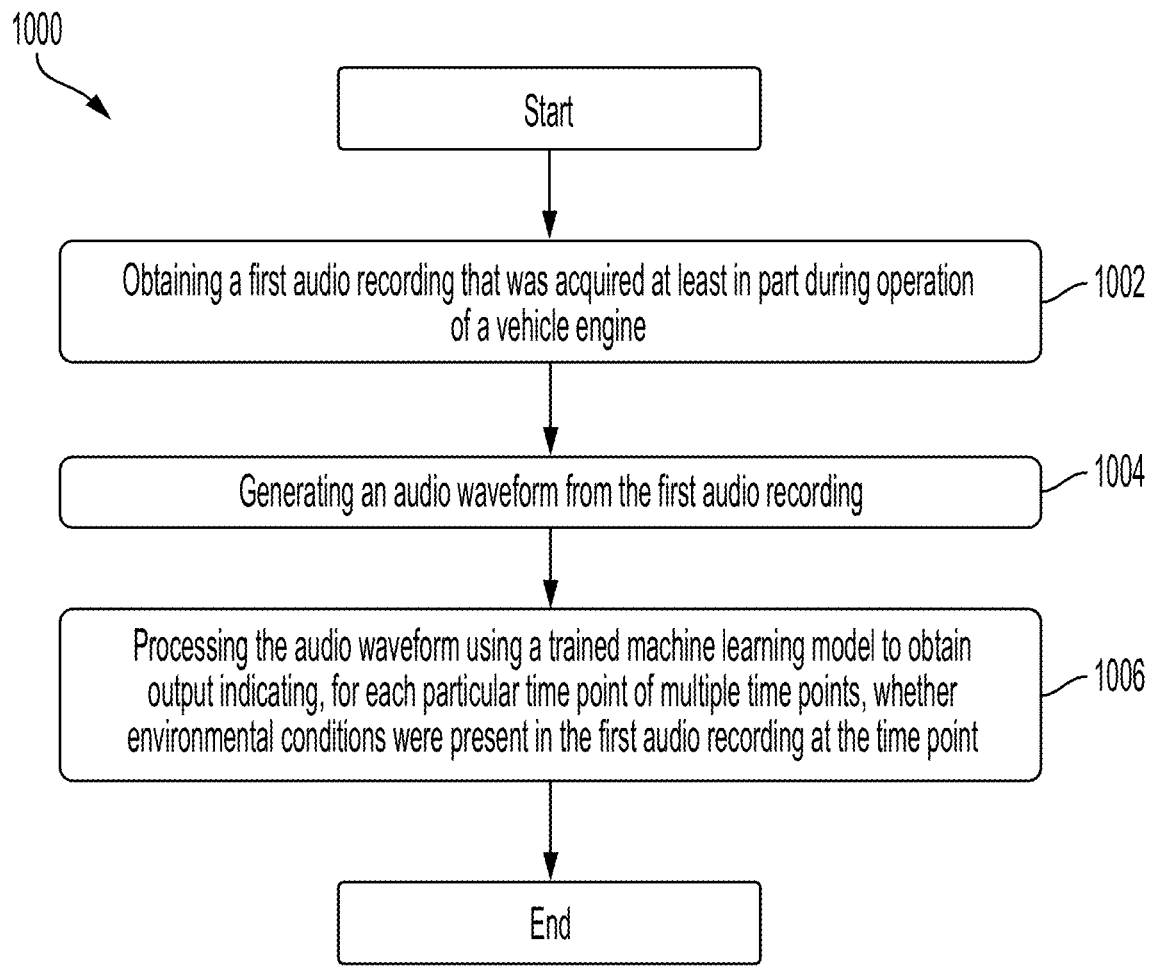
FIG. 10 illustrates a flowchart of an illustrative process 1000 for using a trained machine learning model to detect the presence or absence of environmental noise in audio acquired at least in part during operation of an engine of a vehicle, in accordance with some embodiments of the technology described herein.

FIG. 10 illustrates a flowchart of an illustrative process 1000 for using a trained machine learning model to detect the presence or absence of environmental noise in audio acquired at least in part during operation of an engine of a vehicle, in accordance with some embodiments of the technology described herein. Process 1000 may be executed by any suitable computing device(s). For example, process 1000 may be executed by an MVDD (e.g., MVDD 104), a mobile device (e.g., mobile device 108), a server or servers (e.g., server(s) 129), or any other suitable computing device (s) including any of the devices described herein including with reference to FIG. 1A.

Process 1000 starts at act 1002 by obtaining a first audio recording that was acquired at least in part during operation of a vehicle engine, in accordance with some embodiments of the technology described herein. The first audio recording may have been acquired by at least one acoustic sensor. The acoustic sensor(s) may be part of an MVDD used to inspect the vehicle.

Next, process 1000 proceeds to act 1004, where an audio waveform is generated from the first audio recording obtained at act 1002. This may be done in any suitable way including in any of the ways described herein. For example, the first audio recording comprises multiple channels and the audio waveform may be generated from a waveform selected from one of the multiple channels or from a waveform obtained by combining waveforms in different channels. Also, generating the audio waveform may comprise pre-processing the audio recording (by resampling, normalizing, changing duration of, filtering, and/or clipping the first audio recording). For example, in some embodiments, generating the audio waveform comprises: (1) resampling the first waveform to a target frequency (e.g., 44.1 kHz) to obtain a resampled waveform; (2) normalizing the resampled waveform by subtracting its mean and dividing by its standard deviation to obtain a normalized waveform (a time series of Z-scores); and (3) clipping the normalized waveform to a target maximum (e.g., +/−6 standard deviations) to obtain the audio waveform. Zero Z-scores may be used to impute for parts of the audio waveform that are missing.

Next, process 1000 proceeds to act 1006, where the audio waveform obtained at act 1004 is processed using a trained machine learning model (e.g., the trained ML model illustrated in FIG. 11) to obtain output indicating for each particular time point of multiple time points, whether environmental was present in the first audio recording at the time point.

In some embodiments, the output further provides an indication of where the environmental was detected within the audio recording. In such embodiments, the output of the trained ML model includes a time-series with each value in the time series indicating a time segment (e.g., a 100 ms segment, 150 ms segment, 200 ms segment, 250 ms segment, a segment of any length between 100 ms and 500 ms, etc.) in which the environmental was detected. In such embodiments, the inputs to and outputs from the trained ML network are both time series, with the output time series having a lower temporal resolution than the input time series.

Following the conclusion of act 1006, process 1000 ends. Following the end of process 1000, the output indicative of the presence or absence of environmental noise may be used to determine subsequent steps. When the output indicates that the audio recording is not impacted by environmental noise, the audio recording may be processed by one or more other machine learning models (e.g., as described herein with reference to FIGS. 2-9 and 12A, 12B, and 13) to detect the presence or absence of vehicle defects. However, when the output indicates that the audio recording is impacted by environmental noise, one or more corrective actions may be taken. For example, in some embodiments, the affected audio recording may be discarded and the system may request that a new audio recording be obtained (e.g., by sending a message to the inspector of the vehicle whose MVDD provided an audio recording corrupted by environmental noise). As another example, in some embodiments, the affected audio recording may be processed by one or more denoising algorithms known in the art to reduce the amount of environmental noise present in the affected audio recording. As another example, when the environmental noise is concentrated in a certain portion of the audio recording (rather than the entire recording), that portion of the audio recording may be discarded.

Figure 11:
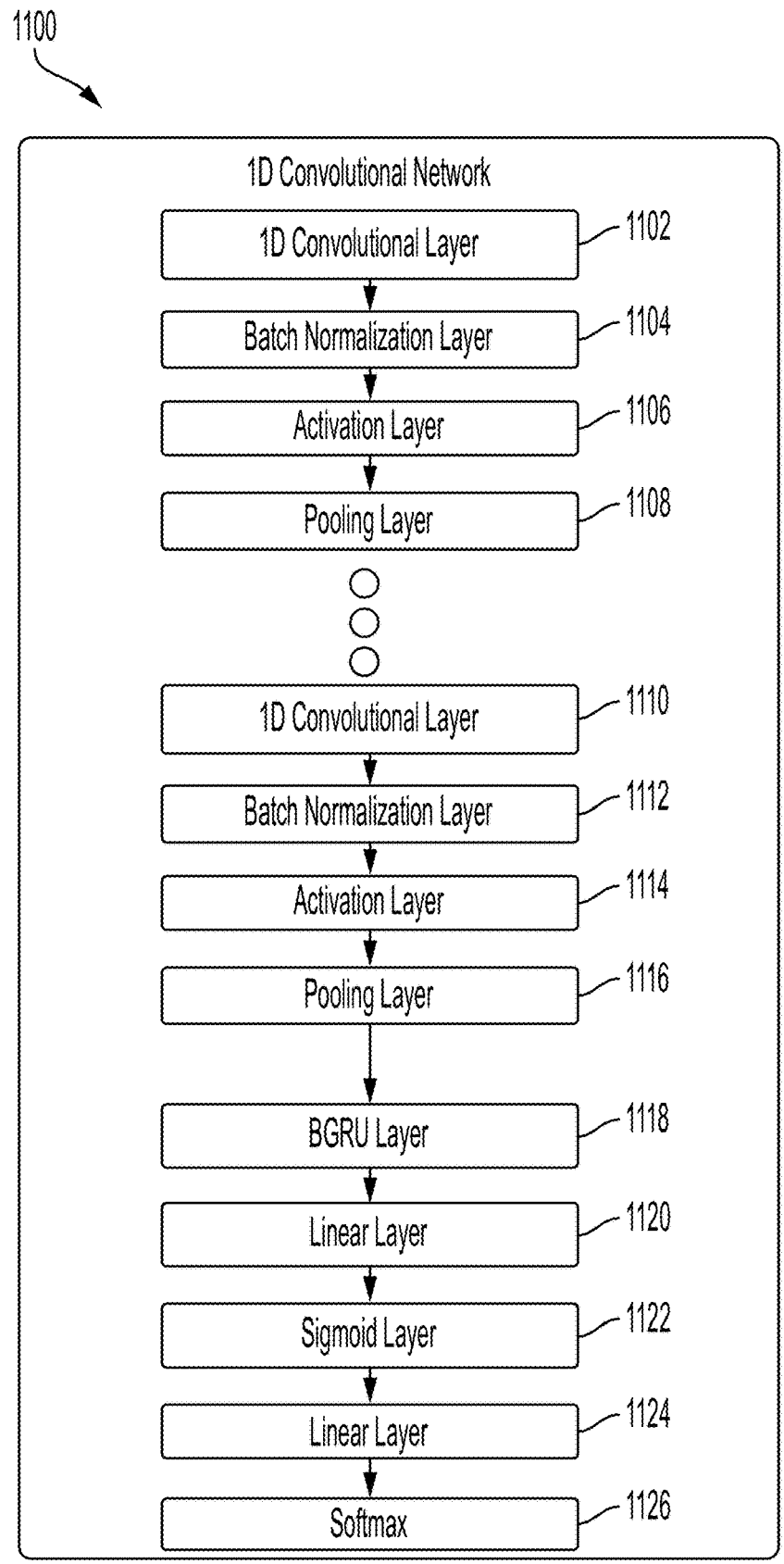
FIG. 11 illustrates an example architecture of a neural network which may be used to process an audio waveform in connection with detecting the presence or absence of environmental noise in the audio waveform, in accordance with some embodiments of the technology described herein.

FIG. 11 illustrates an example architecture of an example neural network which may be used to process an audio waveform in connection with detecting the presence or absence of environmental noise in the audio waveform, in accordance with some embodiments of the technology described herein. The neural network 1100 includes a plurality of layers with a corresponding plurality of parameters which are determined through training.

In some embodiments, the neural network 1100 may have at least 100K, at least 500K, at least 1 million, at least 2 million, at least three million at least 5 million, at least 10 million, between 1 and 5 million parameters, between 500K and 10 million parameters, between 500K and 100 million parameters.

As shown in FIG. 11, the neural network 1100 may include a series of multiple (e.g., 2, 3, 4, 5, 6, 7, 8, 9, 10, etc.) 1D convolutional blocks, after which latent features are extracted (these latent features may correspond to features of the input audio signal in time intervals of a particular length e.g., between 150 and 200 ms). These latent features may be passed through a recurrent portion of the neural network

1100, for example, a bi-directional gate recurrent unit (BGRU). The BGRU may allow for temporal features to be shared between features representations between timesteps. Subsequently, a linear layer may classify each feature representation into a respective 1-class value indicating the presence of environmental noise. These 1-class values, which are spread over time, may be aggregated together to form one vector denoting the presence of environmental noise at each subsequent time step.

The 1D convolutional neural network 1100 may include any suitable plurality of 1D convolutional blocks. Each 1D convolutional block may include a 1D convolutional layer (e.g., 1102), a batch normalization layer (e.g., 1104), an activation layer (e.g., 1106), and a pooling layer (e.g., 1108). The activation layer may use any suitable non-linear activation function (e.g., sigmoid, hyperbolic tangent, ReLU, leaky ReLU, softmax, etc.). The pooling layer may be a maximum pooling layer or an average pooling layer. In some embodiments, a 1D convolutional block may include one or more other layers (e.g., a dropout layer), as aspects of the technology described herein are not limited in this respect.

In some embodiments, the last convolutional block—including 1D convolutional layer 1110, batch normalization layer 1112, activation layer 1112, and pooling layer 1116—is followed by a recurrent neural network portion comprising, for example, BGRU layer 1118. The recurrent neural network portion is followed by linear layer 1120, sigmoid layer 1122, linear layer 1124 and softmax layer 1126.

In some embodiments, the output of the neural network 1100 may include an array of values for corresponding time intervals. Higher values for a particular time interval may indicate a higher probability or likelihood of environmental noise (e.g., wind noise) being present at that specific time step.

In addition, the neural network 1100 aggregates the output of each time step into a singular, sample-level prediction of the overall presence of environmental noise throughout the entire sample. Specifically, an "attention" mechanism is used to aggregate all time step outputs into a single sample-level prediction. This "attention" mechanism consists of a linear projection (linear layer 1120) that projects the feature representations at each time step into a singular value. All of these singular values are passed through a softmax operation (softmax layer 1126) that constructs a weighting of each time step, denoting how much emphasis should be placed on the contribution of that specific time step into the overall aggregation. The original environmental outputs at each time step are multiplied by their respective weightage and summed together, resembling a "weighted average" of all output time steps into a single sample-level output obtained from softmax layer 1126.

Table 9, included below, illustrates an example configuration for the respective layers of an example implementation of 1D convolutional neural network 1100.

TABLE 9

Example Configuration of Neural Network 1100

| | |
|---|---|
| 0 | Conv1d(1, 16, kernel_size=(7,), stride=(1,), padding=(3,)) |
| 1 | BatchNorm1d(16, eps=1e-05, momentum=0.1, affine=True, track_running_stats=True) |
| 2 | LeakyReLU(negative_slope=0.01) |
| 3 | MaxPool1d(kernel_size=6, stride=6, padding=0, dilation=1, ceil_mode=False) |
| 4 | Conv1d(16, 32, kernel_size=(17,), stride=(1,), padding=(8,)) |
| 5 | BatchNorm1d(32, eps=1e-05, momentum=0.1, affine=True, track_running_stats=True) |
| 6 | LeakyReLU(negative_slope=0.01) |
| 7 | MaxPool1d(kernel_size=6, stride=6, padding=0, dilation=1, ceil_mode=False) |
| 8 | Conv1d(32, 64, kernel_size=(17,), stride=(1,), padding=(8,)) |
| 9 | BatchNorm1d(64, eps=1e-05, momentum=0.1, affine=True, track_running_stats=True) |
| 10 | LeakyReLU(negative_slope=0.01) |
| 11 | MaxPool1d(kernel_size=6, stride=6, padding=0, dilation=1, ceil_mode=False) |
| 12 | Conv1d(64, 128, kernel_size=(17,), stride=(1,), padding=(8,)) |
| 13 | BatchNorm1d(128, eps=1e-05, momentum=0.1, affine=True, track_running_stats=True) |
| 14 | LeakyReLU(negative_slope=0.01) |
| 15 | MaxPool1d(kernel_size=6, stride=6, padding=0, dilation=1, ceil_mode=False) |
| 16 | Conv1d(128, 256, kernel_size=(17,), stride=(1,), padding=(8,)) |
| 17 | BatchNorm1d(256, eps=1e-05, momentum=0.1, affine=True, track_running_stats=True) |
| 18 | LeakyReLU(negative_slope=0.01) |
| 19 | MaxPool1d(kernel_size=6, stride=6, padding=0, dilation=1, ceil_mode=False) |
| 20 | Conv1d(256, 512, kernel_size=(17,), stride=(1,), padding=(8,)) |
| 21 | BatchNorm1d(512, eps=1e-05, momentum=0.1, affine=True, track_running_stats=True) |
| 22 | LeakyReLU(negative_slope=0.01) |
| (rnn): | GRU(512, 512, batch_first=True, bidirectional=True) |
| (dense): | Linear(in_features=1024, out_features=1, bias=True) |
| (sigmoid): | Sigmoid( ) |
| (dense_softmax) | Linear(in_features=1024, out_features=1, bias=True) |
| (softmax) | Softmax(dim=1) |
| criterion | BCELoss( ) |

A neural network for detecting presence of environmental noise (e.g., the neural network 1100) may be trained by estimating values of neural network parameters using training data and suitable optimization software. The optimization software may be configured to perform neural network training by gradient descent, stochastic gradient descent, or in any other suitable way. In some embodiments, the Adam optimizer (Kingma, D. and Ba, J. (2015) Adam: A Method for Stochastic Optimization. Proceedings of the 3rd International Conference on Learning Representations (ICLR 2015)) may be used.

In some embodiments, data augmentation may be used to increase size of the training data. For example, additional audio training data may be obtained, for each of one or more audio waveforms, by making changes to the vector representing the audio waveform. For example, the vector may randomly inverted (polarity inversion), shifted in time by a random amount (e.g., with wraparound rotation), and/or random continuous sections of the vector may be set to zero (time masking).

In one example, the training data was created using expert labelers. To this end, audio recordings were labeled by the labelers as having environmental (e.g., wind) noise. For example, upon finding environmental noise in an audio recording, an expert labeler would denote the presence of the noise with two time steps denoting onset and offset times of each noise event. For example, the expert labeler, when finding wind noise in the audio recording, would denote the presence of the wind noise with two timestamps, for example 2.7 s and 5.4 s, denoting when the wind noise is audibly present in the recording. During training, these labeled "sound events" are transformed into an array of equal time steps at the same resolution of the output of the model. For instance, the labeled sound events may be transformed into ~170 millisecond time steps, with 0 denoting time steps without the presence of environmental noise, and 1 denoting time steps with audible environmental noise. In one example, the train and test datasets consisted of 1,232 and 238 audio recordings (approximately 30 seconds each) respectively. Each of the audio recordings part of the train and test datasets was pre-processed as described herein with reference to FIG. 10.

In one example, the neural network model 1100 was implemented using the PyTorch library and trained to minimize a binary cross entropy loss when predicting the binary label of whether environmental noise is present at a certain time period. Specifically, the total loss for an individual sample is the summation of all binary cross entropy losses for each predicted time step. The Adam optimizer was used for training. The learning rate and momentum of the optimizer was controlled by the one-cycle scheduling algorithm. The one-cycle maximum learning rate was set by performing the learning rate range test five times and selecting the median value. The model was trained for 40 epochs using 48 sample mini-batches. The score used to evaluate the neural network is the Polyphonic Sound Detection Score (PSDS) at two predefined scenarios. Specifically, the PSDS score is calculated using pDTC and pGTC values at both 0.05 and 0.4, respectively. The parameter combination that yielded the highest score using the PSDS scenario at 0.4 pDTC and pGTC is used on the validation dataset was retained for evaluation on the test set. The PSDS, pDTC and pGTC values are described in Bilen, Çağdaş, et al. "A framework for the robust evaluation of sound event detection." IEEE International Conference on Acoustics, Speech and Signal Processing (ICASSP). IEEE, 2020, which is incorporated by reference herein in its entirety.

Figure 12A:
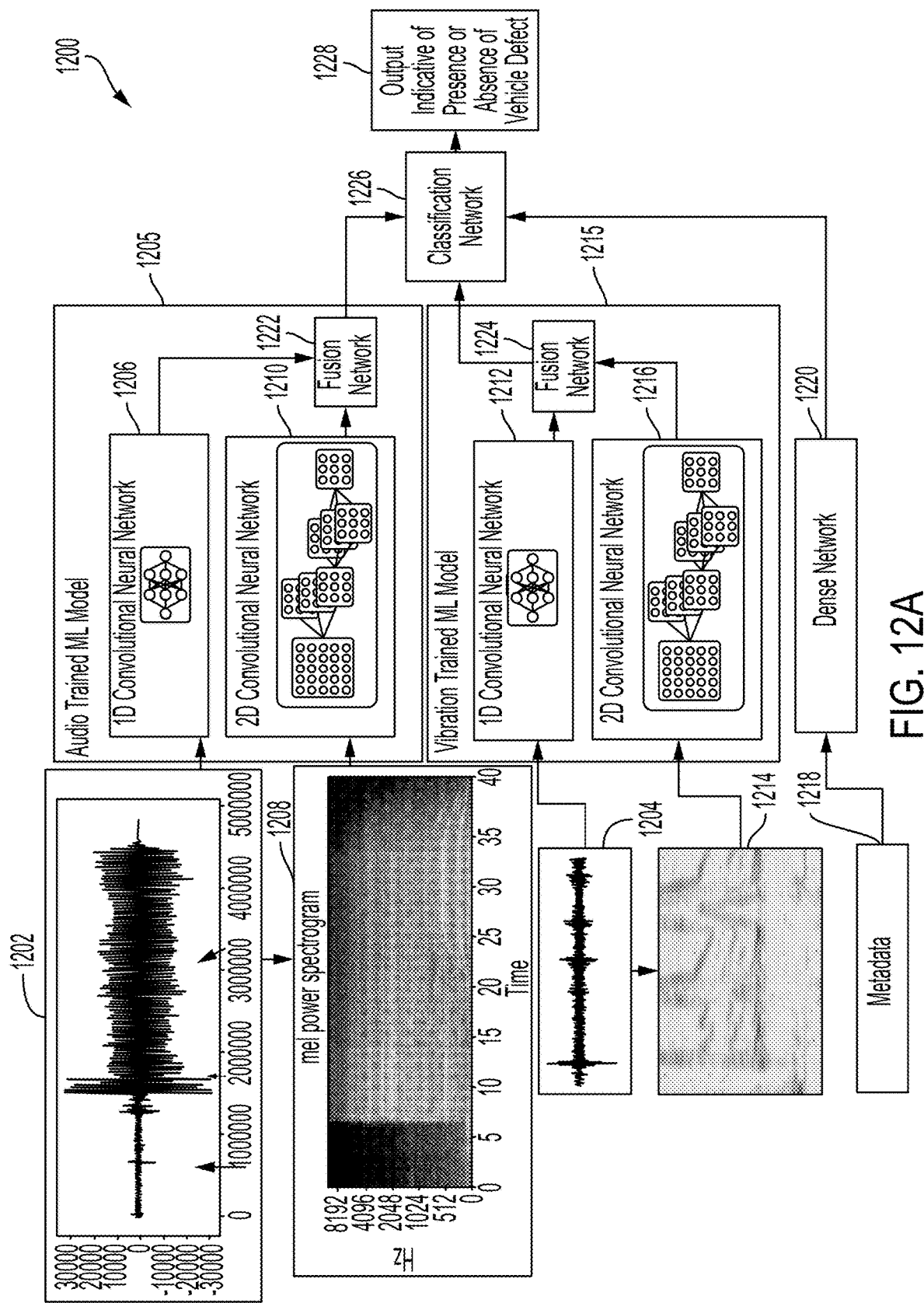
FIG. 12A illustrates an example architecture of an example trained ML model for detecting presence of vehicle defects from audio and vibration signals acquired at least in part during operation of an engine of a vehicle, in accordance with some embodiments of the technology described herein.

FIG. 12A illustrates an example architecture of an example trained ML model for detecting presence of vehicle defects from audio and vibration signals acquired at least in part during operation of an engine of a vehicle, in accordance with some embodiments of the technology described herein. As shown in FIG. 12A, trained ML model 1205 is configured to receive as input: (1) a waveform of the audio recording; (2) a two-dimensional representation (e.g., a Mel-scale log spectrogram) of the audio waveform; (3) a waveform of the vibration recording; (4) a two-dimensional representation of the vibration waveform (e.g., a linear scale log spectrogram); and (5) metadata indicating one or more properties of the vehicle. Upon processing these inputs, trained ML model 1200 provides output 1228 indicative of the presence or absence of a vehicle defect.

As shown in FIG. 12A, the trained ML model 1200 may comprise multiple sub-models: (1) model 1205 configured to process an audio waveform 1202 and a 2D representation 1208 of the audio recording; (2) model 1215 configured to process a vibration waveform 1204 and a 2D representation 1214 of the vibration waveform; and (3) as model 1220 to process the metadata 1218. The trained model 1200 further includes classification network 1226 configured to process outputs of the models 1205, 1215, and 1120.

In some embodiments, the trained ML model 1200 may have at least 100K, at least 500K, at least 1 million, at least 2 million, at least three million at least 5 million, at least 10 million, between 1 and 5 million parameters, between 500K and 10 million parameters, between 500K and 100 million parameters.

The first trained ML model 1205 is a neural network model. The first neural network model includes a first neural network 1206 configured to process the audio waveform 1202, a second neural network 1210 configured to process the 2D representation 1208 of the audio waveform. The outputs of the neural networks 1206 and 1210 are processed by fusion neural network 1222. The output of fusion network 1222 is provided to classification network 1226.

The second trained ML model 1215 is a second neural network model. The second neural network model includes a third neural network 1212 configured to process the vibration waveform 1204, a fourth neural network 1216 configured to process the 2D representation 1214 of the vibration waveform. The outputs of each respective neural networks 1212 and 1216 are processed by fusion network 1224. The output of fusion network 1224 is provided to classification network 1226.

The dense network 1220 is configured to process the metadata 1218. The dense network 1220 may be a fully-connected network. The output of dense network 1220 is provided to classification network 1226. Accordingly, classification network 1226 may process the inputs from the first trained ML model 1205, second trained ML model 1215, and dense network 1220. Upon processing these inputs, trained ML model 1200 provides output 1228.

In some embodiments, trained ML model 1200 may provide an output 1228 that is indicative of the presence or absence of the vehicle defect. For example, the output may provide an indication (e.g., a number such as a probability or a likelihood) that a vehicle defect is present or absent in the audio recording (e.g., a higher probability may be indicative of the vehicle defect being present, while a lower probability may be indicative of the vehicle defect being absent). For example, the output may provide an indication of the presence or absence of abnormal vehicle sounds (e.g., ticking, knocking, hesitation), abnormal timing chain noise (e.g., rattling of a stretched chain), abnormal engine accessory noise (e.g., power steering pump whines, serpentine belt squeals, bearing damage, turbocharger or supercharger noise, and noise emanating from any other anomalous components that are not internal to the engine block), and/or abnormal exhaust noise (e.g., noise generated due to a cracked or damaged exhaust system near the engine). In some embodiments, trained ML model 1200 may output 1288 as a vector of elements, where each element of the vector is a numeric value (e.g., a probability, a likelihood, a confidence) indicative of whether a respective potential vehicle defect is present tor absent based on the audio data, vibration data, and the metadata processed by this model.

In some embodiments, the audio waveform 1202 may be generated from an audio recording acquired at least in part during operation of an engine of a vehicle. The audio recording may be obtained using an acoustic sensor, (e.g., at least one microphone part of the MVDD) to acquire audio signals at least in part during operation of the engine of the vehicle. The audio waveform 1202 may be generated from that audio recording in any suitable way described herein including with reference to FIG. 2.

In some embodiments, the audio recording may include sounds produced during multiple engine operations. For example, the audio recording may include sounds produced during start-up (e.g., engine ignition), idle, load (e.g., while the engine is operating at elevated RPM), as described herein in connection with FIG. 2.

In some embodiments, audio waveform 1202 may include audio sequences of engine loads separated by periods of idle. For example, audio waveform 1202 may include audio of a first load where the engine is accelerated to approximately 3000 RPM, then the engine idles before a second load where the engine is accelerated to approximately 3000 RPM, then the engine idles before a second load where the engine is accelerated to approximately 3000 RPM a second time. In some embodiments, the first and second loads may be approximately the same (e.g., approximately 3000 RPM for each). In some embodiments, the first and second loads may be different (e.g., approximately 2000 RPM for the first and approximately 3000 RPM for the second. In other embodiments, the audio waveform may include more than two load cycles, as aspects of the technology described herein are not limited in this respect. In some embodiments, the load sounds in the audio waveform may have been produced by an engine accelerated to other RPMs, as described herein with respect to FIG. 2.

The audio waveform 1202 may have any suitable duration, for example, as described in connection with FIG. 2. For example, waveform 1202 may have a duration between 10 seconds and 2 minutes or be live streamed. In some embodiments, the audio waveform 1202 may be obtained from the audio recording by pre-processing that audio recording to obtain the audio waveform 1202. In some embodiments, the pre-processing may include resampling, normalizing, cropping, and/or clipping the audio recording to obtain the audio waveform 1202. The pre-processing may be performed in order to obtain a waveform having a target time duration, a target sampling rate, and/or a target dynamic range, as described herein.

In some embodiments, processing of the audio recording to generate the audio waveform 1202 may include resampling the audio recording to have a target frequency, such as by upsampling or downsampling the audio recording; scaling to have a target dynamic range, or otherwise pre-processed to change the duration; and/or selecting a channel from a multi-channel recording. In some embodiments, this processing may be executed using the same techniques as describe above in connection with FIG. 2. For example, the audio recording may be a two-channel recording between 25-35 seconds in duration and the resulting audio waveform may be in a mono format with a duration of 30 seconds and a sample rate of 22,050 Hz.

After pre-processing of the audio recording to obtain the audio waveform 1202, the resulting audio waveform 1202 may have any suitable duration and sampling rate. As a result, the audio waveform 1202 may be a vector having between 100,000 and 500,000 elements, 500,000 and 2,000,000 elements, 1 million and 10 million elements, or between 10 million and 100 million elements, or any other suitable range within these ranges.

In some embodiments, audio waveform 1202 may be the same waveform as audio waveform 202. In some embodiments, audio waveform 1202 may be a different waveform than audio waveform 202 but may be based on the same audio recording. In some embodiments, audio waveform 1202 may be a different waveform than audio waveform 202 but may be based on different audio recordings of the same vehicle.

As shown in FIG. 12A, the audio waveform 1202 is processed by a first neural network 1206 of first trained ML model 1205. The first neural network 1206 may be a 1D convolutional neural network. The 1D CNN may include any suitable number of 1D convolutional blocks. A 1D convolutional block may include a 1D convolutional layer a batch normalization layer, an activation layer (e.g., embodying a non-linearity such as a ReLU), and a 1D pooling layer (e.g., a maximum pooling layer, an average pooling layer). An example architecture of the first neural network 1206 is described herein with reference to Table 8.

TABLE 8

Example Configuration of Neural Network 1206

| Layer | Chanel Input | Chanel Response | Kernel Size | Padding | Stride |
|---|---|---|---|---|---|
| Conv Block 1 | 1 | 32 | — | — | — |
| Sinc Layer | 1 | 32 | 251 | 125 | 1 |
| Batch Normalization Layer | 32 | 32 | — | — | — |
| Leaky ReLu Activation | — | — | — | — | — |
| Max Pooling Layer | 32 | 32 | 8 | 0 | 8 |
| Conv Block 2 | 32 | 64 | — | — | — |
| 1D Convolutional Layer | 32 | 64 | 7 | 3 | 1 |
| Batch Normalization Layer | 64 | 64 | — | — | — |
| Leaky ReLu Activation | — | — | — | — | — |
| Max Pooling Layer | 64 | 64 | 8 | 0 | 8 |
| Conv Block 3 | 64 | 128 | — | — | — |
| Conv Block 4 | 128 | 256 | — | — | — |
| Conv Block 5 | 256 | 256 | — | — | — |
| Global Average Pooling Layer | — | — | — | — | — |

In some embodiments, the two-dimensional representation 1208 of the audio waveform 1202 may be generated by applying a suitable transform to the audio waveform 1202. For example, the two-dimensional representation 1208 may be obtained by applying a short-time Fourier transform, as wavelet transform, a Gabor transform, or a chirplet transform to the audio waveform 1202 in order to generate the two-dimensional representation. For example, the two-dimensional representation 1208 may be a Mel-scale log spectrogram generated using a fast-Fourier transform window of 1024 units, a stride of 512 units, and 256 Mel-frequency bins.

In some embodiments, two-dimensional representation 1208 may be the same representation as two-dimensional representation 206. In some embodiments, two-dimensional representation 1208 may be a different representation than two-dimensional representation 206 but may be based on the same audio waveform. In some embodiments, two-dimensional representation 1208 may be a different representation than audio two-dimensional representation 206 but may be based on a different audio waveform of a same vehicle.

As shown in FIG. 12A, the two-dimensional representation 1208 is processed by second neural network 1210 of the first trained ML model 1205. The second neural network 1210 may be a 2D convolutional neural network. The 2D CNN may include any suitable number of 2D convolutional blocks. A 2D convolutional block may include a 2D convolutional layer, a batch normalization layer, an activation layer (e.g., embodying a non-linearity such as a ReLU), and a 2D pooling layer (e.g., a maximum pooling layer, an average pooling layer). An example architecture of the second neural network 1210 is described herein with reference to Table 9.

TABLE 9

Example Configuration of Neural Network 1210

| Layer | Chanel Input | Chanel Response | Kernel Size | Padding | Stride |
|---|---|---|---|---|---|
| Conv Block 1 | 1 | 32 | — | — | — |
| 2D Convolutional Layer | — | 32 | 3 × 3 | 1 × 1 | 1 × 1 |
| Batch Normalization Layer | — | 32 | — | — | — |
| Leaky ReLu Activation | — | — | — | — | — |
| Max Pooling Layer | 32 | 32 | 2 × 2 | 0 | 2 × 2 |
| Conv Block 2 | 32 | 64 | — | — | — |
| Conv Block 3 | 64 | 128 | — | — | — |
| Conv Block 4 | 128 | 256 | — | — | — |
| Conv Block 5 | 256 | 256 | — | — | — |
| Global Average Pooling Layer | — | — | — | — | — |

As shown in FIG. 12A, outputs of the neural networks 1206 and 1210 may be processed using fusion neural network 1222. The fusion neural network 1222 may be a fully connected neural network having any suitable number of blocks. Each block may include a linear layer, an activation layer (e.g., embodying a non-linearity such as a ReLU), a batch normalization layer, and a dropout layer.

In some embodiments, the vibration waveform 1204 may be generated from a vibration recording acquired at least in part during operation of an engine of a vehicle. The vibration recording may be obtained using a vibration sensor (e.g., at least one accelerometer part of the MVDD) to acquire vibration signals at least in part during operation of the engine of the vehicle. The vibration sensor may generate a multi-channel vibration recording where the channels correspond to vibration signals detected along different directions. In some embodiments, vibration waveform 1204 may be a three-channel signal that represents the three spatial dimensions. For example, the accelerometer may generate signals associated with an x-axis, a y-axis, and a z-axis as respective channels of the vibration recording.

In some embodiments, the orientation of each accelerometer axis relative to the vehicle may be known. In such embodiments, axis specific pre-processing may be applied to the channels of the vibration recording. In some embodiments, the orientation of each accelerometer axis may be unknown. In such embodiments, a pre-processing step may determine the orientation of the accelerometer axes. In some embodiments, the processing may be invariant such that the relative orientation of the accelerometer axes does not need to be known.

In some embodiments, vibration waveform 1204 may be a time-domain waveform. For example, vibration waveform 1204 may be a 1D vector where each element of the vector corresponds to a different time point and the value of each element corresponds to the amplitude of signals acquired by the vibration sensor at that time point. In some embodiments, the vibration waveform may be in different domain (e.g. frequency domain).

In some embodiments, the vibration recording may include vibrations produced during multiple engine operations. For example, the vibration recording may include vibrations produced during start-up (e.g., engine ignition), idle, load (e.g., while the engine is operating at elevated RPM), as described herein in connection with audio waveform 1202.

In some embodiments, the vibration recording and the audio recording are acquired in synchronization such that both recordings start and end at approximately the same time. In some embodiments, the vibration recording and the audio recording are not synchronized but are generated at the same time such that they both acquire signals corresponding to the same vehicle operations. Accordingly, sound generated during the sequence of engine operations is reflected in the audio waveform 1202 are vibration generated during the same sequence of engine operations is reflected in the vibration waveform 1204.

The vibration waveform 1204 may have any suitable duration. In some embodiments, for example, the vibration waveform 1204 may have a duration between 5 and 45 seconds, 15 and 45 seconds, between 12 and 60 seconds, and/or between 10 seconds and 2 minutes. For example, the waveform may have a time duration of 30 seconds. In some embodiments, the waveform may have a duration greater than 2 minutes. In some embodiments, the waveform may be live streamed, in which case the duration would be determined, at least in part, on the duration of the live stream. In some embodiments, vibration waveform 1204 may have the same duration as audio waveform 1202 (e.g., 30 seconds).

In some embodiments, vibration waveform 1204 may be obtained from the vibration recording by pre-processing that vibration recording to obtain the vibration waveform 1204. In some embodiments, the pre-processing may include resampling, normalizing, cropping, and/or clipping the vibration recording to obtain the vibration waveform 1204. The pre-processing may be performed to obtain a vibration waveform having a target time duration, a target sampling rate (e.g., 100 Hz, between 50 and 200 Hz), and/or a target dynamic range. For example, the vibration recording may be cropped or zero-padded to have a 30 second duration.

As shown in FIG. 12A, the vibration waveform 1204 is processed by a third neural network 1212. The third neural network 1212 may be a 1D convolutional neural network. The 1D CNN may include any suitable number of 1D convolutional blocks. A 1D convolutional block may include a 1D convolutional layer a batch normalization layer, an activation layer (e.g., embodying a non-linearity such as a ReLU), and a 1D pooling layer (e.g., a maximum pooling layer, an average pooling layer). An example architecture of the third neural network 1212 is described herein in Table 10.

TABLE 10

Example Configuration of Neural Network 1212

| Layer | Chanel Input | Chanel Response | Kernel Size | Padding | Stride |
|---|---|---|---|---|---|
| Conv Block 1 | 3 | 32 | — | — | — |
| 1D Convolutional Layer | 3 | 32 | 251 | 125 | 1 |
| Batch Normalization Layer | 32 | 32 | — | — | — |
| Leaky ReLu Activation | — | — | — | — | — |
| Max Pooling Layer | 32 | 32 | 3 | 0 | 3 |
| Conv Block 2 | 32 | 64 | — | — | — |
| 1D Convolutional Layer | 32 | 64 | 7 | 3 | 1 |
| Batch Normalization Layer | 64 | 64 | — | — | — |
| Leaky ReLu Activation | — | — | — | — | — |
| Max Pooling Layer | 64 | 64 | 3 | 0 | 3 |
| Conv Block 3 | 64 | 128 | — | — | — |
| Conv Block 4 | 128 | 256 | — | — | — |
| Conv Block 5 | 256 | 256 | — | — | — |
| Global Average Pooling Layer | — | — | — | — | — |

In some embodiments, the two-dimensional representation 1214 of the vibration waveform 1204 may be generated by applying a suitable transformation to the vibration waveform 1204. For example, the two-dimensional representation 1214 may be obtained by applying a short-time Fourier transform, as wavelet transform, a Gabor transform, or a chirplet transform to the audio waveform 1202 in order to generate the two-dimensional representation. For example, the two-dimensional representation 1214 of the vibration waveform may be a linearly-scaled log spectrogram representation of each channel (e.g., an x channel, y channel, and z channel). The linearly-scaled spectrogram may be generated using a fast-Fourier transform window of 256 units, with a stride of 52 units and 128 frequency bins. The log spectrogram may be normalized by subtracting its mean and dividing by its standard deviation.

As shown in FIG. 12A, the two-dimensional representation 1214 is processed by the fourth neural network 1216 of the second trained ML model 1215. The fourth neural network 1216 may be a 2D convolutional neural network. The 2D CNN may include any suitable number of 2D convolutional blocks. A 2D convolutional block may include a 2D convolutional layer, a batch normalization layer, an activation layer (e.g., embodying a non-linearity such as a ReLU), and a 2D pooling layer (e.g., a maximum pooling layer, an average pooling layer). An example architecture of the fourth neural network 1216 is described herein in Table 11.

TABLE 11

Example Configuration of Neural Network 1216

| Layer | Chanel Input | Chanel Response | Kernel Size | Padding | Stride |
|---|---|---|---|---|---|
| Conv Block 1 | 3 | 32 | — | — | — |
| 2D Convolutional Layer | — | 32 | 3 × 3 | 1 × 1 | 1 × 1 |
| Batch Normalization Layer | — | 32 | — | — | — |
| Leaky ReLu Activation | — | — | — | — | — |
| Max Pooling Layer | 32 | 32 | 2 × 2 | 0 | 2 × 2 |
| Conv Block 2 | 32 | 64 | — | — | — |

TABLE 11-continued

Example Configuration of Neural Network 1216

| Layer | Chanel Input | Chanel Response | Kernel Size | Padding | Stride |
|---|---|---|---|---|---|
| Conv Block 3 | 64 | 128 | — | — | — |
| Conv Block 4 | 128 | 256 | — | — | — |
| Conv Block 5 | 256 | 256 | — | — | — |
| Global Average Pooling Layer | — | — | — | — | — |

As shown in FIG. 12A, outputs of the neural networks 1212 and 1216 may be processed using fusion neural network 1224. The fusion neural network 1224 may be a fully connected neural network having any suitable number of blocks. Each block may include a linear layer, an activation layer (e.g., embodying a non-linearity such as a ReLU), a batch normalization layer, and a dropout layer.

In some embodiments, metadata 1218 may include one or more properties of the vehicle and/or conditions associated with the acquisition of the audio data, in accordance with some embodiments. Examples of metadata are provided herein. In some embodiments, metadata 1218 may include one or more vehicle properties that may be acquired from an on-board analysis computer integrated with the vehicle and/or data from one or more additional sensors as described herein.

In order for the metadata 1218 to be processed by a trained machine learning model such as the neural network model, at least some (e.g., all) of the metadata 1218 has to be converted to a numeric representation. This may be done in any suitable way described herein including with reference to FIG. 2. In some embodiments, the vectorized metadata may include between 100 and 500 elements, between 250 and 750 elements, between 500 and 1000 elements, or greater than 1000 elements.

As shown in FIG. 12A, the metadata 1218 may be transformed to a numeric metadata representation that is processed by dense neural network 1220, which may be a fully connected neural network. The dense network 1220 may include any suitable number of blocks. Each block may include a linear layer, an activation layer (e.g., embodying a non-linearity such as a ReLU), a batch normalization layer, and a dropout layer. An example architecture of the dense network 1220 is described herein in Table 12.

TABLE 12

Example Configuration of Neural Network 1220

| Layer | Chanel Input | Chanel Response | Dropout |
|---|---|---|---|
| Dense Block 1 | 82 | 226 | — |
| Linear Layer | 82 | 256 | — |
| Leaky ReLu Activation | — | — | — |
| Batch Normalization Layer | — | — | — |
| Dropout | — | — | 0.3 |
| Dense Block 2 | 226 | 36 | — |

As shown in FIG. 12A, the outputs from the first trained ML model 1205, the second trained ML model 1215, and the dense network 1220 are processed by classification network 1226 to generated output 1228. Classification network 1226 may be a dense neural network, which may be a fully connected neural network. The classification network 1226 may include any suitable number of blocks. Each block may include a linear layer, an activation layer (e.g., embodying a non-linearity such as a ReLU), a batch normalization layer, and a dropout layer. An example architecture of the dense network 1220 is described herein in Table 13.

TABLE 13

Example Configuration of Neural Network 1226

| Layer | Chanel Input | Chanel Response | Dropout |
|---|---|---|---|
| Dense Block 1 | 2084 | 512 | — |
| Linear Layer | 2084 | 512 | — |
| Leaky ReLu Activation | — | — | — |
| Batch Normalization Layer | 512 | 512 | — |
| Dropout | — | — | 0.3 |
| Dense Block 2 | 512 | 256 | — |
| Classification Linear Layer | 256 | 5 | — |

In some embodiments, output 1228 may be indicative of the presence or absence of vehicle defects. In some embodiments, a vehicle report may be generated based at least in part on output 1228 of classification network 1226, as described herein.

In some embodiments, output 1228 may include labels for abnormal vehicle sounds. Labels for abnormal vehicle sounds may include symbolic and/or textual indications that a potential vehicle defect could be present. In some embodiments, the symbolic and/or textual indications may indicate the potential presence of a vehicle defect when the defect has a greater than 50% chance of being present, greater than 60% chance of being present, greater than 70% chance of being present, greater than 80% chance of being present, or greater than 90% chance of being present. In some embodiments, the symbolic and/or textual indications may indicate the potential presence of a vehicle defect when the defect has a probability between 60%-100%, 70%-100%, 80%-100%, 90%-100%, or 95%-100%. In some embodiments, the symbolic and/or textual indications may present a probability between 0-1 that a potential vehicle defect is present. For example, the presence of any of the following noises may be considered a positive class: vehicle grinding, vehicle whining, and/or vehicle clunking. The absence of any of abnormal vehicle noises was considered a negative class. After training, the model produced a score between 0 and 1, with higher values indicating higher probabilities of abnormal noise.

In some embodiments, labels included in output 1228 may be compared to a user generated label from the user's inspection report of the vehicle. In response to discrepancies between the user's labels and the labels included in output 1228, a request for a follow up inspection may be associated with the audio recording and included in a vehicle condition report. This may cause an inspector to collect additional data (so that the data may be re-analyzed) and/or provide comments on the vehicle condition report indicating agreement or disagreement with the findings, as described herein.

Although in the illustrative embodiment of FIG. 12A, the trained ML model 1205 includes portions for analyzing both audio, vibration, and metadata input, in other embodiments, the trained ML model 1205 may be used and/or trained to operate only on a subset of these data inputs. Indeed, the illustrative example shows five inputs—1D audio input 1202, 2D audio input 1208), 1D vibration input 1204, 2D vibration input 1214, and metadata 1218—and any subset of these inputs may be used in some embodiments. For example, the trained ML model 1205 may operate only on the audio input (1D audio input only, 2D audio input only, or both 1D and 2D audio input) and the vibration input (1D vibration input only, 2D vibration input only, or both 1D and 2D vibration input). As another example, the trained ML model 1205 may operate only on the vibration input (1D vibration input only, 2D vibration input only, or both 1D and 2D vibration input) and the metadata may be used. the trained ML model 1205 may operate only on the vibration input (1D vibration input only, 2D vibration input only, or both 1D and 2D vibration input).

Figure 12B:
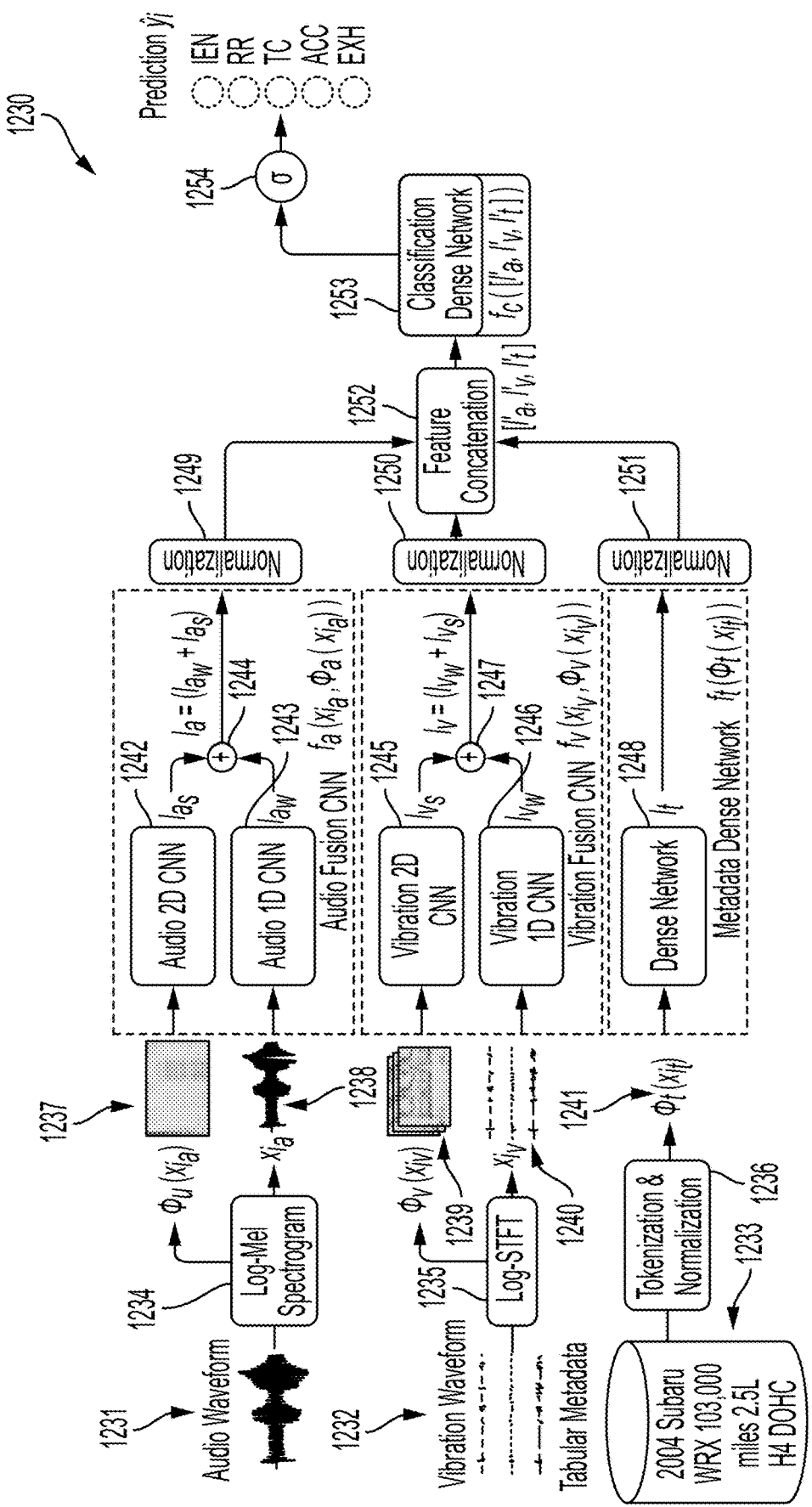
FIG. 12B illustrates an example architecture of the exampled trained ML model shown in FIG. 12A, in accordance with some embodiments of the technology described herein.

FIG. 12B illustrates an example architecture of the example trained ML model shown in FIG. 12A, in accordance with some embodiments of the technology described herein. Trained machine learning model 1230 is configured to detect potential vehicle defects by fusing features extracted from audio, vibration, and metadata processing.

The model is configured to generate features from the waveform 1238 and the 2D representation 1237 of the audio waveform and fuse the generated features before concatenating together with the other generated features for classification.

In some embodiments, 2D representation of the audio waveform 1237 may be generated as a log-Mel spectrogram by a log-Mel spectrogram operation 1234. The log-Mel spectrogram may be any other time-frequency representation of the audio waveform, as described herein.

In some embodiments, an audio waveform 1238 is retained after the log-Mel spectrogram operation 1234 such that the audio waveform 1238 may be processed by the audio fusion convolutional neural network.

The audio fusion convolutional neural network is configured to generate features from the audio waveform 1238 and the 2D representation of the audio waveform 1237 using two separate convolutional neural networks, in accordance with some embodiments. The 2D convolutional neural network 1242 for the 2D representation of the audio waveform 1237 may include repeating 2D convolutional blocks, the blocks including 2D convolutional layers, batch normalization layers, Leaky ReLu non-linear activation layers, and a max pooling layer, in accordance with some embodiments.

As an example, the convolutional block may be repeated four times and the resulting feature response pooled using a global-average-pooling operation into a vector of 1024 elements. Similarly, the 1D Convolutional neural network 1243 may include the same blocks except with 1D convolutional layers rather than 2D convolutional layers. In some embodiments, the first layer of the 1D convolutional neural network may be a learnable parameterized Sinc filter.

After features are generated by both the 1D convolutional neural network and the 2D convolutional neural network, the results may be fused together using element-wise summation by summation operation 1244.

Vibration fusion convolutional neural network may be configured in a similar architecture as the audio fusion convolutional neural network. The vibrational fusion convolutional neural network may be configured to generate features from the vibration waveform 1240 and a 2D representation of the vibration waveform 1239 using two separate convolutional neural networks, in accordance with some embodiments. The respective neural networks may have a repeating block architecture of 1D and 2D convolutional layers, respectively. Additionally, the repeating blocks may include batch normalization layers, LeakyReLU activation layers, and max pooling layers, respectively. For the 1D convolutional neural network 1246 the first layer is a 1D convolutional layer configured to process a 3-channel waveform (e.g., a channel for each of three orthogonal directions such as x, y, and z in a cartesian coordinate plane). The resulting vectors from each of 1D convolutional neural network and 2D convolutional neural network 1234 are 1024 element vectors which are fused together using element-wise summation operation 1247.

In some embodiments, the 2D representation of the vibration waveform 1239 is generated by a log STFT operation 1235 and a vibrational waveform 1232. An unprocessed vibration waveform 1240 may be retained for processing by the vibration fusion convolutional neural network.

Metadata dense network is a dense network 1248 including linear layers configured to extract intermediated features from the tokenized metadata 1241, in accordance with some embodiments. For example, dense network 1248 may be constructed of two repeating blocks of a linear layer, a LeakyReLU activation layer, batch normalization layer, and dropout layer.

In some embodiments, a tokenization and normalization operation may be used prior to processing by the dense network to tokenize vehicle metadata. For example, metadata 1233 may be tokenized by tokenization operation 1236 to generate tokenized metadata 1241 which may subsequently be processing by dense network 1248.

In some embodiments, the feature outputs of each of the audio fusion convolutional neural network, the vibration fusion convolutional neural network, and the metadata dense network are each normalized by normalization operation 1249, 1250, and 1251 respectively to scale each vector to approximately the same range to prevent one from vector from overpowering the others during fusion.

Classification dense network 1253 is used to process the concatenated features from concatenation operation 1252 which concatenates each of the models normalized vectors. In some embodiments, classification dense network 1253 may produce an output 1254 indicative of the presence or absence of a vehicle defect. In some embodiments, classification dense network outputs logits of each engine fault class. The classification dense network may include two linear blocks, each of which includes linear layers, LeakyReLU activation layers, batch normalization layers, and dropout layers followed by a final linear layer that outputs class wise logits.

In some embodiments, a sigmoid activation is included to project the outputs of the classification dense network into class-wise probabilities. In some embodiments, the classes used for training and for classification may be internal engine noise (IEN), rough running engine (RR), timing chain issues (TC), engine accessory issues (ACC), and exhaust noise (EXH).

The IEN class may include noises that originate from the intervals of a vehicle's engine. Two main categories of internal engine noise are ticking and knocking, which may both present as a consistent tapping sound. Ticks may be quieter soft taps that originate from the value train of an engine. Ticks are often considered less severe while knocks are often deeper, louder sounds that originate from the lower internals of the engine and are almost always an indication of severe engine damage.

The RR class may include sounds resulting from the instability in the operation of the engine. This fault encapsulates any abnormal vibrations that are emitted from the engine, often from unstable idles. A rough running engine may have an unstable idle when the engine is unable to maintain a stable rotation rate. In addition, vehicles where accelerations are delayed or slowed are also considered as having a rough running engine.

The TC class may include sounds resulting from timing chain issues. A vehicle that has an issue that has an issue related to its timing chain, often presenting itself as a stretched chain that rattles audibly during a vehicle start. It is important to note that while most vehicles having timing chains, some vehicles instead have timing belts, which do not exhibit these audible faults. However, even though timing belts may not exhibit audible faults, timing chains failure and timing belt failure are each considered serious faults that often precede catastrophic engine damage. In addition, inspectors commonly miss issues with the timing chain or belt.

The ACC class may include sounds related to accessory components on the engine. For example power steering pump whines, serpentine belt squeals, bearing damage, turbocharger issues, and any other anomalous components that are not internal to the engine block.

The EXH class may include sounds related to the exhaust system. Vehicles that have a cracked or damaged exhaust system near the engine often exhibit a noise similar to a tapping noise the engine ticks exhibit. While exhaust noises are considered less severe faults, they are still a commonly missed fault that may require attention.

For training, a collection of vehicle audio recordings and vibration recordings may be divided into training, validation, and evaluation datasets. A vehicle inspector labels the collection of vehicle audio and vibration recordings in accordance with the classes described herein.

As an example of a training process which may be used to train the ML model illustrated in FIGS. 12A and 12B, a data set representing the distribution of types of vehicles sold in the United States is split into three sets (e.g., a training set, a validation set, and an evaluation set) that represent a natural distribution of the types of vehicles in the data set. To achieve the natural distribution, the data set may be split according to time periods of vehicle sales. The validation and evaluation datasets contain all vehicles that were sold on the platform in two separate time periods. The train set contains a sub-set of all vehicles sold, excluding the timer periods in the validation and evaluation sets. Table 14 below shows the number of positive cases of the five engine fault classes in the three datasets, and in addition the number of samples that are considered non-faulty.

TABLE 14

Engine Fault Class Distribution Across Datasets

| Class Counts | Train | Validation | Evaluation |
|---|---|---|---|
| IEN | 16,295 | 3,357 | 3,142 |
| RR | 3,979 | 2,259 | 2,228 |
| TC | 1,902 | 1,123 | 1,046 |
| ACC | 16,668 | 15,291 | 14,602 |
| EXH | 18,126 | 8,117 | 7,611 |
| No Faults (Negative) | 11,426 | 37,206 | 31,711 |

The train dataset includes 45,275 vehicles across 846 different models. The validation and evaluation sets have 59,150 and 52,440 vehicles across 942 and 946 different models, respectively.

The ML models illustrated in FIGS. 12A and/or 12B may be trained with the stochastic gradient descent (SGD) optimizer with a learning rate scheduled by a one-cycle policy. The one-cycle policy starts the optimizer's learning rate at a small value, then anneals it to a maximum learning rate and subsequently anneals it back to a small value over the entire training procedure. A learning rate range test is used to automatically find the maximum learning rate parameter for the learning rate scheduler. During training, all models are trained from 20 epochs with a batch size of 16.

The learning rate test may use learning rate values that are uniformly sampled and used within a single forward pass of the model to find the learning rate which produces the lowest batch-wise loss. The lowest batch-wise loss learning rate divided by a factor of 10 is selected as the optimal learning rate. The test may be run m takes and the median learning rate used to account for any outliers in selected learning rates due to batch stochasticity.

The one-cycle learning rate policy paired with the learning rate range test may perform well across the machine learning models described in connection to FIG. 12B. For example, the maximum learning rate may be 0.027. After each epoch of training, the model may be validated against the validation set. At the end of the training sequence, the trained model is evaluated on the evaluation set at the checkpoint where the model achieved the highest macro-averaged average precision score on the validation set.

In some embodiments, data augmentation may be used to increase size of the training data. For example, additional audio training data may be obtained, for each of one or more audio waveforms, by making changes to the vector representing the audio waveform. For example, the vector may randomly inverted (polarity inversion), shifted in time by a random amount (e.g., with wraparound rotation), and/or random continuous sections of the vector may be set to zero (time masking). As another example, additional audio training data may be obtained, for each of one or more audio waveforms, by making changes to the matrix representing the 2D representation of the waveform (e.g., the normalized matrix representing the log-transformed spectrogram). For example, the matrix may be shifted in time by a random amount (e.g., with wraparound rotation) and/or a random continuous set of rows may be set to zero (frequency masking).

For example, for both audio and vibration, random time shifting which randomly shifts the audio and vibration representation forwards and backwards along the time axis may be used. The samples that are randomly shifted are rolled over (wraparound). For example, if the representation is shifted k samples forward, the last k samples are rolled to the beginning of the representation. The time shifting may be performed on both the waveform and the 2D representations of the waveforms. The waveforms and 2D representations of the waveforms may be shuffled independently, such that the x-y-z orientation of the waveforms may not necessarily align with the 2D representations for a given sample. As the model may be unaware of the accelerometer orientation in relation to a vehicle for a given sample, the shifting of the x-y-z orientations may aid the model in becoming invariant to the orientation. In some embodiments, random time shifting may be also performed to improve invariance towards the variations in the unconstrained nature of the audio recordings. For example, the audio and vibration waveforms may be randomly time shifted up to 95% of the size of each respective waveform. For the 2D representation of the audio waveform, the shifting factor may be randomly selected from a normal distribution with a mean of 100 samples and standard deviation of 400 samples. For the 2D representation of the vibration waveform the shifting factor may be also sampled from a normal distribution with a mean of 10 samples and standard deviation of 40 samples. Each of the shifting factors may be sampled independently such that the waveforms and the 2D representations are shifted by varying degrees, meaning that they are no longer temporally aligned. Such data augmentation techniques may be applied in generating training data for other ML models described herein.

Table 15A and 15B below show the engine fault detection performance when incrementally adding each component of the trained ML model shown in FIGS. 12A and 12B to show each component's respective contribution to the overall performance. Each method depicted in Table 15A and 15B is constructed by removing the other respective feature extractors, while using the same dense classification network (e.g., 1253 in FIG. 12B).

TABLE 15A

Performance Results

| Method | Macro-Average | | Class-Wise ROC AUC | | | | |
|---|---|---|---|---|---|---|---|
| | mROC | mAP | IEN | RR | TC | ACC | EXH |
| Audio Only | 0.716 | 0.269 | 0.8 | 0.700 | 0.69 | 0.66 | 0.74 |
| Vibration Only | 0.627 | 0.188 | 0.600 | 0.73 | 0.6 | 0.59 | 0.61 |
| Audio + Vibration | 0.741 | 0.313 | 0.81 | 0.77 | 0.7 | 0.67 | 0.76 |
| Metadata Only | 0.806 | 0.336 | 0.75 | 0.86 | 0.95 | 0.7 | 0.77 |
| Audio + Vibration + Metadata | 0.844 | 0.454 | 0.85 | 0.88 | 0.95 | 0.73 | 0.81 |

TABLE 15B

Performance Results Continued

| Method | Macro-Average | | Class-Wise AP | | | | |
|---|---|---|---|---|---|---|---|
| | mROC | mAP | IEN | RR | TC | ACC | EXH |
| Audio Only | 0.716 | 0.269 | 0.37 | 0.1 | 0.05 | 0.43 | 0.39 |
| Vibration Only | 0.627 | 0.188 | 0.1 | 0.25 | 0.03 | 0.35 | 0.2 |
| Audio + Vibration | 0.741 | 0.313 | 0.38 | 0.27 | 0.06 | 0.44 | 0.42 |
| Metadata Only | 0.806 | 0.336 | 0.15 | 0.29 | 0.490 | 0.43 | 0.33 |
| Audio + Vibration + Metadata | 0.844 | 0.454 | 0.41 | 0.38 | 0.52 | 0.49 | 0.48 |

As illustrated in Tables 15A and 15B, the fusion of audio, vibration, and metadata features achieved a performance of 0.833 mROC and 0.454 mAP, significantly outperforming any individual components both in terms of mROC and mAP. Looking at each individual component's class-wise-performance, certain modalities become strong classifiers on certain engine fault classes over others. For example, the audio modality is significantly better than any other single modality for capturing IEN, while the vibration modality outperforms audio in capturing RR. One non-limiting explanation for the disparity in performance is because IEN is often diagnosed through audible tapping, while RR often presents itself as a shaking and vibrating engine that is not necessarily audible. When fusing audio and vibration features, the IEN and RR performance outperforms nay individual modality. Although one modality is able to capture mor significant features than the other for a specific engine fault, fusing them together still provides complementary features that improve detection performance.

Tables 15A and 15B also illustrate that audio and vibration modalities perform poorly on the detection of TC, while the metadata information significantly outperforms them. One explanation is that because timing chain issues occur only at the vehicle start for a short duration, they are difficult to detect in the recorded signals. Vehicle engines with timing chains also often have diagnostic sensors that can detect their faults, which are captured in the metadata of the vehicle. However the fusion of all these modalities still improves TC performance over metadata alone, meaning there are still complementary features being learned in the audio and vibration modalities. Further, adding metadata information to audio and vibration improves detection performance across all classes, from which we infer that the information captured in a vehicle's metadata helps uncover various biases towards each of the engine faults that significantly improve performance. While the training dataset discussed and used in the generation of Tables 15A and 15B, training on larger collections of vehicles further may increase ROC and AP performance across all engine faults.

Figure 13:
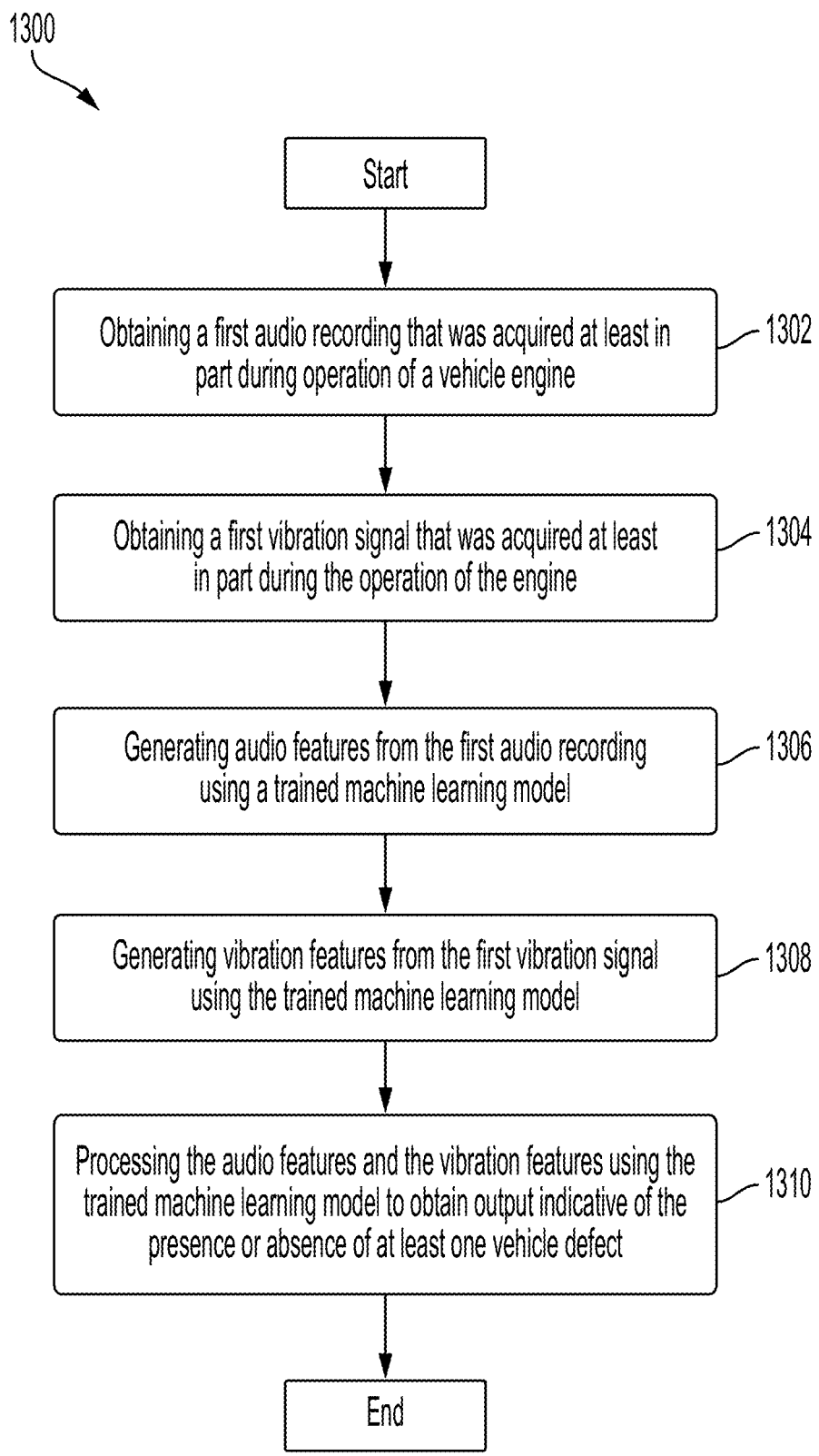
FIG. 13 is a flowchart of an illustrative process for detecting presence of vehicle defects from audio and vibration acquired at least in part during operation of an engine of a vehicle, for example using the example trained model of FIG. 12A or FIG. 12B, in accordance with some embodiments of the technology described herein.

FIG. 13 is a flowchart of an illustrative process 1300 for detecting presence of vehicle defects from audio and vibration acquired at least in part during operation of an engine of a vehicle, for example using the example trained model of FIG. 12A or FIG. 12B, in accordance with some embodiments of the technology described herein. Process 1300 may be executed by any suitable computing device(s). For example, process 1300 may be executed by an MVDD (e.g., MVDD 104), a mobile device (e.g., mobile device 108), a server or servers (e.g., server(s) 129), or any other suitable computing device(s) including any of the devices described herein including with reference to FIG. 1A.

Process 1300 starts at act 1302, by obtaining a first audio recording that was acquired at least in part during operation of a vehicle engine, in accordance with some embodiments of the technology described herein. The first audio recording may have been acquired by at least one acoustic sensor. The acoustic sensor(s) may be part of an MVDD used to inspect the vehicle.

In some embodiments, the at least one acoustic sensor acquires the first audio recording at least in part during the operation of a vehicle engine. The operation of a vehicle engine may include a number of engine operations, including ambient sounds prior to start up, start-up sounds, idle sounds, load sounds, and engine shut off sounds. Accordingly, in some embodiments, the first audio recording may begin prior to start-up and include at least an engine start-up operation. In some embodiments, the first audio recording may end at or soon after engine shut off. In some embodiments, the first audio recording may exclusively include vehicle engine noise including one or more engine operations.

Next, process 1300 proceeds to act 1304, where a first vibration signal that was acquired at least in part during the operation of the engine is obtained, in accordance with some embodiments of the technology described herein. The first vibration signal may have been acquired by at least one vibration sensor. The at least one vibration sensor may be part of an MVDD used to inspect the vehicle.

In some embodiments, the at least one vibration sensor acquires the first vibration signal concurrently (e.g., simultaneously with) acquiring the at least one acoustic sensor acquiring the first audio recording. The first vibration signal and the first audio recording may be acquired concurrently such that they each acquire data of the same number of engine operations.

Next, process 1300 proceeds to act 1306, where audio features from the first audio recording obtained at act 1302 are generated. In some embodiments, generating the audio features comprises generating an audio waveform from the audio recording and generating a 2D representation of the audio waveform.

The audio waveform may be the audio recording or may be generated from the audio recording by pre-processing the audio recording in any of the ways described herein. For example, the first audio recording may comprise multiple channels and the audio waveform may be generated from a waveform selected from one of the multiple channels or from a waveform obtained by combining waveforms in different channels. Additionally or alternatively, generating the audio waveform may comprise pre-processing the audio recording (by resampling, normalizing, changing duration of, filtering, and/or clipping the first audio recording). For example, in some embodiments, generating the audio waveform comprises: (1) resampling the first waveform to a target frequency (e.g., 22.05 kHz) to obtain a resampled waveform; (2) normalizing the resampled waveform by subtracting its mean and dividing by its standard deviation to obtain a normalized waveform; and (3) clipping the normalized waveform to a target maximum to obtain the audio waveform. In one example, the audio waveform is cropped or zero-padded to 30 seconds, in which case the length of the audio waveform is 1,661,500 samples (when the target sampling rate is 22.05 kHz).

The audio features may also include a 2D representation of the audio waveform generated from the audio waveform. Generating the 2D representation may comprise generating a time-frequency representation of the audio waveform using a short-time Fourier transform, a wavelet transform, a Gabor transform, a chirplet transform, and/or any other suitable time-frequency transform to generate the time-frequency representation. In some embodiments, generating the time-frequency representation of the audio waveform comprises generating a Mel-scale spectrogram from the audio waveform. For example, a log-scaled Mel-spectrogram may be generated using an FFT window of 1024 units, a hop length of 512 units, and 256 Mel-frequency bins. In this example, the resulting shape of the Mel-spectrogram is (256, 1292).

Next, process 1300 proceeds to act 1308, where vibration features are generated from the vibration signal obtained at act 1304. In some embodiments, generating the vibration features comprises generating a vibration waveform from the vibration signal and generating a 2D representation of the vibration signal.

In some embodiments, the vibration waveform may be the vibration signal or may be generated from the vibration signal by preprocessing the vibration signal. For example, the vibration signal may comprise multiple channels and the vibration waveform may be generated from a waveform selected from one of the multiple channels or from a waveform obtained by combining waveforms in different channels. Additionally or alternatively, generating the vibration waveform may comprise pre-processing the vibration signal (by resampling, normalizing, changing duration of, filtering, and/or clipping the vibration signal). For example, in some embodiments, generating the vibration waveform comprises: (1) resampling the vibration signal to a target frequency (e.g., 100 Hz) to obtain a resampled waveform; (2) normalizing the resampled waveform to a range of 0-1; and (3) clipping the normalized waveform to a target maximum to obtain the vibration waveform. In one example, the vibration waveform is cropped or zero-padded to 30 seconds, in which case the length of the vibration waveform is 3000 samples (when the target sampling rate is 100 Hz).

The vibration features may also include a 2D representation of the vibration waveform generated from the vibration waveform. Generating the 2D representation may comprise generating a time-frequency representation of the vibration waveform using a short-time Fourier transform, a wavelet transform, a Gabor transform, a chirplet transform, and/or any other suitable time-frequency transform to generate the time-frequency representation. In some embodiments, generating the time-frequency representation of the audio waveform comprises generating a linear log-scale spectrogram of the vibration waveform. The Mel scale is not used because at the lower frequencies (as compared to audio frequencies) of the vibration signals, the Mel scale does not appear to carry any significant meaning. In one example, an FFT window of 256 units, a hop length of 32, and a linear scale of 128 frequency bins may be used. In this example, the resulting shape of the linear log spectrogram is (128, 294) per channel. The log spectrogram may be normalized by subtracting its mean and dividing by its standard deviation.

Next, process 1300 proceeds to act 1310 where the audio features and the vibration features are processed using a trained machine learning model (e.g., the model shown in FIGS. 12A and/or 12B) to obtain output indicative of the presence or absence of at least one vehicle defect. Following the conclusion of act 1310, process 1300 ends. Following the end of process 1300 the output indicative of the presence or absence of the at least one vehicle defect may be used to generate a vehicle condition report, as described herein.

Process 1300 is illustrative and that there are variations. For example, although in the illustrated embodiment of FIG. 13, only audio and vibration data is obtained and processed by the trained ML model at act 1310, in other embodiments, the process further includes obtaining metadata containing information about the vehicle (examples of metadata are provided herein), generating metadata features from the metadata (e.g., by generating a numeric representation of the metadata, as described herein) and processing features derived from the audio and the metadata with the trained ML to obtain the output indicative of the presence or absence of the at least one vehicle defect.

Figure 14:
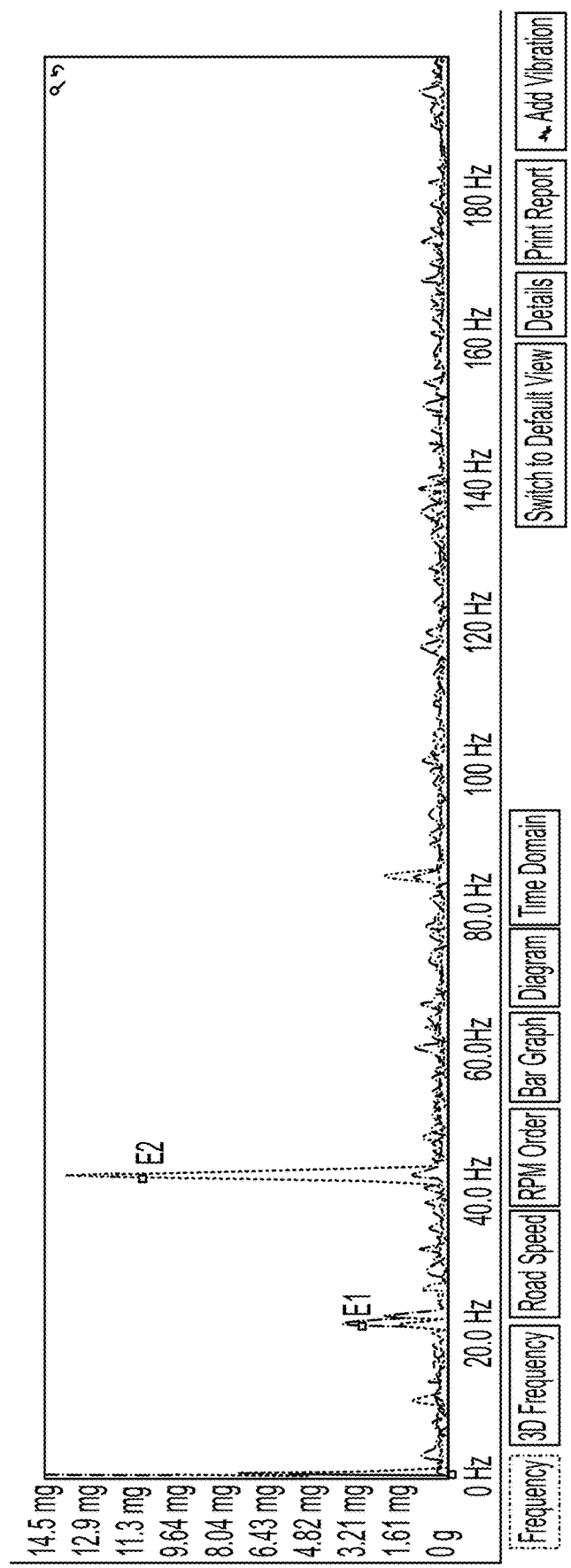
FIG. 14 is a diagram illustrating the presence of features indicative of one or more vehicle defects in the frequency content of vibration data that may be gathered by a vibration sensor of a mobile vehicle diagnostic device (MVDD), in accordance with some embodiments of the technology described herein.

FIG. 14 is a diagram illustrating the presence of features indicative of one or more vehicle defects in the frequency content of vibration data that may be gathered by a vibration sensor of a mobile vehicle diagnostic device (MVDD), in accordance with some embodiments of the technology described herein. As shown in FIG. 14, there is interesting frequency content in the 0-200 Hz range that may be captured including peaks at 20-25 Hz, 40-45 Hz, and 80-85 Hz. Such peaks may be indicative of engine misfire events. The peaks shown may represent first, second, and/or higher-order vibrations due to a vehicle defect (e.g., a misfire). Notably, frequency content indicative of a potential defect or defects is present in the 0-50 Hz range, which demonstrates the advantage of having a vibration sensor in the MVDD.

Figure 15A:
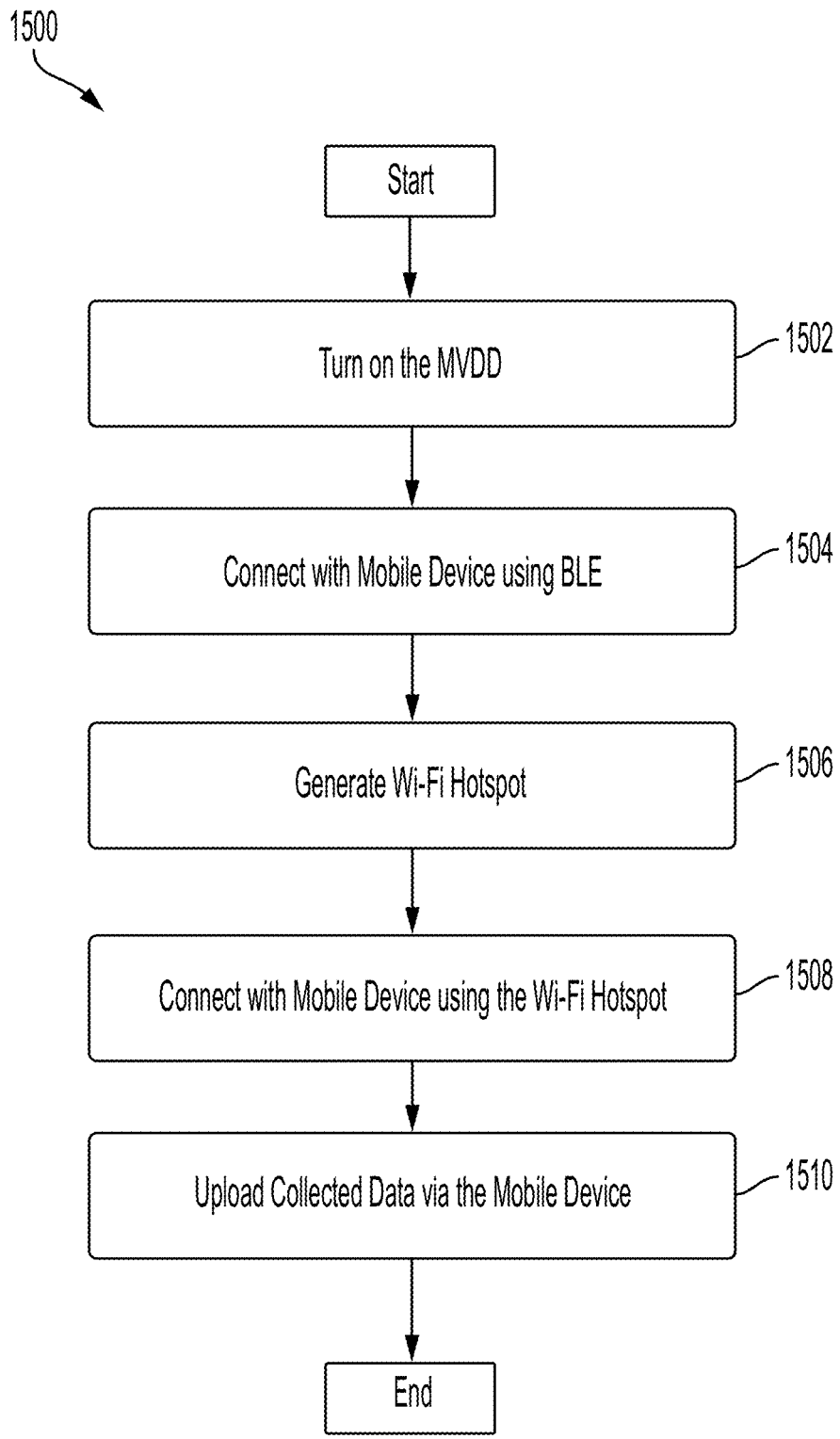
FIG. 15A is a flowchart of an illustrative process for connecting an MVDD with a mobile device to upload data collected by the MVDD, in accordance with some embodiments of the technology described herein.

FIG. 15A is a flowchart of an illustrative process 1500 for connecting an MVDD with a mobile device (e.g., mobile device 108) to upload data collected by the MVDD, in accordance with some embodiments of the technology described herein. The example process 1500 includes acts 1502, 1504, 1506, 1508, and 1510.

Process 1500 begins at act 1502, which involves turning on the MVDD. The MVDD may be turned on by pressing a power switch on the MVDD. In some examples, a button (e.g., a push button) may be used to turn on the MVDD. Additionally or alternatively, the MVDD may be turned on by voice command (e.g., a "wake-up" word) in a manner similar to how voice assistants may be turned on.

Next, process 1500 proceeds to act 1504, where the MVDD and the mobile device are communicatively coupled, for example, by being connected using a Bluetooth low energy (BLE) link or using any other suitable communication interface and/or protocol, examples of which are provided herein. To this end, in some embodiments, the user of the mobile device (e.g., a vehicle inspector) uses a software application on the mobile device to make a selection to initiate the pairing process. After the mobile device receives a pairing message from the MVDD, that message may be presented to the user and the user may provide one or more inputs to complete the pairing process. In some embodiments, the initial pairing process is only performed the first time an MVDD is connected to a mobile computing device and the MVDD and mobile device are automatically paired in the future.

In some embodiments, after the devices are paired, the MVDD may generate a Wi-Fi hotspot at act 1506. The mobile device may connect to the Wi-Fi hotspot at act 1508. The Wi-Fi hotspot may be used for providing data from the MVDD to the mobile device. The data may be provided after its collection has been completed or as it is being collected. For example, the Wi-Fi hotspot may allow for streaming data to the mobile device as it is being collected, for example, to provide the user with live feedback.

Next, at act 1510, the mobile device may upload the data to one or more remote computers (e.g., server(s) 129) via a cellular network or a Wi-Fi network. In some embodiments, the mobile device waits for the data transmission to complete before using the Wi-Fi or cellular connection to upload the data received from the MVDD to one or more other devices. Other local wireless technologies or wired technologies may be used in alternative embodiments. In some embodiments, the data may be uploaded to a server for post-processing and may be analyzed using one or more trained ML models. In some examples, this data is provided to a server useable for generating condition reports for vehicles.

Accordingly, in some embodiments, a combination of various wireless technologies may be used. For example, Bluetooth may be used to pair a mobile device (e.g., mobile device 108) with the MVDD, Wi-Fi may be used to transmit data from the MVDD to the mobile device, and cellular (and/or Wi-Fi) may be used to transmit data from the mobile device to one or more remote computers (e.g., server(s) 129).

Figure 15B:
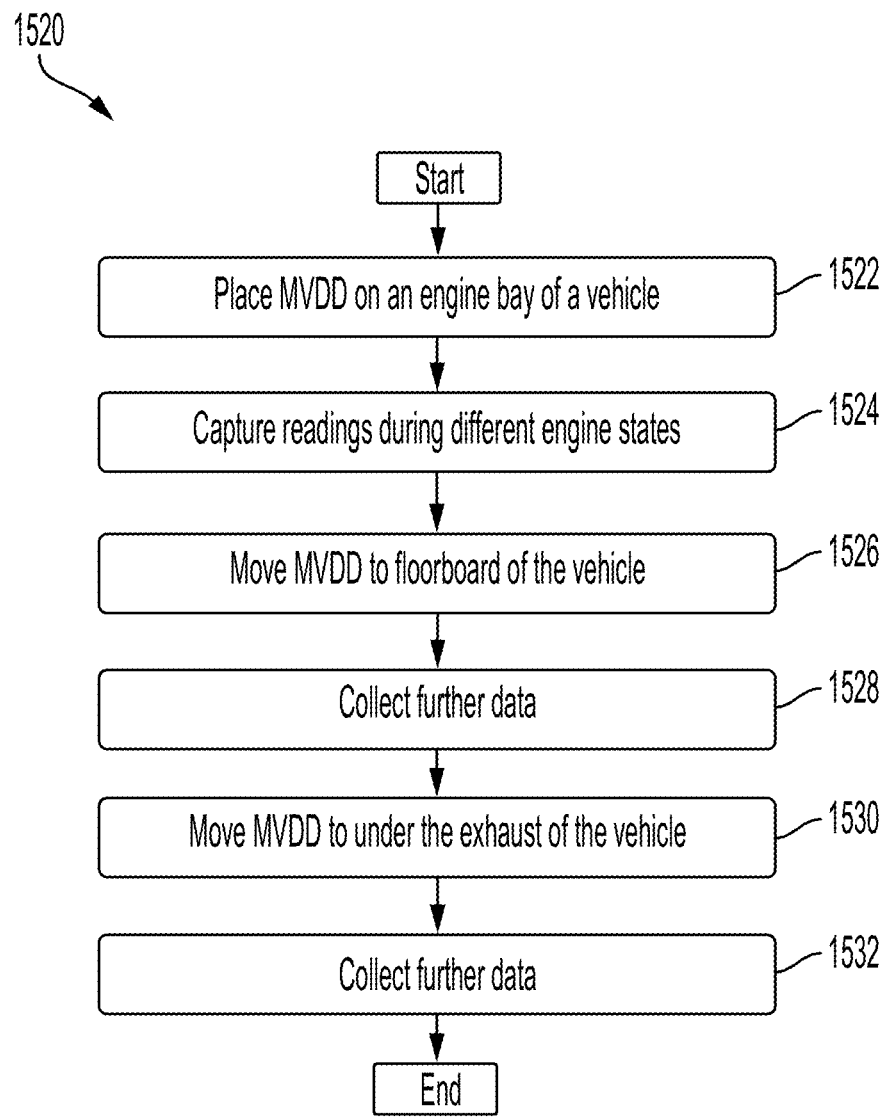
FIG. 15B is a flowchart of an illustrative process for performing guided tests for inspecting a vehicle with the MVDD, in accordance with some embodiments of the technology described herein.

FIG. 15B is a flowchart of an illustrative process 1520 for performing guided tests for inspecting a vehicle with an MVDD, in accordance with some embodiments of the technology described herein. The illustrative process 1520 includes acts 1522, 1524, 1526, 1528, 1530, and 1532.

In some embodiments, process 1520 begins at act 1522, where the MVDD is placed in, on, or proximate an engine of a vehicle. In some embodiments, prior to being placed, the MVDD may be turned on and communicatively coupled to a user's mobile device (e.g., as described herein including with reference to FIG. 15A).

Figure 22:
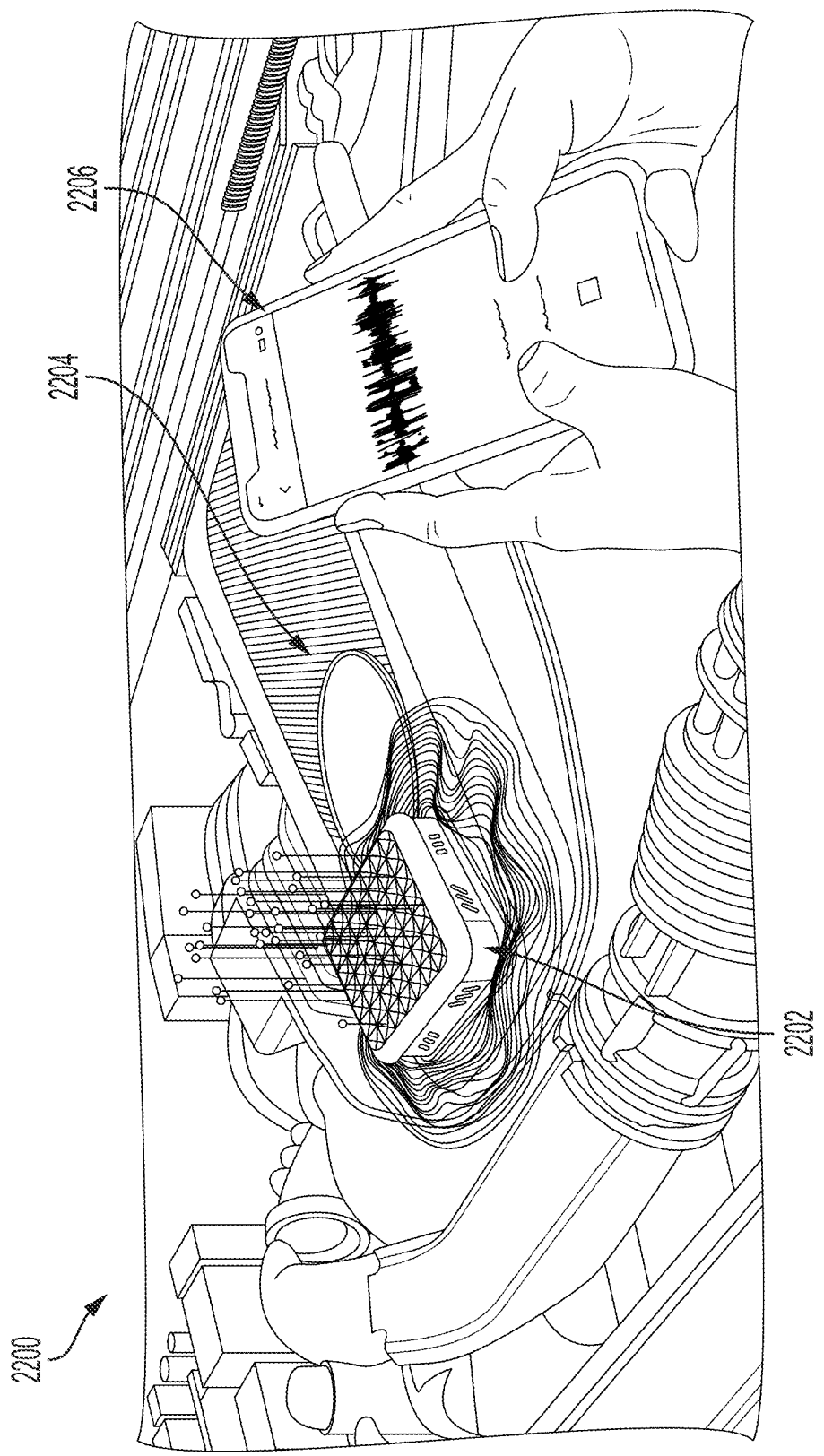
FIG. 22 illustrates an example process for acquiring data about the vehicle while it is in operation, in accordance with some embodiments of the technology described herein.

In some embodiments, the MVDD may be placed on an engine of the vehicle, in the engine bay of the vehicle, on the engine cover (e.g., as shown in FIG. 22), on top of the hood of the vehicle, underneath the vehicle, near the vehicle, and/or in any other suitable location from which the MVDD may be able to acquire data using one or more of its sensors.

In some embodiments, the MVDD may be placed such that the MVDD is mechanically coupled to the engine, as described herein. In some embodiments, the MVDD may be attached to a component in the engine bay. For example, a mount may be attached to the MVDD with a screw or bolt inserted into a threaded hole on the MVDD. The MVDD and the mount may be used to mount the MVDD in the engine bay. In some embodiments, the MVDD may be attached to a component in the engine bay by clipping the MVDD to a component in the engine bay. For example, the MVDD may be clipped to a component in the engine bay by placing a carabiner through a loop on the MVDD and then attaching the carabiner to a component in the engine bay.

Next, at act 1524, the MVDD may capture data using one or more of its sensors during different engine operations. Examples of engine operations include an engine start, an idle period, an engine rev, and an engine stop. Various combinations of the above operations and/or any other engine operations may be used. For example, a user may wish to collect multiple engine revs to improve the detection of possible engine issues.

Next, at act 1526, the MVDD may be moved to a floorboard of the vehicle. In other embodiments, the act 1526 moves the MVDD to the dashboard of the vehicle or another location inside the cabin of the vehicle. In alternative embodiments, at act 1526 the MVDD may be secured to the engine so a user may take the car on a test drive with the MVDD attached. The MVDD may be secured to the engine by mounting or clipping the MVDD to the vehicle.

Next, at act 1528, further data is collected by the MVDD at its new location to which it was placed at act 1526.

Next, at act 1530, the MVDD may be placed underneath the vehicle (e.g., proximate the exhaust). Next, the data collected is by the MVDD at its location underneath the vehicle.

In some embodiments, as in the example of FIG. 15B, the MVDD may be used to collect data at multiple locations during vehicle inspection. However, an MVDD may be used to collect data only at one location (e.g., only on or near the engine), two locations (e.g., on or near the engine and on or near the exhaust), four locations, and/or any suitable number of locations. Regardless of the number of locations, at each location, the MVDD may collect data during a sequence of one or more engine states and the user performing the inspection may be guided (e.g., by the software on their mobile device) to position the MVDD at the location(s) and take the vehicle engine through the respective sequences of engine states. The sequences of engine states may depend on the location of the MVDD, in some embodiments, or may be the same sequence, in other embodiments.

Figure 15C:
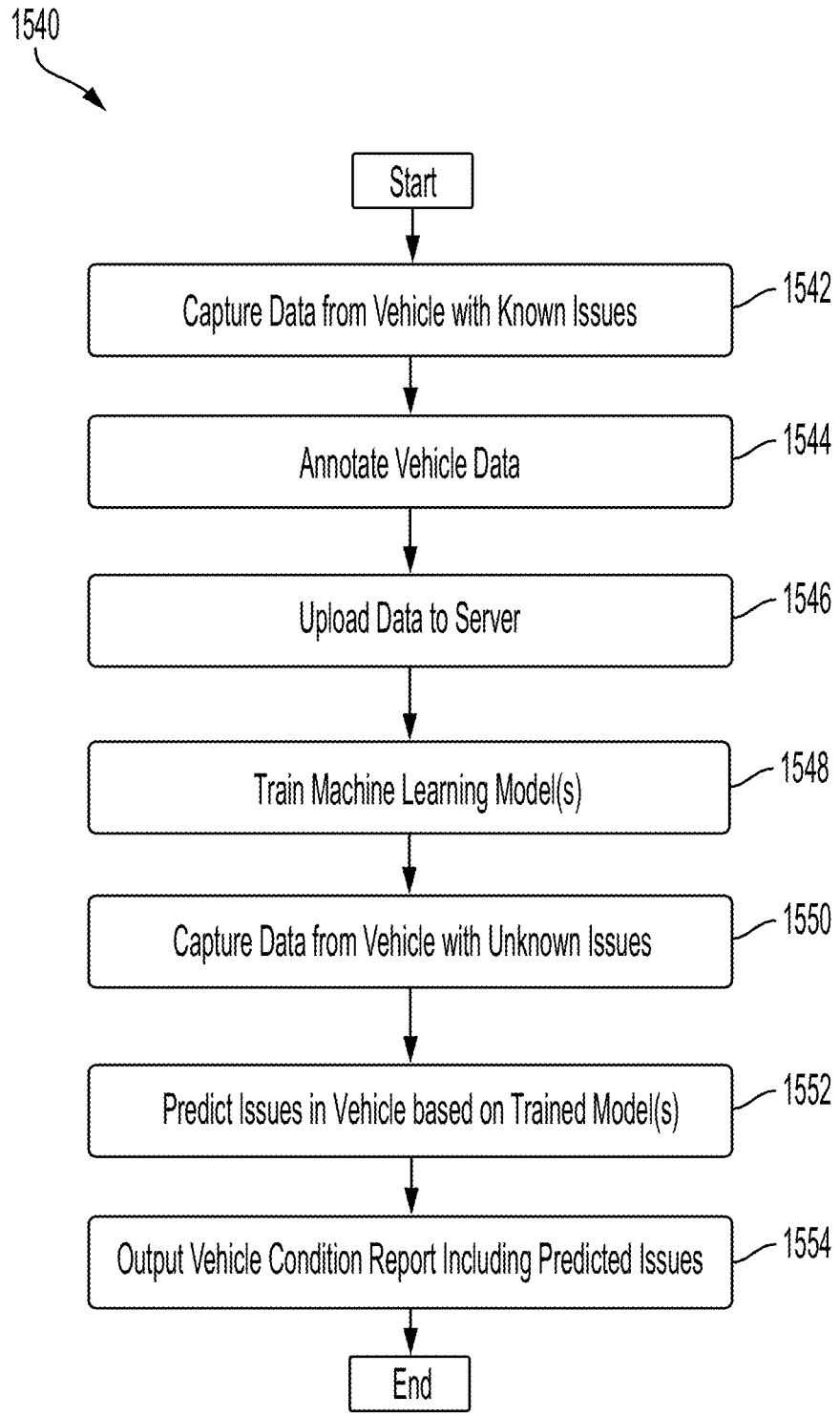
FIG. 15C is a flowchart of an illustrative process for performing guided tests for obtaining vehicle data, training a ML model, and producing a vehicle condition report, in accordance with some embodiments of the technology described herein.

FIG. 15C is a flowchart of an illustrative process 1540 for performing guided tests for obtaining vehicle data, training an ML model, and producing a vehicle condition report, in accordance with some embodiments of the technology described herein. In the illustrative example shown in FIG. 15C, process 1540 includes act 1542 where vehicle data is captured from a vehicle with known defects, act 1544 where vehicle data is annotated with the known defects, act 1546 where annotated vehicle data is uploaded to a server, act 1548 where the uploaded vehicle data is used to train at least one ML model, act 1550 where new vehicle data is captured from vehicles with unknown defects, act 1552 where the at least one ML model is used to predict defects in the vehicle with unknown defects by analyzing the new vehicle data, and act 1554 where the predicted defects are output as a vehicle condition report.

At act 1542, a user captures data from a vehicle with known defects. For example, an engine may have a known problem such as cylinder misfire. In some embodiments, vehicle data such as audio data and engine vibration data may be recorded by the user's mobile device or a separate device, such as an MVDD. Then, engine data streams, such as rpms, voltage, and system temperature, may be obtained from the OBDII port by the user's mobile device or the MVDD. Vehicle identification information may also be captured through the OBDII port.

At act 1542, the captured vehicle data is annotated with tags that signify known defects. In some embodiments, user and/or diagnostic trouble codes (DTC) may be used to tag the data with known defects. When the user tags the data with known defects, the data then is ready to be uploaded. The tags facilitate processing the vehicle data and subsequently using the vehicle data to train models.

At act 1546, the annotated data is then uploaded to a server over a network, as described herein. In some embodiments, the server may receive the annotated vehicle data and begin processing. In some embodiments, it is possible that the data does not need to be uploaded to the server for processing but may be processed at the user's mobile device.

Next, at act 1548, the annotated data is used to train the at least one machine learning model at the server. Examples of such ML models are described herein.

In some embodiments, a library of models may be developed such that models which have been trained for detecting specific vehicle defects may each be specialized for the detection of their respective defects and/or specialized for the detection of defects of a specific make and model of vehicle. Accordingly, by generating a library of models with thousands of models for different vehicles with known defects, the system may begin to predict the possible defects with a level of certainty. In some embodiments, it may be possible to predict the vehicle make, model, and year with the audio data, vibration data, and OBDII data.

Next at act 1550, after the models are generated and trained using machine learning, the user may capture new data from a vehicle with unknown defects. The user may use a user's mobile device and/or an MVDD to record audio data and engine vibration data. Then the user's mobile device or the MVDD may receive engine data streams from the OBDII data port. In some embodiments, all captured data may be uploaded to the server for processing.

At act 1552, at least one ML model is used to predict defects in the vehicle with unknown defects by analyzing the new vehicle data. For example, by applying an ML model to the collected audio data, vibration data, and/or OBDII data, the presence of possible defects may be predicted at act 1552.

At act 1554, after processing, a vehicle condition report is generated. The vehicle condition report may include possible vehicle defects along with a level of certainty. In some embodiments, graphs of vehicle audio frequency as a function of time as well as a graph of the engine vibration frequency may be included in the report. In some embodiments, OBDII sensor codes may be included in the report.

As described herein, the inventors have developed a mobile vehicle diagnostic device (MVDD) which may be used to acquire sensor data for use with a vehicle diagnostic system (e.g., vehicle diagnostic system 100) to detect the potential presence or absence of vehicle defects.

As described herein, a vehicle diagnostic system may analyze audio recordings in connection with determining if sounds associated with the presence or absence of a vehicle defect may be present during the operation of a vehicle. The inventors have recognized and appreciated that some techniques described herein may benefit from the inclusion of two or more microphones. For such techniques, devices including multiple microphones may provide advantages over single microphone devices by using and/or comparing multiple auditory inputs during processing and/or analysis. For example, the microphones (together with one or more other components, like processors and/or software) may be configured to perform noise cancelation and/or a comparison of audio detected by the respective microphones. As another example, the multiple microphones may be positioned and orientated relative to each other such as to improve the sensitivity of individual microphones to frequencies received from different directions for the acquisition of stereo audio. As another example, an MVDD may determine which microphone is facing away from the engine and use that microphone to remove background noise. Despite some techniques benefiting from the use of a multi-microphone device, the techniques described herein are not limited to requiring multiple microphones be used to acquiring audio recordings unless otherwise stated. Example sensors which may be included in an MVDD are described herein including in connection with FIG. 16A.

Figure 16A:
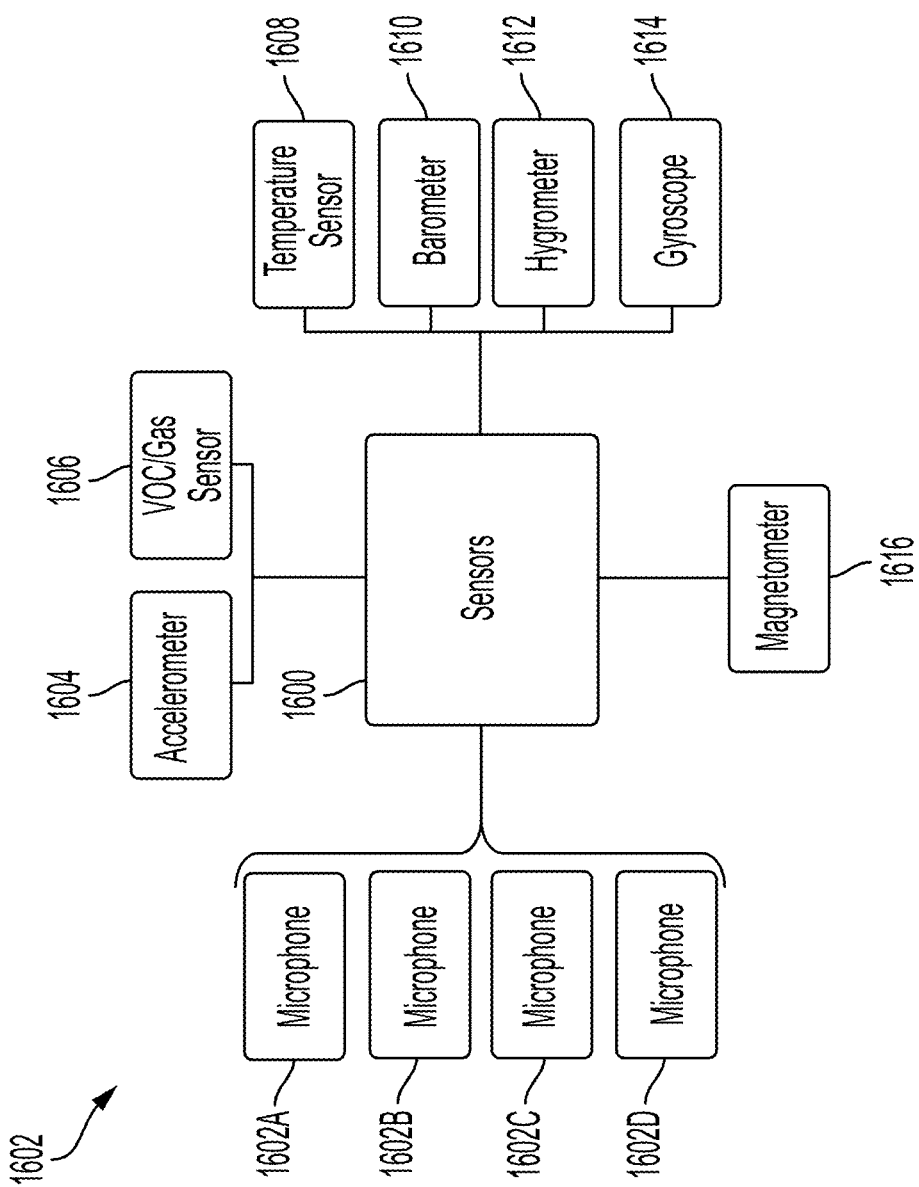
FIG. 16A illustrates example sensors of a mobile vehicle diagnostic device, in accordance with some embodiments of the technology described herein.

FIG. 16A illustrates example sensors of a mobile vehicle diagnostic device (MVDD), in accordance with some embodiments of the technology described herein. In the illustrative example of FIG. 16A, mobile vehicle diagnostic device sensors 1600 comprise acoustic sensor(s) 1602, accelerometer 1604, volatile organic compounds (VOC)/gas sensor 1606, temperature sensor 1608, barometer 1610, hygrometer 1612, gyroscope 1614, and magnetometer 1616. Any suitable number of any of the foregoing sensors may be part of the MVDD in some embodiments, and, for example, one or more of each of these types of sensors may be used. Any or all of the sensors described herein may be used in connection with any suitable vehicle defect detection system, such as those which use machine learning models to detect the potential presence or absence of vehicle defects.

As illustrated in FIG. 16A, acoustic sensors(s) 1602 may be implemented using multiple microphones, such as microphone 1602A, 1602B, 1602C, and 1602D. Microphones 1602A-1602D may all be implemented as the same type of microphone (e.g., use the same diaphragm design), in accordance with some embodiments. For example, microphones 1602A-1602D may each be a piezoelectric microphone, or any other type of microphone described herein as aspects of the technology described herein are not limited in this respect.

Additionally, although sensor 1600 is illustrated as including four microphones, aspects of the technology described herein are not limited in this respect. Mobile vehicle diagnostic device sensors 1600 may include any suitable number of microphones. In some embodiments, sensors 1600 may include 2, 3, 4, 5, 6, 8 or more than 8 microphones. In other embodiments, sensors 1600 may include a single microphone.

In some embodiments, acoustic sensor(s) 1602 may be configured such that each of microphones 1602A-1602D has the same sensitivity. Accordingly, sensors 1600 may include microphones configured to be responsive to audio received from different directions. For example, each microphone may be configured on a different side of a device, such that each microphone is responsive to audio received on the respective side of the device which it is configured. In some embodiments, the microphones may be oriented in different respective directions. A pair of microphones may be oriented in respective first and second directions. The first and second directions may be at least a threshold number of degrees apart (e.g., at least 15, 20, 25, 30, 35, 40, 45, 50, 75, 90, 105, 120, 135, 150, 165, and 180 degrees apart). In this way, the microphone array provides a diversity of orientations, which facilitates collecting audio data from a diversity of angles ensuring that any problematic sounds are detected regardless of the component(s) that generated them. In some implementations (e.g., with a microphone on each side), this may also simplify use of the MVDD because an inspector need not mind the orientation in which they place the MVDD on or near the vehicle, as the diversity of orientations of microphones in the MVDD will ensure that at least one microphone will be oriented toward the engine.

Additionally, or alternatively, one or more acoustic sensor(s) may be configured to be responsive to audio received from a same direction. For example, two microphones may be configured on a shared side of device 1600 such that they are responsive to audio received on the shared side of the device. This may facilitate beamforming.

In some embodiments, acoustic sensor(s) 1602 may be implemented as any suitable type of microphone such as a condenser microphone (e.g., DC-based condenser, RF condenser, electret condenser, etc.), a dynamic microphone (e.g., a moving coil microphone), a ribbon microphone, a carbon microphone, a piezoelectric microphone, a fiber-optic microphone, a laser microphone, and/or a microelectromechanical systems (MEMS) microphone.

In some embodiments, the acoustic sensor(s) may be used to record audio of one or multiple potential vehicle defects which may occur at different frequencies. Accordingly, in some embodiments, acoustic sensor(s) 1602 may be configured to detect frequencies over a wide bandwidth. In some embodiments, acoustic sensor(s) 1602 may be configured to detect frequencies with a bandwidth from 20 Hz to 20 kHz, 32 Hz to 80 kHz, 32 Hz to 80 kHz, 20 Hz to 80 kHz, 16 Hz to 100 kHz, 8 Hz to 120 kHz, or 2 Hz to 140 kHz.

In some embodiments, acoustic sensor(s) 1602 may be configured to record audio at a sampling rate of approximately 4 kHz, approximately 8 kHz, approximately 22 kHz, approximately 44 kHz, approximately 48 kHz, approximately 96 kHz, approximately 192 kHz, or approximately 256 kHz. In some embodiments, acoustic sensor(s) 1602 may be configured to record audio at a sampling rate between 4 kHz and 256 kHz. In some embodiments, acoustic sensor(s) 1602 may be configured to record audio at a sampling rate greater than 256 kHz.

In some embodiments, the acoustic sensor(s) may be configured to record audio of different potential vehicle defects which may occur at different volumes. Accordingly, in some embodiments, the acoustic sensor(s) 1602 may be configured to capture audio with sensitivity at both loud and quiet volumes. For example, the microphones may be configured to acquire audio with a sensitivity from 50 dB to 80 dB, 40 dB to 100 dB, 36 dB to 132 dB, or 30 dB to 150 dB.

In some embodiments, acoustic sensor(s) 1602 may be configured such that one or more of microphones 1602A-1602D have a different sensitivity than the other(s). When configured with different sensitivities, different microphones may be more sensitive to particular frequencies relative to the other microphones. Accordingly, in some embodiments, the different sensitivities of the microphones may be used to acquire audio of different volumes which may then be processed together or separately to detect potential vehicle defects which may result in sounds at different volumes.

In some embodiments, the housing around the microphone may be shaped to focus particular frequencies onto the diaphragm. Accordingly, although the same type of microphone may be used for microphones 1602A-1602D, the housing around one or more of the microphones may be shaped differently such as to produce different auditory sensitivities for one or more of the microphones.

Alternatively, microphones 1602A-1602D may be implemented as a combination of one or more different types of acoustic sensors. For example, at least one of microphones 1602A-1602D may use an acoustic sensor which is implemented using a different sensor architecture for detecting sounds, such as any of the microphone types described herein.

In some embodiments, the sensors 1600 may be configured for acquiring sensor measurements of non-internal combustion engine vehicles (e.g., electric vehicles). Frequencies in the ultrasonic range (i.e., frequencies greater than 20 kHz) may be used for determining some defects associated with electric vehicles. Therefore, in some embodiments, the sensors may be configured to acquire ultrasonic frequencies for use with determining defects which may be particular to electric vehicles.

Accelerometer 1604 may be used as a vibrational sensor, in accordance with some embodiments of the technology described herein. Accelerometer 1604 may be configured to detect frequencies in a vibrational frequency range from 50 Hz to 100 Hz, 25 Hz to 200 Hz, 10 Hz, to 300 Hz, 1 Hz to 350 Hz, and 0 to 800 Hz. The vibration signals described herein as being analyzed using trained ML models may be obtained using accelerometer 1604.

In some embodiments, accelerometer 1604 may be configured to operate with a sampling rate sufficient to detect frequencies across the full vibration frequency range. For example, accelerometer 1604 may be configured to operate with a sampling rate of 10 Hz, 50 Hz, 100 Hz, 400 Hz, 600 Hz, or 700 Hz. In some embodiments, accelerometer 1604 may be configured to operate with a sampling rate greater than 700 Hz.

The sensors 1600 may include odor/gas sensors to detect gas emissions, in accordance with some embodiments. In some embodiments, the VOC/Gas sensor 1606 may be a total VOC sensor, which is configured to detect the concentrations of a collection of gasses (e.g., alcohols and CO2) that are in the surrounding air. For example, the VOC/Gas sensor 1606, may be used to detect gas emissions in the engine bay and/or within the vehicle interior. As another example, VOC/Gas sensor 1606 may be used to detect smoke. In some embodiments, VOC/Gas sensor 1606 may be sensitive to detecting the presence of specific gasses and/or particulates without detecting specific concentrations.

In some embodiments, the VOC/gas sensor 1606 may be used to detect localized levels of the collection of gasses. For example, the VOC/gas sensor may sample multiple times during different vehicle states (e.g., during revs, idle, while moving, etc.). The multiple samples may be used to detect when exhaust is leaking from the exhaust manifold. For example, when detecting increased concentrations of NO2 which are higher than during normal operation, the mobile vehicle diagnostic device may determine the exhaust manifold is damaged or defective.

In some embodiments, the VOC/Gas sensor readings may be used to orient the device at the correct spot. For example, the readings from the VOC/Gas sensor may be used to determine when the mobile vehicle diagnostic device is placed too far or too close to the exhaust manifold. In some of these examples, an indicator light flashes to notify a user to move the MVDD.

Temperature sensor 1608, barometer 1610, and hygrometer 1612 may be used to determine ambient conditions, in accordance with some embodiments of the technology described herein. Ambient conditions may affect the electronic components, batteries, gaskets, thermal transfer, and other components of the vehicle. Accordingly, the ambient conditions may affect the extent to which sound and/or vibration signals may vary across vehicles or measurement instances.

In some embodiments, a defect of the vehicle itself may cause the ambient conditions around the device to change from the ambient conditions of the environment. Accordingly, the detected ambient conditions may be compared to a weather application to determine if the vehicle is skewing the measured readings. For example, the measured readings may be compared to a weather application on a connected mobile device to determine if the engine may be skewing the measured readings. As another example, the measured readings may be stored and then compared with weather records at a later time to determine if the engine may have been skewing the measured readings.

Gyroscope 1614 may be included to augment the data collected by the accelerometer, in accordance with some embodiments. Gyroscope 1614 can measure angular acceleration. Therefore, in some embodiments, the gyroscope may be used to measure pitch and roll of the vehicle component upon which the sensors are positioned. In some embodiments, gyroscope 1614 may be used for orienting the device in the engine bay. In some embodiments, gyroscope 1614 may be used to detect when there is significant teetering of the device (e.g., change in orientation) which could be indicative of a corresponding teetering motion of the engine when it is revved. For example, the gyroscope may be used to measure the relative vibration dampening of the internal engine mounts.

Magnetometer 1616 may be included to detect an EM field of the vehicle, in accordance with some embodiments. The magnetometer 1616 may be sensitive to the magnetic field produced by the vehicle components either at rest or while moving. In some embodiments, magnetometer 1616 may be used to determine the change in direction and intensity of the magnetic fields that the vehicle and/or components of the vehicle produce during various phases of operation and/or at rest.

In some embodiments, the magnetometer 1616 may be used to measure the electromagnetic interference (EMI) and/or electromagnetic radiation (EMR) associated with changes and fluctuations in the localized magnetic field. Therefore, using data acquired using magnetometer 1616, changes in the magnetic properties of the vehicle may be detected. For example, electromagnetic field data may be used to detect abnormal amounts of rust on a vehicle. As another example, electromagnetic field data may be used to detect dimensions of a vehicle.

In some embodiments, variations between the signals produced by magnetometer 1616 and expected signals for a particular vehicle based on the magnetic properties of its stock components may indicate the presence of an additional and/or missing vehicle component. For example, signals produced by magnetometer 1600 may be used to determine if an aftermarket modification, or foreign item (e.g., an explosive) are installed in the vehicle. In some examples, electromagnetic field data may be used to determine when the engine's spark plug is misfiring.

In some embodiments, an MVDD may include any or all of the sensors described herein with reference to FIG. 16A. For example, an MVDD may include one or more of the sensors illustrated in FIG. 16A, two or more of the sensors illustrated in FIG. 16A, three or more of the sensors illustrated in FIG. 16A, four or more of the sensors illustrated in FIG. 16A, five or more of the sensors illustrated in FIG. 16A, six or more of the sensors illustrated in FIG. 16A, seven or more of the sensors illustrated in FIG. 16A, or all of the sensors illustrated in FIG. 16A. In some embodiments, the MVDD may include one or more other sensors of any suitable type in addition to or instead of at least one of the components illustrated in FIG. 16A.

Figure 16B:
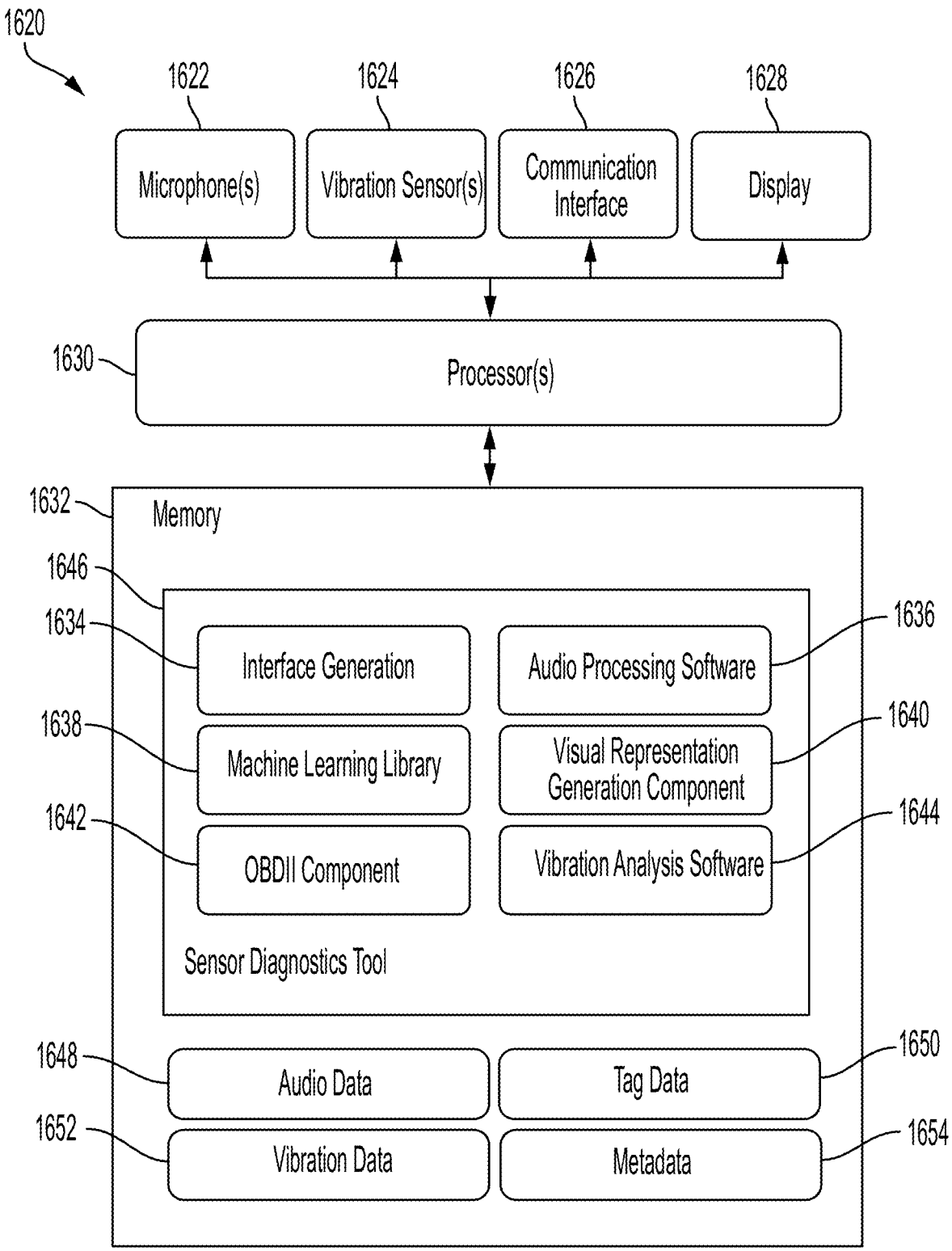
FIG. 16B illustrates example components of a mobile vehicle diagnostic device, in accordance with some embodiments of the technology described herein.

FIG. 16B illustrates example components of a mobile vehicle diagnostic device 1620, in accordance with some embodiments of the technology described herein. In the illustrated example of FIG. 16B, MVDD 1620 comprises multiple sensors including microphone(s) 1622, vibration sensor(s) 1624, communication interface 1626, display 1628, processor(s) 1630, and memory 1632.

Processor(s) 1630 may be configured to operate multiple sensors associated with the mobile vehicle diagnostic device. In some embodiments, processor 1630 may be configured to operate microphone(s) 1622 to detect frequencies in the auditory and ultrasonic frequency ranges. In some embodiments, the processor(s) 1630 may be configured to detect frequencies in the vibrational frequency range. In some embodiments, the processor(s) 1630 may be configured to execute processing and/or analyzing of the outputs produced through the operation of the multiple sensors, as described herein.

In some embodiments, microphone(s) 1622 may include multiple microphones as described in connection with FIG. 16A. In some embodiments, when multiple microphones are configured to acquire audio from different directions, the MVDD may use only a subset of those microphones to collect data and/or only a subset of the collected data may be used for subsequent analysis. In some embodiments, all of the collected data may be used for subsequent analysis.

In some embodiments, an MVDD that includes four (or more) microphones may increase the accuracy of models which detect potential vehicle defects based on recorded samples. For example, when the microphones are configured as described herein in FIG. 19, at least one microphone is always facing the engine itself. Accordingly, some user errors related to the positioning of the MVDD may be avoided because the MVDD may collect quality samples even if placed in the wrong location and/or orientation. For example, different car models/makes have different engine arrangements and an untrained user may place the MVDD at a non-ideal location. However, the layout of the microphones increases the likelihood that an informative audio sample is recorded. Additionally, the MVDD may provide real time feedback to fix issues before a user completes a test process.

Processor(s) 1630 may be configured to operate communication interface 1626, in accordance with some embodiments of the technology described herein. In some embodiments, Communication interface 1626 includes an input/output (I/O) interface and wireless interfaces. The I/O interface may be used for receiving input from a user and communicating feedback to the user in connection with the operation of the mobile vehicle diagnostic device. The wireless interfaces may include a Bluetooth interface and/or a Wi-Fi interface for communicating with other devices and/or networks.

In some embodiments, minimal processing occurs on the MVDD and the sensor diagnostics tool 1646 may control the sensors to collect signals, package the signals, and send the signals to a connected mobile device using the communication interface 1626. In some embodiments the MVDD may receive OBDII signals through communication interface 1626 either through a wireless and/or wired interface.

In some embodiments, processor(s) 1630 execute operations and/or instructions to send and receive communications through the wireless interface. In some embodiments, the processor executes instructions for storing, processing, and/or transmitting the outputs from the multiple sensors. In some embodiments, the wireless interface may transmit and/or receive results from processing the sensor data using one or more machine learning models, as described herein.

In some embodiments, the Bluetooth interface may use a Bluetooth Low Energy (BLE) radio to pair with a local user device and or network device. The Wi-Fi interface may be used to transmit and/or receive communications from a local Wi-Fi network. A paired user device which is connected to the Wi-Fi network by the mobile vehicle diagnostic device may receive data acquired by the sensors of the mobile vehicle diagnostic device. In some embodiments, the wireless interfaces may allow acquired data to be streamed to a local user device in real time. The streamed data may facilitate a user providing active feedback on the streamed data during the vehicle inspection process. The user's feedback may be stored as tags associated with the streamed data, as described herein.

In some embodiments, the sensor data is streamed using the Wi-Fi interface. In some embodiments, the sensor data is streamed using the Bluetooth interface. In some embodiments, the wireless interface may be configured to transmit and receive data over a cellular network. The cellular network may be used to communicate with remote systems, such as a cloud computing environment which may be used to executed one or more trained ML models, including any of the types of ML models described herein. The mobile vehicle diagnostic device may receive analysis results from the cloud computing environment through the cellular network. In some embodiments, a network wired interface may be used in combination with either/both of the wireless interfaces to transmit and receive data between the MVDD, the user's device, and/or a cloud computing environment.

In some embodiments, communication interface 1626 may include a plurality of buttons. For example, the I/O interface may include pushbuttons. The pushbuttons may be used for initiating connections with other devices and/or networks. For example, a pushbutton may be used for initiating a Bluetooth connection through the Bluetooth interface with a user's mobile device. Additionally, or alternatively, the pushbuttons may be used for switching between modes, such as waking the device from a sleep mode and/or switching the device between analysis modes.

In some embodiments, communication interface 1626 may include visual indicators for providing a user with visual feedback. For example, the I/O interface may include a ring of LED lights. In some embodiments, the I/O interface may include indicator lights which are configured to flash different colors to provide instructions or to indicate the detection of vehicle operations. For example, the lights may flash different colors based on the detected vehicle operations (e.g., rev event, idle event, engine start event, etc.). As a further example, these indicators may be used to instruct a user to perform a process in connection with the operation of the mobile vehicle diagnostic device. As yet another example, the lights may also flash to indicate that an issue has been detected, such as the detection of a vehicle defect or the detection of additional sounds present (e.g., accessory noise, tic events, misfire, etc.).

Additionally or alternatively, in some embodiments, the I/O interface may include speakers which provide audio feedback to a user. For example, an audio chime and/or playback of voice recordings may be used to indicated to a user the devices connection status, battery level (e.g., low battery level alert), placement instructions, and/or a "lost" function (playing a noise to assist with locating the device).

In some embodiments, a speaker may be used to detect reflections inside the engine bay by emitting a signal and measuring the response. In some embodiments, these reflections are used to detect features/quality of an electric vehicle engine.

In some embodiments, memory 1632 may include a non-transitory memory and the processor(s) 1630 may execute any instructions stored in the non-transitory memory. The non-transitory memory may store a sensor diagnostics tool 1646 (which is software that includes processor-executable instructions), audio data 1648, tag data 1650, vibration data 1652, and metadata 1654.

In some embodiments, the sensor diagnostics tool 1646 stored in memory 1632 may include audio processing model 1636, vibration diagnostics model 1644, visual representation generation component 1640, OBDII component 1642, machine learning library 1638, and interface generation 1634.

In some embodiments, machine learning library 1638 stores one or more machine learning models that have been trained to process data collected by an MVDD (e.g., audio data, vibration data, and/or metadata) including any of the machine learning models described herein.

In some embodiments, sensor diagnostics tool may operate sensor data acquisition and/or processing methods and techniques, as described herein. The vehicle diagnostics tool may be configured to initiate inspection of possible vehicle defects and may further transfer data to a mobile device and/or remote cloud computing platform through the communication interface 1626, as described herein.

As shown in FIG. 16B, memory 1632 may include a machine learning library 1638. In some embodiments, the machine learning library 1638 may store ML models that may be used for processing sensor data and/or detecting vehicle defects based on the sensor data. In some embodiments, any of the ML models described herein may be stored in the ML library 1638. One or more of these models may be used to detect the presence or absence of a potential vehicle defect and to generate a subsequent vehicle condition report.

In some embodiments, audio processing software 1636 may be configured to process audio signals received from microphones 1622. In some embodiments, the audio processing software 1636 may perform one or more preprocessing operations on the audio signals (e.g., resampling, normalizing, clipping, filtering, truncating, padding, denoising, etc.) including in any of the ways described herein. As one example, the audio data may be normalized for consistency across different or concurrent samples by audio processing software at the MVDD. For example, audio signals may be normalized so that the loudest peak is consistent across different or concurrent samples. Normalization may provide advantages when analyzing quiet vehicles such that when switching between audio recordings stored on the platform, the placement of the microphone at the time of the recording does not impact the perceived loudness of the engine.

In some embodiments in which one or more trained ML models are stored on the MVDD in ML library 1638, the audio processing software may be configured to select one or more trained ML models in the library 1638 and apply it to the data gathered. For example, audio processing software 1636 may apply a trained ML model to process audio data collected by the MVDD. The trained ML model may be any of the ML models described herein.

In some embodiments, the library 1638 may include one or more light-weight ML models optimized for performance of the MVDD. Such ML may be "lightweight" in the sense that they include fewer parameters than more complex models that may be executed remotely from the MVDD (e.g., using server(s) 129). For example, a lightweight ML model stored on the MVDD may have fewer than 500K parameters, fewer than 400K parameters, fewer than 300K parameters, fewer than 250K parameters, fewer than 200K parameters, fewer than 150K parameters, fewer than 100K parameters, fewer than 50K parameters, fewer than 25K parameters, fewer than 10K parameters, or between 100and 10K parameters. By contrast, more complex models may include more than at least 500K parameters, at least 1 million parameters, at least 5 million parameters, etc. In some embodiments, fewer parameters may be achieved by using fewer parameters in the various layers of a neural network model. Additionally or alternatively, models may be simplified by processing fewer types of inputs (e.g., only 1D and not 2D inputs, only audio data and not metadata, etc.).

Though the overall performance of such lightweight ML models may not be as strong as that of the more complex models, such light-weight models may nonetheless provide a useful indication as to the likelihood of the presence or absence of one or more vehicle defects. The indication produced by such a model may provide an indication that further investigation and/or analysis is to be performed. For example, a lightweight ML model may process an audio waveform and may determine a probability that the audio waveform contains an indication of a vehicle defect (e.g., an engine knock or any other defect or defects described herein). In this example, the lightweight ML model may be configured to process only the audio waveform and not other data (e.g., without using the 2D representation of the audio waveform as input to the model).

In some embodiments, the vibration processing software 1644 may be configured to process the vibration signals collected by vibration sensor(s) 1624. The software may pre-process the vibration signals in any suitable way including in any of the ways described herein. For example, the software 1644 may remove noise from the vibration signals. The software 1644 may be configured to select one or more trained ML models in the library 1638 and apply it to the data gathered. For example, software 1644 may apply a trained ML model to process vibration data collected by the MVDD.

In some embodiments, the sensor diagnostics tool 1646 may be configured to detect and verify that each step of the test procedure has been completed and captured. For example, a test procedure may include engine operations including start-up, idle period, and revs at specified intervals. In some embodiments, if one test procedure is not detected, then a warning message may be conveyed to a user. In some embodiments, the warning message may include instructions for improving the results by repeating one or more of the procedures again. In some embodiments, the tool 1646 may determine that the collected sensor data contains signals of suitable quality (e.g., using an ML model configured to detect environmental noise) to detect the presence or absence of potential vehicle defects. However, the tool 1646 may also determine that the collected sensor data is not of suitable quality to be used for future training of a machine learning model. For example, sensor data may not be of suitable quality for future training due to the inclusion of some irregularities in the acquired data. Additionally, tool 1646 may be configured be trained to detect disturbances that detract from the quality of the sensor data and result in disturbances that are too excessive for the data to be used to detect vehicle defects. The tool 1646 may then notify a user that the data quality is not suitable. The tool 1646 may use one or more ML models to make the types of determinations described in this paragraph and/or do so in any other way.

Memory 1632 may include non-transitory storage of sensor data from the multiple sensors of the mobile vehicle diagnostic device, in accordance with some embodiments of the technology described herein. For example, sensor data may include audio data 1648, vibration data 1652, VOC/gas sensor data, temperature data, pressure data, humidity data, and/or local magnetic field data. In some embodiments, memory 1632 may further include tag data 1650. Tag data 1650 may include the results of the analysis of sensor data, such as tags indicating that vehicle defects were detected in the acquired sensor data.

Memory 1632 may include non-transitory storage of metadata related to the vehicle and/or the data acquisition, in accordance with some embodiments. Examples of metadata are provided herein. In some embodiments, metadata 1654 may include data received from an on-board diagnostics system. For example, metadata may be received through communication interface 1626 through a cable connection between the mobile vehicle diagnostic device and a vehicle OBDII port. As another example, metadata may be received indirectly through a user's mobile device. As yet another example, metadata 1654 may include information about the user who is inspecting the vehicle and/or observations recorded by the user relating to sounds and/or conditions observed by the user during use of the mobile vehicle diagnostic device.

In some embodiments, the MVDD may be used to inspect a vehicle's suspension system. In some embodiments, the MVDD may be placed, or mounted, on the vehicle frame, for example behind the driver-side wheel. The MVDD may be used to record sensor readings while a user gets in and out of the car, which are indicative of vehicle displacement in response to addition of the driver's weight. By comparing across vehicles (and similarly weighing drivers) or the same vehicle over time, degradation of suspension components may be monitored. In some embodiments, the accelerometer may be used to measure the speed of the response and how quickly the suspension rebounds when depressed. In some embodiments, the gyroscope may measure how much vehicle body roll or pitch occurs.

Additionally, in some embodiments, the suspension may be further tested by maintaining the MVDD in place on the vehicle frame during a drive-over process described in U.S. Patent Application Pub. No. US 2020/0322546, published on Oct. 8, 2020, titled "Vehicle Undercarriage Imaging System". Such a test may be used to detect acceleration and braking force (e.g., using measurements captured by the gyroscope to measure the roll and/or pitch of the vehicle while a breaking or acceleration force is applied to the vehicle), and response of suspension components to such forces. This test may be repeated for each corner of the vehicle.

Figure 16C:
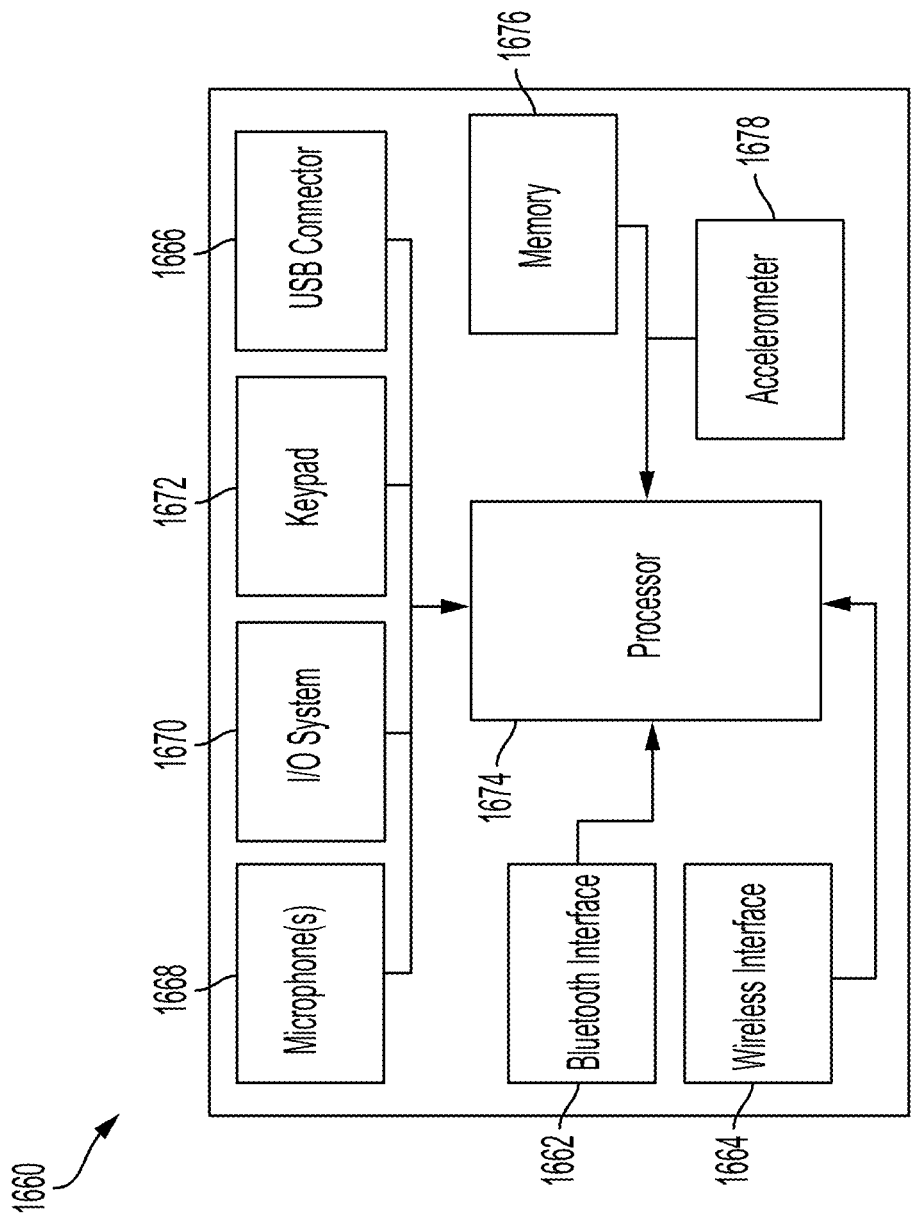
FIG. 16C shows a user device 1660 that may be used to capture vehicle data, in accordance with some embodiments of the technology described herein.

FIG. 16C shows an example user device 1660 that may be used to capture vehicle data, in accordance with some embodiments of the technology described herein. In the illustrated example, the device 1660 includes Bluetooth card 1662, Wi-Fi card 1664, microphone(s) 1668, I/O system (e.g., display screen) 1670, keypad 1672, processor 1674, memory 1676, and accelerometer 1678. The user device 1660 may be, for example, mobile device 108 described with reference to FIG. 1A.

In some embodiments, user device 1660 may be used to capture vehicle data. For example, microphone 1668 may capture engine audio data while it is running. The device may be placed on the engine, and microphone 1668 may record audio for a set amount of time. This process allows for audio to be recorded at different engine load potentials. In another example, Bluetooth card 1662 may be used to connect to a microphone, such as a microphone in an MVDD, that may capture vehicle audio data. A situation may arise where a microphone may better attach to the engine, and user device 1660 is able to receive vehicle audio data from the microphone. Also, an MVDD may connect to the user device 1660 via USB port 1666.

In some embodiments, the Bluetooth Interface 1662 may be used to pair the user device 1660 to an MVDD. In some embodiments, the wireless interface 1664 may include a Wi-Fi interface, which may be used to receive data from the MVDD at the user device 1660. In some embodiments, the wireless interface 1664 may include a cellular interface for connecting to a cellular network. The Wi-Fi interface and/or cellular interface may be used to transmit data to the user device 1660 to one or more remote computers (e.g., server(s) 129) and/or receive data (condition report) from the remote computer(s).

In some embodiments, a remote computer (e.g., the server 129) may transmit data (e.g., the vehicle condition report) to the mobile user device 1660. These data may be displayed through I/O system 1670, which may display the report on a display screen to the user. A user could then view the report on device 1660. The device also contains processor 1674 which may be configured to process vehicle data and produce a vehicle condition report, as described above in connection with FIG. 1A. In some embodiments, memory 1676 includes instructions to cause the processor to execute processor-executable instructions as described herein.

Figure 17A:
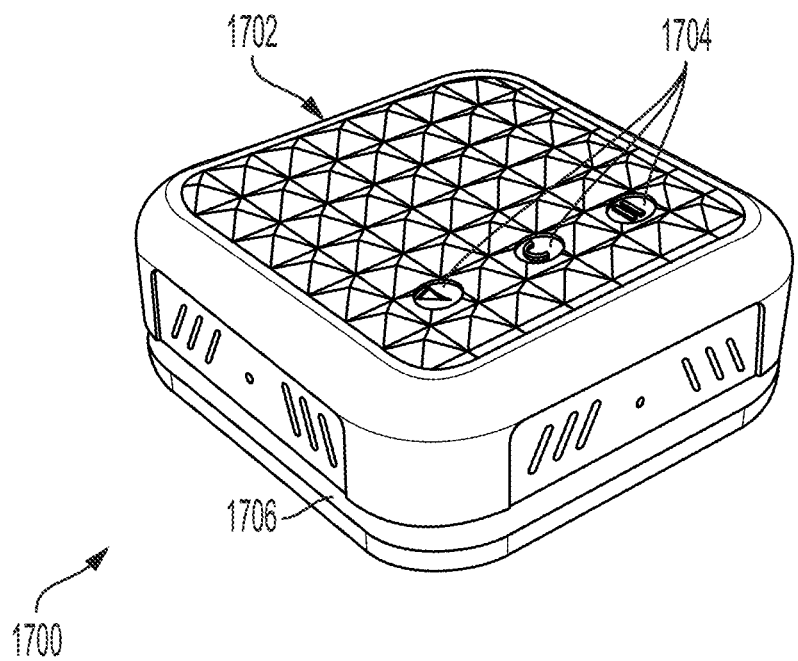
FIG. 17A illustrates an exterior view of an example mobile vehicle diagnostic device, in accordance with some embodiments of the technology described herein.

FIG. 17A illustrates an exterior view of an example mobile vehicle diagnostic device, in accordance with some embodiments of the technology described herein. The mobile vehicle diagnostic device 1700 includes an exterior shell 1702. The exterior shell 1702 may be designed to protect the interior hardware components of the mobile vehicle diagnostic device from environmental conditions, such as moisture, temperature, chemical, and/or mechanical protection. For example, the exterior shell 1702 may be configured to protect the interior hardware from heat produced by the engine, weather, fluids which may be present on the surfaces of components in the engine bay, and/or mechanical vibrations produced by the vehicle components. The exterior shell allows the mobile vehicle diagnostic device 1700 to be placed inside or outside, inside the cabin of the car; within the engine bay, such as being placed on top of a car's engine; mounted to the vehicle frame; etc.

In some embodiments, the exterior shell may have a symmetrical shape so the mobile vehicle diagnostic device may be placed at different orientations at the same location. For example, a user may place the mobile vehicle diagnostic device 1700 with an orientation where the internal microphones are oriented left, right, front, and back. For example, a user may be instructed to change the orientation for different tests or to capture additional vibration data or other sensor data. As another example, the mobile vehicle diagnostic device may be placed next to a vehicle to measure gases (VOC's) and audio data during a drive over. Other microphone arrays with different numbers of microphones (or microphone arrays) in different orientations may also be used, as aspects of the technology described herein is not limited in this respect. In some embodiments, a single microphone is used.

In the illustrated embodiment of FIG. 17A, the exterior shell 1702 forms a handheld sized box. However, the exterior shell in other embodiments may be assembled into different shapes (e.g., another embodiment includes a cylindrical shape). The exterior shell may be formed into any suitable shape which supports the placement of the mobile vehicle diagnostic device in appropriate orientations for acquiring vehicle measurements, as aspects of the technology described herein are not limited in this respect. The exterior shell 1702 may be made of a plastic material with a textured overmold attached. The textured overmold may be used to mitigate migration of the mobile vehicle diagnostic device 1700 during the vehicle inspection collection process. The textured overmold may also be configured to limit protect against mechanical stresses on the device without detracting from the sensitivity of the sensors.

In some embodiments, the overmold is made of a rubber material. The rubber overmold may further prevent the mobile vehicle diagnostic device from slipping and/or sliding while inspecting the vehicle. The added stability provided by the rubber overmold may improve the performance of the sensors and may help with producing data continuity and consistency during the acquisition process. In some embodiments, the exterior shell includes components to mount on a stand or positional device affixed or adjacent to a vehicle at an optimized orientation.

In some embodiments, at least part (e.g., all) of the overmold may be made from a thermoplastic elastomer (TPE). The TPE used to form part or all of the overmold may be a styrenic block copolymer, thermoplastic polyolefinelastomer, thermoplastic vulcanizate, thermoplastic polyurethane, thermoplastic copolyester, thermoplastic polyamide, or custom fabricated TPE. For example, Sofprene, Santoprene, Laprene, Tremoton, Solprene, Mediprene, or any other suitable TPE may be used to form the overmold. In some embodiments, a suitable TPE may be characterized by a density, tensile strength, elongation at break, and hardness as described herein.

In some embodiments, the TPE used may have a density between 1.0-3.5 g/cm$^3$, 1.0-2.0 g/cm$^3$, or 1.0-1.5 g/cm$^3$. For example, the TPE may have a density of approximately 1.10 g/cm$^3$.

In some embodiments, the TPE used may have a tensile strength between 5-100 MPa, 10-50 MPa, or 10-25 MPa. For example, the TPE may have a tensile strength of approximately 13 MPa.

In some embodiments, the TPE used may have an elongation at break between 200-1000%, 400-750%, or 500-700%. For example, the TPE may have an elongation at break of approximately 700%.

In some embodiments, the TPE used may have a Shore A hardness between 20-90, 30-80, or 40-60. For example, the TPE may have a Shore A hardness of approximately 50.

In some embodiments, exterior shell 1702 includes openings to facilitate exposure of specific sensors to the open air. For example, a hygrometer may be exposed to the open air such that it may measure an amount of water vapor in the air. As another example, the exterior shell may include a slot to facilitate ventilation and/or apertures configured for use with microphones, as described herein.

In the illustrated embodiments of FIG. 17A, openings may be included in each sidewall of the exterior shell 1702 to facilitate multidirectional or multiaccess microphone configuration. Accordingly, in some embodiments, microphones installed within exterior shell 1702 may be used both for the acquisition of vehicle sounds and noise canceling. The directionality provided by the multidirectional microphone configuration may provide advantages when used in public settings rather than in a noise isolated environment, as discussed herein.

In some embodiments, the openings may further include a water and dust ingress resistant mesh layer affixed to the interior side of the wall to protect the interior electronics. The opening may include a mesh to control the amount of air flow to control the quality of the sensor recording (e.g., wind sock).

In some embodiments, the mobile vehicle diagnostic device includes UI buttons 1704. The UI buttons may be used to operate the mobile vehicle diagnostic device for acquiring sensor data of a vehicle in connection with detecting potential vehicle defects. In some embodiments, the UI buttons 1704 may be used for turning on/off the power of the mobile vehicle diagnostic device, pairing the MVDD with a mobile device, starting/stopping a process for collection samples, and/or pausing a test in progress.

In some embodiments, the mobile vehicle diagnostic device includes a visible LED ring 1706 which provides feedback based on color and/or flash patterns. For example, the LED ring may flash blue when recording and change to a steady state green when complete. The light may turn on to indicate that the mobile vehicle diagnostic device is initiating a Bluetooth connection. The light may spin in a circle (e.g., a tail chase sequence) while the mobile vehicle diagnostic device is acquiring measurements (e.g., recording readings from one or more sensors).

As examples of feedback which may be provided by the LED ring, the feedback may include Bluetooth pairing, connection status, recording in progress, battery level, or detection of particular events (e.g., engine rev operations, cylinder misfire detection, and the like). However, other feedback may be indicated to a user of the device using the LED right, as aspects of the technology described herein are not limited in this respect. In some embodiments, a speaker on the mobile vehicle diagnostic device provides audio feedback. The audio feedback back may be used alternatively or in addition to the LED ring, as described herein.

In the embodiment illustrated in FIG. 17A, the MVDD 1700 includes three pushbuttons (e.g., the UI buttons 1704), one power switch (not shown), and a ring of LED lights forming the LED ring 1706. Two of the UI buttons may be used for general purpose functions, for example, initiating the Bluetooth connection and switching between modes. The third button may be for waking up the MVDD from a sleeping mode. The power switch may be located on the side of the mobile vehicle diagnostic device and may be used to power the MVDD on and off.

Figure 17B:
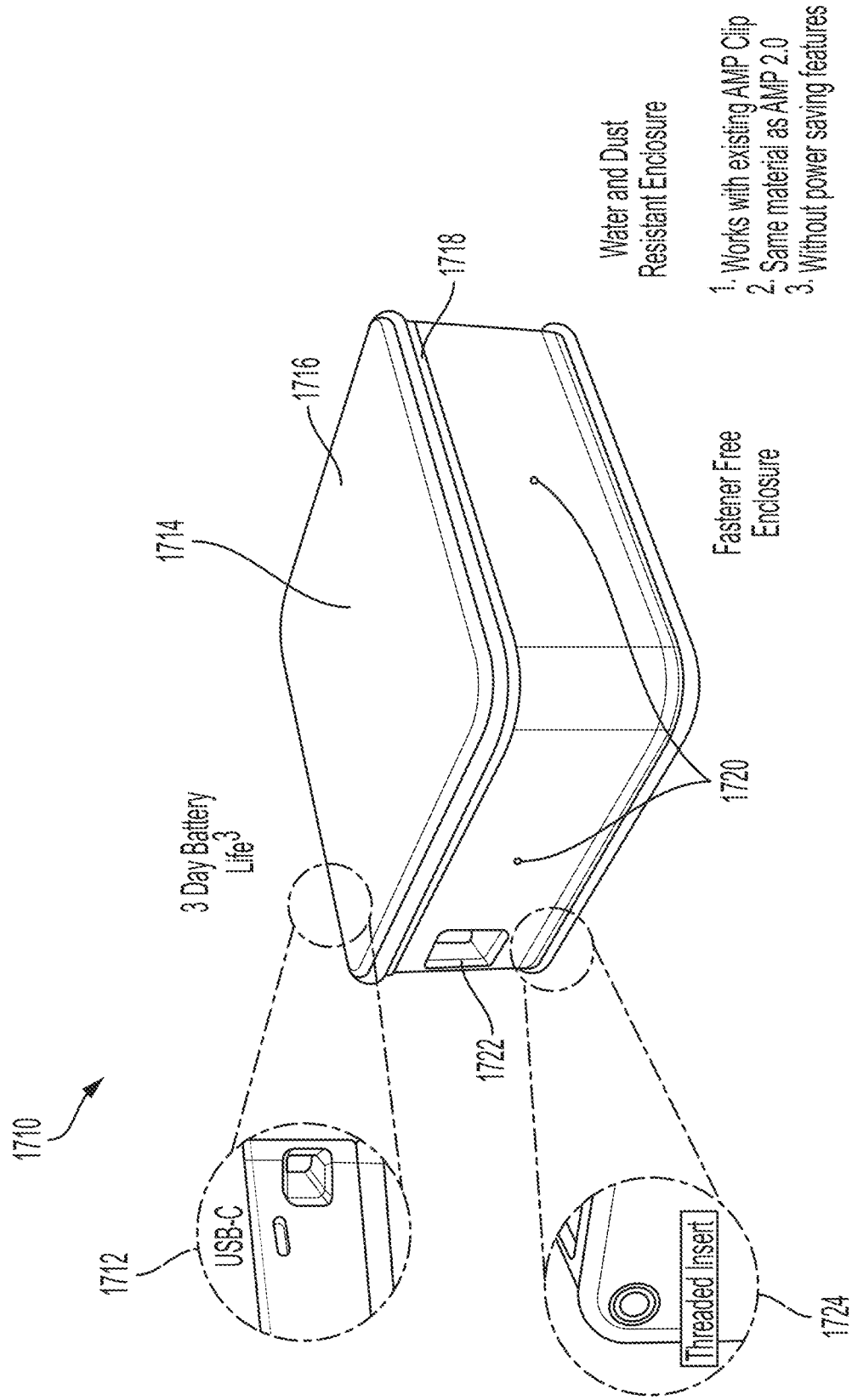
FIG. 17B illustrates an exterior view of an alternative example mobile vehicle diagnostic device, in accordance with some embodiments of the technology described herein.

FIG. 17B illustrates an exterior view of an alternative example mobile vehicle diagnostic device 1710, in accordance with some embodiments of the technology described herein. As shown in FIG. 17B, example mobile vehicle diagnostic device, includes a USC-C port 1712, LED backlit button 1714, overmold 1716, LED Ring 1718, clip hook 1722, threaded insert 1724, and four microphones 1720. Additionally, the mobile vehicle diagnostic device exterior shell creates an enclosure and connects without a fastener. This enclosure is water and dust resistant (illustrated and described in more detail in reference to FIG. 18L).

USB-C port 1712 provides wired connectivity to the internal components of the mobile vehicle diagnostic device. In some embodiments, USB-C port 1712 may be used to charge a battery in the mobile vehicle diagnostic device 1710. In some embodiments, the USB-C port 1712 may be used to transfer data from the MVDD 1710 and/or to provide firmware updates from a connected computing device. In some embodiments, the battery may provide a three-day battery life or more when using power saving features. In some embodiments, USB-C port 1712 may be used provide a wired connection to an OBDII port such that OBDII signals may be received by the MVDD.

A single LED backlit button 1714 may be included in the mobile vehicle diagnostic device, in accordance with some embodiments. The LED backlit button may have multiple functions ranging from on/off, reset, pair, wake up etc. In some embodiments, the functions may be performed in response to receiving a specific pattern of inputs. For example, one operation may be performed in response to receiving a short push, a second operation may be performed in response to receiving a long push, and a third operation may be performed in response to receiving two quick pushes. The button may include a logo for the MVDD.

The overmold 1716 provides grip and protection for the MVDD. The overmold 1716 operates similar to the rubber overmold illustrated and described in reference to the example mobile vehicle diagnostic device 1700 shown in FIG. 17A. In some embodiments, the overmold 1716 mitigates migration of the MVDD 1710 during the vehicle inspection collection process, while also limiting the detracting from the sensitivity of the sensors. In some embodiments, the overmold 1716 is made of rubber material, as described herein. The friction of the overmold 1716 may prevent the MVDD 1710 from slipping and/or sliding while inspecting the vehicle. Accordingly, the added stability from the rubber overmold may improve the performance of the sensors and helps with data continuity and consistency during the acquisition process.

In some embodiments, the LED ring includes RGB LEDS that may combine to produce 16 million (or more) hues of light. The LED ring 1718 provides feedback based on color and/or flash patterns. In one example, the LED ring flashes blue when recording and changes to a stead state green when complete. The light may turn on to indicate that the MVDD is initiating a Bluetooth connection, and spins in a circle (tail chase) while the MVDD is performing a test (e.g., inspecting the vehicle with the one or more sensors). Examples of feedback which could be provided by the LED ring includes Bluetooth pairing status, connection status, recording in progress, battery level, or detection of particular events (e.g., engine rev, cylinder misfire detection, etc.). In some embodiments, additional on-device feedback is provided via a speaker (not shown).

The MVDD 1710 may be configured to be mounted either within the vehicle and/or on a stand external to the vehicle, in accordance with some embodiments. For example, the MVDD may include a clip hook 1722 and/or a threaded insert 1724 for mounting the MVDD within and/or external to the vehicle. In some embodiments, the clip hook 1722 may be low-profile and may allow one or more connectors to attach the MVDD to a vehicle. In some embodiments, this facilitates attaching the MVDD 150 to different locations within the vehicle such that measurements may be repeated at each of the respective positions in the vehicle. In some embodiments, the MVDD may be attached in specific positions to acquire measurements while the vehicle is in motion.

In some embodiments, the threaded insert 1724 may facilitate the attachment of additional hardware. For example, a clip may be connected to the MVDD via a screw installed in the threaded insert 1724. As another example, threaded insert 1724 the additional hardware allows the MVDD 1710 to attach to various parts of the vehicle. In some of these examples, the additional hardware and fixes the MVDD 1710 to vehicle and enables the MVDD to record data while the vehicle is moving.

In some embodiments, the MVDD 1710 includes four microphones 1720 with one mounted to each sidewall of the MVDD. The microphones may be configured in any suitable way. For example, the microphones may be arranged using any four of eight internal mounting points including, a top (facing the sky), bottom (facing the ground), left, right, front (facing the windshield), and rear (facing away from the engine compartment) faces. In some embodiments, the enclosure is symmetrical so that microphones oriented in different positions by turning the device (e.g., by 90 degrees). In some embodiments, there may be four microphones each mounted on a respective sidewall. In some embodiments, each of the microphones may be mounted to a respective wall and at an approximate center position of that respective wall.

In some embodiments, the microphones are configured inside the housing of the MVDD 1710 to capture sound without distorting the sounds. Additionally, different types of microphones may be used to minimize distortion. In some embodiments, the microphones may be configured to be more responsive to frequencies relevant to the analysis of vehicle components. As an example, an engine produces sounds that are different than traditional speech (or other typical microphone input), so the microphones selected are configured to capture loud sounds without distortion.

In some embodiments, the configuration of microphones facing different directions may be used to localize which component is making a noise. For example, one or more of the microphones may pick up a high pitch noise which indicates a brake is dragging on a wheel. The array of microphones is then used to determine which wheel and break the noise is coming from. In another example, the microphone array may determine if the noise is from the upper part of the engine or the lower part of the engine (e.g., by triangulation). Although the example shown includes four microphones, other examples may include other number of microphones in a microphone array or a single microphone may be used.

In some embodiments, the exterior shell 1702 includes openings to expose specific sensors to the open air (e.g., a hygrometer). For example, in some embodiments, the exterior shell includes slots for ventilation and/or other holes (e.g., for microphones, etc.). Additionally, openings with a sealed gasketed channel may be used to minimize distortion (e.g., for the microphones). In the example shown, openings may be included in each side of the exterior shall 1702, allowing for multidirectional, or multiaccess microphone configurations to be implemented.

In some embodiments, the microphones may be used to perform noise cancellation with respect to extraneous sounds while recording audio of the vehicle. Such noise cancellation may provide advantages for acquiring audio of the vehicle. For example, when the mobile vehicle diagnostic device is operated in an uncontrolled environment (e.g., in public settings) rather than in a noise isolated environment, the use of noise cancellation may provide for cleaner recordings and more accurate determinations of vehicle defects based on the audio of the vehicle. As part of the noise cancellation, the microphones may be used to determine the location of the noise (e.g., by triangulation) and use that determined location to facilitate noise cancellation.

In some embodiments, the housing may be sealed to prevent water and dust from collecting within the housing to protect the interior electronics. However, some of the sensors may rely either on air flow from the surrounding environment or from having channels through the walls of the housing for acquiring data. Therefore, the openings in the housing may further include a water and dust ingress resistant mesh layer affixed to the interior side of the wall. The opening may include a mesh to control the amount of air flow to control the quality of the sensor recording (e.g., wind sock).

The housing of the mobile vehicle diagnostic device may be any suitable shape. In some embodiments, the shape of the housing may facilitate different types of measurements. For example, the placement of system 1800 in the engine bay may be limited by the size and shape of the housing. When the housing is large, it may prohibit the placement of the housing in close proximity to some vehicle components which lack open space adjacent to the component. Accordingly, some sizes and shapes of the housing may provide advantages for some measurements, such as facilitating placement of the housing in close proximity to a vehicle component during the acquisition of measurements. For some measurements, the proximity of the sensors within the housing to the vehicle component may improve signal-to-noise of the measurement and may therefore improve the performance of defect detection.

As another example, the symmetry of the housing may provide advantages for some measurements. When symmetrical, the housing shape may enable the housing to accurately be reoriented at the same location relative to a vehicle component. Therefore, some measurements may have different sensitivities based on the direction that the sensor is oriented relative to the vehicle component which produced the detected stimulus. For these measurements, the measurements may be repeated with the housing oriented differently at the same position such as to acquire the directional dependence of the stimulus. However, as asymmetries in the housing shape may lead to errors in the reproducible placement of the housing when changing orientations, a symmetric housing may provide advantages for some measurements.

The inventors have recognized and appreciated the impact of the housing size and shape may have on the placement of the housing during measurements. Therefore, the inventors have developed a housing that, in some embodiments, is suitably sized to be placed in proximity to vehicle components of interest.

Figure 18D:
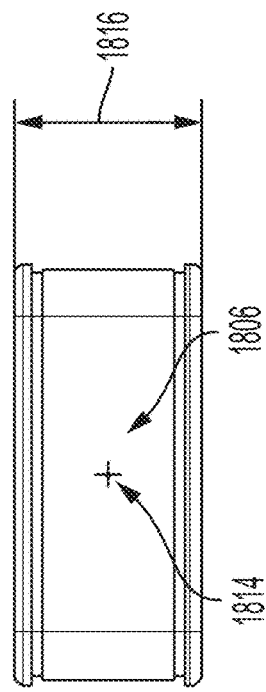
FIG. 18D illustrates a side-view of the mobile vehicle diagnostic device 1800, in accordance with some embodiments of the technology described herein.
Figure 18B:
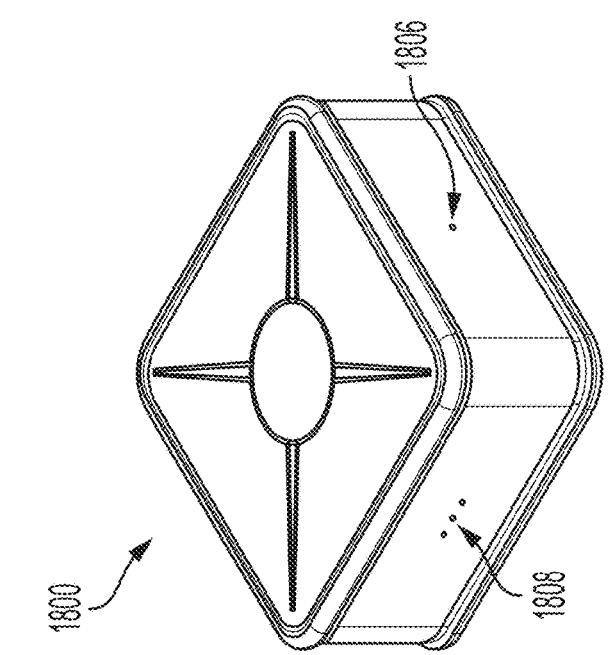
FIG. 18B illustrates a perspective view of mobile vehicle diagnostic device 1800, in accordance with some embodiments of the technology described herein.
Figure 18C:
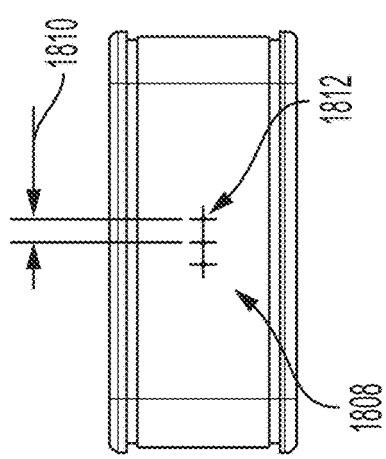
FIG. 18C illustrates a side view of a frontside of the mobile vehicle diagnostic device 1800, in accordance with some embodiments of the technology described herein.
Figure 18A:
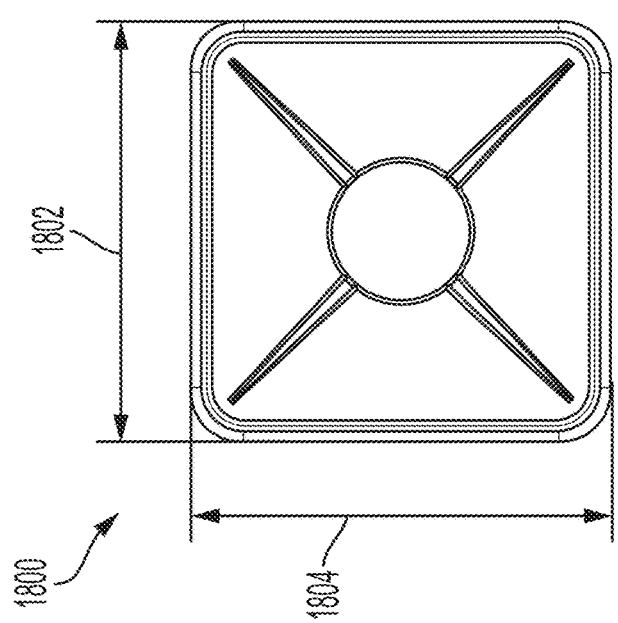
FIG. 18A illustrates a top view of mobile vehicle diagnostic device 1800, in accordance with some embodiments of the technology described herein.

FIG. 18A illustrates a top view of mobile vehicle diagnostic device 1800, in accordance with some embodiments of the technology described herein. As shown in FIG. 18A, the housing of the mobile vehicle diagnostic device may be box shaped and may have width 1802 and length 1804. In some embodiments, the housing may have a square footprint such that the width 1802 is equal to the length 1804. In some embodiments, the housing may have a rectangular footprint, such that the width 1802 is not equal to the length 1804. In some embodiments, for both square and rectangular footprints, the width 1802 and length 1804 may each be between 3 inches and 6 inches long. For example, in a square embodiment width, 1802 and length 1804 may each be approximately 4.3 inches long. As another example, in another square embodiment, width 1802 and length 1804 may each be approximately 4.4 inches long. In other embodiments other dimensions with any suitable size and shape of the housing may be used, as described herein.

FIG. 18B illustrates a perspective view of mobile vehicle diagnostic device 1800, in accordance with some embodiments of the technology described herein. As shown in FIG. 18B, a frontside wall of the housing includes apertures 1808 and a right side wall of the housing includes apertures 1806. Microphones may be mounted to the side walls to be aligned with the apertures such that sounds may be received by the microphones through the apertures without dampening or distortion of the sounds by the side walls of the housing. In some embodiments, side walls may include a single aperture, such as aperture 1806. In some embodiments, side walls may include multiple apertures, such as apertures 1808. In other embodiments, different numbers and/or configurations of apertures may be used, as aspects of the technology described herein are not limited in this respect.

FIG. 18C illustrates a side view of a frontside of the mobile vehicle diagnostic device 1800, in accordance with some embodiments of the technology described herein. As shown in FIG. 18C, apertures 1808 may include three apertures arranged along a line which is approximately parallel with the width 1802 of the housing. In some embodiments, the apertures may be equally spaced. For example, the spacing between adjacent apertures 1810 on the frontside may between 0.1 inches and 0.3 inches. For example, the spacing between adjacent apertures 1810 may be approximately 0.236 inches. In other embodiments, the apertures may be aligned along a line which is approximately perpendicular to the width 1802 of the housing. In other embodiments, the apertures may be configured with a different geometry, as aspects of the technology described herein are not limited in this respect. For example, the apertures may be configured in a triangular configuration on a side wall of the housing.

The apertures in the side walls may have any suitable diameter to provide for the transmission of sounds to the microphone. In some embodiments, the apertures may have a diameter between 0.01 inches and 0.1 inches. For example, the diameter 1812 of apertures 1808 may be approximately 0.057 inches. In some embodiments, one or more of apertures 1808 may have a different diameter than the other apertures.

FIG. 18D illustrates a side-view of the mobile vehicle diagnostic device 1800, in accordance with some embodiments of the technology described herein. In some embodiments, the height 1816 of the housing may be between 1 inch and 6 inches tall. In some embodiments, the height 1816 of the housing may be smaller than the length 1804 and the width 1802 of the housing. For example, the height 1816 may be approximately 2 inches. As another example, the height 1816 of the housing may be approximately 1.96 inches. Aperture 1806 may be configured to provide a channel for sound to travel through to a microphone, as described herein. As shown in FIG. 18D, aperture 1806 may include a single aperture approximately centered on the side of the housing (e.g., to facilitate receipt of audio by microphone(s) placed at approximately the center of that side of the housing). For example, the center of aperture 1906 may be approximately 1 inch from both the top and the bottom of the housing. The aperture may have any suitable diameter 1814, as described herein.

Figure 18G:
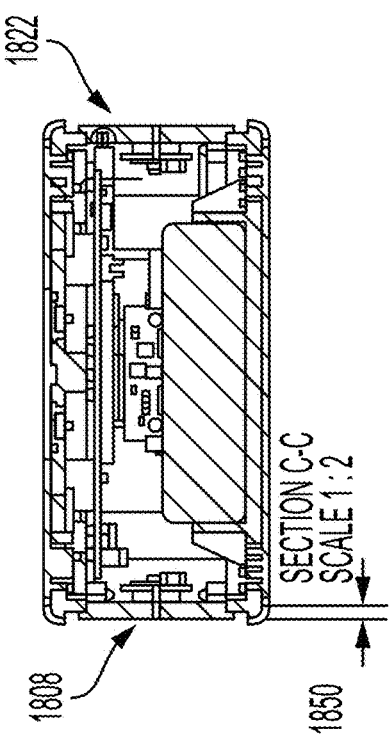
FIG. 18G illustrates a cross sectional view of the mobile vehicle diagnostic device 1800, the cross section being along line C of FIG. 18F, in accordance with some embodiments of the technology described herein.
Figure 18E:
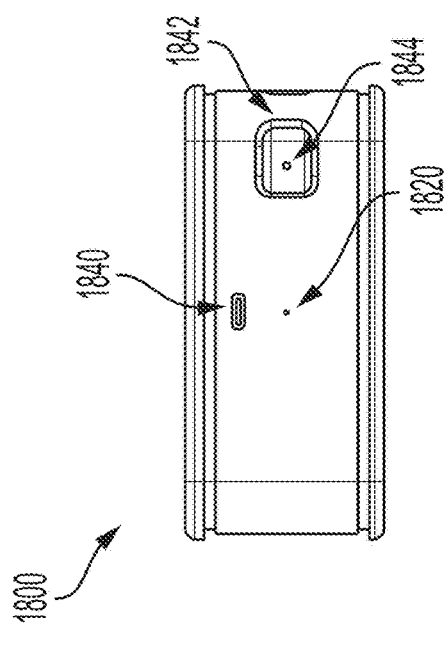
FIG. 18E illustrates a side view of a left side of the mobile vehicle diagnostic device 1800, in accordance with some embodiments of the technology described herein.

FIG. 18E illustrates a side view of a left side of the mobile vehicle diagnostic device 1800, in accordance with some embodiments of the technology described herein. As shown in FIG. 18E, aperture 1820, USB-C port 1840, low profile clip hook 1842, and pressure port 1844 are included on the left side of the housing. Aperture 1820 may be configured to provide a channel for sound to travel through to a microphone, as described herein. For example, aperture 1820 may be configured in the same was as aperture 1814. In some embodiments, USB-C port 1840 may be configured to provide wired connectivity to the internal components of the mobile vehicle diagnostic device.

Figure 18F:
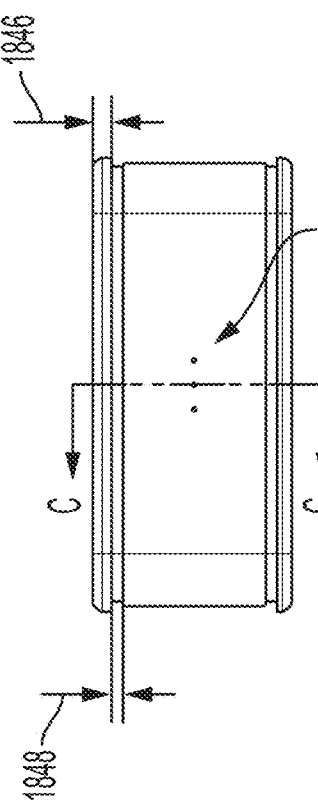
FIG. 18F illustrates a side view of a back side of the mobile vehicle diagnostic device 1800, in accordance with some embodiments of the technology described herein.

FIG. 18F illustrates a side view of a back side of the mobile vehicle diagnostic device 1800, in accordance with some embodiments of the technology described herein. As shown in FIG. 18F, apertures 1822 are included on the back side of the housing. Apertures 1822 may be configured to provide a channel for sound to travel through to a microphone, as described herein. For example, apertures 1822 may be configured in the same way as apertures 1808. In some embodiments, the top and bottom of the housing may be configured to form a seal with the sidewalls using a fastener-free configuration, as described herein. In some embodiments, an overmold may be disposed over a portion of the top and the bottom of the housing to protect and/or stabilize the mobile vehicle diagnostic device. For example, the overmold may extend over the top of the housing to provide a covered portion. The covered portion may extend between 0.1 inches and 0.3 inches, as measured from the top towards the bottom along the height direction. For example, the covered portion may extend 0.177 inches over the top.

FIG. 18G illustrates a cross sectional view of the mobile vehicle diagnostic device 1800, the cross section being along line C of FIG. 18F, in accordance with some embodiments of the technology described herein. As shown in FIG. 18G, apertures 1822 and 1808 are included on opposing sides of the housing and extend through the side walls. The side walls may be formed from a hard plastic. In some embodiments, the side wall thickness may be between 0.1 inches and 0.3 inches. For example, the side wall thickness may be 0.128 inches.

FIG. 18H illustrates a perspective view of the mobile vehicle diagnostic device 1800 with the top removed, in accordance with some embodiments of the technology described herein. As shown in FIG. 18H, microphones 1864*a* and 1864*b* are mounted to the interior side walls 1860 of the housing. In the illustrated embodiment, microphones 1864*a* and 1864*b* are printed circuit board (PCB) microphones. The microphones are mounted to the interior side walls such that the microphone is aligned with the apertures in the respective side walls. In other embodiments, any suitable type of microphone, as described herein, may be used in place of or in combination with the PCB microphones.

FIG. 18I illustrates a perspective view of microphone 1862, in accordance with some embodiments of the technology described herein. The housing of the mobile vehicle diagnostic device may be configured to retain the microphones at the appropriate positions of the sidewalls. In some embodiments, the interior of the side walls may be configured with locking clips 1862. Locking clips may have inward facing chamfered surfaces to facilitate flexing of the clip when inserting components between the clips. Once a component has been inserted, flat shelf-like surfaces are configured to restrict the component from movement away from the side wall. In some examples, locking clips 1832 may be included on each side of the PCB microphone 1864*b* to restrict both movement of the PCB microphone parallel to the side wall and movement away from the sidewall. In some embodiments, locking clips 1832 may be included on either side of the PCB microphone along the long direction of the side wall to restrict movement of the PCB microphone along the long direction of the side wall, as shown in FIG. 18I.

In some embodiments, the interior sidewalls may include protruding posts configured to extend through apertures on PCB microphone 1864*b*. The posts may restrict movement of the PCB microphones parallel to the side wall. For example, the interior sidewalls may include two posts configured to extend through two corresponding apertures on a PCB microphone so as to create two points of contact between the housing and the PCB to restrict translations and rotations in a plane oriented parallel to the sidewall, as shown in FIG. 18I.

FIG. 18J illustrates a top view of the mobile vehicle diagnostic device 1800 with the top removed, in accordance with some embodiments of the technology described herein. As shown in FIG. 18J, each side wall of the housing may include a separately mounted PCB microphone 1864. In some embodiments, each PCB microphone 1864 may be configured as described herein with reference to FIGS. 18H and 18I. In some embodiments, one or more of PCB microphones 1864 may be retained by the housing using any other suitable mounting method.

FIG. 18K illustrates a top view of microphone 1864*c*, in accordance with some embodiments of the technology described herein. When acquiring audio recordings, vibrations from the vehicle may result in artifacts in the audio recording. For example, vehicle vibrations may be transferred through the housing to the microphone. Vibrations of the microphone may result in rattling of the microphone against the housing which may produce sounds that could be detected as audio artifacts. Additionally, the frequency of vibration itself may generate audio artifacts depending on the frequency.

Accordingly, in some embodiments, the MVDD includes at least one dampening device disposed in the housing and positioned to dampen vibration of the microphones in the MVDD. In some embodiments, a dampening device may be a device for passively suppressing vibration. For example, such a dampening device may be made from and/or include materials which have, or which have been designed to have, vibration dampening properties. Examples of such materials include flexible materials such as foams, rubber, cork, and laminates. As another example, such a dampening device may be made from one or more mechanical springs, wire rope isolators and/or air isolators that are designed to absorb and/or dampen vibrations.

Additionally or alternatively, active isolation techniques may be used to suppress vibrations, in accordance with some embodiments. Active vibration techniques include feedback circuits and sensors for controlling an actuator to compensate for vibrations. For example, piezoelectric accelerometers, microelectromechanical systems (MEMS), or other motion sensors may be used with a feedback circuit to generate signals for actuating a linear actuator, pneumatic actuator, or piezoelectric actuator to compensate for vibrations.

In some embodiments, the dampening device may be implemented using a gasket disposed between a microphone (e.g., a PCB microphone) and the sidewall of the housing. The gasket may suppress vibrations and/or mitigate the transfer of vibrations from the housing to the microphone. For example, as shown in FIG. 18K, a gasket 1868 may be included between PCB microphone 1864*c* and the side wall of the housing. Such a gasket may be included between each microphone and the sidewall to which that microphone is mounted, as can be seen in FIG. 18J. Another gasket configuration is further discussed below, in connection with FIG. 18N.

In some embodiments, the gaskets used as dampening devices may be formed from an open-cell and/or closed-cell foam material. For example, gaskets may be made of a polyurethane foam, melamine foam, nitrile sponge, polystyrene foam, or neoprene foam. In some embodiments, gaskets may be formed from a rubber material. For example, gaskets may be made of silicon rubber. In some embodiments, other plastic or polymeric materials configured to dampen vibrations generated by a vehicle may be used.

Figure 18N:
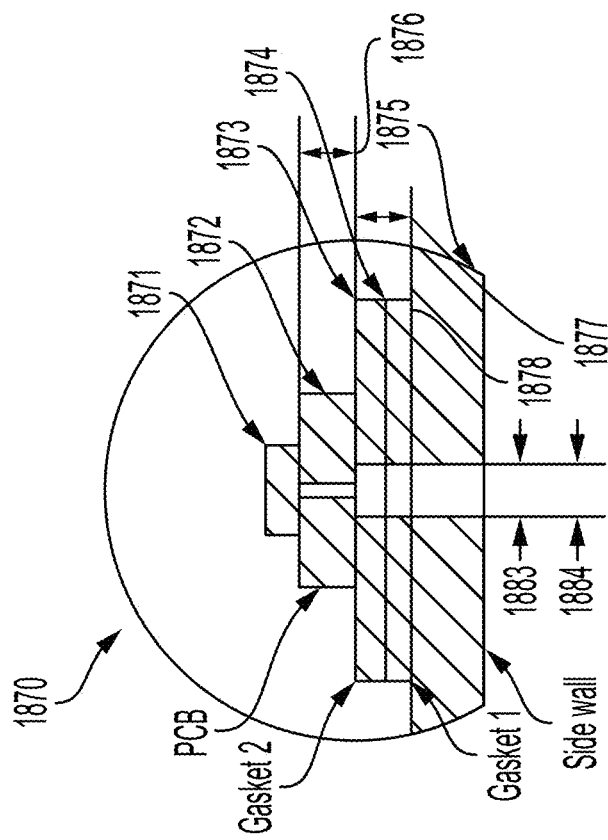
FIG. 18N illustrates a cross sectional view of a microphone with an alternative gasket configuration 1870, in accordance with some embodiments of the technology described herein.
Figures 18L, 18M:
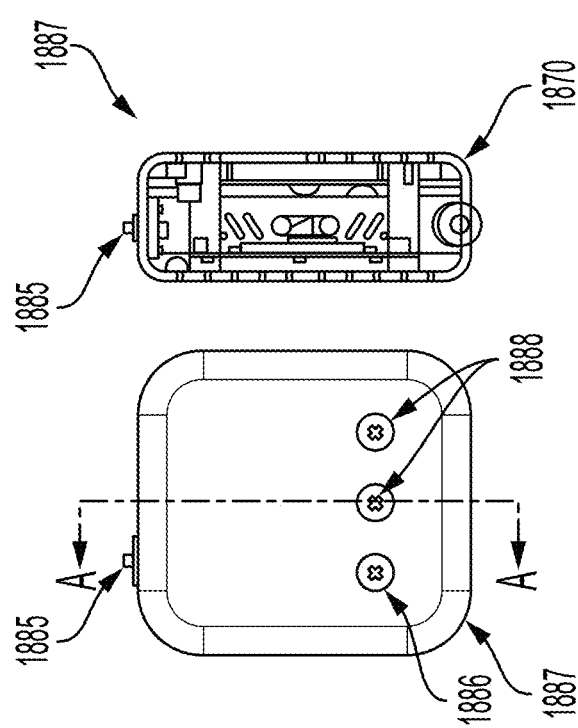
FIG. 18L illustrates a top view of the MVDD 1887, in accordance with some embodiments of the technology described herein.
FIG. 18M illustrates a cross sectional view taken along line A of MVDD 1887 of FIG. 18L, in accordance with some embodiments of the technology described herein.

FIG. 18L illustrates a top view of the MVDD 1887, in accordance with some embodiments of the technology described herein. As shown in FIG. 18L, MVDD 1887 may include UI buttons 1886 and 1888, and power switch 1885. The top view also shows cross-sectional line A. Cross sectional line A is aligned along one of the sound paths of the MVDD.

FIG. 18M illustrates a cross sectional view taken along line A of MVDD 1887 of FIG. 18L, in accordance with some embodiments of the technology described herein. The cross-sectional view illustrates power switch 1885 and microphone configuration 1870. In some embodiments, the power switch 1885 facilitates an operation to hard power on and hard power off the MVDD during use and/or when out of use.

FIG. 18N illustrates a cross sectional view of a microphone with an alternative gasket configuration 1870, in accordance with some embodiments of the technology described herein. As shown in FIG. 18L, the PCB 1872 and its corresponding microphone 1871 are mechanically connected to the side wall 1875 of the housing. The gasket configuration 1870 includes a first gasket 1874 mechanically connected to the exterior wall and a second gasket 1873. The second gasket 1873 is mechanically connected to the first gasket 1874 and the PCB 1872.

In some embodiments, the aperture of the housing may have a diameter 1884 between 0.2 inches and 1 inch. For example, the aperture of the housing may have a diameter of approximately 0.44 inches. In some embodiments, the aperture through the gaskets may have a diameter 1883 between 0.1 inches and 1 inch. For example, the gaskets aperture may have a diameter of approximately 0.36 inches.

In addition to providing vibration dampening, gaskets may also provide protection from the surrounding environmental conditions. In some embodiments, the first gasket 1873 and the second gasket 1874 form a gasket chamber which protects the microphone 1871 from the exterior elements. For example, the gaskets may be configured to protect against intrusion of water, humidity, and dust. In some embodiments, the gasket channel may be configured to minimize sound distortion. In some embodiments, the first gasket 1873 and the second gasket 1871 are made of a foam material which may minimize reflections inside the MVDD. In some embodiments, the opening further includes an acoustic mesh (not shown) which minimizes water and dust ingress while maintain the frequency response of the microphone.

Having thus described several configurations of the housing of an example mobile vehicle diagnostic device, it should be understood that the various features described herein may be used in any suitable combination such as to facilitate the use of the system in detecting potential vehicle defects. The housing may include any or all of the sensors described herein for acquiring measurements which may be used in detecting potential vehicle defects. The sensors contained within the housing may be arranged in any suitable configuration.

Figure 19A:
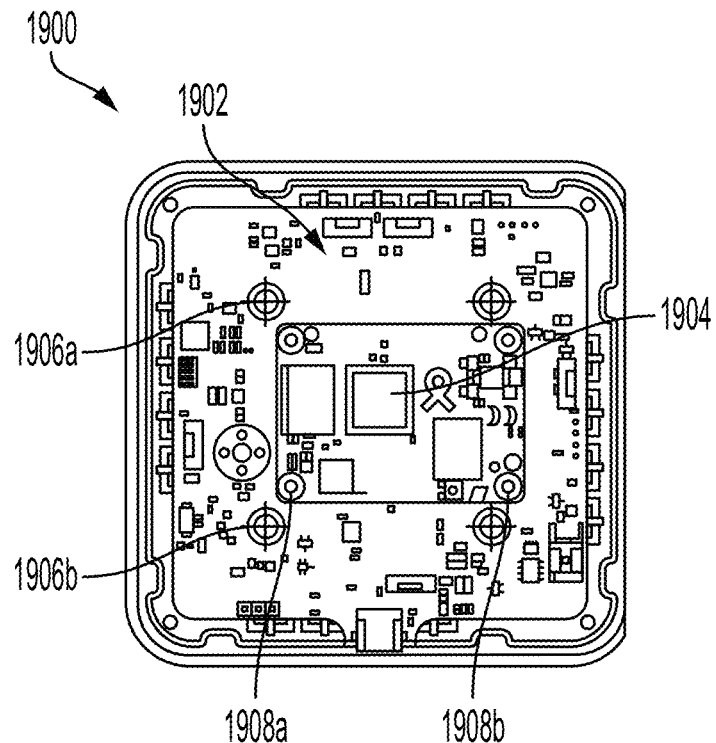
FIG. 19A illustrates a top view of an example configuration for electronic components within the housing, in accordance with some embodiments of the technology described herein.

FIG. 19A illustrates a top view of an example configuration for electronic components within the housing, in accordance with some embodiments of the technology described herein. Electronic component configuration 1900 includes main circuit board 1902 and expansion board 1904.

In some embodiments, the processor, memory, wireless interface, and connectors to the sensors, and I/O system may be placed on a printed circuit board (PCB) which is secured to the bottom of the MVDD. This allows the sensors to be placed throughout the middle of the enclosure including placing the sensor that require open air near vents or other openings.

In some embodiments, main circuit board 1902 may be configured to provide electrical connections between the components of the mobile vehicle diagnostic device. For example, the sensors and processor may be fabricated as separate components from the main circuit board but may connect and communicate through the main circuit board.

In some embodiments, the microphones mounted to the sidewalls may be communicatively coupled through cables to the main circuit board. In other embodiments, the microphones may be communicatively coupled to the main circuit board through any suitable semiconductor packaging technique, as aspects of the technology described herein are not limited in this respect. In some embodiments, the microphones may be fabricated as integrated components of the main circuit board.

Main circuit board 1902 may be mounted to the housing in any suitable way such that the main circuit board is not damaged by the movement induced during the transport and/or use of the mobile vehicle diagnostic device. In some embodiments, fasteners may be used to mount main circuit board 1902 to the housing. For example, fasteners 1906a and 1906b may be screws configured to pass through respective fixing holes on the main circuit board and into threaded holes of the housing.

In some embodiments, an array of sensors may be integrated with expansion board 1904. In some embodiments, the array of sensors may include any or all of the sensors described herein. In some embodiments, expansion board 1904 may include a processor. In some embodiments, the array of sensors may be integrated with the main circuit board. In some embodiments, the array of sensors may be integrated in part with the main circuit board and in part with the expansion board.

Expansion board 1904 may be mounted to the housing in any suitable way such that the expansion board is not damaged by the movement induced during the transport and/or use of the mobile vehicle diagnostic device. In some embodiments, fasteners may be used to mount the expansion board 1904 to the housing. For example, fasteners 1908a and 1908b may be screws configured to pass through respective fixing holes on the expansion board and further through corresponding holes on the mainboard such that the screw may access threaded holes of the housing through the mainboard. In some embodiments, the expansion board may mount to mainboard only and not to the housing directly.

In some embodiments, electrical connections between the expansion board 1904 and the main board 1902 may be facilitated by any suitable electronics packaging. For example, the expansion board may be configured with pins and the main circuit board may be configured with corresponding sockets for providing electrical connections and communication between the boards. As another example, the expansion board and the main circuit board may include peripheral component interconnect express (PCIe) connectors for providing electrical connections and communications between the boards.

In some embodiments, the components of the expansion board may be integrated into the main circuit board to provide a single board design. In some embodiments, a portion of the components associated with the expansion board may otherwise be integrated into the main circuit board. In some embodiments, the expansion board may be implemented as a series of expansion boards each individually connected to the main circuit board. In some embodiments, additional components may be included and/or a portion of the listed components may be excluded, as aspects of the technology described herein is not limited in this respect.

Figure 19B:
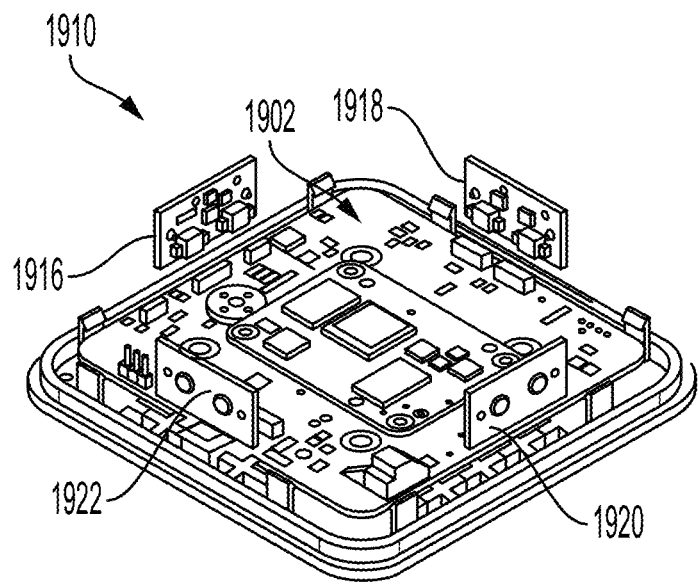
FIG. 19B illustrates a perspective view of configuration 1910 of the microphones and sensors of the mobile vehicle diagnostic device with the top and side walls removed, in accordance with some embodiments of the technology described herein.

FIG. 19B illustrates a perspective view of configuration 1910 of the microphones and sensors of the mobile vehicle diagnostic device with the top and side walls removed, in accordance with some embodiments of the technology described herein. As shown in FIG. 19B, microphones 1916, 1918, 1920, 1922 are configured to receive sounds from the left, front, right, and back directions, respectively. In some embodiments, main circuit board 1902 is mounted to the bottom of the housing and each of the microphones are positioned above the edges of the main circuit board. In some embodiments, the relative positions of the microphones to the main circuit board may be different, as aspects of the technology described herein are not limited in this respect.

Figure 20:
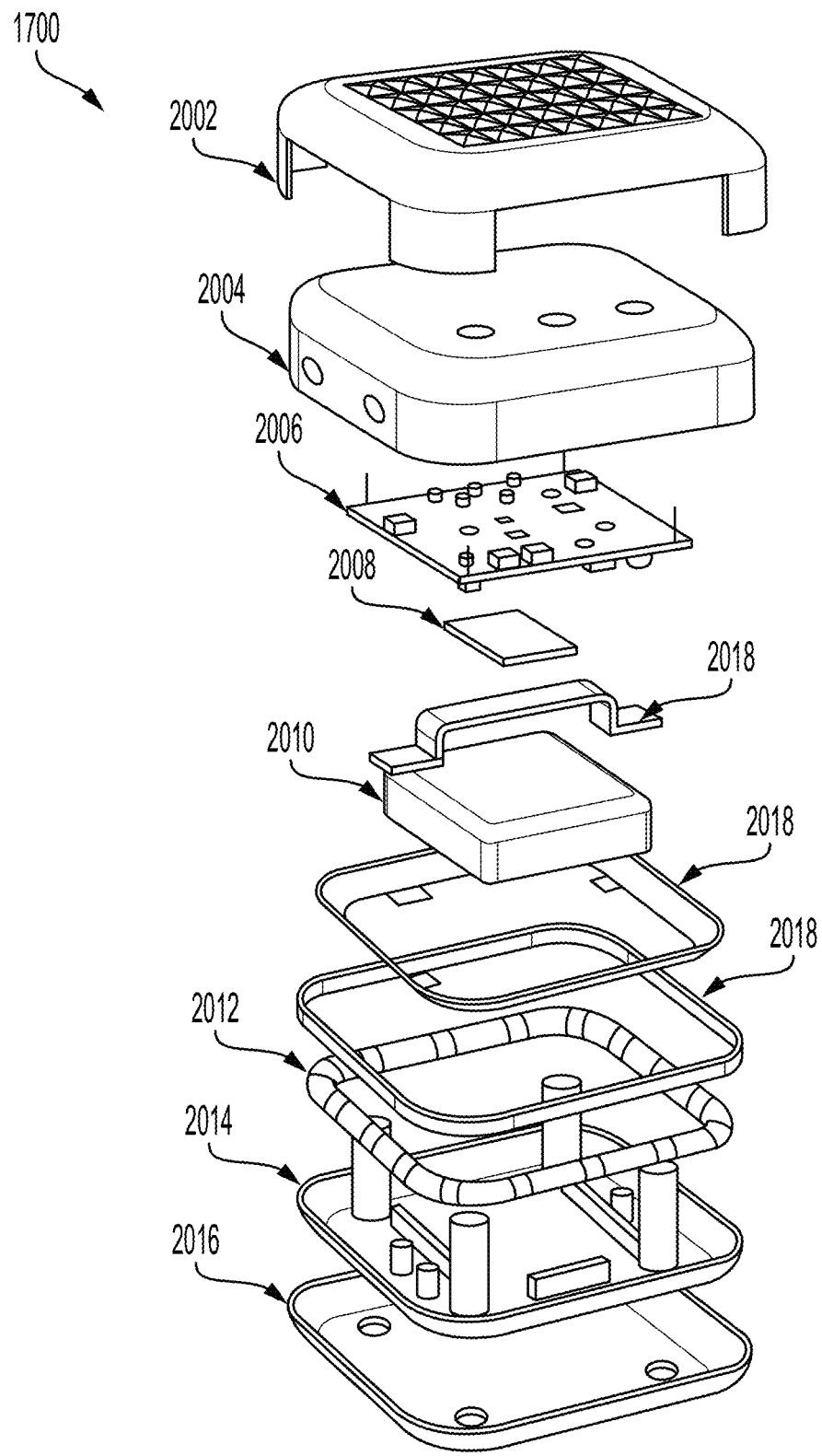
FIG. 20 illustrates an exploded view of the example mobile vehicle diagnostic device shown in FIG. 17A, in accordance with some embodiments of the technology described herein.

FIG. 20 illustrates an exploded view of the example mobile vehicle diagnostic device shown in FIG. 17A, in accordance with some embodiments of the technology described herein. In the illustrated embodiment, the mobile vehicle diagnostic device includes an upper overmold 2002, a lower overmold 2016, an upper exterior shell 2004, a lower exterior shell 2014, a PCB board 2006 with mounted processing components, storage components, sensors, networking components, a storage device 2008, a battery 2010, an LED ring 2012, and mounting and connecting components 2018.

Figure 21:
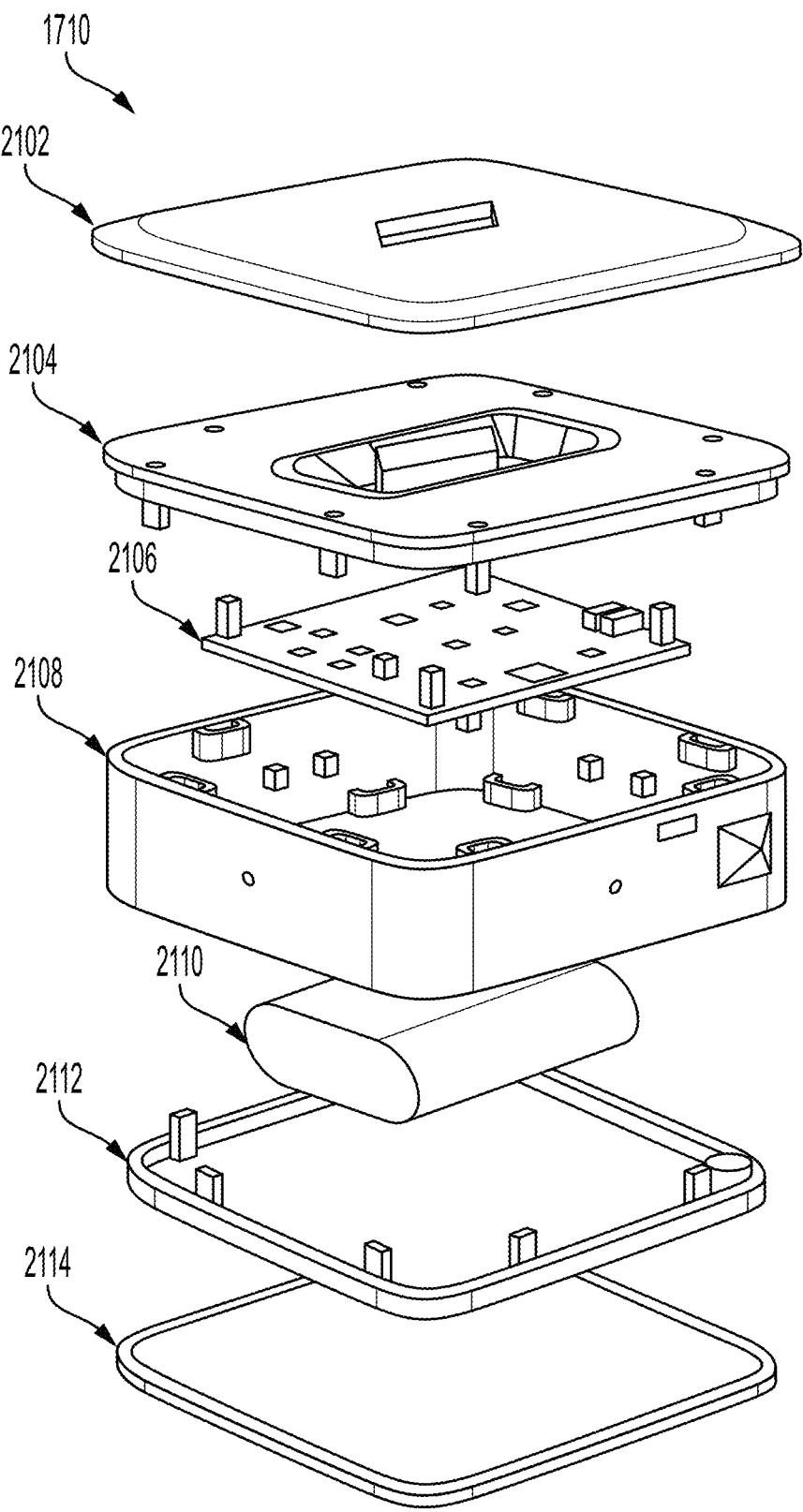
FIG. 21 illustrates an exploded view of the example mobile vehicle diagnostic device shown in FIG. 17B, in accordance with some embodiments of the technology described herein.

FIG. 21 illustrates an exploded view of the example mobile vehicle diagnostic device shown in FIG. 17B, in accordance with some embodiments of the technology described herein. The example shown includes an upper overmold 2102, a lower overmold 2114, an upper exterior shell 2104, a lower exterior shell 2112, a PCB board 2106 with mounted processing components, storage components, sensors, networking components, 2108 an exterior wall shell configured to mount microphones, and a battery 2110. The enclosure, created by the upper exterior shell 1206, a lower exterior shell 1208, and an exterior wall shell, is fastener free. In some embodiments, the enclosure is water and dust resistant.

FIG. 22 illustrates an example process for acquiring data about the vehicle while it is in operation, in accordance with some embodiments of the technology described herein. In some embodiments, process 2200 includes positioning the MVDD 2202 in the engine bay on top of engine cover 2204.

In some embodiments, the MVDD is configured to communicate data acquired by the MVDD to user device 2206. For example, the MVDD may be configured to communicate data to the user device 2206 via a Wi-Fi connection (e.g., after having facilitated the setup of that connection using Bluetooth). User device 2206 may be configured to display an interface to allow the user to view data collected by the MVDD (e.g., via a visualization of an audio recording), control operation of the MVDD, provide input to and/or receive output from the MVDD, and/or any other functions described herein.

Although illustrated as being used on an internal combustion passenger vehicle in the example of FIG. 22, the MVDD may be used to in connection with any other suitable type of vehicle(s) (e.g., electric cars, commercial or industrial trucks, trucks, busses, boats, planes, recreational equipment, industrial equipment, etc.).

In some embodiments, the data collected by an MVDD may be used in conjunction with data collected by other methods and, for example, by methods for imaging the vehicle undercarriage as described in U.S. Patent Application Pub. No. US 2020/0322546, published on Oct. 8, 2020, titled "Vehicle Undercarriage Imaging System".

In some examples, the MVDD may be placed under a vehicle together with such a vehicle undercarriage imaging system, such that the additional sensors allow for addition insights into the condition of the vehicle. For example, microphones may capture exhaust noise as well as any abnormal accessory noise, while the vehicle undercarriage imaging system is in the process of capturing and processing an undercarriage image. The VOC/gas sensors may also be used to detect an exhaust leak or the absence of a catalytic converter, this information may be combined with the images received using virtual lift to provide a more complete understanding of the vehicle condition. Though, in some embodiments, the MVDD may be used to collect data underneath the vehicle without the vehicle undercarriage imaging system, as these techniques may be used independently.

As described herein, a user's mobile device (e.g., mobile device 108) may operate a software application to assist a user in inspecting the vehicle with the mobile vehicle diagnostic device. The software application may perform a variety of functions including, but not limited to, allowing the user to control the MVDD, sending commands to the MVDD, receiving data from the MVDD, processing data received from the MVDD (e.g., pre-processing and/or analyzing the data using trained ML models deployed on the mobile device), transmitting the data for further analysis to one or more remote computers (e.g., server(s) 129), displaying visualizations of the data received from the MVDD to the user, and troubleshooting any issues with the MVDD.

In some embodiments, the software application may guide the user in using the MVDD. To this end, the software application may provide a user with instructions (e.g., through a series of one or more screens) to help the user operate the MVDD. This may facilitate users having different levels of experience (e.g., a user who is not a mechanic or who otherwise has no experience inspecting vehicles) in performing vehicle inspection.

As part of such guidance, the software application may provide the user with instructions before, during, and/or after collecting data with the MVDD. For example, prior to collecting data with the MVDD, the software application may provide the user with instruction(s) for how and where to position the MVDD, how to turn on the MVDD, how to pair the MVDD with the mobile device on which the software application is executing (e.g., via Bluetooth), and/or how to cause the MVDD to start taking measurements.

As another example, while the MVDD is collecting data, the software application may guide the user through a sequence of actions the user should take with respect to operating the vehicle to take the vehicle's engine through a series of stages (e.g., by instructing the user to start the engine, allow for an idle period, rev the engine, turn off the engine, repeat any one or more of these steps, etc.).

As another example, after the MVDD completes taking measurements, the software application may show the user results of the data collection (e.g., a visualization of the data) and/or provide the user with an indication of the quality of the data being collected. For example, the indication of quality may indicate whether there was environmental noise in the audio and that the audio data should be collected again. As another example, the indication of quality may be a confirmation that all types of data which were attempted to be collected were, in fact, collected. In some embodiments, if any anomalies are detected by the on-board machine learning algorithm (e.g., on the MVDD, on the mobile device, or by a remote server), then a user may be informed (e.g., via a pop-up notification) that a condition needs to be further inspected or addressed.

In some embodiments, the software application on the mobile device may be configured to collect information from the user. For example, the software application may prompt the user with questions and collect the users answers. For example, a user interface may be displayed to a user which provides a form for a user to provide observations. For example, a user may list engine problems (e.g., Engine Does Not Stay Running, Internal Engine Noise, Runs Rough/Hesitation, Timing Chain/Camshaft Issue, Excessive Smoke from Exhaust, Head Gasket Issue, Excessive Exhaust Noise, Catalytic Converters Missing, Engine Accessory Issue, Actively Dripping Oil Leak, Oil/Coolant Intermix on Dipstick, Check Engine Light Status, Anti-Lock Brake Light Status, Traction Control Light Status, transmission issues, engine misfires, suspension issue, drive train issue, electrical issue etc.) in response to one or more questions.

In some embodiments, the application operates with other vehicle inspection tools (e.g., "virtual lift" tools, which may provide the user with images of the vehicle's undercarriage). For example, frame rot may be detected and displayed to the user, which may provide the user with additional context to the data collected by the MVDD.

In some embodiments, the methods and systems described herein may be used with a platform to buy and sell vehicles. In some embodiments, the data collected may be used to verify that a test purported to be completed was actually completed. For example, GPS data on the mobile device may be used to determine that a user did a test drive, and/or using the accelerometer and gyroscope data may be used to ensure that tests for acceleration and/or braking of the vehicle were performed.

Figure 23:
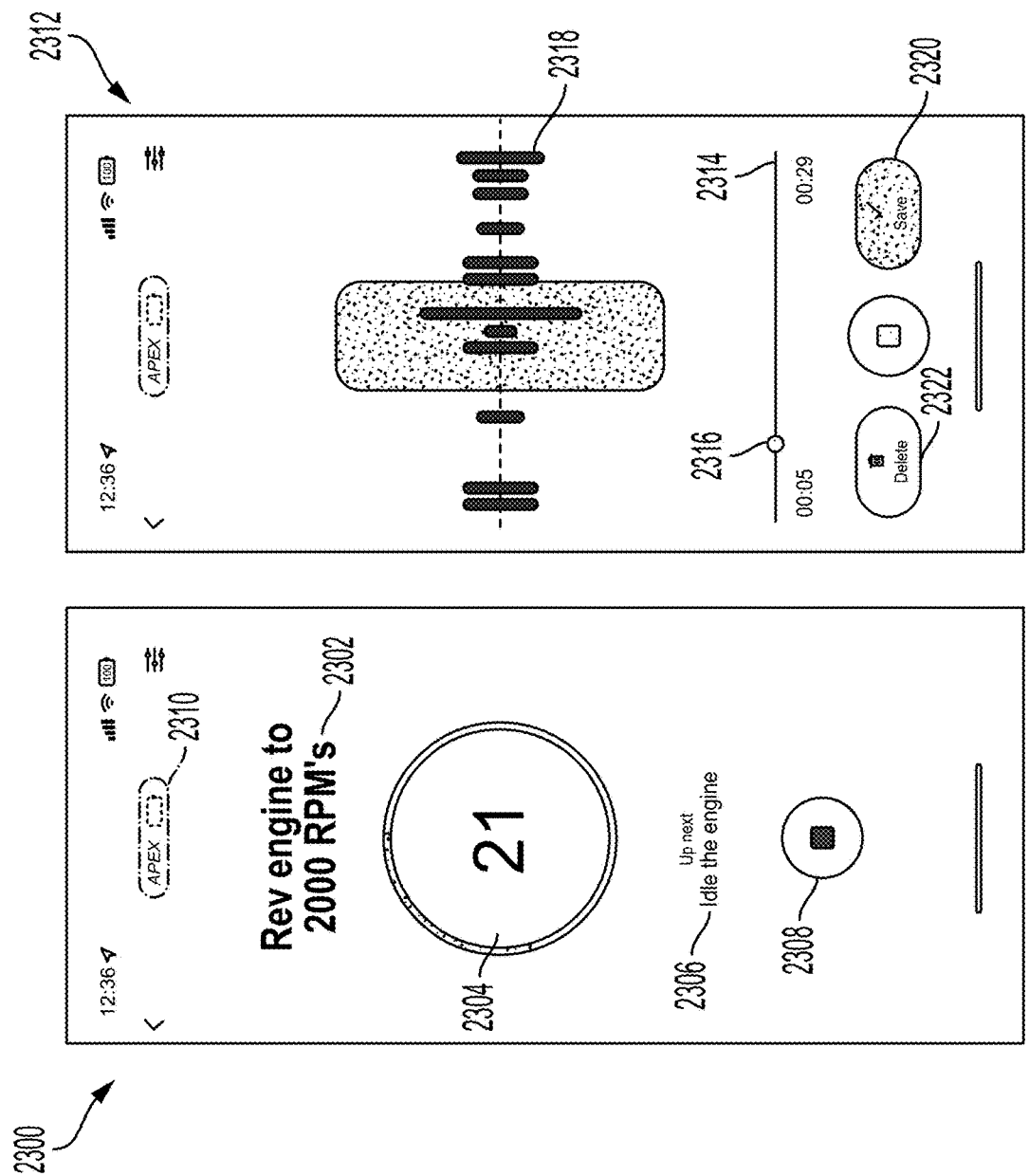
FIG. 23 illustrates example screenshots of a user interface of a software application program executing on a mobile device and configured to allow the user to operate and/or interface with an MVDD, in accordance with some embodiments of the technology described herein.

FIG. 23 illustrates example screenshots of a user interface of a software application program executing on a mobile device and configured to allow the user to operate and/or interface with an MVDD, in accordance with some embodiments of the technology described herein. FIG. 23 shows screenshots 2300 and 2312.

As described herein, in some embodiments, the software application may facilitate use of the MVDD to obtain data about a vehicle being inspected. For example, the software application may display a series of instructions to a vehicle inspector for what to do in order for the data to be collected. The software may show a screen having one or multiple instructions and an indication of the order in which the vehicle inspector is to perform these instructions.

FIG. 23 shows an example screenshot 2300 representative of a display a vehicle inspector may say when the software application is guiding the vehicle inspector in operating the MVDD. As shown, screenshot 2300 includes instruction 2302 ("Rev engine to 2000 RPMs" in this example) instructing the inspector to rev the vehicle's engine to the indicated RPMs. Of course the software application may generate other instructions for the user (e.g., an instruction to start or stop or idle the engine, an instruction to rev to a different number of RPMs, etc.). The software application may provide an indication of the next instructions to be given to the user as shown in portion 2306 of the screenshot 2300. The overall progress of the data collection is shown by progress bar 2304. The inspector may pause data collection by pushing the button 2308. The inspector may be informed about the status of the MVDD (e.g., connectivity, battery, etc.) via indicator 2310.

In some embodiments, the software application may be used to review data collected by the vehicle inspector. For example, as shown in screenshot 2312, the inspector may visualize audio recording 2318 and control its playback via bar 2316. The overall duration 2314 may be indicated. The inspector may delete 2322 or save 2320 an audio recording.

Figure 24A:
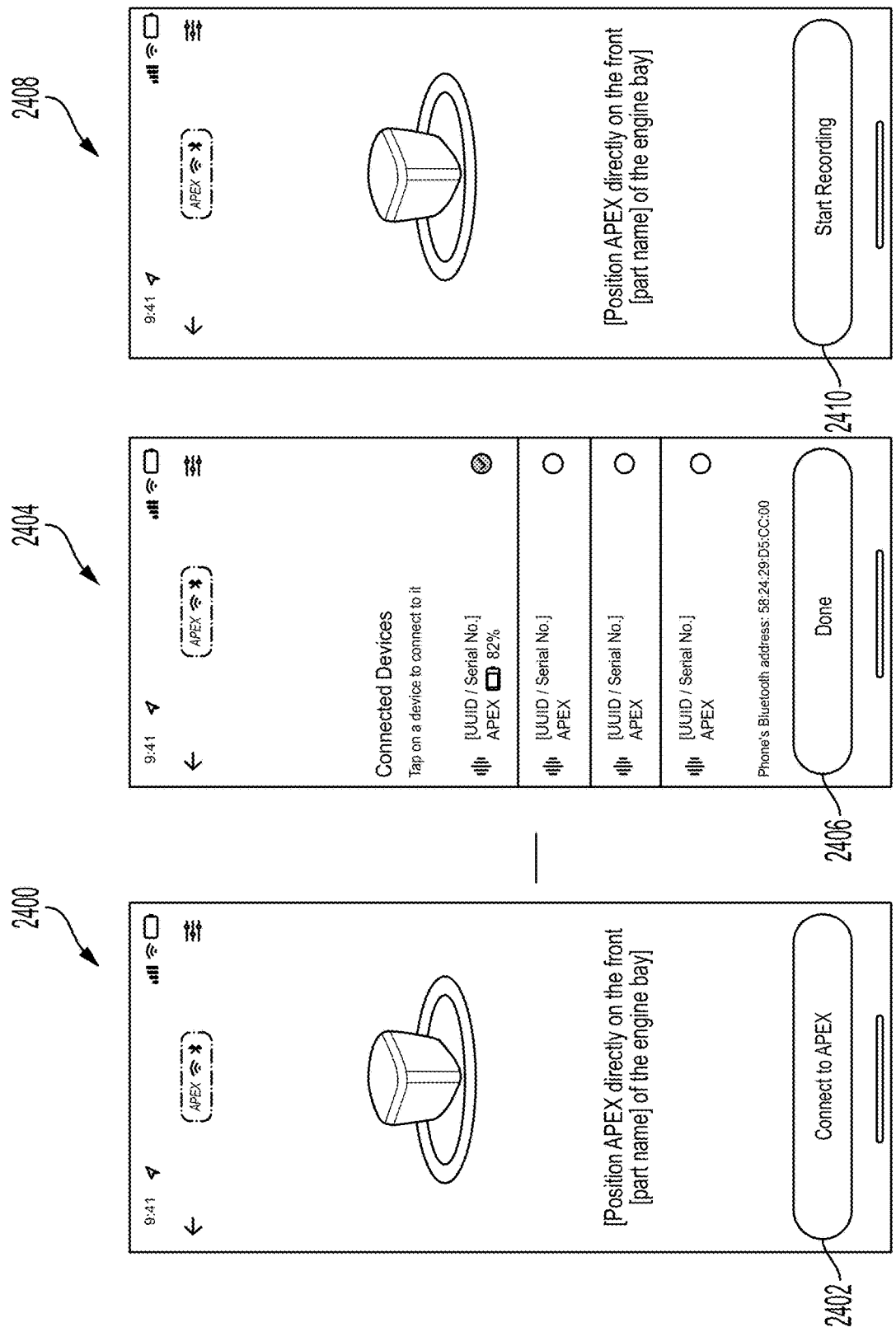
FIG. 24A illustrates an example user interface flow for connecting to an MVDD, in accordance with some embodiments of the technology described herein.

FIG. 24A illustrates an example user interface flow for connecting to the MVDD, in accordance with some embodiments of the technology described herein. The user interface flow includes a series of user interfaces 2400, 2404, and 2406. The user interface 2100 displays instructions to place the MVDD on the engine and a connect button 2402 which, when selected, updates the display to the user interface 2404. The user interface 2404 displays a selectable list of available MVDDs. After a user selects the MVDD, a connection complete button 2406 is made selectable by a user. Selecting the connection complete button 2406 updates the display to the user interface 2408. The user interface 2408 displays a start recording button 2410. A user selects the start recording button when the vehicle and user is prepared to start the inspection process for the vehicle. Selecting the recording button updates the display to the user interface 2410 illustrated in FIG. 24B.

Figure 24B:
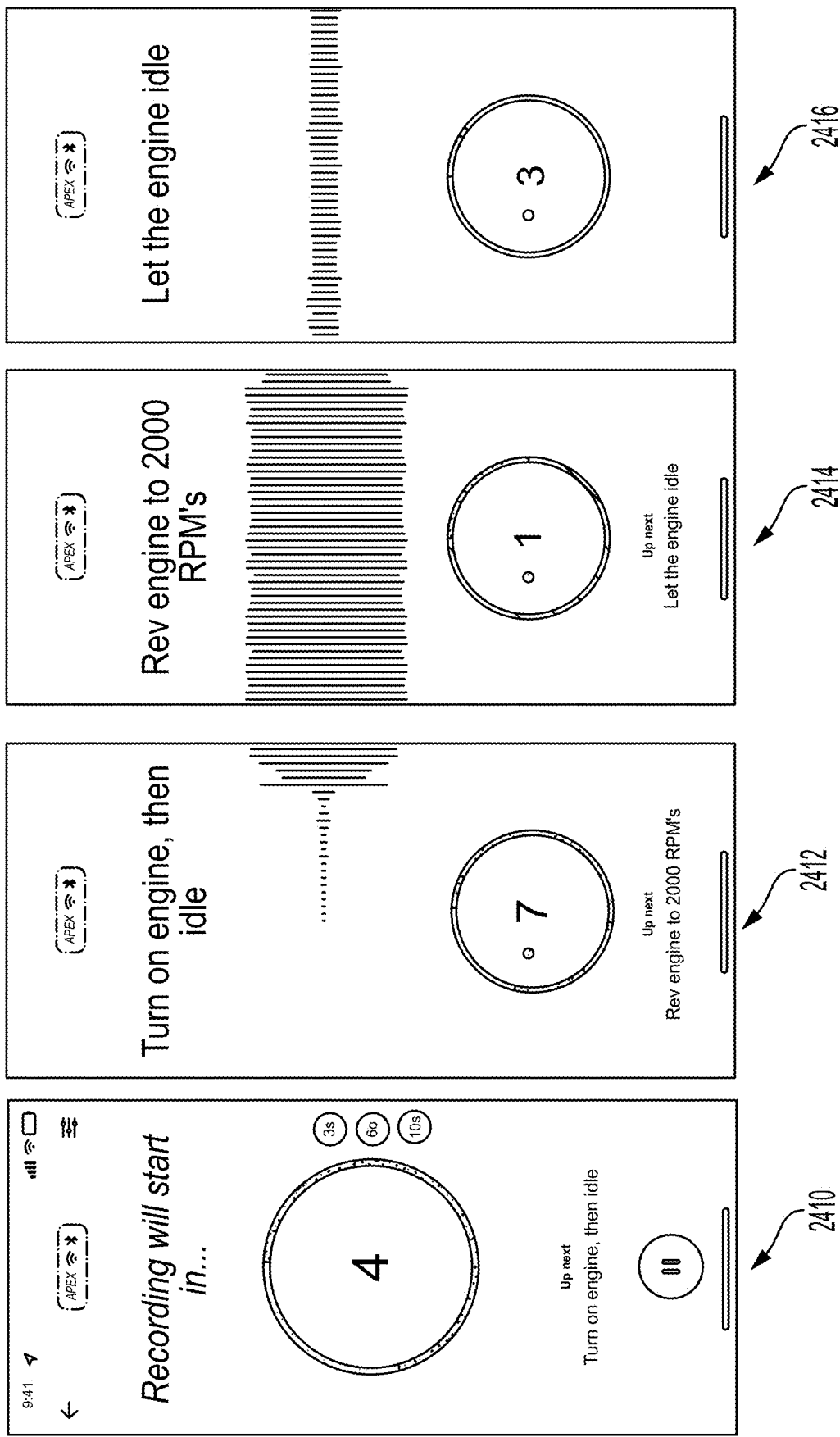
FIG. 24B illustrates an example user interface flow for recording an inspection process, in accordance with some embodiments of the technology described herein.

FIG. 24B illustrates an example user interface flow for recording an inspection process, in accordance with some embodiments of the technology described herein. The user interface 2410 displays a countdown indicating when the recording (from the microphones and/or other sensors) is to start. The button of the user interface includes instructions for the next step in the inspection process (e.g., "Turn on engine, then idle"). The user interface 2412 displays the engine start and idle step in the inspection process with a count down and "up next" instructions. The user interface 2414 displays the rev engine step in the inspection process. In the example shown, the rev instructions are to 2000 RPMs, in other example the rev may be to other levels of RPMs (e.g., 2800). In some examples, multiple rev steps are repeated to different RPM levels. The user interface 2414 also includes a count down and an "up next" instructions. The user interface 2416 displays instructions and a countdown for a final idle. In some examples, each count down is for 10 seconds. In other examples, each step has a specific count (e.g., 10 seconds for an idle and 5 second for a rev).

Figure 24C:
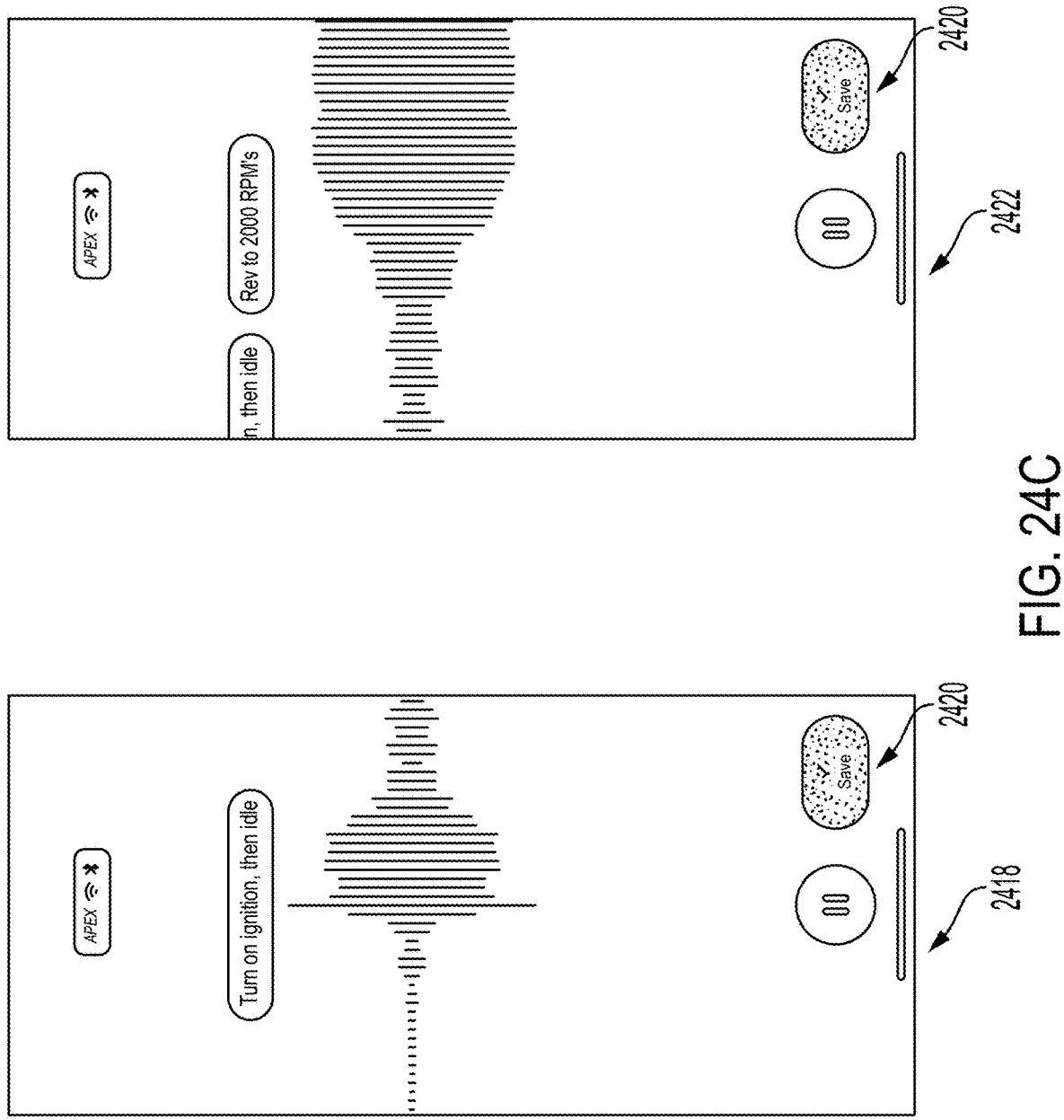
FIG. 24C illustrates an example user interface for listening to a playback of a recorded inspection, in accordance with some embodiments of the technology described herein.

FIG. 24C illustrates an example user interface for listening to a playback of a recorded inspection, in accordance with some embodiments of the technology described herein. After completing an engine inspection process a user may playback the recorded audio file. In some examples, the audio file may be processed and runs through preliminary models to inspect for issues. The user interface 2418 may be displayed when the playback for the audio file is at the portion for igniting the engine and idling thereafter. The user interface 2422 may be displayed when the playback of the audio file is at the rev step of the inspection process. After a user listens to the playback, (and sometimes confirms the quality of the sample and/or that the correct tests were performed) a user may select the button 2420 to save the audio file (with any other sensor readings). In some embodiments, saving the audio file further includes uploading the recorded data for further processing.

Figure 25:
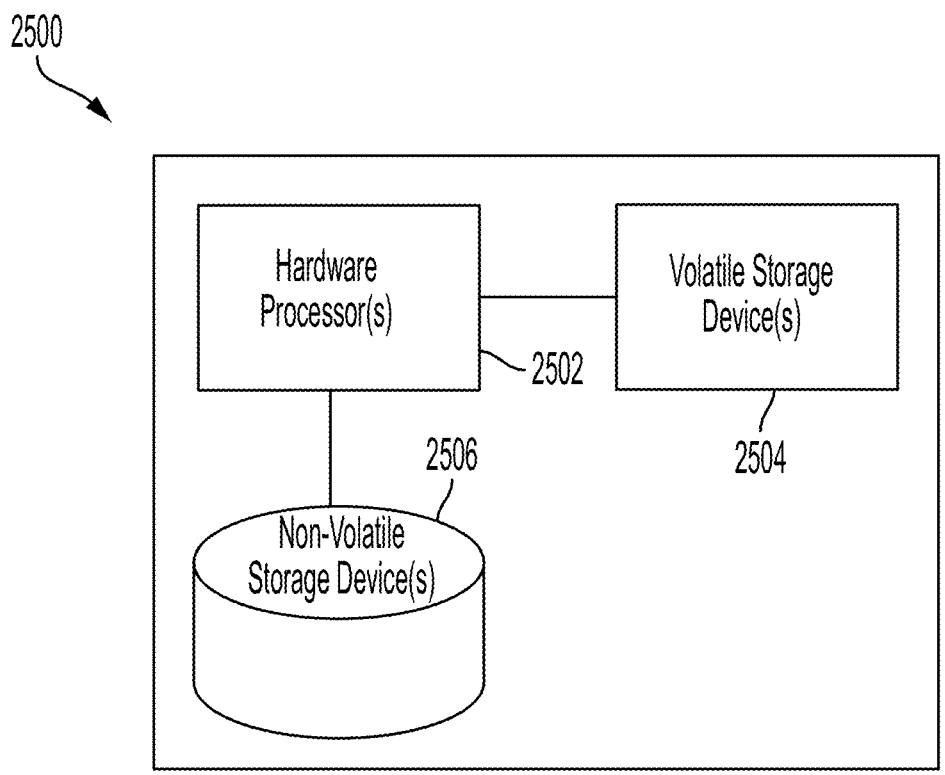
FIG. 25 is a block diagram of an illustrative computing system that may be used in implementing some embodiments of the technology described herein.

An illustrative implementation of a computer system 2500 that may be used in connection with any of the embodiments of the disclosure provided herein is shown in FIG. 25. For example, any of the computing devices described herein (e.g., 108, 124, 128, 129) may be implemented as computer system 2500. The computer system 2500 may include one or more computer hardware processors 2502 and one or more articles of manufacture that comprise non-transitory computer-readable storage media, for example, one or more volatile storage device 2504 (e.g., random access memory or any other suitable type of memory) and/or one or more non-volatile storage devices 2506 (e.g., a hard disk, a flash memory, etc.). The hardware processor 2502(s) may control writing data to and reading data from the volatile storage device(s) 2504 and the non-volatile storage device(s) 2506 in any suitable manner. To perform any of the functionality described herein, including with respect to any process described herein, the hardware processor(s) 2502 may execute one or more processor-executable instructions stored in one or more non-transitory computer-readable storage media (e.g., the volatile storage device(s) 2504 and/or non-volatile storage device(s) 2506), which may serve as non-transitory computer-readable storage media storing processor-executable instructions for execution by the hardware processor(s) 2502.

Having thus described several aspects of at least one embodiment of the technology described herein, it is to be appreciated that various alterations, modifications, and improvements will readily occur to those skilled in the art. Such alterations, modifications, and improvements are intended to be part of this disclosure, and are intended to be within the spirit and scope of disclosure. Further, though advantages of the technology described herein are indicated, not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein may be implemented in any of numerous ways. For example, the embodiments may be implemented using hardware, software, or a combination thereof. When implemented in software, the software code may be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone, tablet, or any other suitable portable or fixed electronic device.

Also, a computer may have one or more input and output devices. These devices may be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks, fiber optic networks, or any suitable combination thereof.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media may be transportable, such that the program or programs stored thereon may be loaded onto one or more different computers or other processors to implement various aspects of the technology as described above. As used herein, the term "computer-readable storage medium" encompasses only a non-transitory computer readable medium that may be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of processor-executable instructions that may be employed to program a computer or other processor to implement various aspects of the technology as described above. Additionally, one or more computer programs that when executed perform methods of the technology described herein need not reside on a single computer or processor, but may be distributed in a modular fashion amongst a number of different computers or processors to implement various aspects of the technology described herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 3, 6, 8, 10, 13, 15A, 15B, and 15C. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing," "involving," and variations thereof, is meant to encompass the items listed thereafter and additional items.

Unless otherwise specified, the terms "approximately," "substantially," and "about" may be used to mean within ±10% of a target value in some embodiments. The terms "approximately," "substantially" and "about" may include the target value.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system for detecting presence of vehicle defects from audio acquired at least in part during operation of an engine of a vehicle, the system comprising:
   (A) a mobile vehicle diagnostic device (MVDD) for acquiring data about the vehicle at least in part during operation of the vehicle, the MVDD comprising:
      a housing configured to be mechanically coupled to the vehicle, and
      a plurality of acoustic sensors disposed within the housing and configured to acquire sound generated by the vehicle during its operation, the plurality of acoustic sensors oriented in different directions;
   (B) a mobile computing device communicatively coupled to the MVDD and configured to:
      receive data from the MVDD, the data comprising an audio recording acquired by at least one of the plurality of acoustic sensors during operation of the engine of the vehicle, and
      transmit the data, via at least one communication network, to at least one computing device; and
   (C) the at least one computing device, being configured to perform:
      obtaining, via the at least one communication network, the audio recording;
      processing the audio recording using a trained ML model to detect, from the audio recording, presence or absence of at least one vehicle defect, the processing comprising:
         generating audio features from the audio recording, and
         processing the audio features using the trained ML model to obtain output indicative of presence or absence of the at least one vehicle defect.

2. The system of claim 1, wherein the MVDD further comprises:
   at least one dampening device disposed in the housing and positioned to dampen vibration the plurality of acoustic sensors caused by operation of the vehicle.

3. The system of claim 1, wherein the MVDD further comprises:
   at least one vibration sensor disposed within the housing and configured to sense vibration in the housing caused by the operation of the vehicle.

4. The system of claim 1, wherein the plurality of acoustic sensors comprising first and second acoustic sensors respectively oriented in first and second directions, wherein the first and second directions are at least 30 degrees apart.

5. The system of claim 2,
   wherein the housing comprises a plurality of walls and each of the plurality of acoustic sensors is attached to a respective wall in the plurality of walls, and
   wherein the at least one dampening device comprises a plurality of dampening devices disposed between the plurality of walls and the plurality of acoustic sensors to dampen vibrations from the housing to the plurality of acoustic sensors.

6. The system of claim 3,
   wherein the plurality of acoustic sensors are configured to be responsive to audio frequencies between 200 Hz to 60 kHz, and
   wherein the at least one vibration sensor is configured to be responsive to frequencies of 5-800 Hz.

7. The system of claim 1, wherein the MVDD further comprises: at least two sensors selected from the group consisting of a gas sensor, a temperature sensor, a pressure sensor, a vibration sensor, a humidity sensor, a gyroscope, and a magnetometer.

8. The system of claim 1, wherein the housing comprises:
   a rigid base,
   a plurality of walls coupled to the rigid base, and
   an overmolding disposed on the rigid base and configured to provide mechanical, chemical, and thermal protection to components disposed within the housing.

9. The system of claim 1, wherein each of the plurality of acoustic sensors is coupled to a respective one of a plurality of walls of the housing such that each of the plurality of acoustic sensors is oriented to receive audio from a different side of the MVDD.

10. The system of claim 1, further comprising:
    an interface configured to receive signals from an onboard computer of the vehicle, the signals indicating one or more OBD codes.

11. The system of claim 1,
    wherein generating the audio features from the audio recording comprises:

generating an audio waveform from the audio recording, and
generating a two-dimensional (2D) representation of the audio waveform, and
wherein processing the audio features comprises:
processing the audio waveform and the 2D representation of the audio waveform using the trained ML model to obtain output indicative of presence or absence of the at least one vehicle defect.

12. The system of claim 11, wherein the audio recording comprises at least a first waveform for at least a first audio channel, and wherein generating the audio waveform from the audio recording comprises:
resampling the first waveform to a target frequency to obtain a resampled waveform;
normalizing the resampled waveform by subtracting its mean and dividing by its standard deviation to obtain a normalized waveform; and
clipping the normalized waveform to a target maximum to obtain the audio waveform.

13. The system of claim 11, wherein the audio waveform is between 5 and 45 seconds long and wherein a sampling frequency of the audio waveform is between 8 and 45 KHz.

14. The system of claim 11, wherein generating the two-dimensional (2D) representation of the audio waveform comprises generating a time-frequency representation of the audio waveform.

15. The system of claim 14, wherein generating the time-frequency representation of the audio waveform comprises using a short-time Fourier transform, a wavelet transform, a Gabor transform, or a chirplet transform to generate the time-frequency representation.

16. The system of claim 14, wherein generating the time-frequency representation of the audio waveform comprises generating a Mel-scale spectrogram from the audio waveform.

17. The system of claim 1,
wherein the MVDD comprises at least one vibration sensor disposed within the housing and configured to sense vibration in the housing caused by the operation of the vehicle,
wherein the data received by mobile computing device further comprises a vibration signal acquired by the at least one vibration sensor, and
wherein the at least one computing device is further configured to perform:
obtaining, via the at least one communication network, the vibration signal, and
wherein the processing further comprises:
generating vibration features from the vibration signal, and
processing the audio features and the vibration features using the trained ML model to obtain output indicative of presence or absence of the at least one vehicle defect.

18. The system of claim 17,
wherein the MVDD comprises an interface configured to receive signals from an on-board computer of the vehicle, the signals indicating one or more properties of the vehicle,
wherein the data received by mobile computing device further comprises metadata indicating the one or more properties of the vehicle, and
wherein the at least one computing device is further configured to perform:
obtaining, via the at least one communication network, the metadata, and
wherein the processing further comprises:
generating metadata features from the vibration signal, and
processing the audio features and the metadata features using the trained ML model to obtain output indicative of presence or absence of the at least one vehicle defect.

19. A system for detecting presence of vehicle defects from audio acquired at least in part during operation of an engine of a vehicle, the system comprising:
(A) a mobile vehicle diagnostic device (MVDD) for acquiring data about the vehicle at least in part during operation of the vehicle, the MVDD comprising:
a housing configured to be mechanically coupled to the vehicle,
a plurality of acoustic sensors disposed within the housing and configured to acquire sound generated by the vehicle during its operation, the plurality of acoustic sensors oriented in different directions;
(B) a mobile computing device communicatively coupled to the MVDD and configured to:
receive data from the MVDD, the data comprising an audio recording acquired by the at least one acoustic sensor during operation of the engine of the vehicle, and
transmit the data, via at least one communication network, to at least one computing device; and
(C) the at least one computing device, being configured to perform:
obtaining, via the at least one communication network, the audio recording;
processing the audio recording using a trained ML model to detect, from the audio recording, presence or absence of at least one vehicle defect, the processing comprising:
generating audio features from the audio recording, and
processing the audio features using the trained ML model to obtain output indicative of presence or absence of the at least one vehicle defect.

20. A system for detecting presence of vehicle defects from audio acquired at least in part during operation of an engine of a vehicle, the system comprising:
(A) a mobile vehicle diagnostic device (MVDD) for acquiring data about the vehicle at least in part during operation of the vehicle, the MVDD comprising:
a housing configured to be mechanically coupled to the vehicle,
a plurality of acoustic sensors disposed within the housing and configured to acquire sound generated by the vehicle during its operation, the plurality of acoustic sensors oriented in different directions;
(B) a mobile computing device configured to:
receive data from the MVDD, the data comprising an audio recording acquired by the at least one acoustic sensor during operation of the engine of the vehicle, and
transmit the data, via at least one communication network, to at least one computing device; and
(C) the at least one computing device, being configured to perform:
obtaining, via the at least one communication network, the audio recording;
processing the audio recording using a trained ML model to detect, from the audio recording, presence or absence of at least one vehicle defect.

* * * * *